US011743531B2

(12) United States Patent
Morita et al.

(10) Patent No.: US 11,743,531 B2
(45) Date of Patent: *Aug. 29, 2023

(54) CABLE, METHOD OF CONTROLLING CABLE, CONNECTION DEVICE, ELECTRONIC DEVICE, AND METHOD OF CONTROLLING ELECTRONIC DEVICE

(71) Applicant: SONY GROUP CORPORATION, Tokyo (JP)

(72) Inventors: Hiroshi Morita, Kanagawa (JP); Kazuaki Toba, Kanagawa (JP); Kazuo Yamamoto, Chiba (JP); Masanari Yamamoto, Kanagawa (JP)

(73) Assignee: SONY GROUP CORPORATION, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 17/829,744

(22) Filed: Jun. 1, 2022

(65) Prior Publication Data

US 2022/0295137 A1 Sep. 15, 2022

Related U.S. Application Data

(63) Continuation of application No. 17/482,738, filed on Sep. 23, 2021, now Pat. No. 11,375,270, which is a
(Continued)

(30) Foreign Application Priority Data

Sep. 25, 2017 (JP) ................... 2017-184226
Oct. 2, 2017 (JP) ................... 2017-193119
(Continued)

(51) Int. Cl.
*H04N 21/436* (2011.01)
*G06F 3/00* (2006.01)
(Continued)

(52) U.S. Cl.
CPC ................. *H04N 21/436* (2013.01)

(58) Field of Classification Search
CPC ....... H04N 21/436; G06F 3/00; G06F 13/385; H04L 29/06
See application file for complete search history.

(56) References Cited

U.S. PATENT DOCUMENTS

2005/0182876 A1 8/2005 Kim et al.
2010/0109795 A1* 5/2010 Jones ............... G09G 5/006
333/101
(Continued)

FOREIGN PATENT DOCUMENTS

AU 2011338491 A1 6/2013
CA 2820048 A1 6/2012
(Continued)

OTHER PUBLICATIONS

International Search Report and Written Opinion of PCT Application No. PCT/JP2018/034376, dated Dec. 11, 2018, 08 pages of English Translation and 07 pages of ISRWO.
(Continued)

*Primary Examiner* — David E Martinez
(74) *Attorney, Agent, or Firm* — Chip Law Group

(57) ABSTRACT

Provided is a cable connected between a first electronic device and a second electronic device. A determination unit determines whether or not the first electronic device is a compatible electronic device. A control unit performs control to operate in a compatible mode when the first electronic device is a compatible electronic device and operate in a non-compatible mode when the first electronic device is not a compatible electronic device on the basis of the determination result by the determination unit. Furthermore, an electronic device is connected to an external device via the cable. The determination unit determines whether or not the cable is a compatible cable. The control unit performs
(Continued)

control to operate in the compatible mode when the cable is a compatible cable and operate in the non-compatible mode when the cable is not a compatible cable on the basis of the determination result by the determination unit.

20 Claims, 97 Drawing Sheets

Related U.S. Application Data continuation of application No. 16/647,567, filed as application No. PCT/JP2018/034376 on Sep. 18, 2018, now Pat. No. 11,146,851.

(30) Foreign Application Priority Data

Nov. 1, 2017 (JP) ................................ 2017-212305
Feb. 16, 2018 (JP) ................................ 2018-026030

(51) Int. Cl.
    *G06F 13/38* (2006.01)
    *H04L 29/06* (2006.01)

(56) References Cited

U.S. PATENT DOCUMENTS

| | | | |
|---|---|---|---|
| 2010/0271486 A1 | 10/2010 | Bohm | |
| 2011/0032425 A1* | 2/2011 | Kamohara | H04N 5/765 348/553 |
| 2012/0141132 A1 | 6/2012 | Walker | |
| 2012/0166702 A1* | 6/2012 | Toba | H04N 21/43635 710/316 |
| 2012/0167149 A1* | 6/2012 | Toba | H04N 21/4305 725/85 |
| 2013/0159559 A1 | 6/2013 | Hess | |
| 2013/0236188 A1 | 9/2013 | Hung et al. | |
| 2014/0162727 A1* | 6/2014 | Saito | H04N 7/108 455/559 |
| 2014/0176804 A1 | 6/2014 | Toba et al. | |
| 2015/0026366 A1 | 1/2015 | Altmann et al. | |
| 2016/0147692 A1 | 5/2016 | Altmann et al. | |
| 2016/0274921 A1 | 9/2016 | Walker | |
| 2019/0064899 A1* | 2/2019 | Doi | G06F 1/266 |
| 2019/0163496 A1 | 5/2019 | Walker | |

FOREIGN PATENT DOCUMENTS

| | | |
|---|---|---|
| CN | 1898658 A | 1/2007 |
| CN | 102547195 A | 7/2012 |
| CN | 103270506 A | 8/2013 |
| CN | 103308996 A | 9/2013 |
| CN | 105393462 A | 3/2016 |
| CN | 108647164 A | 10/2018 |
| DE | 112014003335 T5 | 3/2016 |
| EP | 2472896 A2 | 7/2012 |
| EP | 2649529 A1 | 10/2013 |
| JP | 2007-535235 A | 11/2007 |
| JP | 2009-060204 A | 3/2009 |
| JP | 2012-105011 A | 5/2012 |
| JP | 2012-124808 A | 6/2012 |
| JP | 2013-192223 A | 9/2013 |
| JP | 2015-111418 A | 6/2015 |
| JP | 5771986 B2 | 9/2015 |
| JP | 2015-222960 A | 12/2015 |
| JP | 2017094771 | 5/2017 |
| JP | 2018191245 A | 11/2018 |
| KR | 10-2006-0106842 A | 10/2006 |
| KR | 10-2012-0075366 A | 7/2012 |
| KR | 10-2016-0037850 A | 4/2016 |
| TW | 201230704 A | 7/2012 |
| TW | 201518949 A | 5/2015 |
| WO | 2012/078699 A1 | 6/2012 |
| WO | 2013/090351 A1 | 6/2013 |
| WO | 2015/009547 A1 | 1/2015 |
| WO | 2015/088887 A1 | 6/2015 |

OTHER PUBLICATIONS

Anonymous, "HDMI: Wikipedia, the free Encylopedia", URL: https://en.wikipedia.org/w/index.php?title=HDMI&oldid=522640653, Nov. 12, 2012, XP055272974, 24 pages.
Extended European Search Report of EP Application No. 18859127.5 dated Sep. 29, 2020, 08 pages.
International Preliminary Report on Patentability of PCT Application No. PCT/JP2018/034376, dated Apr. 9, 2020, 08 pages of English Translation and 04 pages of IPRP.
Notice of Allowance for U.S. Appl. No. 16/647,567, dated Jun. 3, 2021, 14 pages.
Non-Final Office Action for U.S. Appl. No. 17/482,738, dated Oct. 29, 2021, 14 pages.
Notice of Allowance for U.S. Appl. No. 17/482,738, dated Feb. 28, 2022, 9 pages.

* cited by examiner

FIG. 6A

| OPERATION OF Source | COMPATIBLE CABLE | NON-COMPATIBLE CABLE |
|---|---|---|
| COMPATIBLE Source | SHIFT TO COMPATIBLE MODE | SHIFT TO NON-COMPATIBLE MODE |
| NON-COMPATIBLE Source | NORMAL OPERATION | NORMAL OPERATION |

FIG. 6B

| OPERATION OF CABLE | COMPATIBLE Source | NON-COMPATIBLE Source |
|---|---|---|
| COMPATIBLE CABLE | SHIFT TO COMPATIBLE MODE | SHIFT TO NON-COMPATIBLE MODE |
| NON-COMPATIBLE CABLE | NORMAL OPERATION | NORMAL OPERATION |

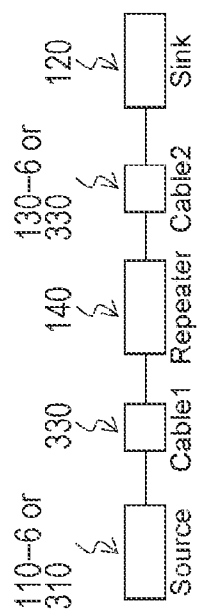
FIG. 41A
FIG. 41B
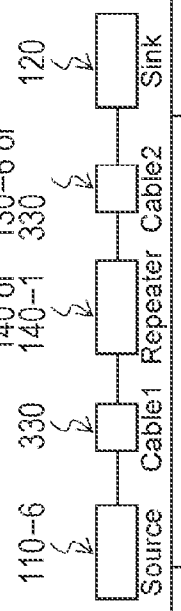
FIG. 41C
FIG. 41D

| GRADATION | | | INFORMATION |
|---|---|---|---|
| SEQUENCE INFORMATION | Source INFORMATION | Cable INFORMATION | |
| 0 | | | SHIFT TO NEXT SEQUENCE |
| 1 | | | SHIFT TO NEXT SEQUENCE |
| | 2 | | Source Version 1 |
| | 3 | | Source Version 2 |
| | 4 | | COPE WITH Source OVERCURRENT |
| | 5 | | NOT COPE WITH Source OVERCURRENT |
| | ⋮ | | ⋮ |
| | 127 | | Source INFORMATION |
| | | 128 | Cable INFORMATION |
| | | ⋮ | ⋮ |
| | | 255 | Cable INFORMATION |

FIG. 98A

Display Port

| PIN No. | PIN NAME |
|---|---|
| 1 | MainLane0+ |
| 2 | Gnd |
| 3 | MainLane0- |
| 4 | MainLane1+ |
| 5 | Gnd |
| 6 | MainLane1- |
| 7 | MainLane2+ |
| 8 | Gnd |
| 9 | MainLane2- |
| 10 | MainLane3+ |
| 11 | Gnd |
| 12 | MainLane3- |
| 13 | Gnd |
| 14 | Gnd |
| 15 | Aux+ |
| 16 | Gnd |
| 17 | Aux- |
| 18 | HOT PLUG DETECTION |
| 19 | Gnd |
| 20 | 3.3V |

FIG. 98B

Thunderbolt

| PIN No. | PIN NAME |
|---|---|
| 1 | HV INPUT/ACGND |
| 2 | HPD |
| 3 | HS0TX(P) |
| 4 | HS0RX(P) |
| 5 | HS0TX(N) |
| 6 | HS0RX(N) |
| 7 | GND |
| 8 | GND |
| 9 | LSR2P Tx |
| 10 | (Reserved) GND |
| 11 | LSP2R Rx |
| 12 | (Reserved) GND |
| 13 | GND |
| 14 | GND |
| 15 | HS1TX(P) |
| 16 | HS1RX(P) |
| 17 | HS1TX(N) |
| 18 | HS1RX(N) |
| 19 | GND |
| 20 | DPPWR |

CABLE, METHOD OF CONTROLLING CABLE, CONNECTION DEVICE, ELECTRONIC DEVICE, AND METHOD OF CONTROLLING ELECTRONIC DEVICE

CROSS REFERENCE TO RELATED APPLICATIONS

The present application is a continuation application of U.S. patent application Ser. No. 17/482,738, filed Sep. 23, 2021, which is a continuation application of U.S. patent application Ser. No. 16/647,567, filed on Mar. 16, 2020, which is U.S. National Phase of International Patent Application No. PCT/JP2018/034376 filed on Sep. 18, 2018, which claims priority benefit of Japanese Patent Application No. JP 2018-026030 filed in the Japan Patent Office on Feb. 16, 2018, claims priority benefit of Japanese Patent Application No. JP 2017-212305 filed in the Japan Patent Office on Nov. 1, 2017, claims priority benefit of Japanese Patent Application No. JP 2017-193119 filed in the Japan Patent Office on Oct. 2, 2017, and also claims priority benefit of Japanese Patent Application No. JP 2017-184226 filed in the Japan Patent Office on Sep. 25, 2017. Each of the above-referenced applications is hereby incorporated herein by reference in its entirety.

TECHNICAL FIELD

The present technology relates to a cable, a method of controlling a cable, a connection device, an electronic device, and a method of controlling an electronic device, and particularly, to a cable and the like having a specific function such as a register that holds specification data and the like and a current consumption unit such as an element for adjusting signal quality.

BACKGROUND ART

In recent years, a high definition multimedia interface (HDMI) and the like have been used as a digital interface for connecting consumer electronics (CE) devices. For example, Patent Document 1 describes the HDMI standard. In the HDMI standard, video, audio, and control signals are transmitted as digital signals by using three data differential line pairs (TMDS Channel 0/1/2).

CITATION LIST

Patent Document

Patent Document 1: Japanese Patent Application Laid-Open No. 2015-111418

SUMMARY OF THE INVENTION

Problems to be Solved by the Invention

For example, in a case where the HDMI is used as a digital interface, a Source (source) device such as a Blu-ray disc (BD) player and a Sink (sink) device such as a TV Receiver are connected by an HDMI cable. As the HDMI cable, four high-speed signal lines including a clock line, a +5 V Power line, a display data channel (DDC) line, a consumer electronics control (CEC) line, a hot plug detect (HPD) line, a Utility (utility) line, and the like are assigned. In the high-speed signal line, each digital signal such as a video, an audio, a control, or the like is transmitted as TMDS data. In this case, a current driving type is used that transmits "0" and "1" in data by drawing a current from a 50Ω termination resistance connected to 3.3 V of the side of the sink by a side of the source. Note that "Blu-ray" is a registered trademark.

The HDMI standard defines a sequence when the HDMI cable is connected. When both ends of a plug of the cable are connected to the source device and the sink device, respectively, a 5 V voltage is transmitted from the source device to the sink device via the +5 V power line. Then, when the 5 V voltage is detected in the sink device, the source device is notified of normal cable connection by transmitting the 5 V voltage from the sink device to the source device via the HPD line. When detecting the 5 V voltage of the HPD line, the source device determines that the cable is connected, and reads extended display identification data (EDID) on the side of the sink by using the DDC line. Thereafter, the source device and the sink device start to exchange signals such as High-bandwidth digital content protection (HDCP) by using the control line such as the DDC line, and transmission of a high-speed data signal by using the TMDS is started.

To guarantee transmission quality of high-speed transmission, various specifications of the cable are established. As one of mechanisms for determining the specification of the cable, it is considered to provide a register that holds specification data to identify the specification of the cable in the cable. In this case, when the source device accesses the register of the cable through the DDC line and the like, the access information is concurrently transmitted to the sink device via the cable, and there is a possibility that a malfunction occurs in the sink device of which the address is not defined.

Furthermore, a guaranteed value of a current output from the +5 V power line of the source device is 55 mA at minimum, and almost no power is consumed in a normal HDMI cable. Therefore, 55 mA is sufficient. Whereas, in a case of an active optical cable (AOC) that optically performs communication instead of a copper wire, it is necessary to provide a circuit for converting electricity into light and a circuit for converting light into electricity at both ends of the plug of the cable, and it is normally difficult to operate with 55 mA. At this time, in a case where a cable draws a current equal to or higher than 55 mA from a source device that guarantees only 55 mA, there is a possibility that the source device cannot withstand overcurrent and is broken. Note that an active copper cable (ACC) in which a circuit for driving an electrical 50Ω wiring is built in a cable similarly needs driving current for an internal circuit.

An object of the present technology is to make it possible to satisfactorily use a cable having a specific function such as a register that holds specification data and the like and a current consumption unit such as an element for adjusting signal quality.

Solutions to Problems

A concept of the present technology is a cable connected between a first electronic device and a second electronic device, the cable including
a determination unit that determines whether or not the first electronic device is a compatible electronic device, and
a control unit that performs control to operate in a compatible mode when the first electronic device is a compatible electronic device and operate in a non-compatible mode when the first electronic device is not a compatible electronic device on the basis of the determination result by the determination unit.

In the present technology, the cable is connected between the first electronic device and the second electronic device. For example, the cable can be replaced with a connection device that is wired or wireless in general. The determination unit determines whether or not the first electronic device is a compatible electronic device. For example, the determination unit may determine whether or not the first electronic device is a compatible electronic device on the basis of a voltage monitoring result of a predetermined line to which a predetermined voltage is applied via a voltage dividing resistor. In this case, appropriate determination can be easily made only by monitoring the voltage of the predetermined line.

In this case, for example, a first switch may be connected to the voltage dividing resistor in series, and the first switch may be in a short-circuit state when the determination is made. With this structure, it is possible to apply the predetermined voltage to the predetermined line via the voltage dividing resistor only at the time of determination.

Furthermore, in this case, for example, a second switch may be inserted at a point closer to the second electronic device than a point where the voltage of the predetermined line is monitored, and the second switch may be in an open state when the determination is made. With this structure, it is possible to avoid an effect of the predetermined voltage applied to the predetermined line being supplied to the second electronic device at the time of determination. Furthermore, accordingly, at the time of determination, it is possible to block the point where the voltage of the predetermined line is monitored from the second electronic device, and it is possible to accurately monitor the voltage of the predetermined line.

The control unit performs control to operate in a compatible mode when the first electronic device is a compatible electronic device and operate in a non-compatible mode when the first electronic device is not a compatible electronic device on the basis of the determination result by the determination unit. For example, when the voltage of the predetermined line measured by the voltage monitoring becomes a predetermined voltage, the control unit, in the compatible mode, may change an open state of the second switch to a short-circuit state after changing a short-circuit state of the first switch to an open state. With this operation, it is possible to recover the predetermined line to an available state without supplying a predetermined voltage to and affecting the second electronic device.

Furthermore, for example, a register connected to a communication line may be further included, a third switch may be connected at a point closer to the second electronic device than a point of the communication line where the register is connected, and after confirming that the first electronic device accesses the register, the control unit, in the compatible mode, may change an open state of the third switch to a short-circuit state. With this operation, it is possible to prevent access information of the register from being transmitted to the second electronic device, and it is possible to avoid that a malfunction occurs in the second electronic device of which an address is not defined.

In this case, for example, the control unit may confirm that the first electronic device accesses the register on the basis of the voltage monitoring result of the predetermined line to which the predetermined voltage is applied via the voltage dividing resistor. In this case, the first electronic device can also function as a voltage monitoring unit that determines whether or not the first electronic device is compatible with its own cable, and the configuration of the cable can be simplified.

Furthermore, in this case, for example, a fourth switch may be inserted into a power line, and after changing the open state of the third switch to the short-circuit state, the control unit, in the compatible mode, may change an open state of the fourth switch to a short-circuit state. With this structure, it is possible to avoid preventing a communication signal from being transmitted from the first electronic device to the second electronic device through the communication line after a connection detection signal is transmitted from the second electronic device to the first electronic device.

Furthermore, in this case, for example, in the non-compatible mode, the control unit may change the open state of the third switch to the short-circuit state without confirming that the first electronic device accesses the register. In this case, the first electronic device does not access the register, and accordingly, it is possible to immediately recover the communication line to an available state.

Then, in this case, for example, the fourth switch may be inserted into the power line, and after changing the open state of the third switch to the short-circuit state, the control unit, in the non-compatible mode, may change the open state of the fourth switch to the short-circuit state. With this structure, it is possible to avoid preventing the communication signal from being transmitted from the first electronic device to the second electronic device through the communication line after the connection detection signal is transmitted from the second electronic device to the first electronic device after the open state of the third switch is changed to the short-circuit state.

Furthermore, for example, a current consumption unit connected to the power line may be further included, and the control unit, in the compatible mode, may change a no-current consumption state of the current consumption unit to a current consumption state after confirming that the first electronic device determines that its own cable is a compatible cable. In this case, for example, a fifth switch may be inserted into the power line, and the control unit, in the compatible mode, may change an open state of the fifth switch to a short-circuit state after confirming that the first electronic device determines that its own cable is a compatible cable. With this operation, the current consumption unit can draw the sufficient current from the first electronic device and consume the current, and an appropriate operation can be made. Furthermore, in this case, since the first electronic device can sufficiently supply the current that may be consumed by the current consumption unit of the cable of the first electronic device, it is possible to avoid that the first electronic device cannot withstand overcurrent and is broken.

In this case, for example, the control unit may confirm that the first electronic device determines that its own cable is a compatible cable on the basis of the voltage monitoring result of the predetermined line to which the predetermined voltage is applied via the voltage dividing resistor. In this case, the first electronic device can also function as a voltage monitoring unit that determines whether or not the first electronic device is a compatible electronic device, and the configuration of the cable can be simplified.

Furthermore, in this case, for example, the control unit may change the open state of the fifth switch to the short-circuit state without confirming that the first electronic device determines that its own cable is a compatible cable in the non-compatible mode. In this case, the first electronic device cannot confirm that it is determined that its own cable is a compatible cable no matter how long the standby time is, and accordingly, the power line can be immediately recovered to an available state.

In this way, according to the present technology, the first electronic device is controlled to operate in the compatible mode when the first electronic device is a compatible electronic device and operate in the non-compatible mode when the first electronic device is not a compatible electronic device. Therefore, the cable may be satisfactorily used that has a specific function such as a register that holds specification data and the like and a current consumption unit such as an element for adjusting signal quality.

Furthermore, for example, the control unit may perform control to operate in the compatible mode when the first electronic device is a compatible electronic device and a relay that isolates the power line does not intervene between the first electronic device and the control unit. In this case, for example, the control unit may determine that the first electronic device is a compatible electronic device as a voltage of a predetermined line to which a predetermined voltage is applied via a voltage dividing resistor changes to a first voltage and thereafter determine that the relay does not intervene between the first electronic device and the control unit as the voltage of the predetermined line changes to a second voltage. With this operation, when the relay such as the repeater intervenes, for example, current consumption of the current consumption unit connected to the power line is suppressed. Therefore, it is possible to avoid that the relay cannot withstand overcurrent and is broken.

Furthermore, for example, an information transmission unit may be further included that exchanges information with the first electronic device and functions at the time of an operation in the compatible mode. In this case, for example, the information transmission unit may include a variable resistance circuit connected to a predetermined line and may transmit arbitrary information to the first electronic device by changing a resistance value of the variable resistance circuit. Furthermore, in this case, for example, the information transmission unit may monitor a voltage of the predetermined line in a state where the resistance value of the variable resistance circuit is fixed to a predetermined value so as to receive predetermined information from the first electronic device. With this operation, it is not necessary to provide the register on the communication line, and the access information of the register is not transmitted from the first electronic device to the second electronic device through the communication line. A malfunction does not occur in the second electronic device of which the address is not defined.

Furthermore, another concept of the present technology is an electronic device, connected to an external device via a cable, including a determination unit that determines whether or not the cable is a compatible cable and a control unit that performs control to operate in a compatible mode when the cable is a compatible cable and operate in a non-compatible mode when the cable is not a compatible cable on the basis of the determination result by the determination unit.

The electronic device according to the present technology is connected to the external device via the cable. For example, the cable can be replaced with a connection device that is wired or wireless in general. The determination unit determines whether or not the cable is a compatible cable. For example, the determination unit may determine whether or not the cable is a compatible cable on the basis of the voltage monitoring result of the predetermined line to which the predetermined voltage is applied via the voltage dividing resistor. In this case, appropriate determination can be easily made only by monitoring the voltage of the predetermined line.

In this case, for example, a first switch may be connected to the voltage dividing resistor in series, and the first switch may be in a short-circuit state when the determination is made. With this structure, it is possible to apply the predetermined voltage to the predetermined line via the voltage dividing resistor only at the time of determination.

Furthermore, in this case, a second switch may be inserted on a side opposite to a terminal side of a point where the voltage of the predetermined line is monitored, and the second switch may be in an open state when the determination is made. With this structure, it is possible to avoid an effect of the predetermined voltage applied to the predetermined line being supplied into the electronic device at the time of determination. Furthermore, accordingly, at the time of determination, it is possible to block the point where the voltage of the predetermined line is monitored from the inside of the electronic device, and it is possible to accurately monitor the voltage of the predetermined line.

The control unit performs control to operate in the compatible mode when the cable is a compatible cable and operate in the non-compatible mode when the cable is not a compatible cable on the basis of the determination result by the determination unit. For example, after detecting that a connection detection line becomes a high level, the control unit may change the short-circuit state of the first switch to the open state in the compatible mode. With this operation, in a case where the cable is removed in a state of waiting for the connection detection line to become a high level, it is possible to detect this state, and it is possible to take measures such as recovering the switch to an initial state so as not to cause a malfunction.

Furthermore, for example, the control unit may change the short-circuit state of the first switch to the open state and may further change the short-circuit state of the second switch to the open state in the non-compatible mode. In this case, it is possible to recover the predetermined line to an available state without supplying a predetermined voltage to and affecting the inside of the electronic device.

Furthermore, for example, the control unit may access a register of the cable through a communication line in the compatible mode before changing the short-circuit state of the first switch to the open state. With this operation, it is possible to access the register of the cable before the predetermined line of the cable becomes available, and accordingly, it is possible to prevent transmission of the access information of the register to the external device. It is possible to avoid that a malfunction occurs in the external device of which an address is not defined.

Furthermore, for example, the control unit, in the compatible mode, may change a current that can be supplied by the power line from a first current to a second current higher than the first current before changing the short-circuit state of the first switch to the open state. With this operation, in a case where the cable includes the current consumption unit and before the current consumption unit is in a current consumption state, a sufficient current may be supplied to the current consumption unit of the cable. By switching a current supply amount mode in this way, it is possible to reduce electric power of a power supply circuit unit.

Furthermore, for example, the control unit may perform control to operate in the compatible mode when the cable is a compatible cable and the relay that isolates the power line does not intervene between the control unit and the cable. In this case, for example, the control unit may determine that the cable is a compatible cable as a voltage of the predetermined line to which the predetermined voltage is applied via the voltage dividing resistor changes to a first voltage and thereafter may determine that the relay does not intervene between the cable and the control unit as the voltage of the predetermined line changes to a second voltage.

Furthermore, for example, an information transmission unit may be further included that exchanges information with the cable and functions at the time of an operation in the compatible mode. In this case, for example, the information transmission unit may include a variable resistance circuit connected to a predetermined line and may transmit arbitrary information to the cable by changing a resistance value of the variable resistance circuit. Furthermore, in this case, for example, the information transmission unit may monitor a voltage of the predetermined line in a state where the resistance value of the variable resistance circuit is fixed to a predetermined value so as to receive predetermined information from the cable. With this operation, it is not necessary to provide the register on the communication line in the cable, and the access information to the register is not transmitted to the external device through the communication line. A malfunction does not occur in the external device of which the address is not defined.

In this way, according to the present technology, control is performed to operate in the compatible mode when the cable is a compatible cable and operate in the non-compatible mode when the cable is not a compatible cable. Therefore, the cable may be satisfactorily used that has a specific function such as a register that holds specification data and the like and a current consumption unit such as an element for adjusting signal quality.

Effects of the Invention

According to the present technology, a cable may be satisfactorily used that has a specific function such as a register that holds specification data and the like and a current consumption unit such as an element for adjusting signal quality. Note that the effects described herein are only exemplary and not limited to these. Furthermore, there may be an additional effect.

BRIEF DESCRIPTION OF DRAWINGS

FIGS. 6A and 6B are diagrams illustrating an outline of operations of a source device and an HDMI cable included in a transmission system according to an embodiment.

FIGS. 41A, 41B, 41C, and 41D are diagrams illustrating an outline of operations of the source device and the HDMI cable included in the transmission system according to the embodiment.

FIGS. 98A and 98B are diagrams illustrating pin arrangement in "Display Port" and "Thunderbolt".

MODE FOR CARRYING OUT THE INVENTION

A mode for carrying out the invention (hereinafter, referred to as "embodiment") will be described below. Note that the description will be made in the following order.
1. Embodiment
2. Modification 1. Embodiment

[Configuration of Transmission System]

Figure 1:
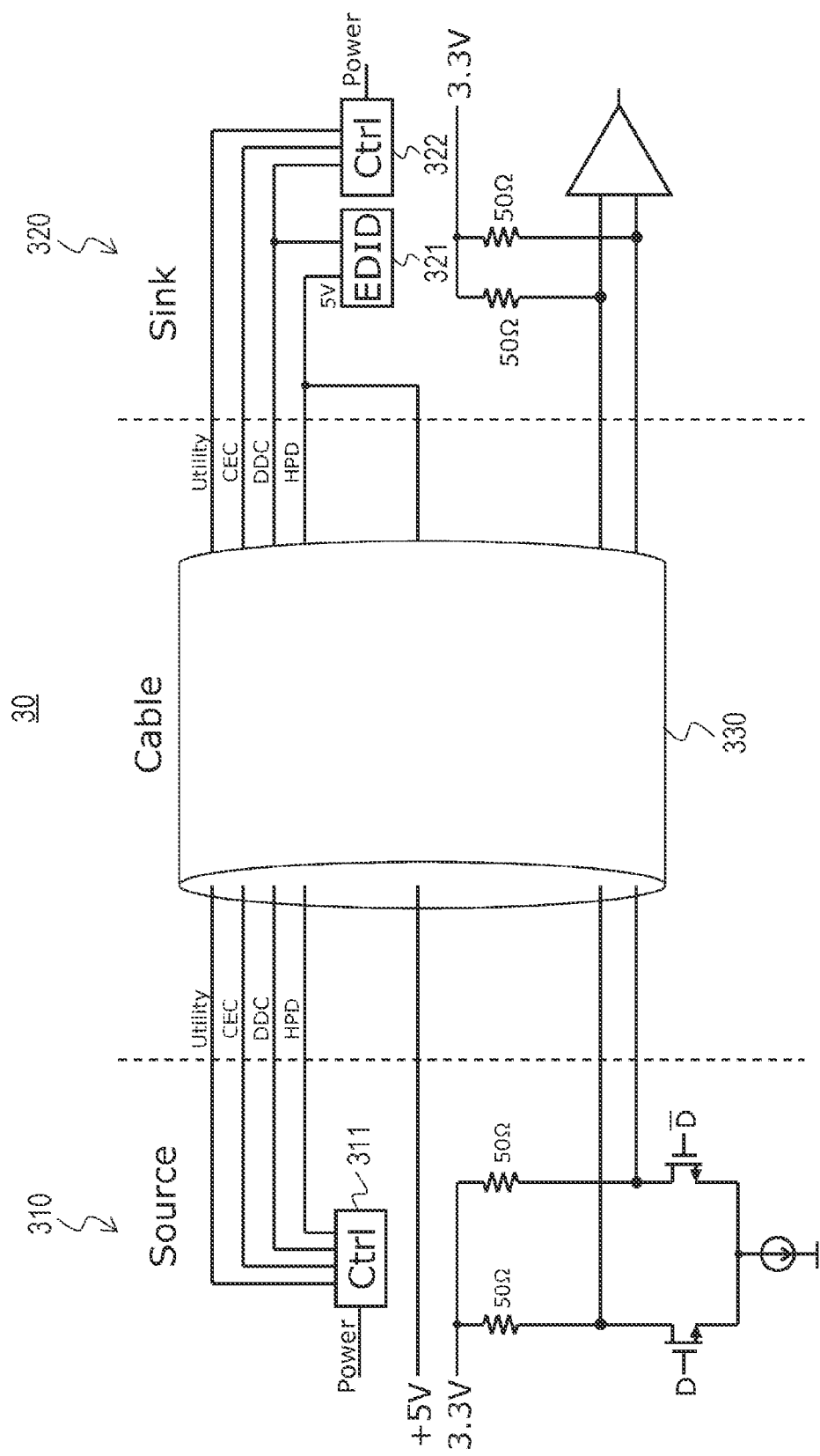
FIG. 1 is a diagram illustrating an exemplary configuration of a transmission system.

FIG. 1 illustrates an exemplary configuration of a transmission system 30. The transmission system 30 is an HDMI transmission system using an HDMI as a digital interface. The transmission system 30 includes a source device 310 that is an HDM transmitter, a sink device 320 that is an HDMI receiver, and an HDMI cable 330 that connects these devices.

Transmission channels of the transmission system 30 include three TMDS channels that transmit video, audio, and control signals as a digital signal as TMDS data and a single TMDS clock channel that transmits a clock signal. Each of the TMDS channels and the TMDS clock channel includes two differential signal lines. In the illustrated example, only one channel is illustrated.

Furthermore, control signal lanes of an HDMI system include a DDC line, a CEC line, an HPD line, a Utility (utility) line, and a +5 V power line. The DDC line includes two signal lines, i.e., an SDA line and an SCL line, included in the HDMI cable 330. For example, the DDC line is used by the source device 310 to read EDID from the sink device 320. The CEC line is used to perform bidirectional communication for control data between the source device 310 and the sink device 320.

A current driving type TMDS channel is used that transmits "0" and "1" in data by drawing a current from a 50Ω termination resistance connected to the side of the sink device 320 to the side of the source device 310. At this time, a signal is differentially transmitted on the basis of a differential signal of D, D (bar). Note that, in the illustrated example, an example is illustrated in which the 50Ω termination resistance on the side of the source device 310 is used. However, it is possible to drive the TMDS by using only the 50Ω termination resistance on the side of the sink device without using the 50Ω above.

The HDMI standard defines a sequence when the HDMI cable 330 is connected. When both ends of a plug of the HDMI cable 330 are connected to the source device 310 and the sink device 320, respectively, a 5 V voltage is transmitted from the source device 310 to the sink device 320 via the +5 V power line. Then, when the 5 V voltage is detected in the sink device 320, the source device 310 is notified of normal cable connection by transmitting the 5 V voltage from the sink device 320 to the source device 310 via the HPD line.

When detecting the 5 V voltage in the HPD line, a control unit 311 of the source device 310 determines that the cable is connected and reads the EDID from an EDID ROM 321 on the side of the sink device 320 by using the DDC line. Thereafter, the source device 310 and the sink device 320 start to exchange signals by a high-bandwidth digital content protection system (HDCP) and the like by using the control line such as the DDC line, and transmission of TMDS data by using the TMDS channel is started in one direction from the source device 310 to the sink device 320. Note that the source device 310 and the sink device 320 can exchange information by using a register prepared in a control unit 322 on the side of the sink device 320.

Figure 2:
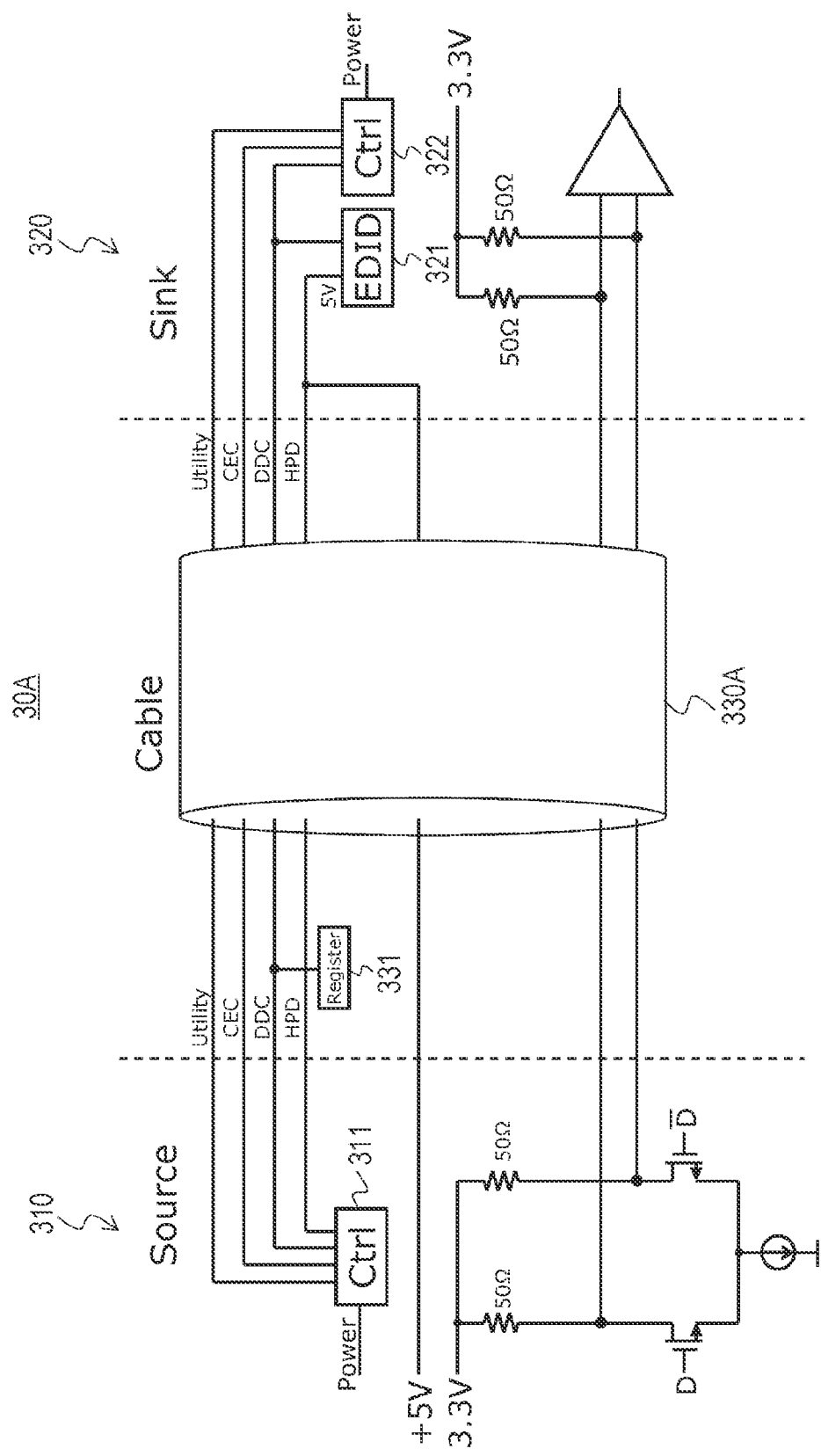
FIG. 2 is a diagram illustrating an exemplary configuration of a transmission system including a register.

In a case where the register is prepared for the cable 330 and the source device 310 and the cable 330 intend to exchange information, as illustrated in a transmission system 30A in FIG. 2, it is considered to dispose a register 331 in parallel with a DDC line in a cable 330A. In this case, as information included in the register 331, a cable ID, a parameter for circuit characteristic adjustment, an amount of current consumed by a cable, a transmittable data rate, and the like are considered. Note that, in FIG. 2, a part corresponding to that in FIG. 1 is denoted with the same reference numeral, and the detailed description thereof is appropriately omitted.

In a case of this configuration, the source device 310 accesses a new address of the register 331 of the cable 330A and accesses the sink device 320 at the same time. In a case where an access to an unintended address is made, there is a possibility that the sink device 320 causes a malfunction.

Figure 3:
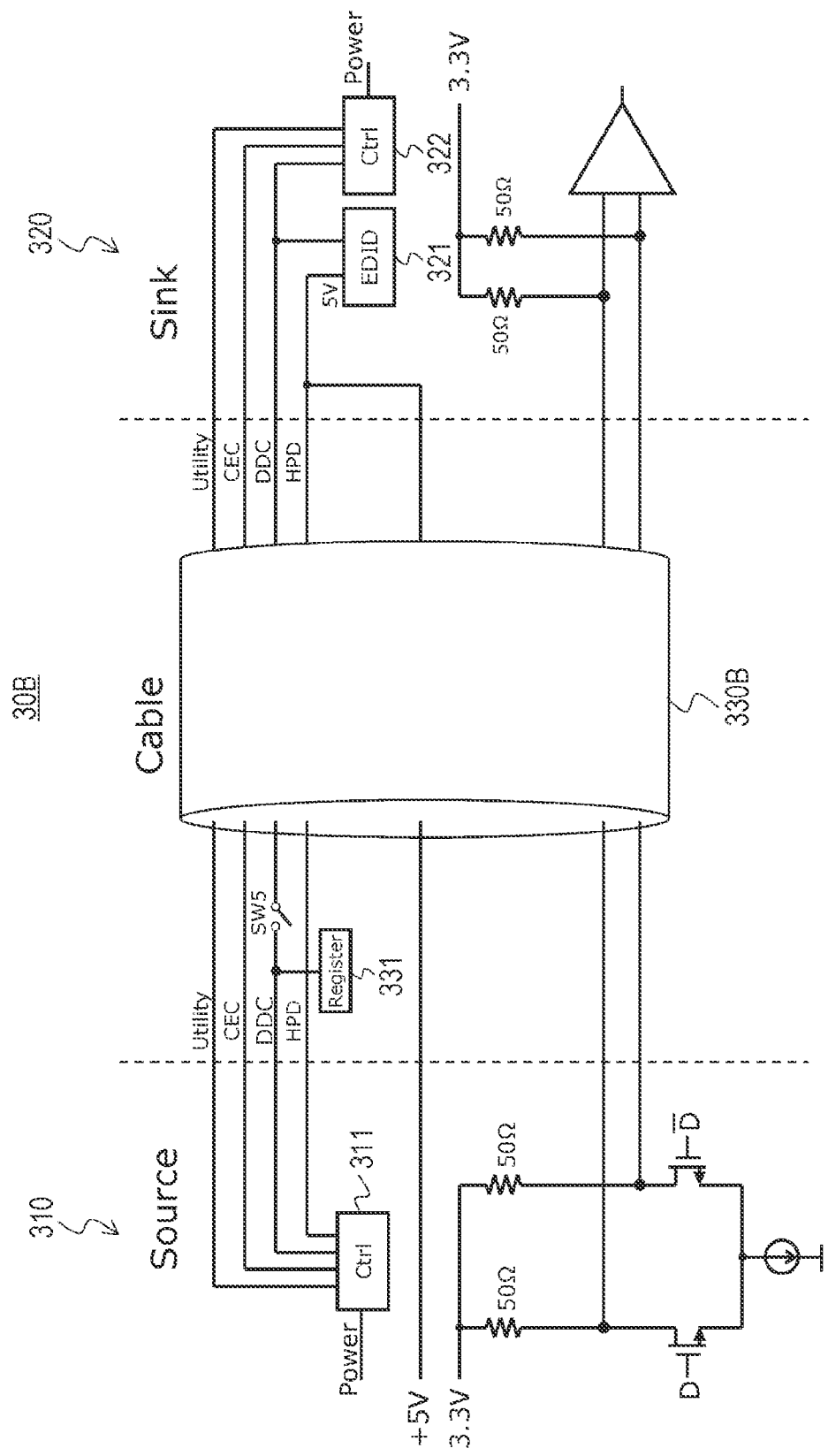
FIG. 3 is a diagram illustrating an exemplary configuration of a transmission system in which a switch is disposed on a DDC line connected to the register.

As illustrated in a transmission system 30B illustrated in FIG. 3, as the simplest method to avoid the malfunction, a method is considered for preventing transmission of address information to the sink device 320 when a switch SW5 is inserted into a cable 330B at a point closer to the sink device 320 than a point of connection with the register 331 of the DDC line and the source device 310 makes read and write accesses to the register 331. Note that, in FIG. 3, a part corresponding to that in FIG. 2 is denoted with the same reference numeral, and the detailed description thereof is appropriately omitted.

In this case, it is necessary to maintain an initial state of the switch SW5 of the cable 330B to be an open state so that the source device 310 may access the cable 330B at any time. When the cable 330B detects an end of the access to the register 331, the cable 330B can shift the switch SW5 to a short-circuit state and can be shifted to a normal operation. However, in a case where the source device 310 is a legacy device, the source device 310 does not access the register 311. Therefore, the open state of the switch SW5 of the cable 330B is maintained and prevents normal DDC communication.

Figure 4:
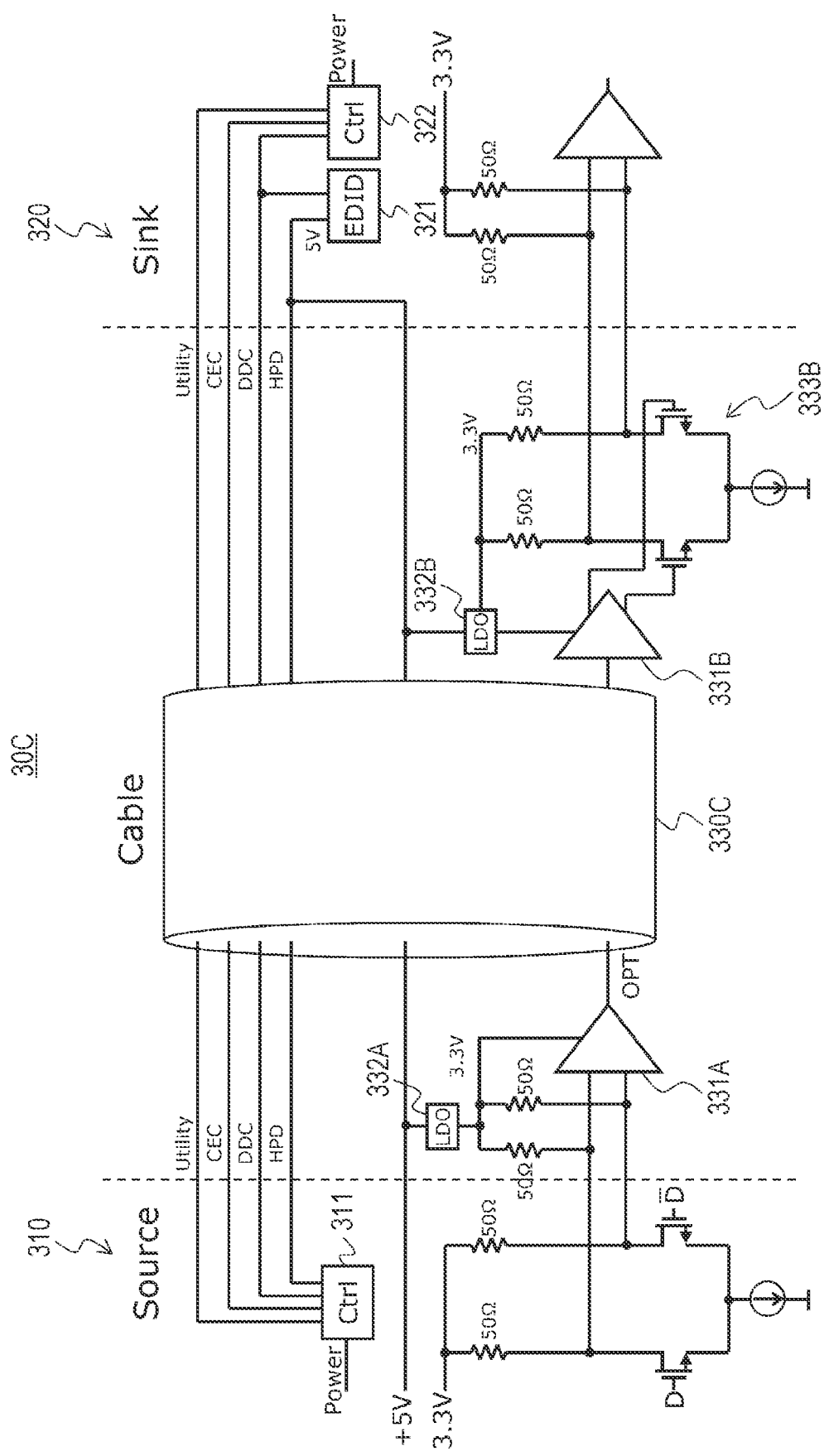
FIG. 4 is a diagram illustrating an exemplary configuration of a transmission system in a case where an HDMI cable that is an AOC is used.

FIG. 4 illustrates an exemplary configuration of a transmission system 30C in a case where an HDMI cable 330C that is an AOC is used. In FIG. 4, a part corresponding to that in FIG. 1 is denoted with the same reference numeral, and the detailed description thereof is omitted.

In a case of the transmission system 30C, a conversion circuit 331A that converts electricity into light exists in a plug on a side of a source of the HDMI cable 330C, and a conversion circuit 331B that converts light into electricity exists in a plug on a side of a sink. Electric power of 3.3 V obtained by Low Drop Out (LDO) regulators 332A and 332B from +5 V of the +5 V power line is given to these conversion circuits 331A and 331B. Note that each of the conversion circuits 331A and 331B is an element that adjusts quality of a signal intervened between data lines (TMDS line) and configures a current consumption unit.

Furthermore, in the plug on the side of the source of the HDMI cable 330C, 3.3 V obtained by the LDO regulator 332A is applied to the data line (TMDS line) through the 50Ω termination resistance as a bias voltage. Moreover, in the plug on the side of the sink of the HDMI cable 330C, a current driving unit 333B that differentially transmits a signal on the basis of a differential signal obtained by the conversion circuit 331B is provided.

Figure 5:
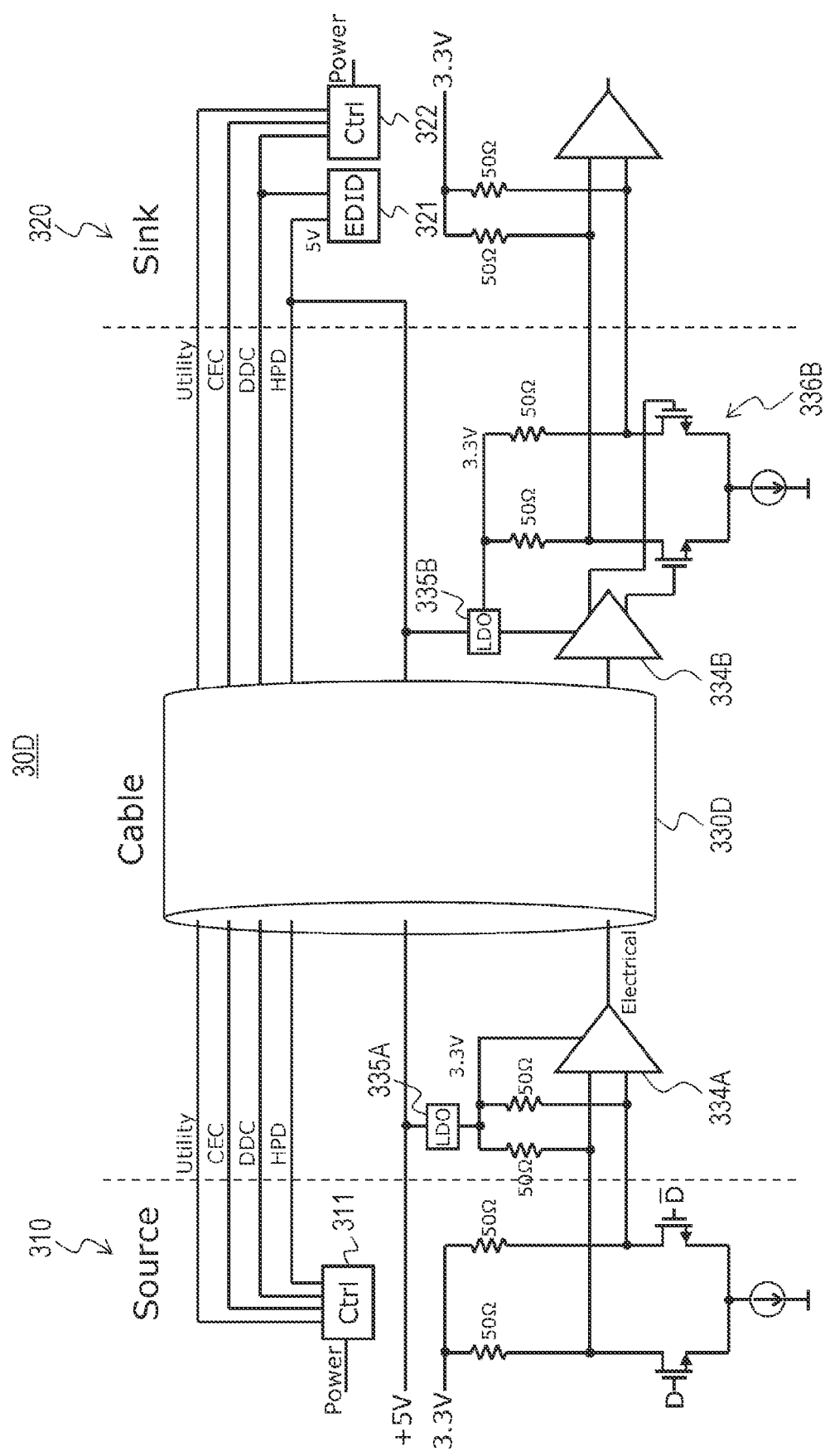
FIG. 5 is a diagram illustrating an exemplary configuration of a transmission system in a case where an HDMI cable that is an ACC is used.

FIG. 5 illustrates an exemplary configuration of a transmission system 30D in a case where an HDMI cable 330D that is an ACC is used. In FIG. 5, a part corresponding to that in FIG. 4 is denoted with the same reference numeral, and the detailed description thereof is omitted.

In a case of the transmission system 30D, driving circuits 334A and 334B for driving an electrical 50Ω wiring exist in plugs on both sides of the HDMI cable 330D. Electric power of 3.3 V obtained by LDO regulators 335A and 335B from the +5 V of the +5 V power line is given to these driving circuits 334A and 334B. Note that each of the driving circuits 334A and 334B is an element that adjusts quality of a signal intervened between the data lines (TMDS line) and configures the current consumption unit.

Furthermore, in the plug on the side of the source of the HDMI cable 330D, 3.3 V obtained by the LDO 335A is applied to the data line (TMDS line) through the 50Ω termination resistance as a bias voltage. Moreover, in the plug on the side of the sink of the HDMI cable 330D, a current driving unit 336B that differentially transmits a signal on the basis of a differential signal obtained by the conversion circuit 334B is provided.

A guaranteed value of a current output from the +5 V power line in the source device 310 is 55 mA at minimum. In a case where the HDMI cable 330C that is an AOC is used (refer to FIG. 4), it is necessary to provide a circuit for converting electricity into light and a circuit for converting light into electricity at both ends of the plug of the cable, and it is normally difficult to operate with 55 mA. At this time, in a case where a cable draws a current equal to or higher than 55 mA from a source device that guarantees only 55 mA, there is a possibility that the source device cannot withstand overcurrent and is broken. The similar can be said in a case where the HDMI cable 330D that is an ACC is used (refer to FIG. 5).

In the present embodiment, the source device and the HDMI cable included in the transmission system each perform different operations according to whether or not the source device and the HDMI cable are compatible, and in addition, whether or not the partner is a compatible device, as illustrated in FIGS. 6A and 6B.

As illustrated in FIG. 6A, a compatible source device (source device that is compatible device) operates in a compatible mode in a case of being connected to a compatible cable (HDMI cable that is compatible device) and operates in a non-compatible mode in a case of being connected to a non-compatible cable. A non-compatible source device normally operates in a case of being connected to either one of the compatible cable and non-compatible cable. Furthermore, as illustrated in FIG. 6B, the compatible cable operates in a compatible mode in a case of being connected to the compatible source device and operates in a non-compatible mode in a case of being connected to the non-compatible source device. The non-compatible cable normally operates in a case of being connected to either one of the compatible source device and the non-compatible source device.

First Embodiment

Figure 7:
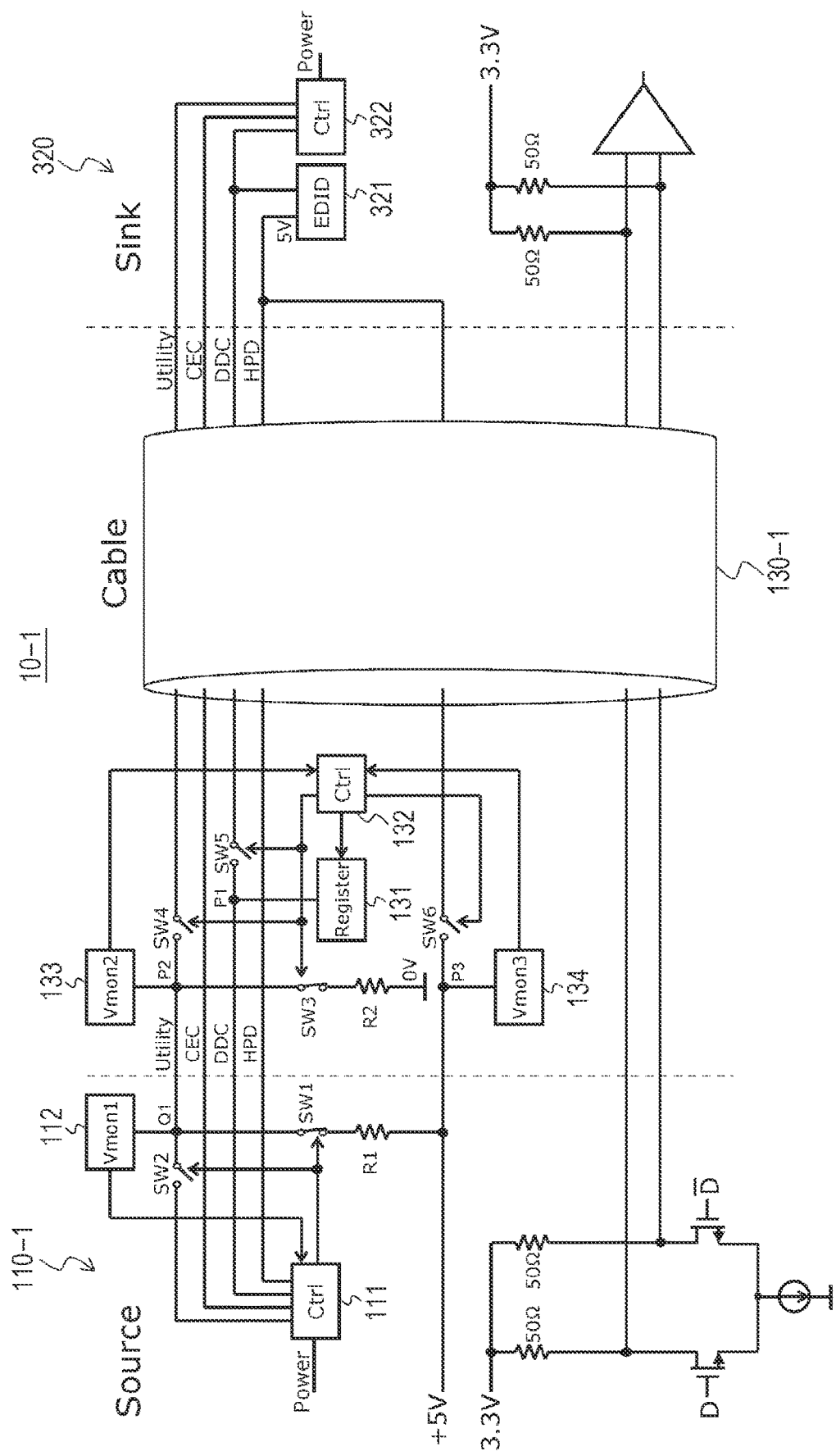
FIG. 7 is a diagram illustrating an exemplary configuration of a transmission system including a compatible source device and a compatible HDMI cable (including register).

FIG. 7 illustrates an exemplary configuration of a transmission system 10-1. The transmission system 10-1 is an HDMI transmission system using an HDMI as a digital interface. The transmission system 10-1 includes a source device 110-1 as a transmission device, a sink device 320 as a reception device, and an HDMI cable 130-1 that connects these devices. In FIG. 7, a part corresponding to that in FIG. 1 is denoted with the same reference numeral, and the detailed description thereof is appropriately omitted.

The HDMI cable 130-1 is a compatible cable that includes a register 131 that stores cable specification data. The HDMI cable 130-1 includes a control unit 132, voltage monitoring units 133 and 134, switches SW3, SW4, SW5, and SW6, and a voltage dividing resistor R2, in addition to the register 131.

The register 131 is connected to a point P1 of the DDC line. The switch SW5 is inserted at a point closer to the sink device 320 than the point P1 of the DDC line. Furthermore, a series circuit including the resistor R2 and the switch SW3 is connected between a point P2 of the Utility line and the ground. With this structure, 0 V that is a ground voltage is applied to the point P2 of the Utility line via the series circuit including the resistor R2 and the switch SW3. The switch SW4 is inserted at a point closer to the sink device 320 than the point P2 of the Utility line. Furthermore, the switch SW6 is inserted into the +5 V power line.

The voltage monitoring unit 133 monitors a voltage at the point P2 of the Utility line and sends the monitoring result to the control unit 132. The voltage monitoring unit 134 monitors a voltage at a point P3 closer to a terminal than a position where the switch SW6 is inserted into the +5 V power line and sends the monitoring result to the control unit 132. The control unit 132 controls an operation of each unit of the HDMI cable 130-1.

The source device 110-1 is a compatible source device. The source device 110-1 includes a voltage monitoring unit 112, switches SW1 and SW2, and a voltage dividing resistor R1 in addition to a control unit 111 that controls an operation of each unit. It is desirable that the resistor R2 of the HDMI cable 130-1 described above and the resistor R1 of the source device 110-1 be each a large value to some extent so as to reduce current consumption. Hereinafter, the description will be made while assuming R1=100 kΩ and R2=400 kΩ are satisfied.

A series circuit including the resistor R1 and the switch SW1 is connected between the +5 V power line and a point Q1 of the Utility line. With this structure, the voltage of +5 V is applied to the point Q1 of the Utility line via the series circuit including the resistor R1 and the switch SW1. The switch SW2 is inserted on a side opposite to the terminal side of the point Q1 of the Utility line. The voltage monitoring unit 112 monitors a voltage at the point Q1 of the Utility line and sends the monitoring result to the control unit 111.

In the transmission system 10-1 illustrated in FIG. 7, the HDMI cable 130-1 is a compatible cable, and the source device 110-1 is a compatible source device. Therefore, the source device 110-1 determines that the connected HDMI cable is a compatible cable and operates in the compatible mode. Similarly, the HDMI cable 130-1 determines that the connected source device is a compatible source device and operates in the compatible mode.

Operations of the source device 110-1 and the HDMI cable 130-1 will be described in detail. In FIG. 7, initial states of the source device 110-1 and the HDMI cable 130-1 are illustrated. In the initial state of the source device 110-1, the switch SW1 is in a short-circuit state, and the switch SW2 is in an open state. Meanwhile, in the initial state of the HDMI cable 130-1, the switch SW3 is in a short-circuit state, and the switches SW4, SW5, and SW6 are in an open state.

Since the switches SW1 and SW3 are in the short-circuit state in the initial state, the resistors R1 and R2 are connected in series between the +5 V power line of the source device 110-1 and the ground (0 V) of the HDMI cable 130-1, and a voltage of 4 V is obtained at the points Q1 and P2 of the Utility line by resistance voltage division.

The voltage monitoring unit 112 of the source device 110-1 monitors that the voltage at the point Q1 is 4 V and sends the monitoring result to the control unit 111. The control unit 111 determines that the connected HDMI cable is the compatible cable on the basis of the monitoring result and controls the HDMI cable to operate in the compatible mode.

Similarly, the voltage monitoring unit 133 of the HDMI cable 130-1 monitors that the voltage at the point P2 is 4 V and sends the monitoring result to the control unit 132. The control unit 132 determines that the connected source device is the compatible source device on the basis of the monitoring result and controls the source device to operate in the compatible mode.

Here, since the switch SW2 is in an open state in the source device 110-1, the voltage of 4 V is not propagated in the source device 110-1 and does not affect the inside of the source device 110-1. Similarly, since the switch SW4 is in the open state in the HDMI cable 130-1, the voltage of 4 V is not propagated to the sink device 320 and does not affect the sink device 320.

Since the source device 110-1 is controlled to operate in the compatible mode, the control unit 111 accesses (read/write) the register 131 of the HDMI cable 130-1 via the DDC line. In this case, since the switch SW5 is in an open state, it is possible to prevent access information of the register 131 from being transmitted to the sink device 320, and occurrence of a malfunction of the sink device 320 of which the address is not defined is avoided.

Figure 8:
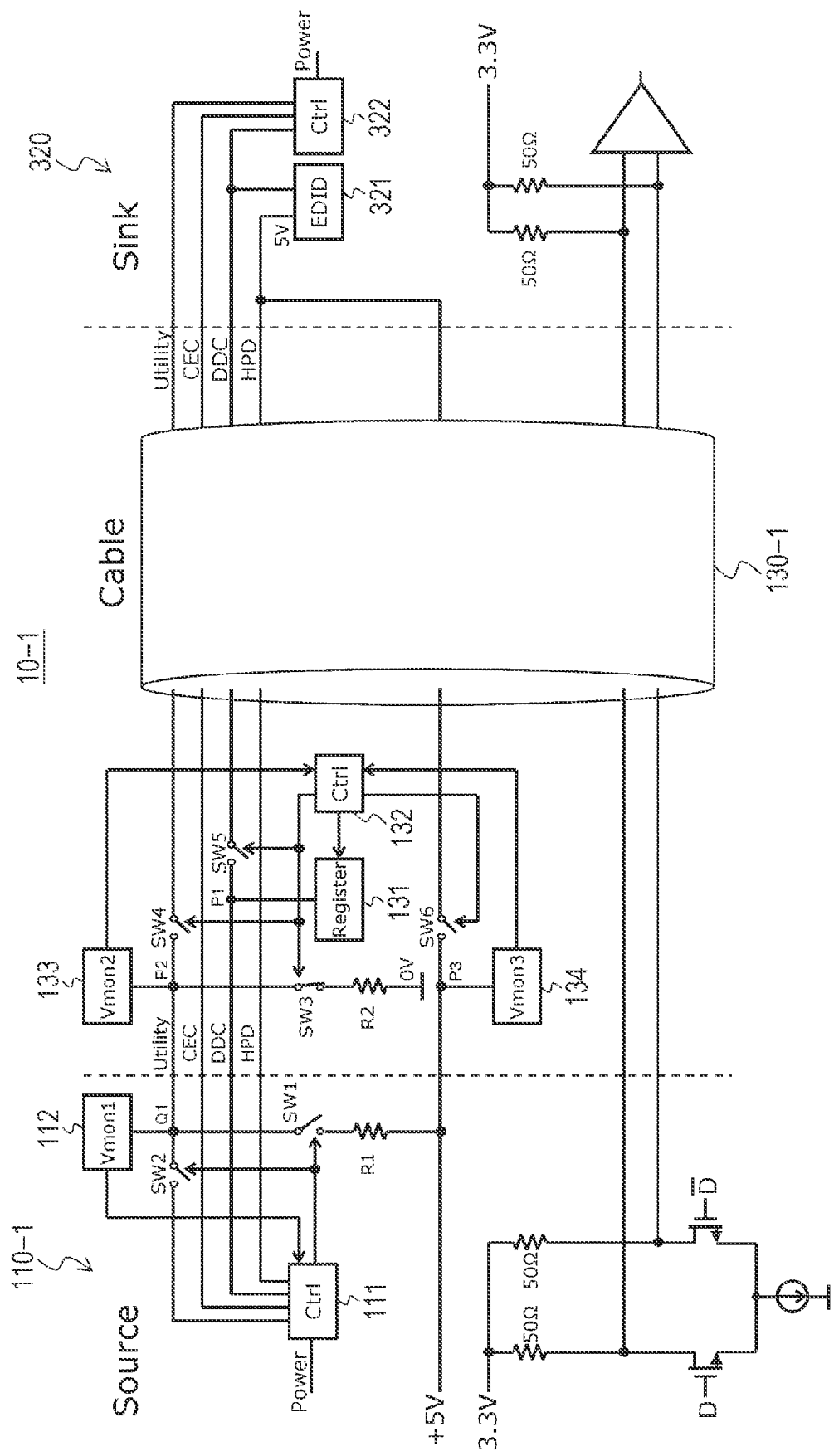
FIG. 8 is a diagram for explaining an operation of the transmission system in FIG. 7.

When the access to the register 131 of the HDMI cable 130-1 is terminated in the source device 110-1, the control unit 111 opens the switch SW1 as illustrated in FIG. 8. Therefore, the voltage at the point P2 of the Utility line is 0 V. In the HDMI cable 130-1, the voltage monitoring unit 133 monitors that the voltage at the point P2 is 0 V and sends the monitoring result to the control unit 132. In this way, by monitoring that the voltage at the point P2 is 0 V, it is confirmed that the source device has accessed the register 131.

Figure 9:
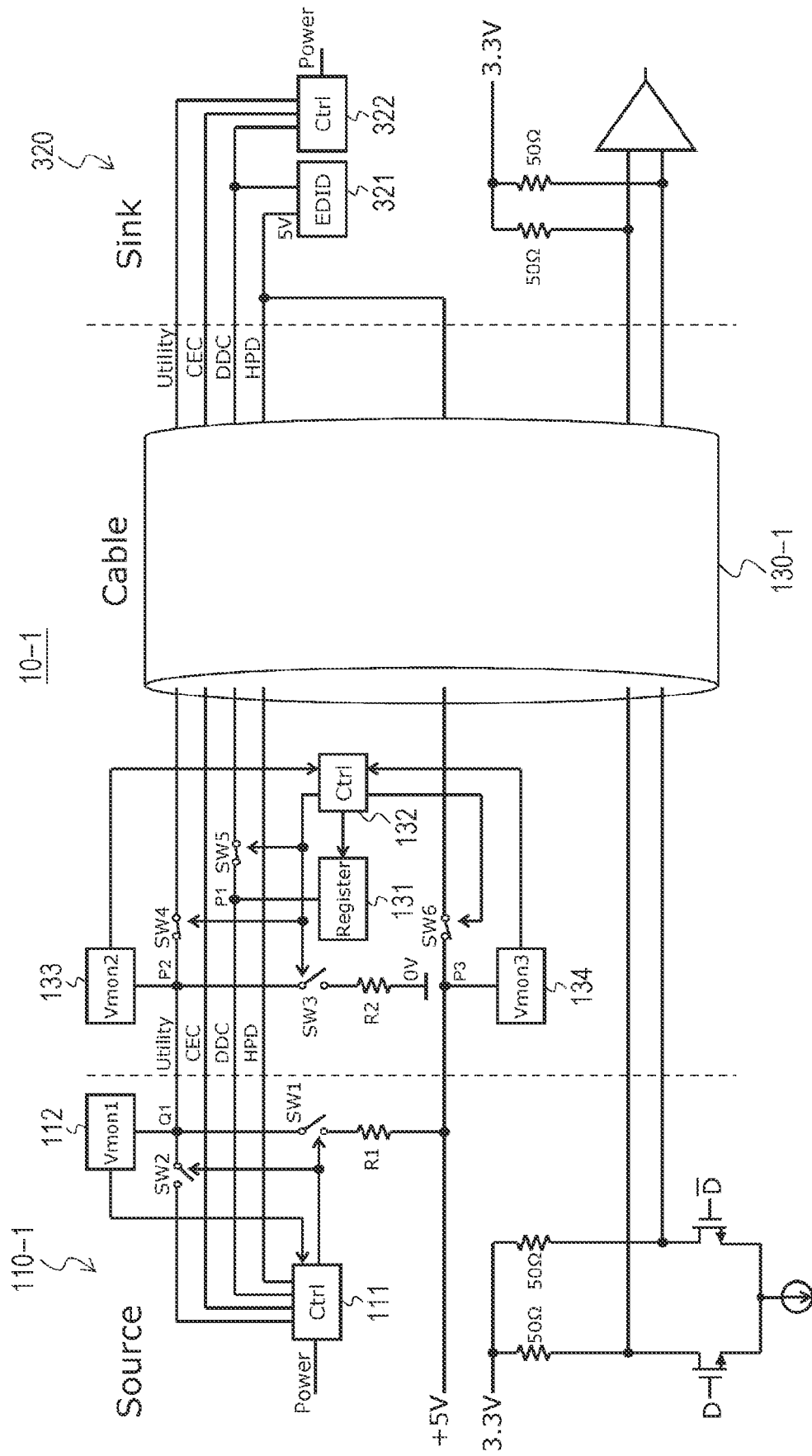
FIG. 9 is a diagram for explaining the operation of the transmission system in FIG. 7.

The control unit 132 determines that the access of the source device 110-1 to the register 131 is terminated on the basis of the monitoring result and changes the state of each switch and shifts to a normal operation as illustrated in FIG. 9. In this case, not to affect the sink device 320, first, the switch SW3 is opened, next, the switches SW4 and SW5 are short-circuited, and finally, the switch SW6 is short-circuited.

Figure 10:
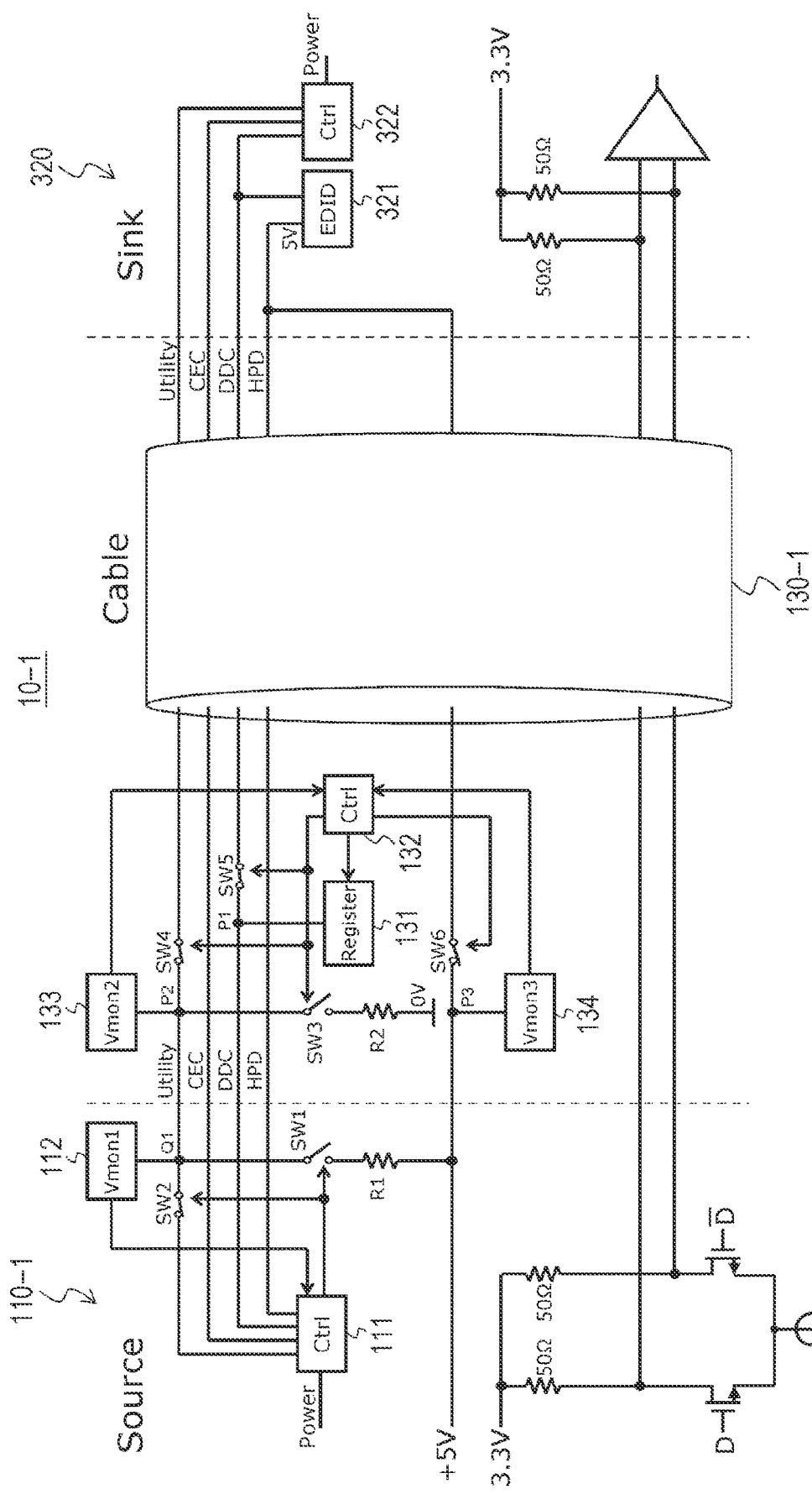
FIG. 10 is a diagram for explaining the operation of the transmission system in FIG. 7.

By short-circuiting the switch SW6, a 5 V voltage is sent from the source device 110-1 to the sink device 320 through the +5 V power line, and accordingly, a 5 V voltage (connection detection signal) is sent from the sink device 320 to the source device 110-1 via the HPD line. With this operation, the control unit 111 of the source device 110-1 recognizes that the preparation of the cable is completed, and short-circuits the switch SW2 and shifts to the normal operation, as illustrated in FIG. 10.

In this way, in the transmission system 10-1 illustrated in FIG. 7, the switch SW5 is in the open state until the access from the source device 110-1 to the register 131 of the HDMI cable 130-1 is terminated. Therefore, the access information of the register 131 is not transmitted to the sink device 320 through the DDC line, and it is possible to avoid the malfunction of the sink device 320 of which the address is not defined.

Furthermore, in the transmission system 10-1 illustrated in FIG. 7, the state of the switch SW5 is changed to the short-circuit state after the access from the source device 110-1 to the register 131 of the HDMI cable 130-1 is terminated, and thereafter, the state of the switch SW6 is changed to the short-circuit state. Therefore, it is possible to avoid preventing a communication signal from being transmitted from the source device 110-1 to the sink device 320 through the DDC line after the connection detection signal is transmitted from the sink device 320 to the source device 110-1.

Figure 11:
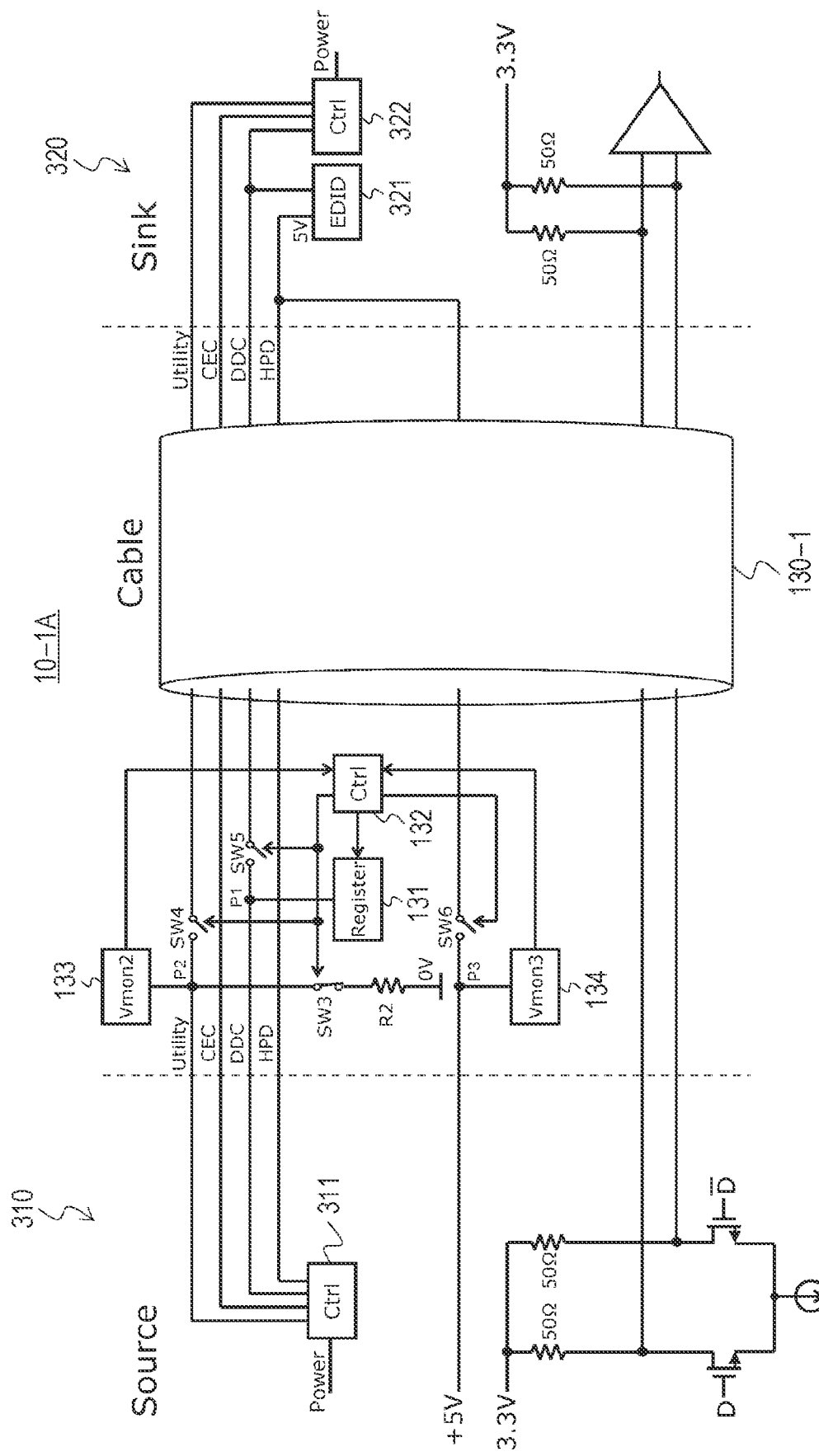
FIG. 11 is a diagram illustrating an exemplary configuration of a transmission system (using Utility line) including a non-compatible source device and a compatible HDMI cable (including register).

FIG. 11 illustrates an exemplary configuration of a transmission system 10-1A. The transmission system 10-1A is an HDMI transmission system using an HDMI as a digital interface. The transmission system 10-1A includes the source device 310 as a transmission device, the sink device 320 as a reception device, and the HDMI cable 130-1 that connects these devices. In FIG. 11, a part corresponding to that in FIGS. 1 and 7 is denoted with the same reference numeral, and the detailed description thereof is appropriately omitted.

In the transmission system 10-1A, the source device 310 is a non-compatible source device such as a legacy, and the HDMI cable 130-1 is a compatible cable. In this case, the source device 310 performs a normal operation (refer to FIGS. 6A and 6B).

Furthermore, the HDMI cable 130-1 determines that the source device is a non-compatible source device and operates in the non-compatible mode. In this case, in the initial state, the voltage at the point P2 of the Utility line is 0 V. The voltage monitoring unit 133 of the HDMI cable 130-1 monitors that the voltage at the point P2 is 0 V and sends the monitoring result to the control unit 132. The control unit 132 determines that the source device is a non-compatible source device on the basis of the monitoring result and the fact that the +5 V power line is at a high level (5 V) and performs control to operate in the non-compatible mode.

In this case, the control unit 132 changes the state of each switch and shifts to the normal operation. In this case, not to affect the sink device 320, first, the switch SW3 is opened, next, the switches SW4 and SW5 are short-circuited, and finally, the switch SW6 is short-circuited.

Figure 12:
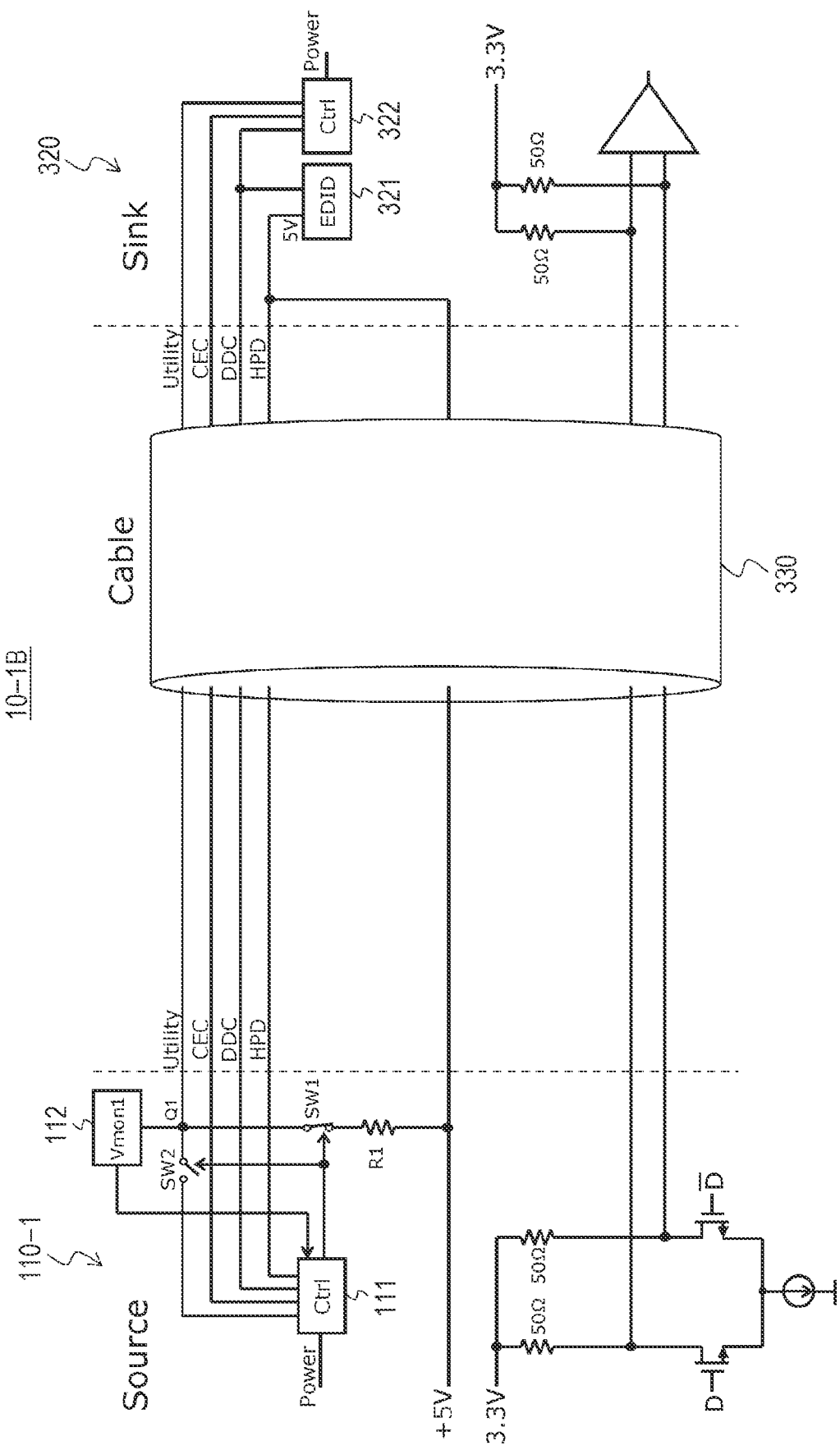
FIG. 12 is a diagram illustrating an exemplary configuration of a transmission system (using Utility line) including a compatible source device and a non-compatible HDMI cable.

FIG. 12 illustrates an exemplary configuration of a transmission system 10-1B. The transmission system 10-1B is an HDMI transmission system using an HDMI as a digital interface. The transmission system 10-1B includes the source device 110-1 as a transmission device, the sink device 320 as a reception device, and the HDMI cable 330 that connects these devices. In FIG. 12, a part corresponding to that in FIGS. 1 and 7 is denoted with the same reference numeral, and the detailed description thereof is appropriately omitted.

In the transmission system 10-1B, the source device 110-1 is a compatible source device, and the HDMI cable 330 is a non-compatible cable such as a legacy. In this case, the HDMI cable 330 performs the normal operation (refer to FIGS. 6A and 6B).

The source device 110-1 determines that the HDMI cable is a non-compatible cable and operates in the non-compatible mode. In this case, in the initial state, the voltage at the point Q1 of the Utility line is 5 V. The voltage monitoring unit 112 of the source device 110-1 monitors that the voltage at the point Q1 is 5 V and sends the monitoring result to the control unit 111. The control unit 111 determines that the HDMI cable is a non-compatible cable on the basis of the monitoring result and the fact that the HPD line is at a high level (5 V) and performs control to operate in the non-compatible mode.

In this case, the control unit 111 changes the state of each switch and shifts to the normal operation. In this case, not to affect the inside of the source device 110-1, first, the switch SW1 is opened, and next, the switch SW2 is short-circuited.

Figure 13:
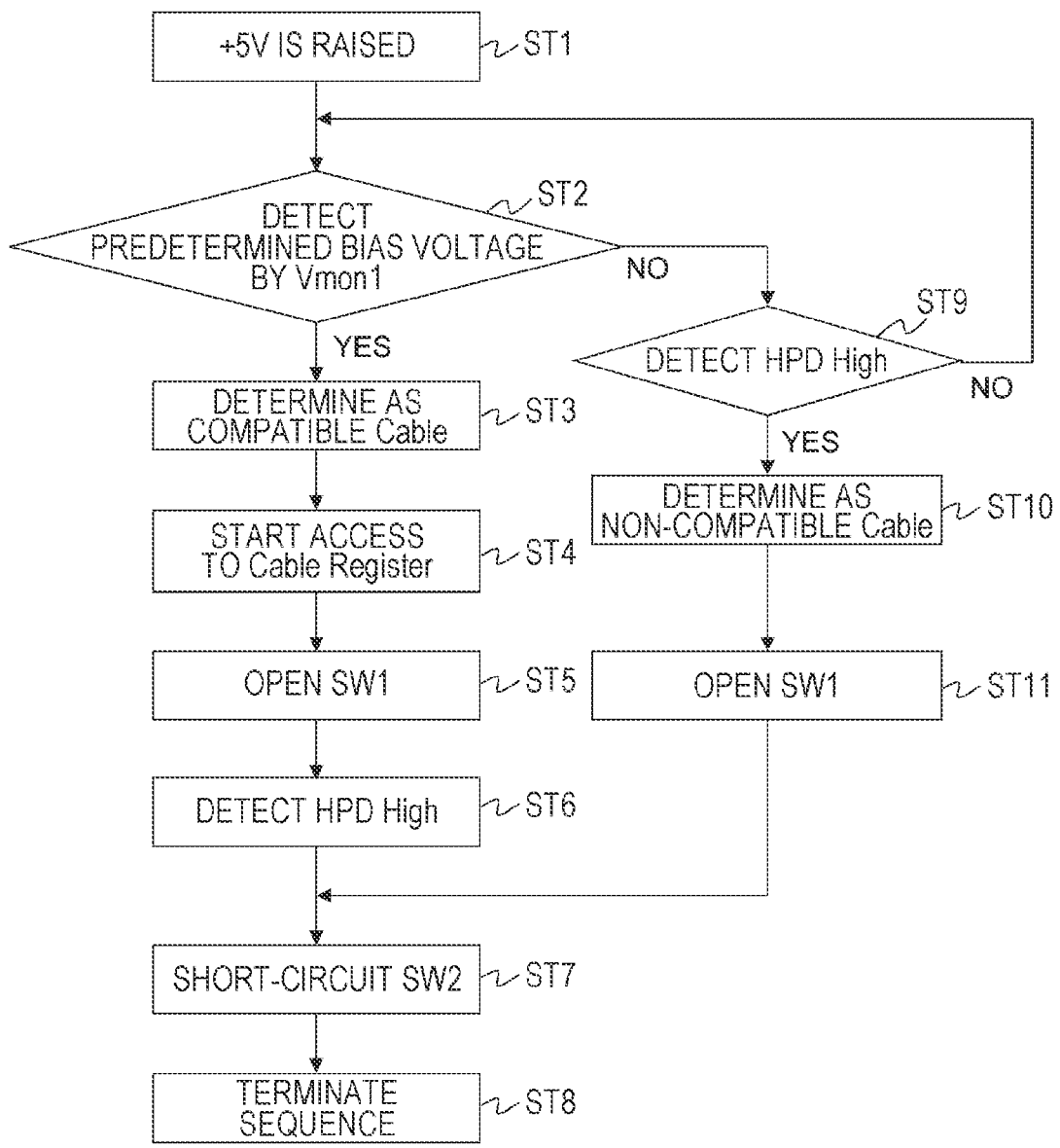
FIG. 13 is a diagram illustrating an example of a sequence of the compatible source device included in the transmission system in FIG. 7.

FIG. 13 illustrates an example of a sequence of the source device 110-1 that is a compatible source device. In step ST1, for example, when a power switch is turned on and +5 V is raised, the sequence is started, and the procedure proceeds to step ST2. In step ST2, the control unit 111 determines whether a predetermined bias voltage (4 V) is detected by the voltage monitoring unit 112.

When the predetermined bias voltage (4 V) is detected, the control unit 111 determines in step ST3 that the HDMI cable is a compatible cable. Then, in step ST4, the control unit 111 starts to access the register of the HDMI cable.

Next, in step ST5, after the access to the register of the HDMI cable is terminated, the control unit 111 changes the state of the switch SW1 from the short-circuit state to the open state. Thereafter, when the control unit 111 detects in step ST6 that the HPD line becomes a high level (5 V), the control unit 111 changes the state of the switch SW2 from the open state to the short-circuit state in step ST7. Then, in step ST8, the sequence is terminated.

Furthermore, when the predetermined bias voltage (4 V) is not detected in step ST2, the control unit 111 determines in step ST9 whether or not the high level (5 V) of the HPD line is detected. When the high level (5 V) of the HPD line is not detected, the procedure returns to step ST2. Meanwhile, when the high level (5 V) of the HPD line is detected, the control unit 111 determines in step ST10 that the HDMI cable is a non-compatible cable.

Then, in step ST11, the state of the switch SW1 is changed from the short-circuit state to the open state. Next, in step ST7, the control unit 111 changes the state of the switch SW2 from the open state to the short-circuit state. Then, in step ST8, the sequence is terminated.

Figure 14:
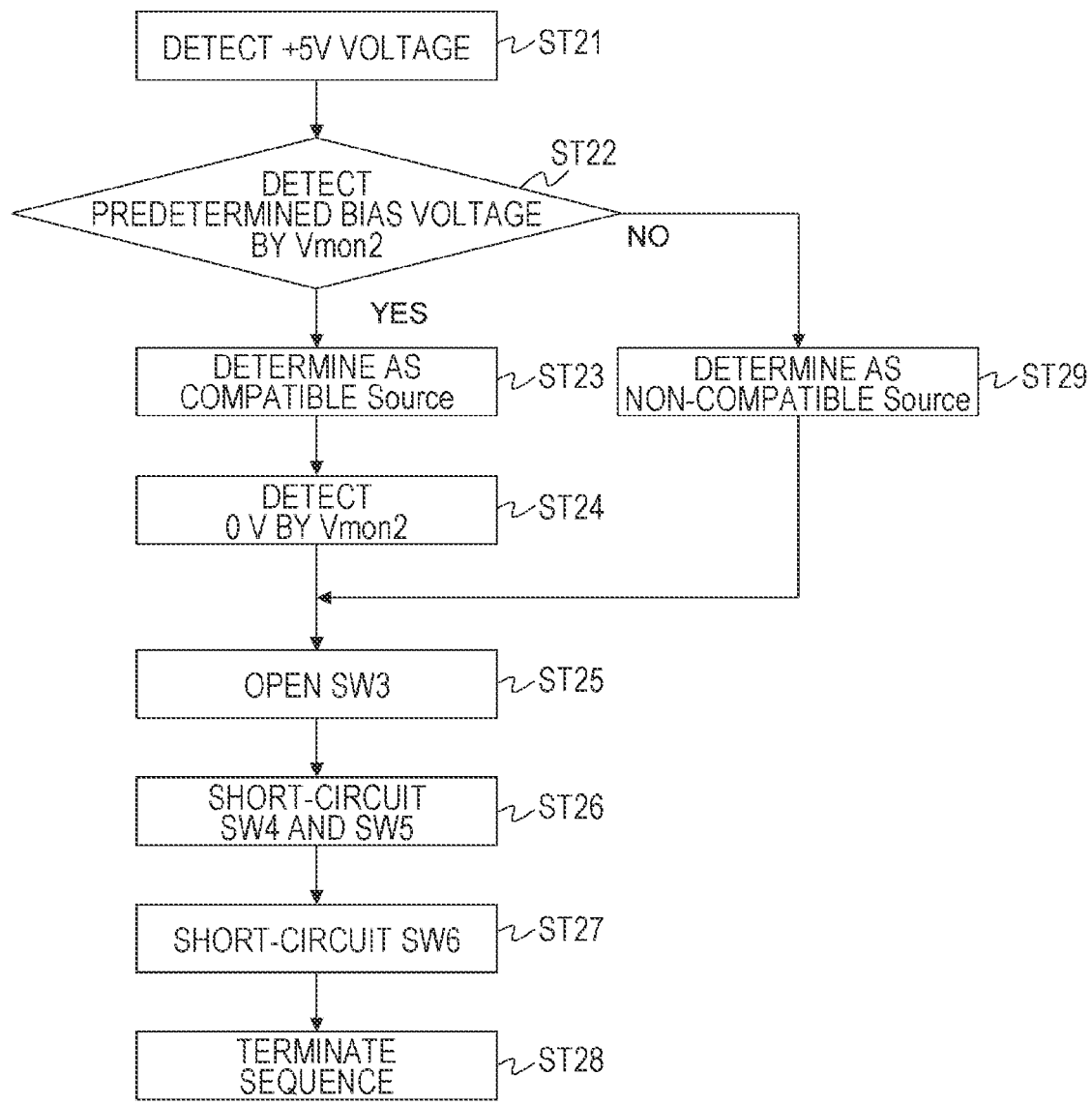
FIG. 14 is a diagram illustrating an example of a sequence of the compatible HDMI cable included in the transmission system in FIG. 7.

FIG. 14 illustrates an example of a sequence of the HDMI cable 130-1 that is a compatible cable. When a voltage of 5 V is detected by the voltage monitoring unit 134 in step ST21, the sequence is started, and the procedure proceeds to step ST22. In step ST22, the control unit 132 determines whether a predetermined bias voltage (4 V) is detected by the voltage monitoring unit 133.

When the predetermined bias voltage (4 V) is detected, the control unit 132 determines in step ST23 that the source device is a compatible source device. Then, when the voltage monitoring unit 133 detects 0 V in step ST24, the control unit 132 changes the state of the switch SW3 from the short-circuit state to the open state in step ST25. In this case, the voltage monitoring unit 133 detects 0 V so that the access from the source device to the register 131 is confirmed.

Next, in step ST26, the control unit 132 changes the states of the switches SW4 and SW5 from the open state to the short-circuit state. Next, in step ST27, the control unit 132 changes the state of the switch SW6 from the open state to the short-circuit state. Then, in step ST28, the sequence is terminated.

Furthermore, when the predetermined bias voltage (4 V) is not detected in step ST22, the control unit 132 determines in step ST29 that the source device is a non-compatible source device. Then, in step ST25, the control unit 132 changes the state of the switch SW3 from the short-circuit state to the open state.

Next, in step ST26, the control unit 132 changes the states of the switches SW4 and SW5 from the open state to the short-circuit state. Next, in step ST27, the control unit 132 changes the state of the switch SW6 from the open state to the short-circuit state. Then, in step ST28, the sequence is terminated.

Note that the switches SW1 and SW2 of the source device 110-1 and the switches SW3, SW4, SW5, and SW6 of the HDMI cable 130-1 are reset to the initial states when the voltage of the +5 V power line drops.

Here, a case is considered where the HDMI cable 130-1 and the source device 110-1 are disconnected in the transmission system 10-1 illustrated in FIG. 7. In the HDMI cable 130-1, the voltage monitoring unit 134 constantly monitors the voltage of the +5 V power line. Since the voltage of the +5 V power line decreases from 5 V in a case of the disconnection, the control unit 132 determines that the disconnection is made and changes the state of each switch to the initial state.

Furthermore, the switch SW2 of the source device 110-1 and the switch SW4 of the HDMI cable 130-1 in the transmission system 10-1 illustrated in FIG. 7 are considered. If there is no problem in bias voltage propagation to the source device 110-1 and the sink device 320 or if an output/input circuit of the Utility line of the source device 110-1 and the sink device 320 does not affect the bias voltage, an operation can be performed without these switches SW2 and SW4.

Furthermore, a power supply for operating each unit of the HDMI cable 130-1 in the transmission system 10-1 illustrated in FIG. 7 is considered. It is considered to apply power to operate the voltage monitoring units 133 and 134, the register 131, the switches SW3, SW4, SW5, and SW6, and the control unit 132 from the source device 110-1 via the +5 V power line, from a battery, which is not illustrated, included in the HDMI cable 130-1, or from an external power supply terminal different from an HDMI terminal included in the cable plug. Note that the idea regarding the power supply to operate each unit of the HDMI cable may be similarly applied to each cable below.

Second Embodiment

Figure 15:
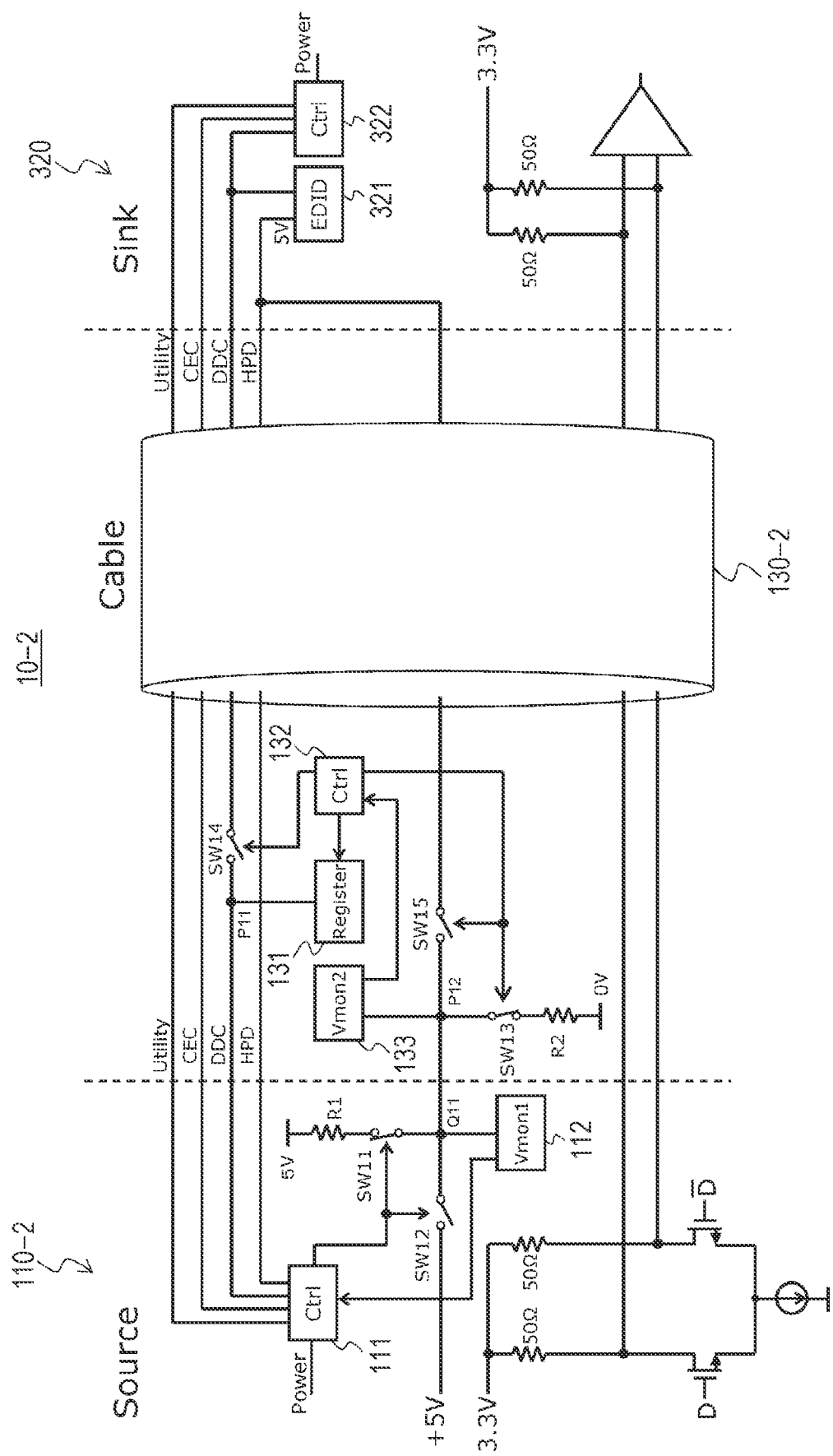
FIG. 15 is a diagram illustrating an exemplary configuration of a transmission system (using +5 V power line) including the compatible source device and the compatible HDMI cable (including register).

FIG. 15 illustrates an exemplary configuration of a transmission system 10-2. The transmission system 10-2 is an HDMI transmission system using an HDMI as a digital interface. The transmission system 10-2 includes a source device 110-2 as a transmission device, a sink device 320 as a reception device, and an HDMI cable 130-2 that connects these devices.

The transmission system 10-1 illustrated in FIG. 7 described above determines whether or not the source device and the HDMI cable are compatible devices by using the Utility line. However, the transmission system 10-2 makes determination by using a +5 V power line. In FIG. 15, a part corresponding to that in FIGS. 1 and 7 is denoted with the same reference numeral, and the detailed description thereof is appropriately omitted.

The HDMI cable 130-2 is a compatible cable that includes a register 131 that stores cable specification data. The HDMI cable 130-2 includes a control unit 132, a voltage monitoring unit 133, switches SW13, SW14, and SW15, and a voltage dividing resistor R2, in addition to the register 131. The register 131 is connected to a point P11 of a DDC line. The switch SW14 is inserted at a point closer to the sink device 320 than the point P11 of the DDC line.

Furthermore, a series circuit including the resistor R2 and the switch SW13 is connected between a point P12 of the +5 V power line and the ground. With this structure, 0 V that is a ground voltage is applied to the point P12 of the +5 V power line via the series circuit including the resistor R2 and the switch SW13. The switch SW15 is inserted at a point closer to the sink device 320 than the point P12 of the +5 V power line. The voltage monitoring unit 133 monitors a voltage at the point P12 of the +5 V power line and sends the monitoring result to the control unit 132. The control unit 132 controls an operation of each unit of the HDMI cable 130-2.

The source device 110-2 is a compatible source device. The source device 110-2 includes a voltage monitoring unit 112, switches SW11 and SW12, and a voltage dividing resistor R1 in addition to a control unit 111 that controls an operation of each unit. It is desirable that the resistor R2 of the HDMI cable 130-2 described above and the resistor R1 of the source device 110-2 be each a large value to some extent so as to reduce current consumption. Hereinafter, the description will be made while assuming R1=100 kΩ and R2=400 kΩ are satisfied.

A voltage of 5 V is applied to a point Q11 of the +5 V power line via the series circuit including the resistor R1 and the switch SW11. The switch SW12 is inserted on a side opposite to the terminal side of the point Q11 of the +5 V power line. The voltage monitoring unit 112 monitors a voltage at the point Q11 of the +5 V power line and sends the monitoring result to the control unit 111.

In the transmission system 10-2 illustrated in FIG. 15, the HDMI cable 130-2 is a compatible cable, and the source device 110-2 is a compatible source device. Therefore, the source device 110-2 determines that the connected HDMI cable is the compatible cable and operates in the compatible mode. Similarly, the HDMI cable 130-2 determines that the connected source device is the compatible source device and operates in the compatible mode.

Operations of the source device 110-2 and the HDMI cable 130-2 will be described in detail. In FIG. 15, initial states of the source device 110-2 and the HDMI cable 130-2 are illustrated. In the initial state of the source device 110-2, the switch SW11 is in a short-circuit state, and the switch SW12 is in an open state. Meanwhile, in the initial state of the HDMI cable 130-2, the switch SW13 is in a short-circuit state, and the switches SW14 and SW15 are in an open state.

Since the switches SW11 and SW13 are in the short-circuit state in the initial state, the resistors R1 and R2 are connected in series, and a voltage of 4 V is obtained at each of the points Q11 and P12 of the +5 V power line sandwiched between the switches SW12 and SW15 by resistance voltage division.

The voltage monitoring unit 112 of the source device 110-2 monitors that the voltage at the point Q11 is 4 V and sends the monitoring result to the control unit 111. The control unit 111 determines that the connected HDMI cable is the compatible cable on the basis of the monitoring result and controls the HDMI cable to operate in the compatible mode.

Similarly, the voltage monitoring unit 133 of the HDMI cable 130-2 monitors that the voltage at the point P12 is 4 V and sends the monitoring result to the control unit 132. The control unit 132 determines that the connected source device is the compatible source device on the basis of the monitoring result and controls the source device to operate in the compatible mode.

Since the source device 110-2 is controlled to operate in the compatible mode, the control unit 111 accesses (read/write) the register 131 of the HDMI cable 130-2 via the DDC line. In this case, since the switch SW14 is in the open state, it is possible to prevent access information of the register 131 from being transmitted to the sink device 320, and occurrence of a malfunction of the sink device 320 of which the address is not defined is avoided.

Figure 16:
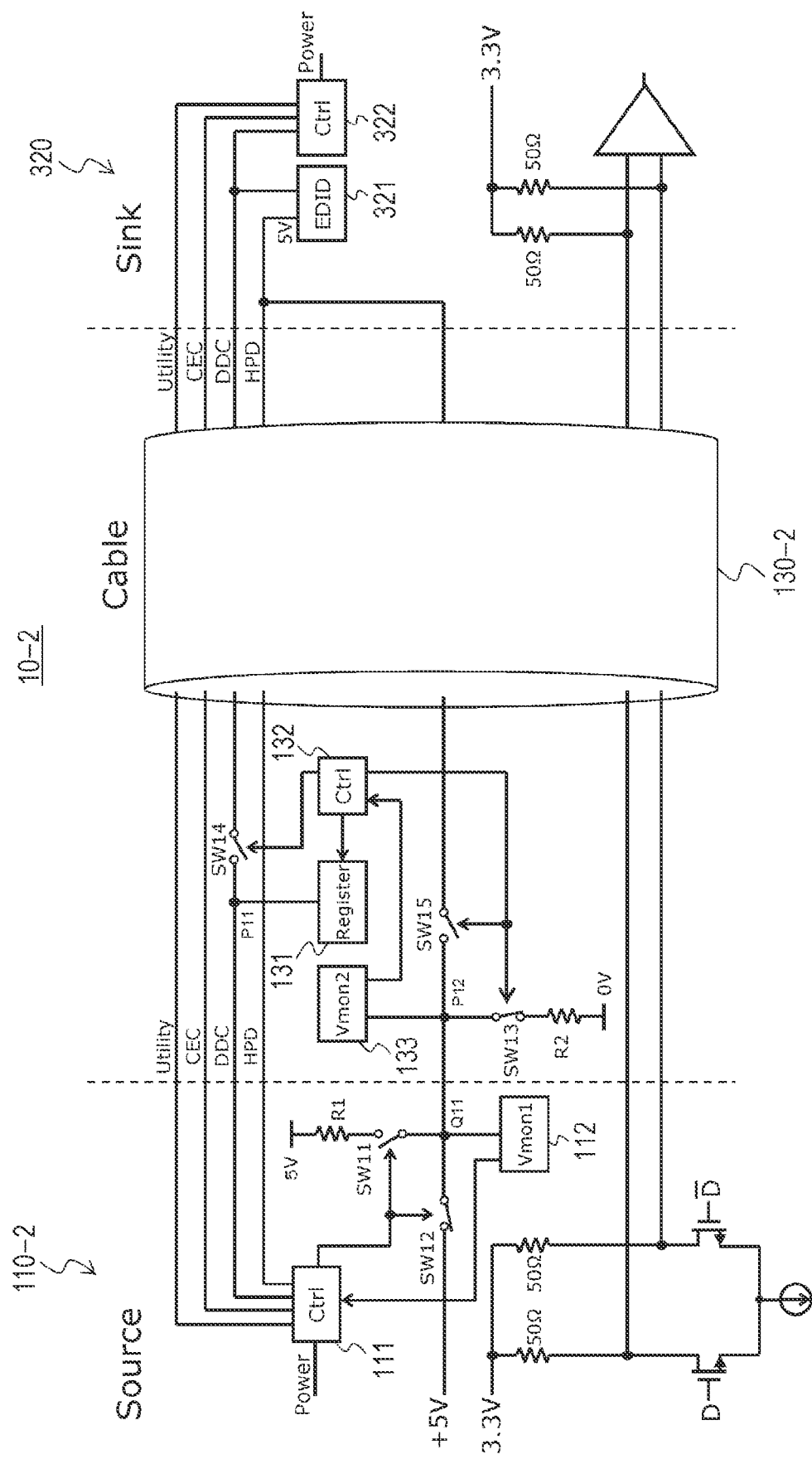
FIG. 16 is a diagram for explaining an operation of the transmission system in FIG. 15.

When the access to the register 131 of the HDMI cable 130-2 is terminated in the source device 110-2, as illustrated in FIG. 16, the control unit 111 short-circuits the switch SW12 and opens the switch SW11. Therefore, the voltage at the point P12 of the +5 V power line is 5 V. In the HDMI cable 130-2, the voltage monitoring unit 133 monitors that the voltage at the point P12 is 5 V and sends the monitoring result to the control unit 132. In this way, by monitoring that the voltage at the point P12 is 5 V, it is confirmed that the source device has accessed the register 131.

Figure 17:
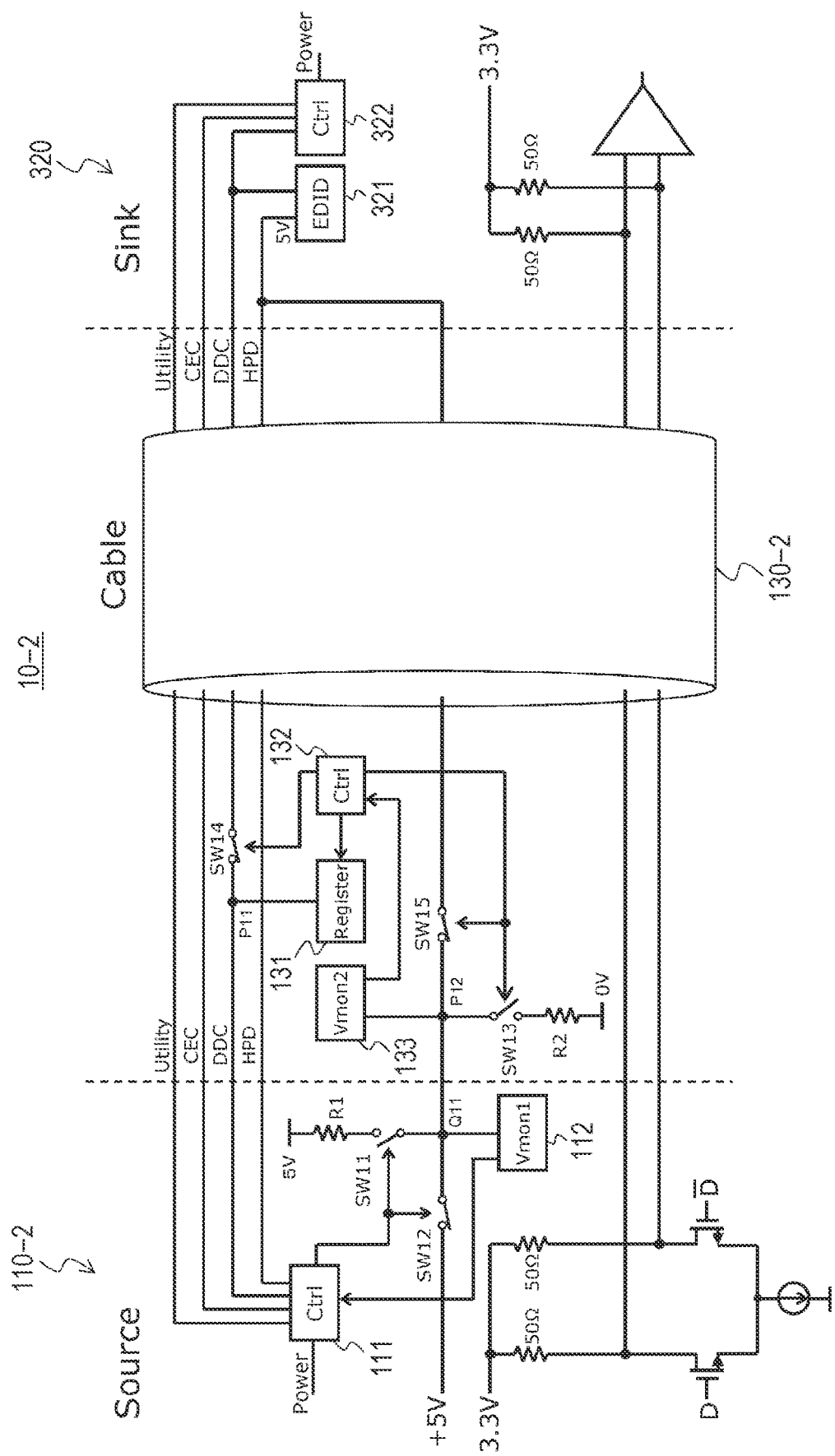
FIG. 17 is a diagram for explaining the operation of the transmission system in FIG. 15.

The control unit 132 determines that the access of the source device 110-2 to the register 131 is terminated on the basis of the monitoring result and changes the state of each switch and shifts to a normal operation as illustrated in FIG. 17. In this case, first, the switch SW13 is opened, and the switch SW14 is short-circuited. Thereafter, the switch SW15 is short-circuited.

By short-circuiting the switch SW15, a 5 V voltage is sent from the source device 110-2 to the sink device 320 through the +5 V power line, and accordingly, a 5 V voltage (connection detection signal) is sent from the sink device 320 to the source device 110-2 via the HPD line. With this operation, the control unit 111 of the source device 110-2 recognizes that the preparation of the cable is completed and shifts to the normal operation.

In this way, in the transmission system 10-2 illustrated in FIG. 15, the switch SW14 is in the open state until the access from the source device 110-2 to the register 131 of the HDMI cable 130-2 is terminated. Therefore, the access information of the register 131 is not transmitted to the sink device 320 through the DDC line, and it is possible to avoid the malfunction of the sink device 320 of which the address is not defined.

Furthermore, in the transmission system 10-2 illustrated in FIG. 15, the state of the switch SW14 is changed to the short-circuit state after the access from the source device 110-2 to the register 131 of the HDMI cable 130-2 is terminated, and thereafter, the state of the switch SW15 is changed to the short-circuit state. Therefore, it is possible to avoid preventing a communication signal from being transmitted from the source device 110-2 to the sink device 320 through the DDC line after the connection detection signal is transmitted from the sink device 320 to the source device 110-2.

Figure 18:
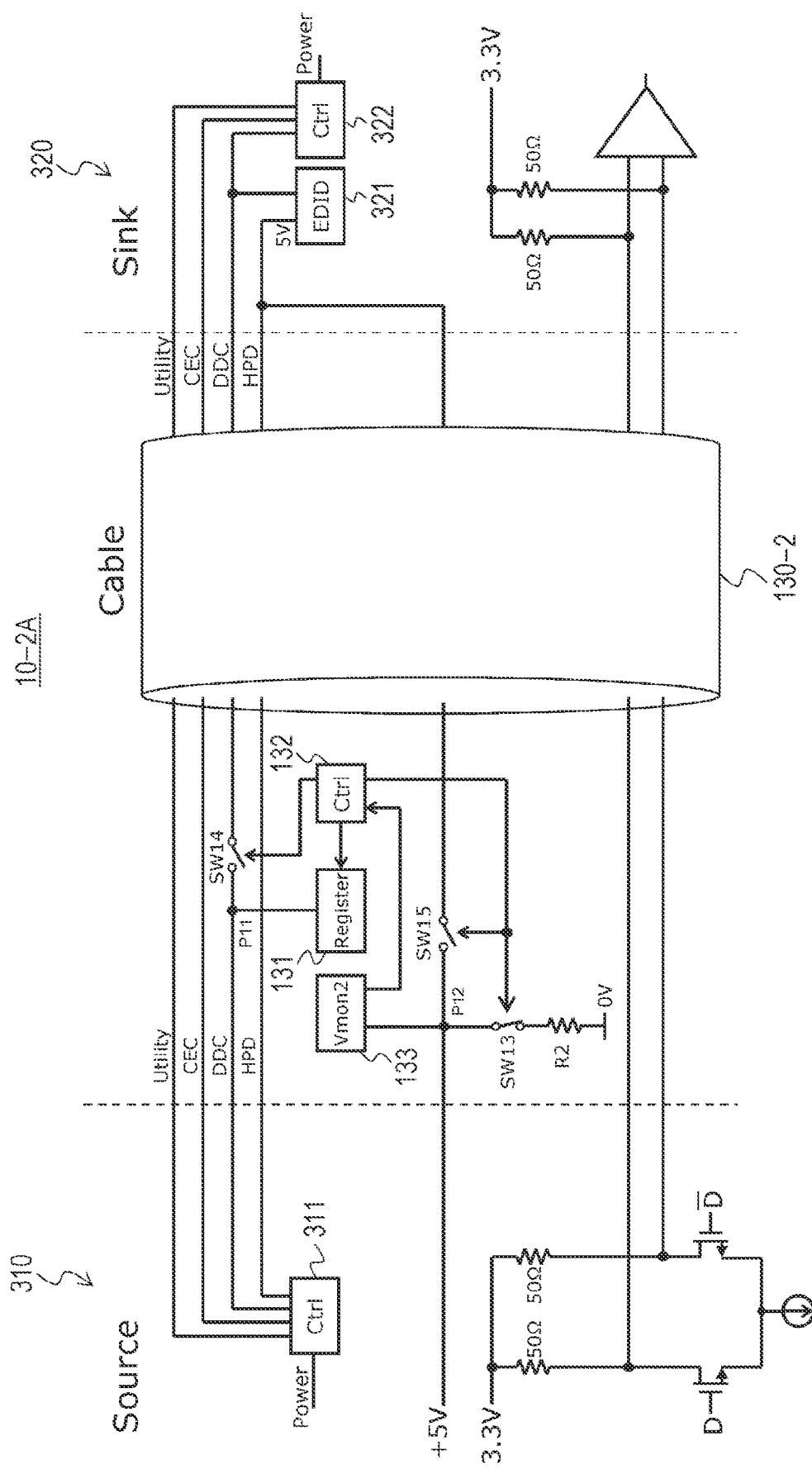
FIG. 18 is a diagram illustrating an exemplary configuration of a transmission system (using +5 V power line) including the non-compatible source device and the compatible HDMI cable (including register).

FIG. 18 illustrates an exemplary configuration of a transmission system 10-2A. The transmission system 10-2A is an HDMI transmission system using an HDMI as a digital interface. The transmission system 10-2A includes the source device 310 as a transmission device, the sink device 320 as a reception device, and the HDMI cable 130-2 that connects these devices. In FIG. 18, a part corresponding to that in FIGS. 1 and 15 is denoted with the same reference numeral, and the detailed description thereof is appropriately omitted.

In the transmission system 10-2A, the source device 310 is a non-compatible source device such as a legacy, and the HDMI cable 130-2 is a compatible cable. In this case, the source device 310 performs a normal operation (refer to FIGS. 6A and 6B).

Furthermore, the HDMI cable 130-2 determines that the source device is a non-compatible source device and operates in the non-compatible mode. In this case, in the initial state, the voltage at the point P12 of the +5 V power line is 5 V. The voltage monitoring unit 133 of the HDMI cable 130-2 monitors that the voltage at the point P12 is 5 V and sends the monitoring result to the control unit 132. The control unit 132 determines that the source device is a non-compatible source device on the basis of the monitoring result and controls the source device to operate in a non-compatible mode.

In this case, the control unit 132 changes the state of each switch and shifts to the normal operation. In this case, first, the switch SW13 is opened, and the switch SW14 is short-circuited. Thereafter, the switch SW15 is short-circuited, and the control unit 132 shifts to the normal operation.

Figure 19:
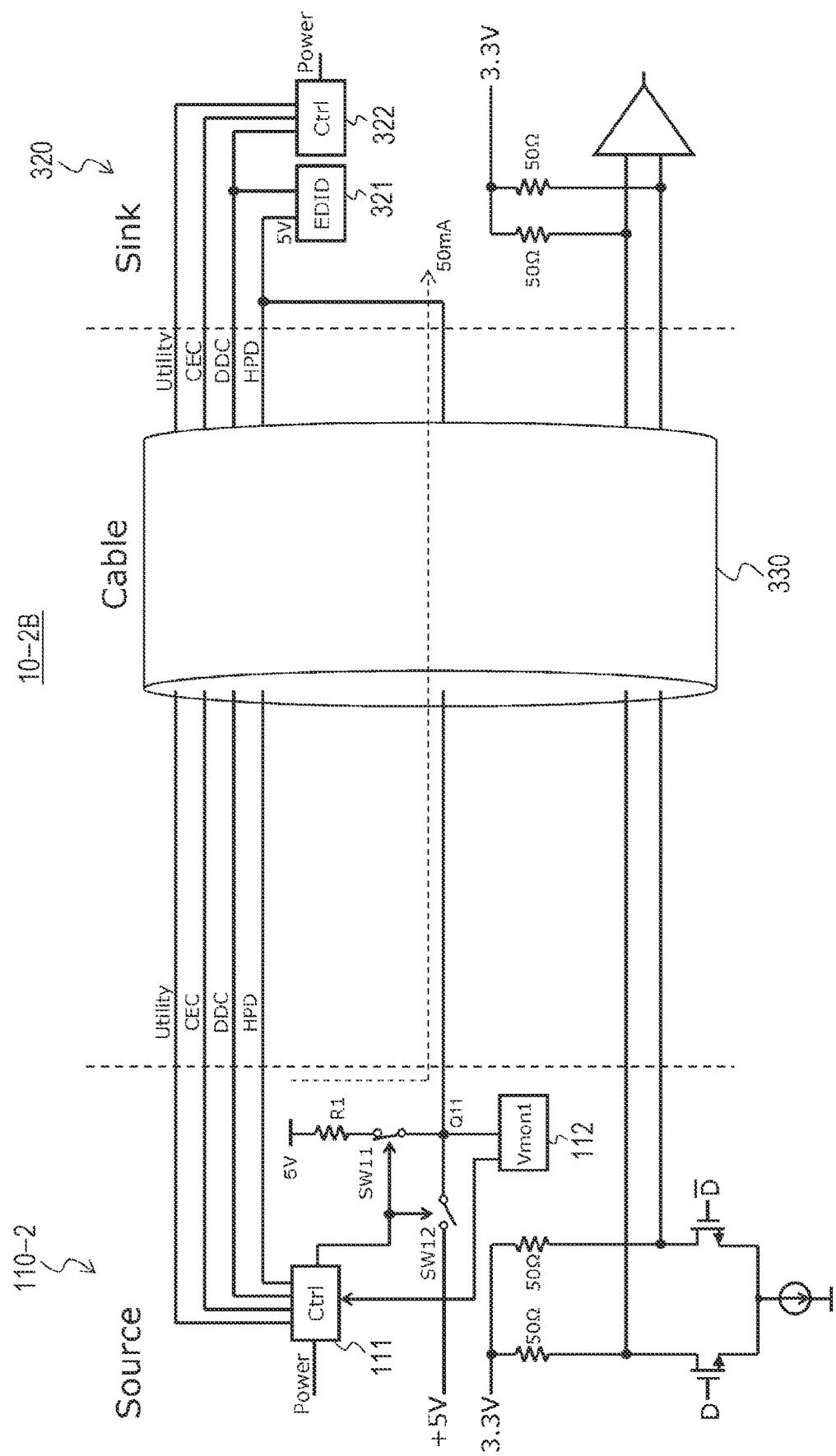
FIG. 19 is a diagram illustrating an exemplary configuration of a transmission system (using +5 V power line) including the compatible source device and the non-compatible HDMI cable.

FIG. 19 illustrates an exemplary configuration of a transmission system 10-2B. The transmission system 10-2B is an HDMI transmission system using an HDMI as a digital interface. The transmission system 10-2B includes the source device 110-2 as a transmission device, the sink device 320 as a reception device, and the HDMI cable 330 that connects these devices. In FIG. 19, a part corresponding to that in FIGS. 1 and 15 is denoted with the same reference numeral, and the detailed description thereof is appropriately omitted.

In the transmission system 10-2B, the source device 110-2 is a compatible source device, and the HDMI cable 330 is a non-compatible cable such as a legacy. In this case, the HDMI cable 330 performs the normal operation (refer to FIGS. 6A and 6B).

The source device 110-2 determines that the HDMI cable is a non-compatible cable and operates in the non-compatible mode. In this case, in the initial state, the voltage at the point Q11 of the +5 V power line is 5 V. The voltage monitoring unit 112 of the source device 110-2 monitors that the voltage at the point Q11 is 5 V and sends the monitoring result to the control unit 111. The control unit 111 determines that the HDMI cable is a non-compatible cable on the basis of the monitoring result and the fact that the HPD line is at a high level (5 V) and performs control to operate in the non-compatible mode. In this case, the control unit 111 short-circuits the switch SW12 and further opens the switch SW11, and shifts to the normal operation.

Here, there is a possibility that the sink device 320 starts to draw 50 mA when detecting 5 V. If 50 mA is drawn via a 100 kΩ resistor R1 in an initial state in FIG. 19, it is expected that the voltage of the +5 V power line on the side of the sink device 320 from the switch SW12 is significantly lowered from 5 V and greatly deviates from a specified specification range.

Figure 20:
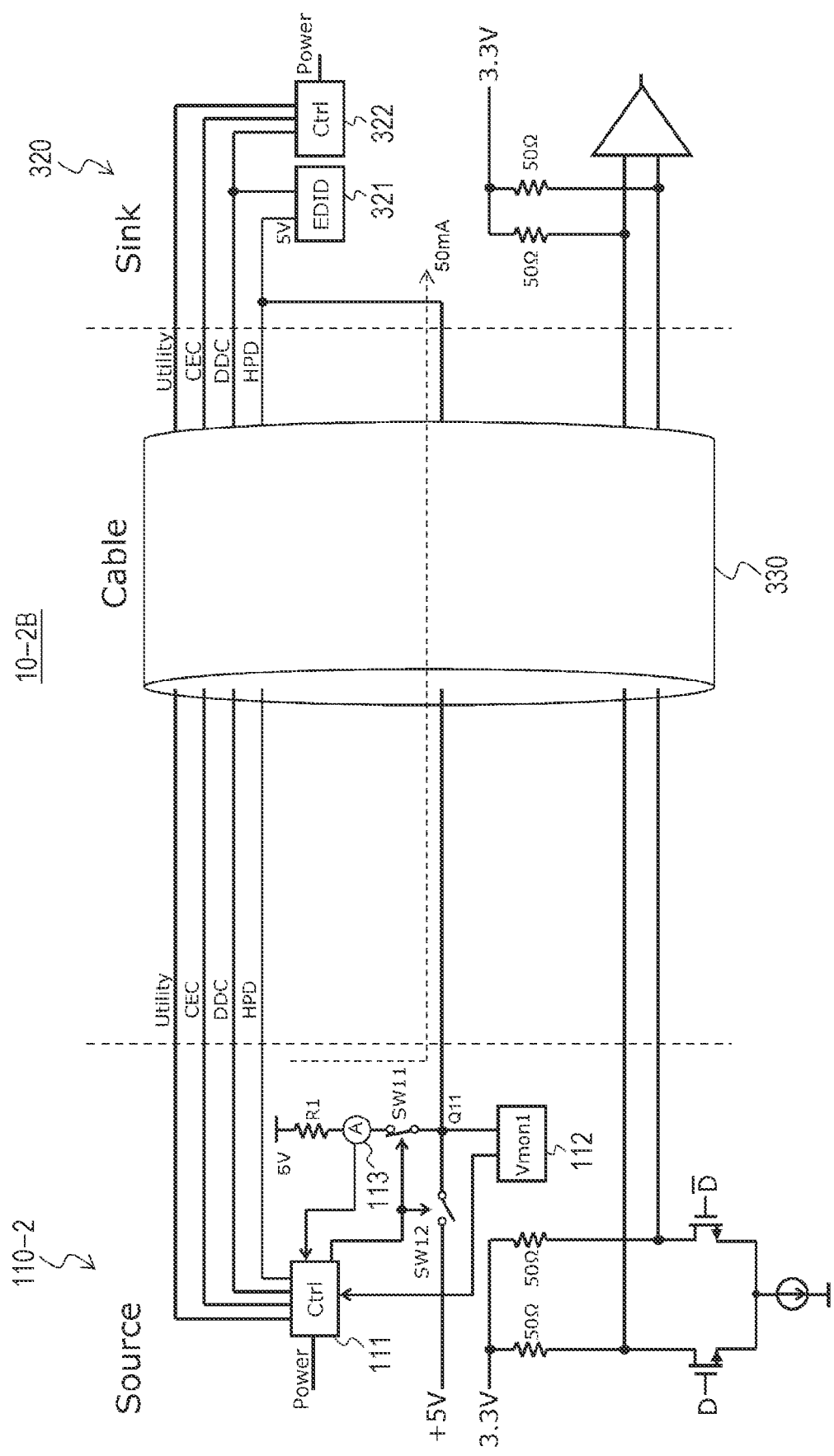
FIG. 20 is a diagram illustrating an exemplary configuration that avoids an inconvenience of the transmission system in FIG. 19.

As a method for avoiding this, as illustrated in FIG. 20, an ammeter 113 is disposed, for example, between the resistor R1 and the switch SW11. Then, when a current in a direction in which an amount of a flowing current I(=5 V/(R1+R2)=5 V/500 KΩ=10 µA) increases in a case where both of the source device and the HDMI cable in FIG. 15 are compatible devices is detected, it is only required that the switches SW11 and SW12 be immediately switched and the current of 50 mA be transmitted from the source of the +5 V power line of the source device 110-2 to the sink device 320.

Figure 21:
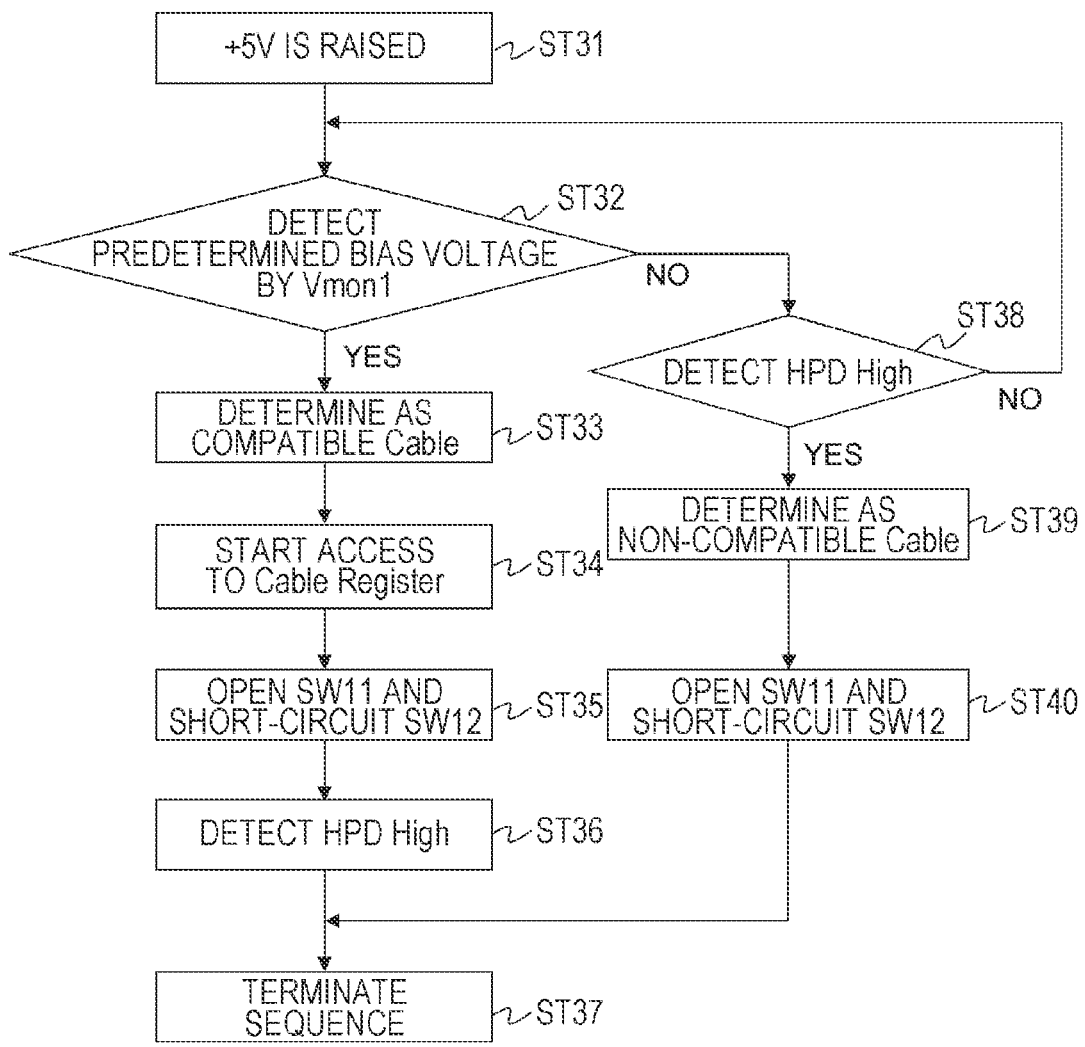
FIG. 21 is a diagram illustrating an example of a sequence of the compatible source device included in the transmission system in FIG. 15.

FIG. 21 illustrates an example of a sequence of the source device 110-2 that is a compatible source device. In step ST31, for example, when a power switch is turned on and +5 V is raised, the sequence is started, and the procedure proceeds to step ST32. In step ST32, the control unit 111 determines whether a predetermined bias voltage (4 V) is detected by the voltage monitoring unit 112.

When the predetermined bias voltage (4 V) is detected, the control unit 111 determines in step ST33 that the HDMI cable is a compatible cable. Then, in step ST34, the control unit 111 starts to access the register of the HDMI cable.

Next, in step ST35, after the access to the register of the HDMI cable is terminated, the control unit 111 changes the open state of the switch SW12 to the short-circuit state and changes the open state of the switch SW11 to the short-circuit state. Then, in step ST36, when the control unit 111 detects that the HPD line becomes a high level (5 V), the sequence is terminated in step ST37.

Furthermore, when the predetermined bias voltage (4 V) is not detected in step ST32, the control unit 111 determines in step ST38 whether or not the high level (5 V) of the HPD line is detected. When the high level (5 V) of the HPD line is not detected, the procedure returns to step ST32. Meanwhile, when the high level (5 V) of the HPD line is detected, the control unit 111 determines in step ST39 that the HDMI cable is a non-compatible cable.

Then, in step ST40, the control unit 111 changes the open state of the switch SW12 to the short-circuit state and the short-circuit state of the switch SW11 to the open state. Then, in step ST37, the sequence is terminated.

Figure 22:
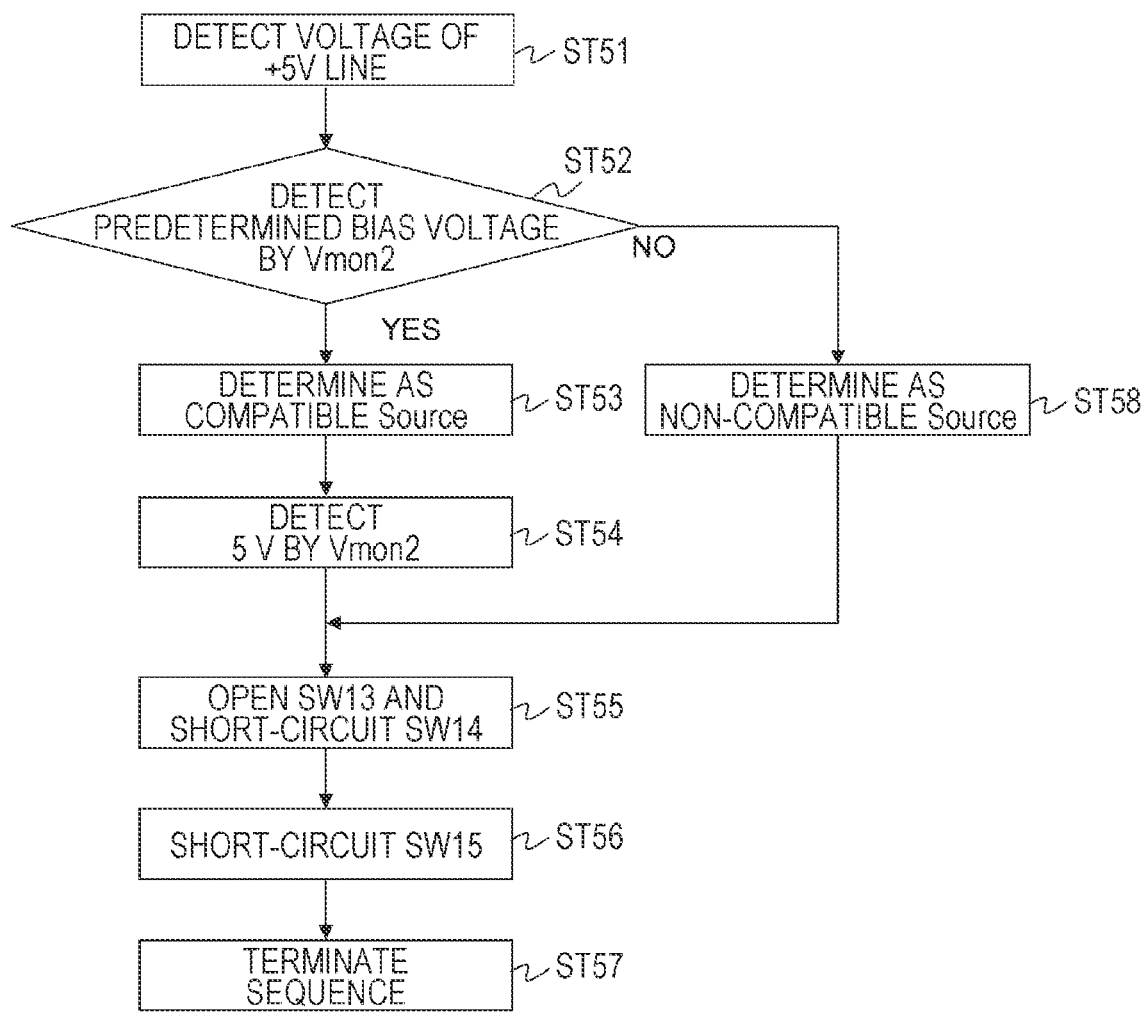
FIG. 22 is a diagram illustrating an example of a sequence of the compatible HDMI cable included in the transmission system in FIG. 15.

FIG. 22 illustrates an example of a sequence of the HDMI cable 130-2 that is a compatible cable. When the voltage monitoring unit 133 detects, in step ST51, a voltage of 5 V or 4 V in the +5 V power line, the sequence is started, and the procedure proceeds to step ST52. In step ST52, the control unit 132 determines whether a predetermined bias voltage (4 V) is detected by the voltage monitoring unit 133.

When the predetermined bias voltage (4 V) is detected, the control unit 132 determines in step ST53 that the source device is a compatible source device. Then, when the voltage monitoring unit 133 detects 5 V in step ST54, the control unit 132, in step ST55, changes the short-circuit state of the switch SW13 to the open state and changes the open state of the switch SW14 to the short-circuit state. In this case, the voltage monitoring unit 133 detects 5 V so that the access from the source device to the register 131 is confirmed. Then, the control unit 132 changes the open state of the switch SW15 to the short-circuit state in step ST56, and the sequence is terminated in step ST57.

Furthermore, when the predetermined bias voltage (4 V) is not detected in step ST52, the control unit 132 determines in step ST58 that the source device is a non-compatible source device. Then, in step ST55, the control unit 132 changes the short-circuit state of the switch SW13 to the open state and changes the open state of the switch SW14 to the short-circuit state. Then, the control unit 132 changes the open state of the switch SW15 to the short-circuit state in step ST56, and the sequence is terminated in step ST57.

Note that the switches SW11 and SW12 of the source device 110-2 and the switches SW13, SW14, and SW15 of the HDMI cable 130-2 are reset to the initial states when the voltage of the +5 V power line drops.

Third Embodiment

Figure 23:
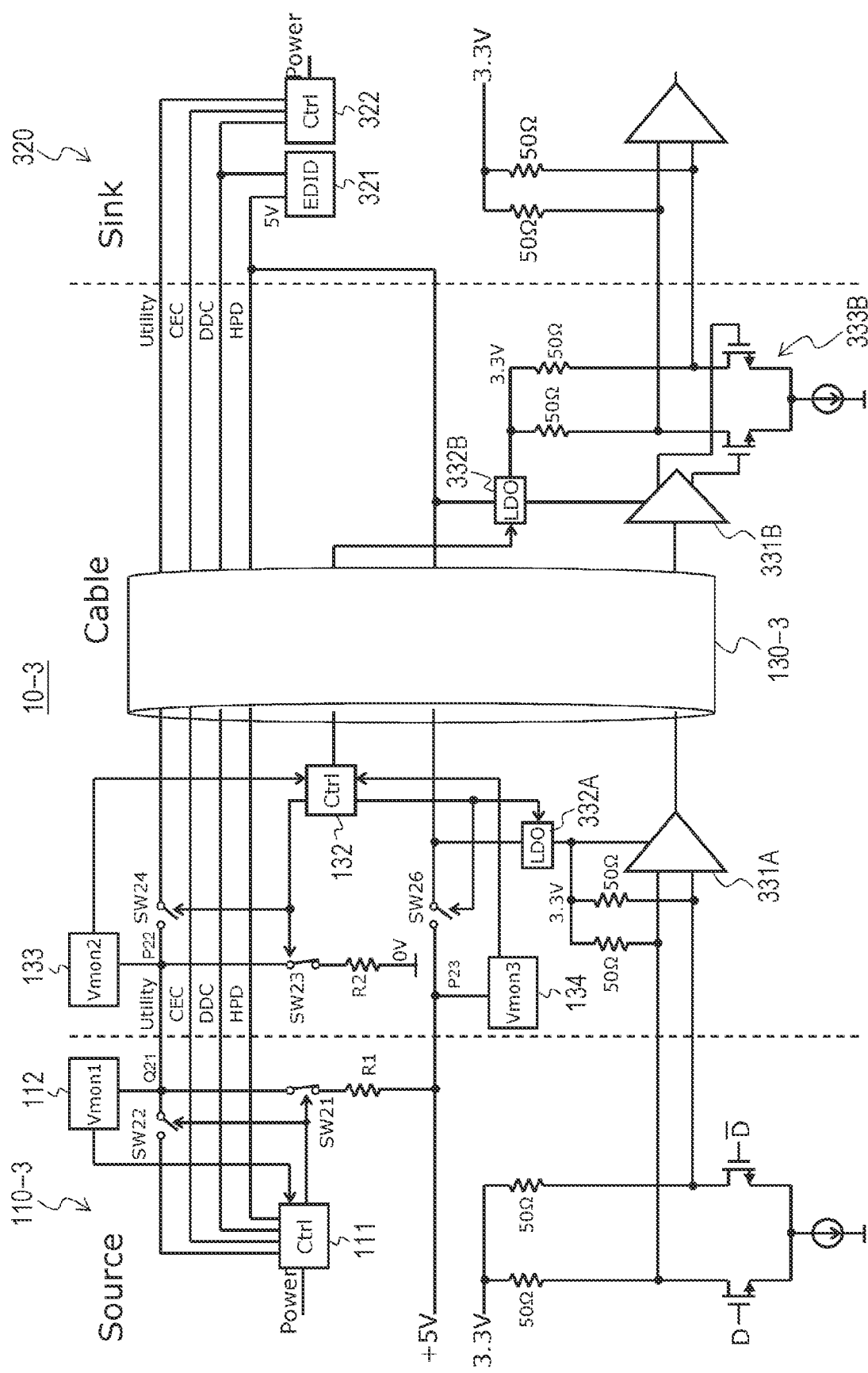
FIG. 23 is a diagram illustrating an exemplary configuration of a transmission system including the compatible source device and a compatible HDMI cable (including current consumption unit).

FIG. 23 illustrates an exemplary configuration of a transmission system 10-3. The transmission system 10-3 is an HDMI transmission system using an HDMI as a digital interface. The transmission system 10-3 includes a source device 110-3 as a transmission device, a sink device 320 as a reception device, and an HDMI cable 130-3 that is an AOC for connecting these devices. In FIG. 23, a part corresponding to that in FIG. 4 is denoted with the same reference numeral, and the detailed description thereof is appropriately omitted.

The HDMI cable 130-3 includes a control unit 132, voltage monitoring units 133 and 134, switches SW23, SW24, and SW26, and a voltage dividing resistor R2 in addition to AOC configuration circuits including conversion circuits 331A and 331B, LDO regulators 332A and 332B, a current driving unit 333B, and the like.

A series circuit including the resistor R2 and the switch SW23 is connected between a point P22 of a Utility line and the ground. With this structure, 0 V that is a ground voltage is applied to the point P22 of the Utility line via the series circuit including the resistor R2 and the switch SW23. The switch SW24 is inserted at a point closer to the sink device 320 than the point P22 of the Utility line. Furthermore, the switch SW26 is inserted into a +5 V power line.

The voltage monitoring unit 133 monitors a voltage at the point P22 of the Utility line and sends the monitoring result to the control unit 132. The voltage monitoring unit 134 monitors a voltage at a point P23 closer to a terminal than a position where the switch SW26 is inserted into the +5 V power line and sends the monitoring result to the control unit 132. Electric power is suppled from the point closer to the sink device 320 than a position where the switch SW26 is inserted into the +5 V power line to the LDO regulators 332A and 332B. The control unit 132 controls an operation of each unit of the HDMI cable 130-3.

The source device 110-3 is a compatible source device. The source device 110-3 includes a voltage monitoring unit 112, switches SW21 and SW22, and a voltage dividing resistor R1 in addition to a control unit 111 that controls an operation of each unit. It is desirable that the resistor R2 of the HDMI cable 130-3 described above and the resistor R1 of the source device 110-3 be each a large value to some extent so as to reduce current consumption. Hereinafter, the description will be made while assuming R1=100 kΩ and R2=400 kΩ are satisfied.

A series circuit including the resistor R1 and the switch SW21 is connected between the +5 V power line and a point Q21 of the Utility line. With this structure, the voltage of +5 V is applied to the point Q21 of the Utility line via the series circuit including the resistor R1 and the switch SW21. The switch SW22 is inserted on a side opposite to the terminal side of the point Q21 of the Utility line. The voltage monitoring unit 112 monitors a voltage at the point Q21 of the Utility line and sends the monitoring result to the control unit 111.

In the transmission system 10-3 illustrated in FIG. 23, the HDMI cable 130-3 is a compatible cable, and the source device 110-3 is a compatible source device. Therefore, the source device 110-3 determines that the connected HDMI cable is a compatible cable and operates in the compatible mode. Similarly, the HDMI cable 130-3 determines that the connected source device is a compatible source device and operates in the compatible mode.

Operations of the source device 110-3 and the HDMI cable 130-3 will be described in detail. In FIG. 23, initial states of the source device 110-3 and the HDMI cable 130-3 are illustrated. In the initial state of the source device 110-3, the switch SW21 is in a short-circuit state, and the switch SW22 is in an open state. Meanwhile, in the initial state of the HDMI cable 130-3, the switch SW23 is in a short-circuit state, and the switches SW24 and SW26 are in an open state.

Since SW21 and SW23 are in the short-circuit state in the initial state, the resistors R1 and R2 are connected in series between the +5 V power line of the source device 110-3 and the ground (0 V) of the HDMI cable 130-3, and a voltage of 4 V is obtained at the points Q21 and P22 of the Utility line by resistance voltage division.

The voltage monitoring unit 112 of the source device 110-3 monitors that the voltage at the point Q21 is 4 V and sends the monitoring result to the control unit 111. The control unit 111 determines that the connected HDMI cable is the compatible cable on the basis of the monitoring result and controls the HDMI cable to operate in the compatible mode.

Similarly, the voltage monitoring unit 133 of the HDMI cable 130-3 monitors that the voltage at the point P22 is 4 V and sends the monitoring result to the control unit 132. The control unit 132 determines that the connected source device is the compatible source device on the basis of the monitoring result and controls the source device to operate in the compatible mode.

Here, since the switch SW22 is in the open state in the source device 110-3, the voltage of 4 V is not propagated in the source device 110-3 and does not affect the inside of the source device 110-3. Similarly, since the switch SW24 is opened in the HDMI cable 130-3, the voltage of 4 V is not propagated to the sink device 320 and does not affect the sink device 320.

Figure 24:
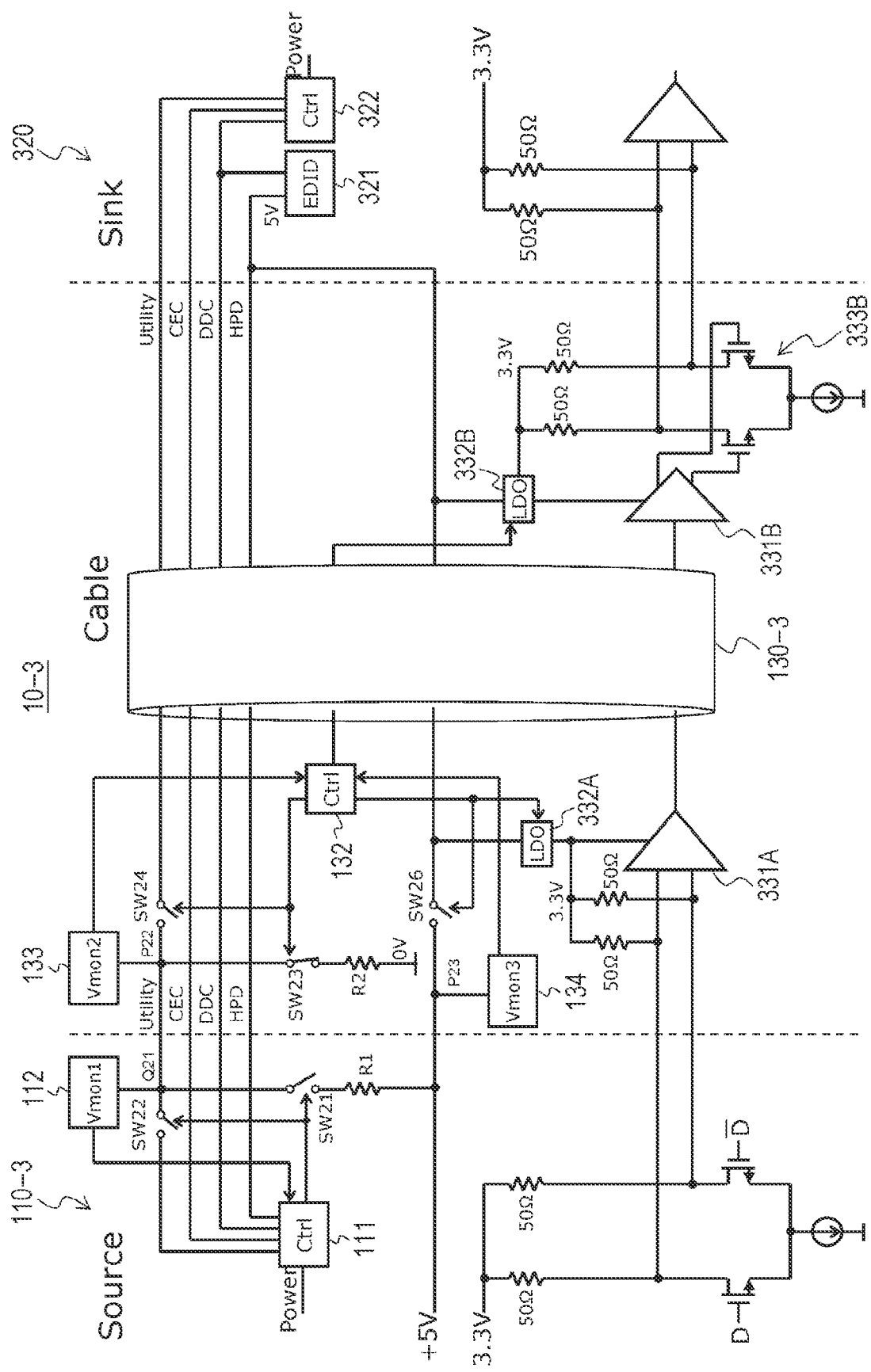
FIG. 24 is a diagram for explaining an operation of the transmission system in FIG. 23.

Since the source device 110-3 is controlled to operate in the compatible mode, the control unit 111 opens the switch SW21 as illustrated in FIG. 24. Therefore, the voltage at the point P22 of the Utility line is 0 V. In the HDMI cable 130-3, the voltage monitoring unit 133 monitors that the voltage at the point P22 is 0 V and sends the monitoring result to the control unit 132. By monitoring that the voltage at the point P22 is 0 V in this way, it is confirmed that the source device determines that its own cable is a compatible cable.

Figure 25:
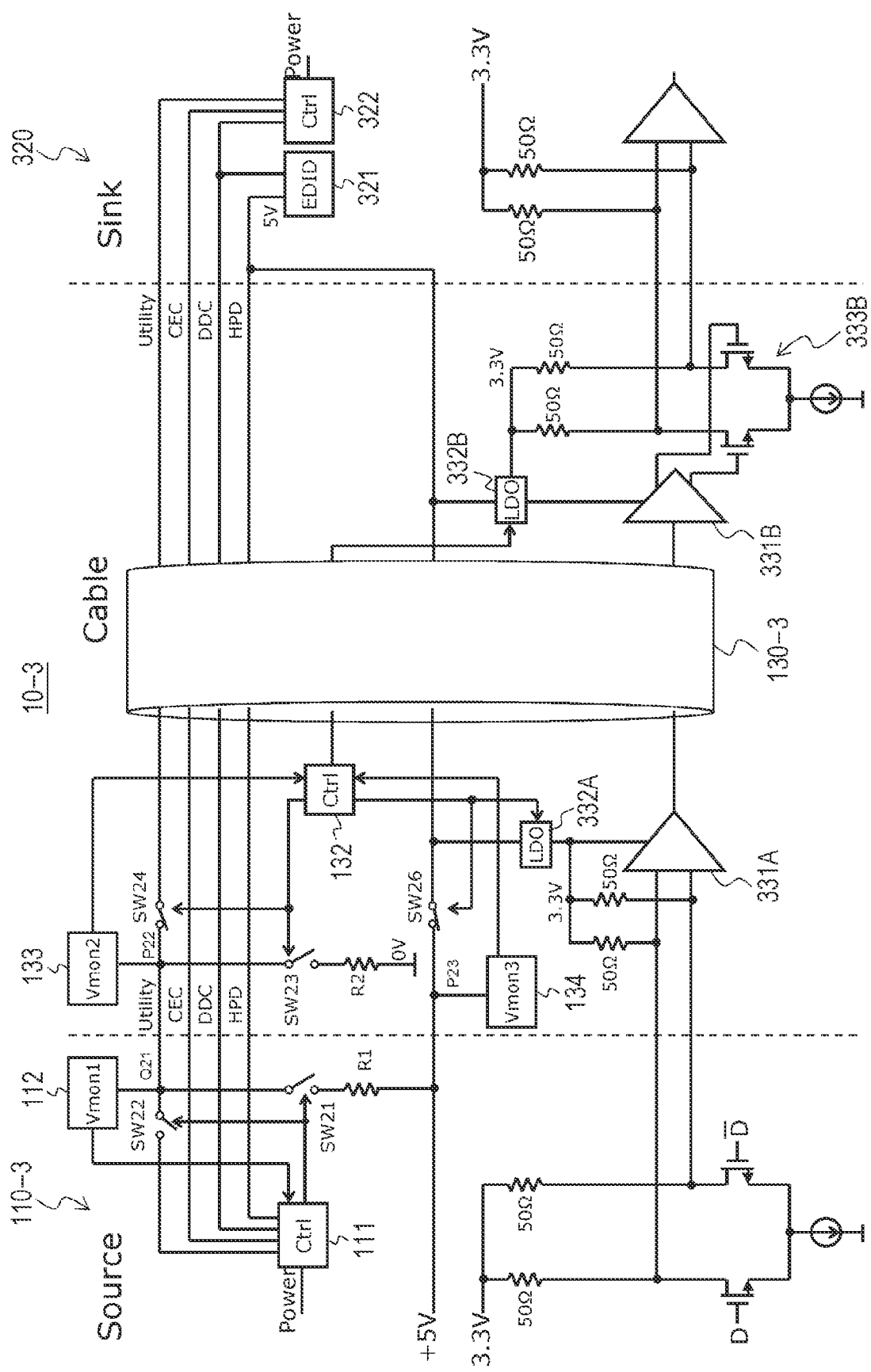
FIG. 25 is a diagram for explaining the operation of the transmission system in FIG. 23.

The control unit 132 changes the state of each switch on the basis of the monitoring result as illustrated in FIG. 25 and shifts to a normal operation. In this case, not to affect the sink device 320, first, the switch SW23 is opened, next, the switch SW24 is short-circuited, and finally, the switch SW26 is short-circuited. Thereafter, the control unit 132 turns on the LDO regulators 332A and 332B and applies 3.3 V of electric power to the conversion circuits 331A and 331B that are active circuits so as to set the conversion circuits 331A and 331B to be in an operation state (Enable).

Figure 26:
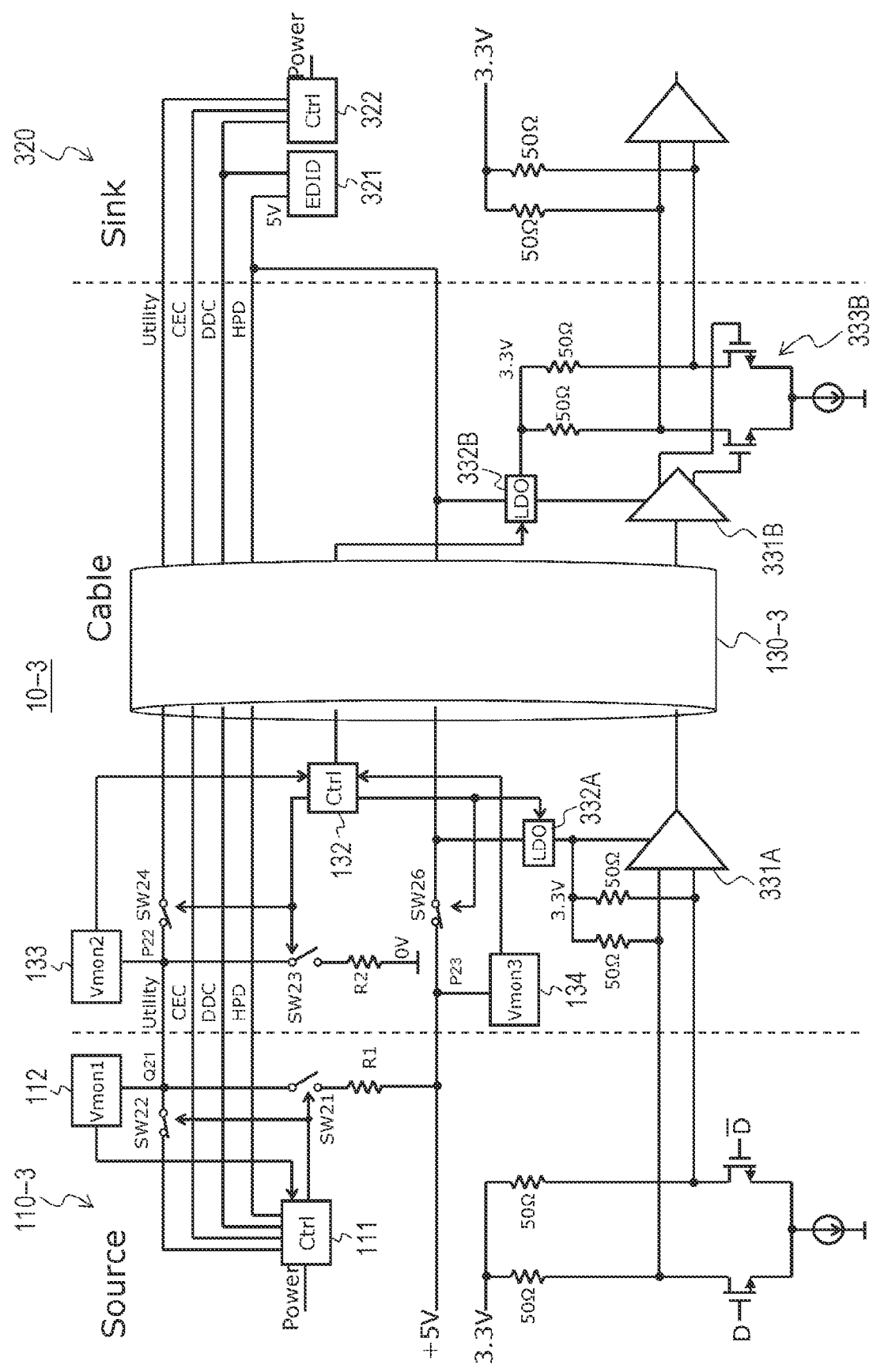
FIG. 26 is a diagram for explaining the operation of the transmission system in FIG. 23.

By short-circuiting the switch SW26, a 5 V voltage is sent from the source device 110-3 to the sink device 320 through the +5 V power line, and accordingly, a 5 V voltage (connection detection signal) is sent from the sink device 320 to the source device 110-3 via the HPD line. With this operation, the control unit 111 of the source device 110-3 recognizes that the preparation of the cable is completed, and short-circuits the switch SW22 and shifts to the normal operation, as illustrated in FIG. 26.

Note that the compatible source device 110-3 may be configured so that a current that can be supplied by the +5 V power line is constantly equal to or higher than 55 mA and the current can be supplied to the active circuit of the HDMI cable 130-3 that is a compatible cable. However, the control unit 111 of the source device 110-3 may change a mode to a mode in which the current that can be supplied by the +5 V power line is set to be equal to or higher than 55 mA when determining that the connected HDMI cable is a compatible cable. By switching the current supply amount mode, the source device 110-3 can reduce electric power of a power supply circuit unit. In this case, after determining that the HDMI cable is a compatible cable and before changing the state of the switch SW21 to the open state, the control unit 111 changes the mode to the mode in which the current that can be supplied is equal to or higher than 55 mA.

In this way, in the transmission system 10-3 illustrated in FIG. 23, in a case of determining that the connected source device is a compatible source device that can sufficiently supply a current to its own active circuit, the HDMI cable 130-3 that is a compatible cable sets its own active circuit to be in an operation state. Therefore, the active circuit of the HDMI cable 130-3 can perform an appropriate operation. Furthermore, it is possible to avoid that the source device cannot withstand overcurrent and is broken.

Figure 27:
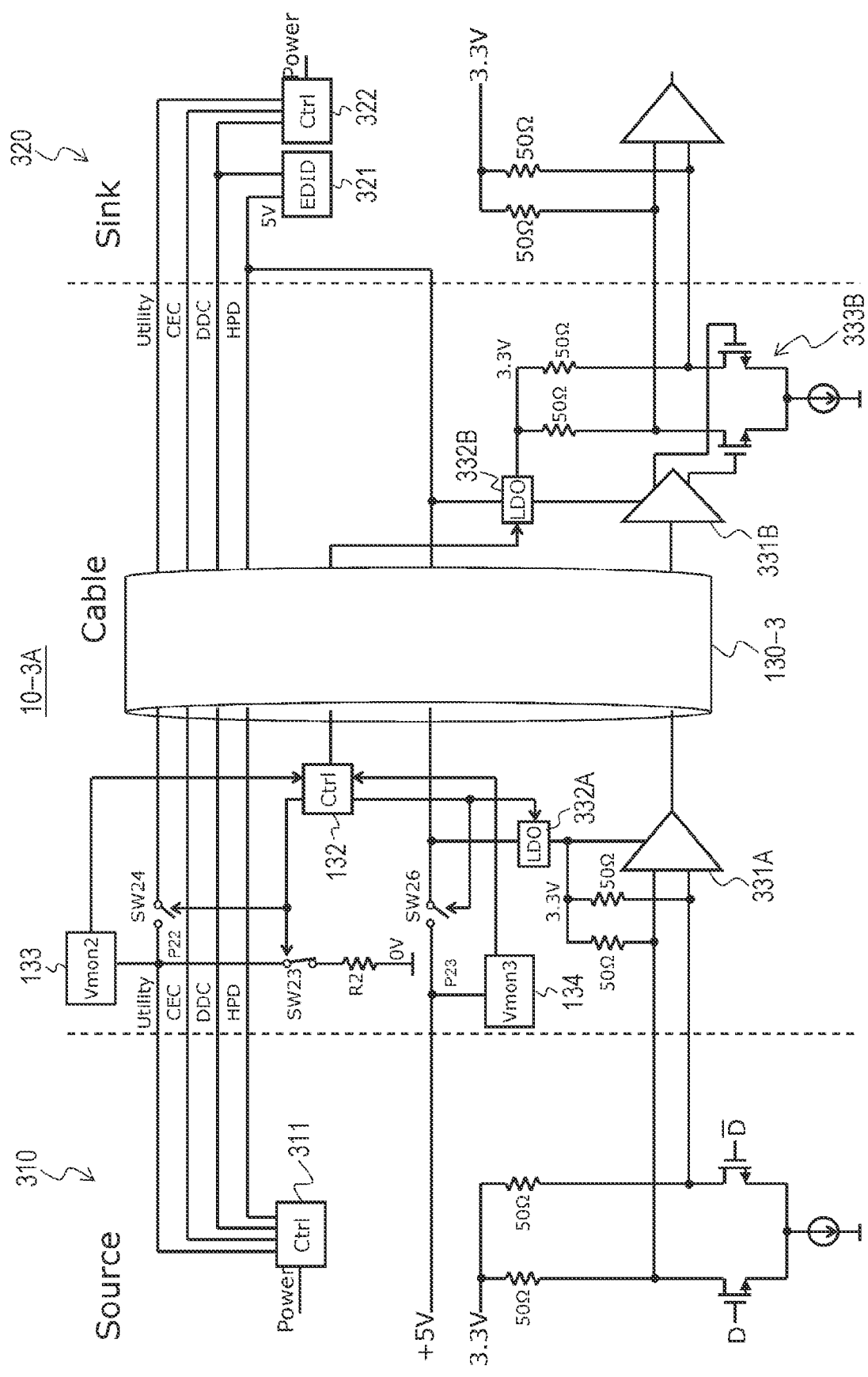
FIG. 27 is a diagram illustrating an exemplary configuration of a transmission system (using Utility line) including the non-compatible source device and the compatible HDMI cable (including current consumption unit).

FIG. 27 illustrates an exemplary configuration of a transmission system 10-3A. The transmission system 10-3A is an HDMI transmission system using an HDMI as a digital interface. The transmission system 10-3A includes the source device 310 as a transmission device, the sink device 320 as a reception device, and the HDMI cable 130-3 that connects these devices. In FIG. 27, a part corresponding to that in FIGS. 4 and 23 is denoted with the same reference numeral, and the detailed description thereof is appropriately omitted.

In the transmission system 10-3A, the source device 310 is a non-compatible source device such as a legacy, and the HDMI cable 130-3 is a compatible cable. In this case, the source device 310 performs a normal operation (refer to FIGS. 6A and 6B).

Furthermore, the HDMI cable 130-3 determines that the source device is a non-compatible source device and operates in the non-compatible mode. In this case, in the initial state, the voltage at the point P22 of the Utility line is 0 V. The voltage monitoring unit 133 of the HDMI cable 130-3 monitors that the voltage at the point P22 is 0 V and sends the monitoring result to the control unit 132. The control unit 132 determines that the source device is a non-compatible source device on the basis of the monitoring result and controls the source device to operate in a non-compatible mode.

In this case, the control unit 132 changes the state of each switch and shifts to the normal operation. In this case, not to affect the sink device 320, first, the switch SW23 is opened, next, the switch SW24 is short-circuited, and finally, the switch SW26 is short-circuited. Furthermore, in this case, the control unit 132 maintains the LDO regulators 332A and 332B to be turned off and maintains the conversion circuits 331A and 331B that are active circuits to be in non-operation states (Disable). With this operation, the HDMI cable 130-3 does not draw the current equal to or higher than 55 mA from the source device 310, and it is possible to avoid that the source device 310 cannot withstand overcurrent and is broken.

Figure 28:
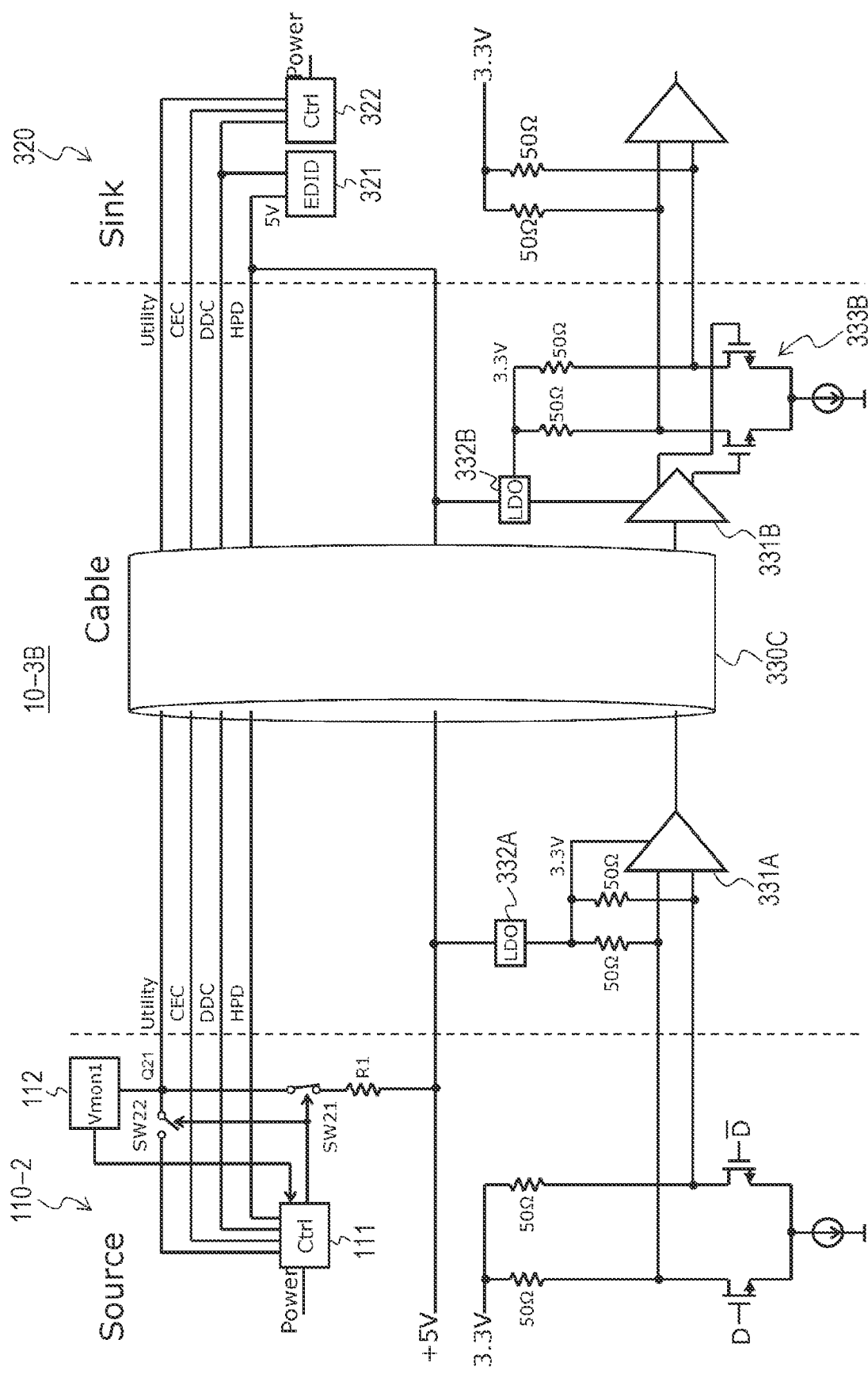
FIG. 28 is a diagram illustrating an exemplary configuration of a transmission system (using Utility line) including the compatible source device and the non-compatible HDMI cable.

FIG. 28 illustrates an exemplary configuration of a transmission system 10-3B. The transmission system 10-3B is an HDMI transmission system using an HDMI as a digital interface. The transmission system 10-3B includes the source device 110-3 as a transmission device, the sink device 320 as a reception device, and an HDMI cable 330C that connects these devices. In FIG. 28, a part corresponding to that in FIGS. 4 and 23 is denoted with the same reference numeral, and the detailed description thereof is appropriately omitted.

In the transmission system 10-3B, the source device 110-3 is a compatible source device, and the HDMI cable 330C is a non-compatible cable such as a legacy. In this case, the HDMI cable 330C performs a normal operation (refer to FIGS. 6A and 6B).

The source device 110-3 determines that the HDMI cable is a non-compatible cable and operates in the non-compatible mode. In this case, in the initial state, the voltage at the point Q21 of the Utility line is 5 V. The voltage monitoring unit 112 of the source device 110-3 monitors that the voltage at the point Q21 is 5 V and sends the monitoring result to the control unit 111. The control unit 111 determines that the HDMI cable is a non-compatible cable on the basis of the monitoring result and the fact that the HPD line is at a high level (5 V) and performs control to operate in the non-compatible mode.

In this case, the control unit 111 changes the state of each switch and shifts to the normal operation. In this case, not to affect the inside of the source device 110-3, first, the switch SW21 is opened, and next, the switch SW22 is short-circuited.

Figure 29:
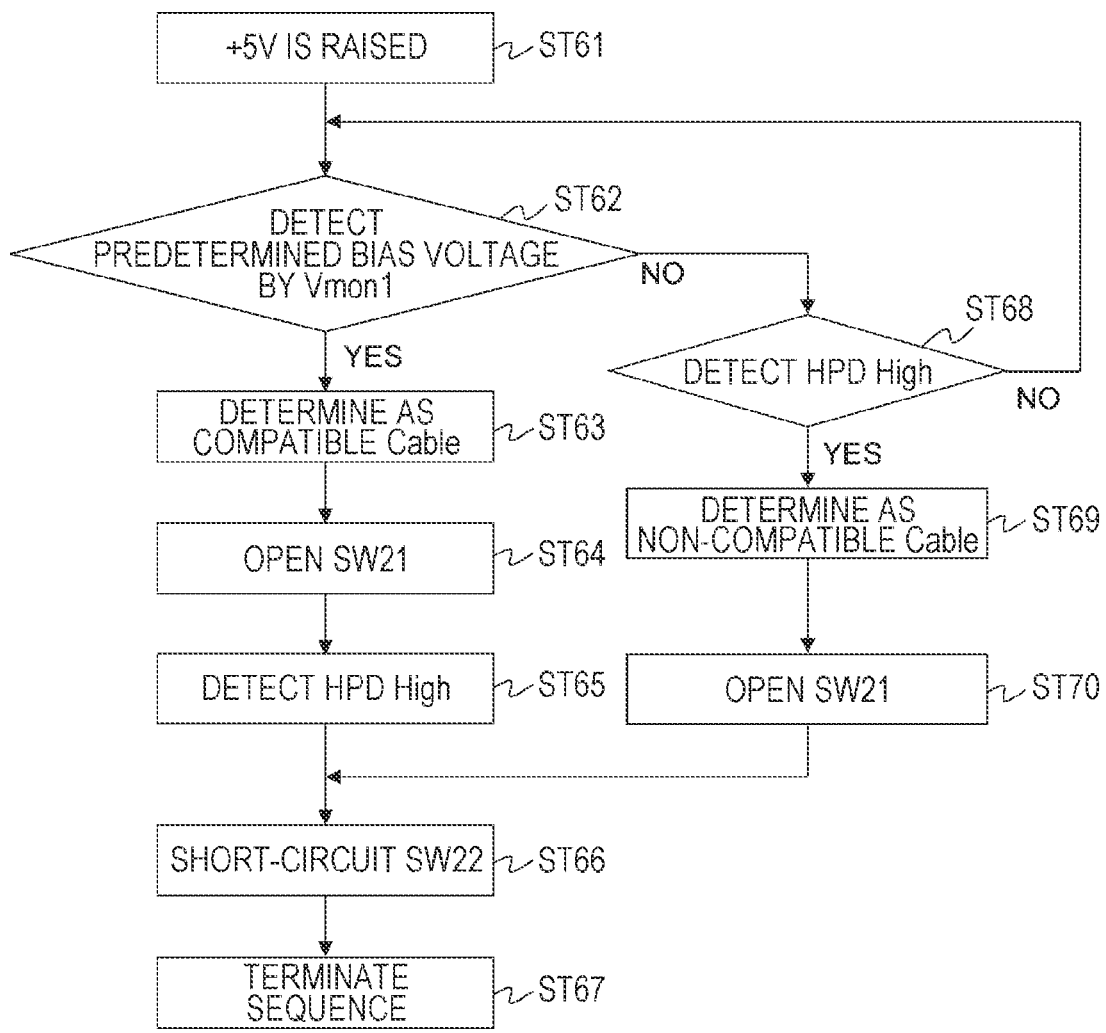
FIG. 29 is a diagram illustrating an example of a sequence of the compatible source device included in the transmission system in FIG. 23.

FIG. 29 illustrates an example of a sequence of the source device 110-3 that is a compatible source device. In step ST61, for example, when a power switch is turned on and +5 V is raised, the sequence is started, and the procedure proceeds to step ST62. In step ST62, the control unit 111 determines whether a predetermined bias voltage (4 V) is detected by the voltage monitoring unit 112.

When the predetermined bias voltage (4 V) is detected, the control unit 111 determines in step ST63 that the HDMI cable is a compatible cable. Then, in step ST64, the control unit 111 changes the state of the switch SW21 from the short-circuit state to the open state. Thereafter, when the control unit 111 detects in step ST65 that the HPD line becomes a high level (5 V), the control unit 111 changes the state of the switch SW22 from the open state to the short-circuit state in step ST66. Then, in step ST67, the sequence is terminated.

Furthermore, when the predetermined bias voltage (4 V) is not detected in step ST62, the control unit 111 determines in step ST68 whether or not the high level (5 V) of the HPD line is detected. When the high level (5 V) of the HPD line is not detected, the procedure returns to step ST62. Meanwhile, when the high level (5 V) of the HPD line is detected, the control unit 111 determines in step ST69 that the HDMI cable is a non-compatible cable.

Then, in step ST70, the state of the switch SW21 is changed from the short-circuit state to the open state. Next, in step ST66, the control unit 111 changes the state of the switch SW22 from the open state to the short-circuit state. Then, in step ST67, the sequence is terminated.

Figure 30:
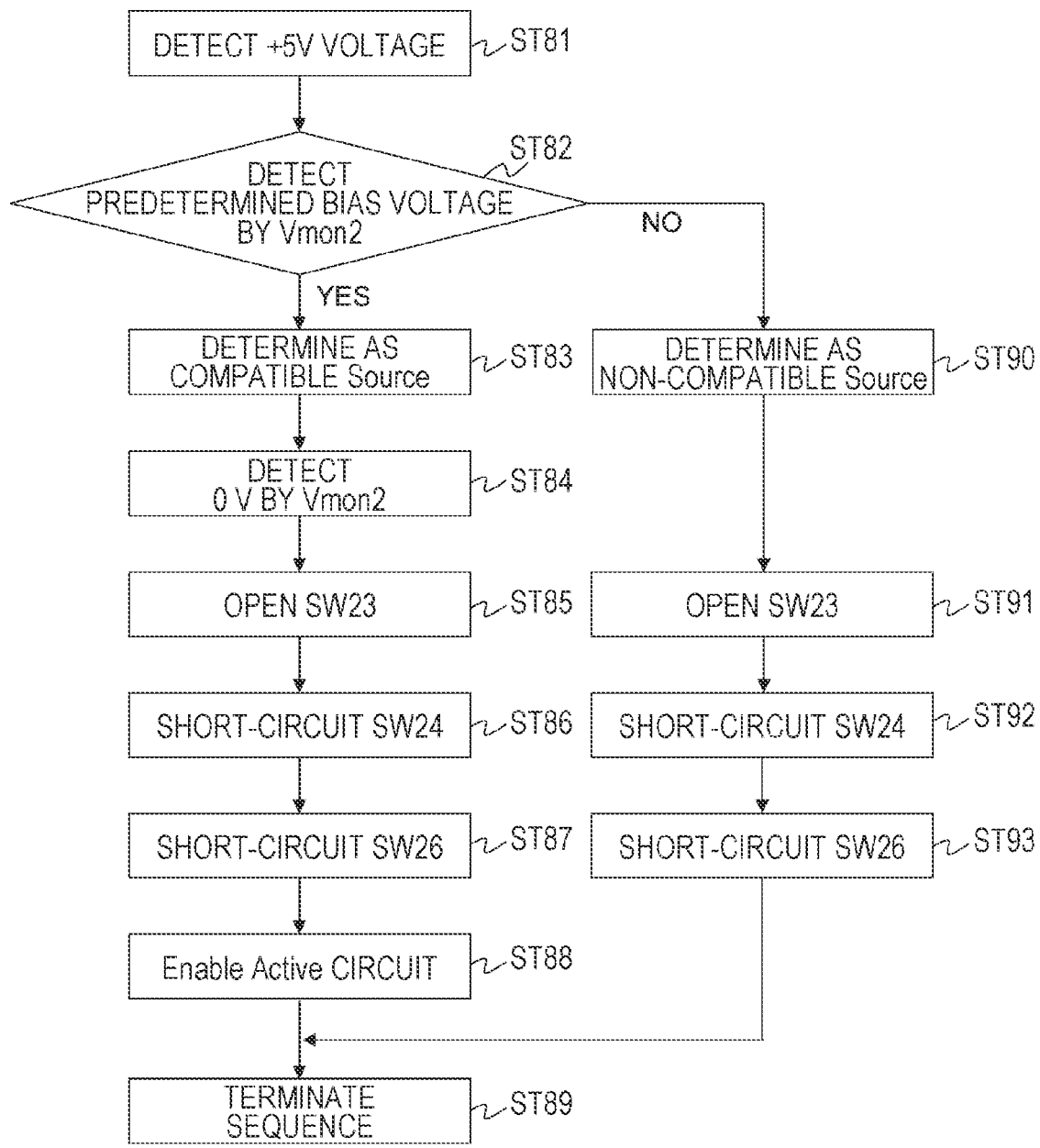
FIG. 30 is a diagram illustrating an example of a sequence of the compatible HDMI cable included in the transmission system in FIG. 23.

FIG. 30 illustrates an example of a sequence of the HDMI cable 130-3 that is a compatible cable. When a voltage of 5 V is detected by the voltage monitoring unit 134 in step ST81, the sequence is started, and the procedure proceeds to step ST82. In step ST82, the control unit 132 determines whether a predetermined bias voltage (4 V) is detected by the voltage monitoring unit 133.

When the predetermined bias voltage (4 V) is detected, the control unit 132 determines in step ST83 that the source device is a compatible source device. Then, when the voltage monitoring unit 133 detects 0 V in step ST84, the control unit 132 changes the state of the switch SW23 from the short-circuit state to the open state in step ST85. In this case, by detecting 0 V by the voltage monitoring unit 133, it is confirmed that the source device determines that its own cable is a compatible cable.

Next, in step ST86, the control unit 132 changes the state of the switch SW24 from the open state to the short-circuit state. Next, in step ST87, the control unit 132 changes the state of the switch SW26 from the open state to the short-circuit state. Then, in step ST88, the LDO regulators 332A and 332B are turned on, and the active circuit is set to be in the operation state (Enable). Thereafter, the sequence is terminated in step ST89.

Furthermore, when the predetermined bias voltage (4 V) is not detected in step ST82, the control unit 132 determines in step ST90 that the source device is a non-compatible source device. Then, in step ST91, the control unit 132 changes the state of the switch SW23 from the short-circuit state to the open state.

Next, in step ST92, the control unit 132 changes the state of the switch SW24 from the open state to the short-circuit state. Next, in step ST93, the control unit 132 changes the state of the switch SW26 from the open state to the short-circuit state. Then, in step ST89, the sequence is terminated.

Note that the switches SW21 and SW22 of the source device 110-3 and the switches SW23, SW24, and SW26 of the HDMI cable 130-3 are reset to the initial states when the voltage of the +5 V power line drops.

In the above, the HDMI cable 130-3 that is a compatible cable controls on/off the LDO regulators 332A and 332B according to whether the source device is a compatible device or a non-compatible device. However, in this case, in a case where the source device is a non-compatible device, the LDO regulators 332A and 332B are turned off, and the active circuit is in a non-operation state. Therefore, data cannot be transmitted.

Therefore, in a case where the source device is a non-compatible source device, the HDMI cable 130-3 may not turn off the LDO regulators 332A and 332B but guarantee the current drawn from the source device to be equal to or lower than 55 mA by decreasing a data rate. With this operation, even if the source device is a non-compatible source device, data can be transmitted.

Fourth Embodiment

Figure 31:
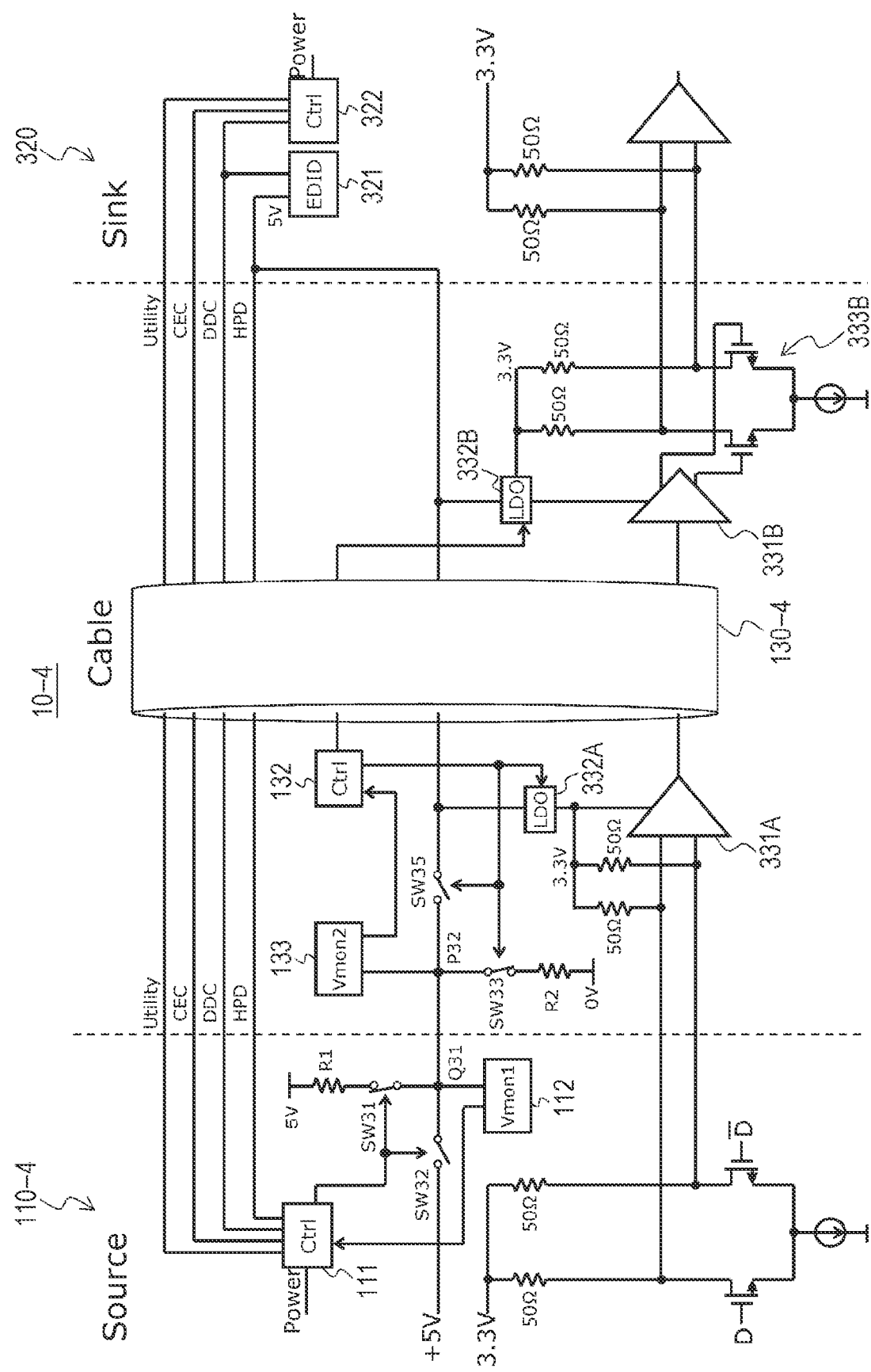
FIG. 31 is a diagram illustrating an exemplary configuration of a transmission system (using +5 V power line) including the compatible source device and the compatible HDMI cable (including current consumption unit).

FIG. 31 illustrates an exemplary configuration of a transmission system 10-4. The transmission system 10-4 is an HDMI transmission system using an HDMI as a digital interface. The transmission system 10-4 includes a source device 110-4 as a transmission device, a sink device 320 as a reception device, and an HDMI cable 130-4 that connects these devices.

The transmission system 10-3 illustrated in FIG. 23 described above determines whether or not the source device and the HDMI cable are compatible devices by using the Utility line. However, the transmission system 10-4 makes determination by using a +5 V power line. In FIG. 31, a part corresponding to that in FIGS. 4 and 23 is denoted with the same reference numeral, and the detailed description thereof is appropriately omitted.

The HDMI cable 130-4 includes a control unit 132, a voltage monitoring unit 133, switches SW33 and SW35, and a voltage dividing resistor R2 in addition to AOC configuration circuits including conversion circuits 331A and 331B, LDO regulators 332A and 332B, a current driving unit 333B, and the like.

A series circuit including the resistor R2 and the switch SW33 is connected between a point P32 of the +5 V power line and the ground. With this structure, 0 V that is a ground voltage is applied to the point P32 of the +5 V power line via the series circuit including the resistor R2 and the switch SW33. The switch SW35 is inserted at a point closer to the sink device 320 than the point P32 of the +5 V power line. The voltage monitoring unit 133 monitors a voltage at the point P32 of the +5 V power line and sends the monitoring result to the control unit 132. The control unit 132 controls an operation of each unit of the HDMI cable 130-4.

The source device 110-4 is a compatible source device. The source device 110-4 includes a voltage monitoring unit 112, switches SW31 and SW32, and a voltage dividing resistor R1 in addition to a control unit 111 that controls an operation of each unit. It is desirable that the resistor R2 of the HDMI cable 130-4 described above and the resistor R1 of the source device 110-4 be each a large value to some extent so as to reduce current consumption. Hereinafter, the description will be made while assuming R1=100 kΩ and R2=400 kΩ are satisfied.

A voltage of 5 V is applied to a point Q31 of the +5 V power line via the series circuit including the resistor R1 and the switch SW31. The switch SW32 is inserted on a side opposite to the terminal side of the point Q31 of the +5 V power line. The voltage monitoring unit 112 monitors a voltage at the point Q31 of the +5 V power line and sends the monitoring result to the control unit 111.

In the transmission system 10-4 illustrated in FIG. 31, the HDMI cable 130-4 is a compatible cable, and the source device 110-4 is a compatible source device. Therefore, the source device 110-4 determines that the connected HDMI cable is a compatible cable and operates in the compatible mode. Similarly, the HDMI cable 130-4 determines that the connected source device is a compatible source device and operates in the compatible mode.

Operations of the source device 110-4 and the HDMI cable 130-4 will be described in detail. In FIG. 31, initial states of the source device 110-4 and the HDMI cable 130-4 are illustrated. In the initial state of the source device 110-4, the switch SW31 is in a short-circuit state, and the switch SW32 is in an open state. Meanwhile, in the initial state of the HDMI cable 130-4, the switch SW33 is in a short-circuit state, and the switch SW35 is in an open state.

Since the switches SW31 and SW33 are in the short-circuit state in the initial state, the resistors R1 and R2 are connected in series, and a voltage of 4 V is obtained at each of the points Q31 and P32 of the +5 V power line sandwiched between the switches SW32 and SW35 by resistance voltage division.

The voltage monitoring unit 112 of the source device 110-4 monitors that the voltage at the point Q31 is 4 V and sends the monitoring result to the control unit 111. The control unit 111 determines that the connected HDMI cable is the compatible cable on the basis of the monitoring result and controls the HDMI cable to operate in the compatible mode.

Similarly, the voltage monitoring unit 133 of the HDMI cable 130-4 monitors that the voltage at the point P32 is 4 V and sends the monitoring result to the control unit 132. The control unit 132 determines that the connected source device is the compatible source device on the basis of the monitoring result and controls the source device to operate in the compatible mode.

Figure 32:
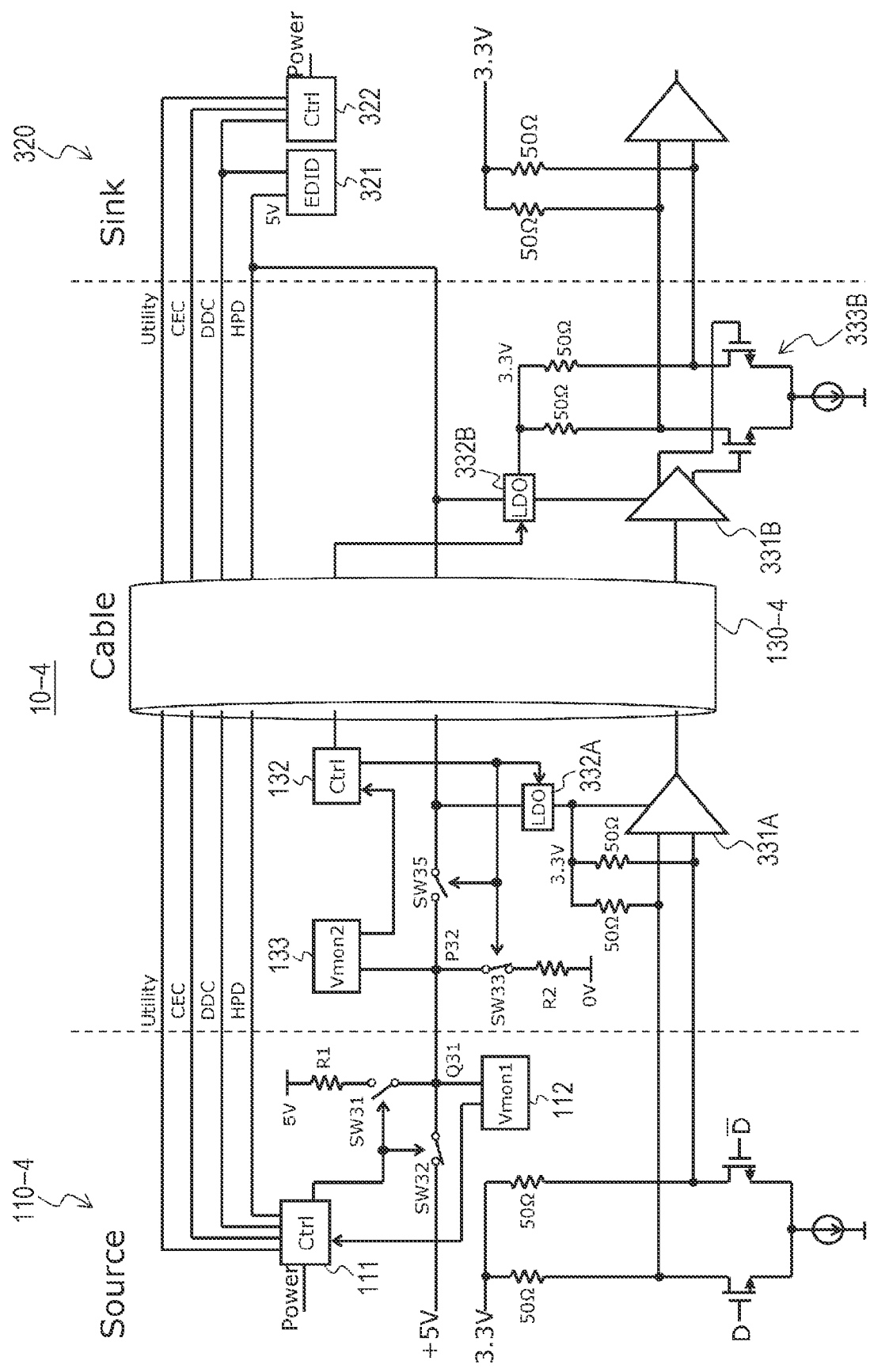
FIG. 32 is a diagram for explaining an operation of the transmission system in FIG. 31.

The source device 110-4 is controlled to operate in the compatible mode. As illustrated in FIG. 32, the control unit 111 short-circuits the switch SW32 and opens the switch SW31. Therefore, the voltage at the point P32 of the +5 V power line is 5 V. In the HDMI cable 130-4, the voltage monitoring unit 133 monitors that the voltage at the point P32 is 5 V and sends the monitoring result to the control unit 132. By monitoring that the voltage at the point P32 is 5 V in this way, it is confirmed that the source device determines that its own cable is a compatible cable.

Figure 33:
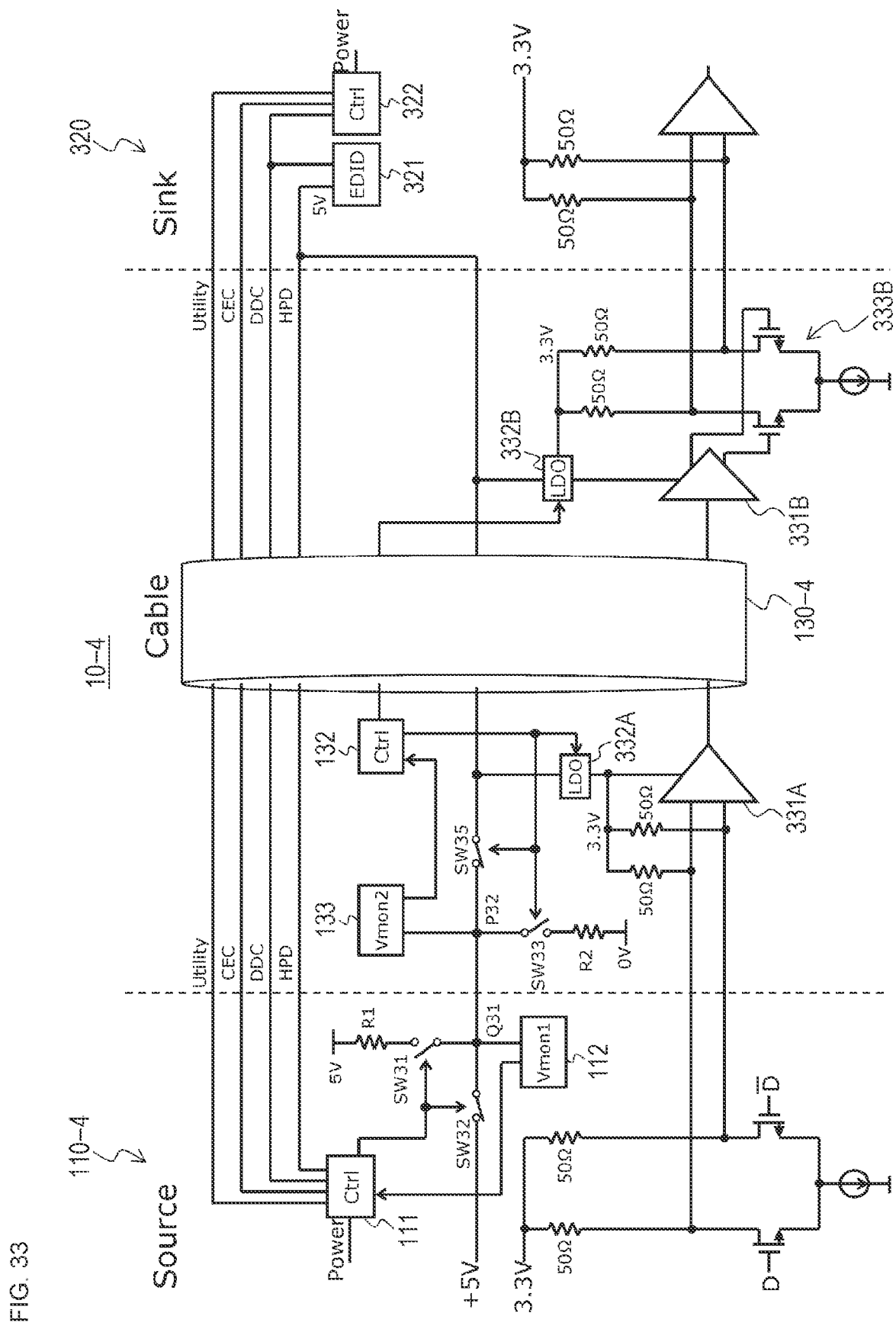
FIG. 33 is a diagram for explaining the operation of the transmission system in FIG. 31.

The control unit 132 changes the state of each switch on the basis of the monitoring result as illustrated in FIG. 33 and shifts to a normal operation. In this case, not to affect the source device 110-4 and the sink device 320, first, the switch SW33 is opened, and next, the switch SW35 is short-circuited. Thereafter, the control unit 132 turns on the LDO regulators 332A and 332B and applies 3.3 V of electric power to the conversion circuits 331A and 331B that are active circuits so as to set the conversion circuits 331A and 331B to be in an operation state (Enable).

By short-circuiting the switch SW35, a 5 V voltage is sent from the source device 110-3 to the sink device 320 through the +5 V power line, and accordingly, a 5 V voltage (connection detection signal) is sent from the sink device 320 to the source device 110-1 via the HPD line. With this operation, the control unit 111 of the source device 110-4 recognizes that the preparation of the cable is completed and shifts to a normal operation.

Note that the compatible source device 110-4 may be configured so that a current that can be supplied by the +5 V power line is constantly equal to or higher than 55 mA and the current can be supplied to the active circuit of the HDMI cable 130-4 that is a compatible cable. However, the control unit 111 of the source device 110-4 may change a mode to a mode in which the current that can be supplied by the +5 V power line is set to be equal to or higher than 55 mA when determining that the connected HDMI cable is a compatible cable. By switching the current supply amount mode, the source device 110-4 can reduce electric power of a power supply circuit unit. In this case, after determining that the HDMI cable is a compatible cable and before opening the switch SW31, the control unit 111 changes the mode to the mode in which the current that can be supplied is equal to or higher than 55 mA.

In this way, in the transmission system 10-4 illustrated in FIG. 31, in a case of determining that the connected source device is a compatible source device that can sufficiently supply a current to its own active circuit, the HDMI cable 130-3 that is a compatible cable sets its own active circuit to be in an operation state. Therefore, the active circuit of the HDMI cable 130-4 can perform an appropriate operation. Furthermore, it is possible to avoid that the source device cannot withstand overcurrent and is broken.

Figure 34:
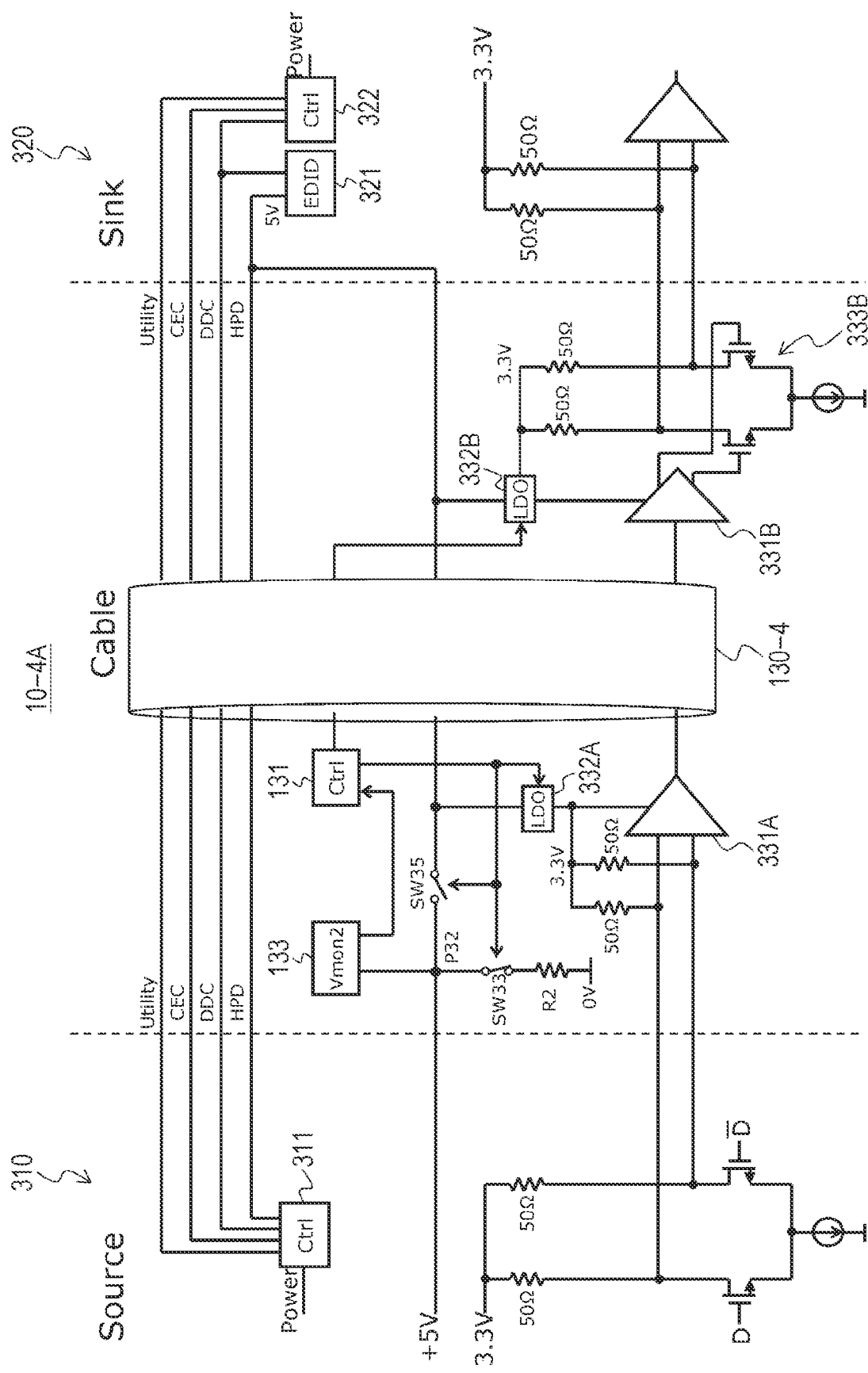
FIG. 34 is a diagram illustrating an exemplary configuration of a transmission system (using +5 V power line) including the non-compatible source device and the compatible HDMI cable (including current consumption unit).

FIG. 34 illustrates an exemplary configuration of a transmission system 10-4A. The transmission system 10-4A is an HDMI transmission system using an HDMI as a digital interface. The transmission system 10-4A includes the source device 310 as a transmission device, the sink device 320 as a reception device, and the HDMI cable 130-4 that connects these devices. In FIG. 34, a part corresponding to that in FIGS. 4 and 31 is denoted with the same reference numeral, and the detailed description thereof is appropriately omitted.

In the transmission system 10-4A, the source device 310 is a non-compatible source device such as a legacy, and the HDMI cable 130-4 is a compatible cable. In this case, the source device 310 performs a normal operation (refer to FIGS. 6A and 6B).

Furthermore, the HDMI cable 130-4 determines that the source device is a non-compatible source device and operates in the non-compatible mode. In this case, in the initial state, the voltage at the point P32 of the +5 V power line is 5 V. The voltage monitoring unit 133 of the HDMI cable 130-4 monitors that the voltage at the point P32 is 5 V and sends the monitoring result to the control unit 132. The control unit 132 determines that the source device is a non-compatible source device on the basis of the monitoring result and controls the source device to operate in a non-compatible mode.

In this case, the control unit 132 changes the state of each switch and shifts to the normal operation. In this case, not to affect the sink device 320, first, the switch SW33 is opened, and next, the switch SW35 is short-circuited. Furthermore, in this case, the control unit 132 maintains the LDO regulators 332A and 332B to be turned off and maintains the conversion circuits 331A and 331B that are active circuits to be in non-operation states (Disable). With this operation, the HDMI cable 130-4 does not draw the current equal to or higher than 55 mA from the source device 310, and it is possible to avoid that the source device 310 cannot withstand overcurrent and is broken.

Figure 35:
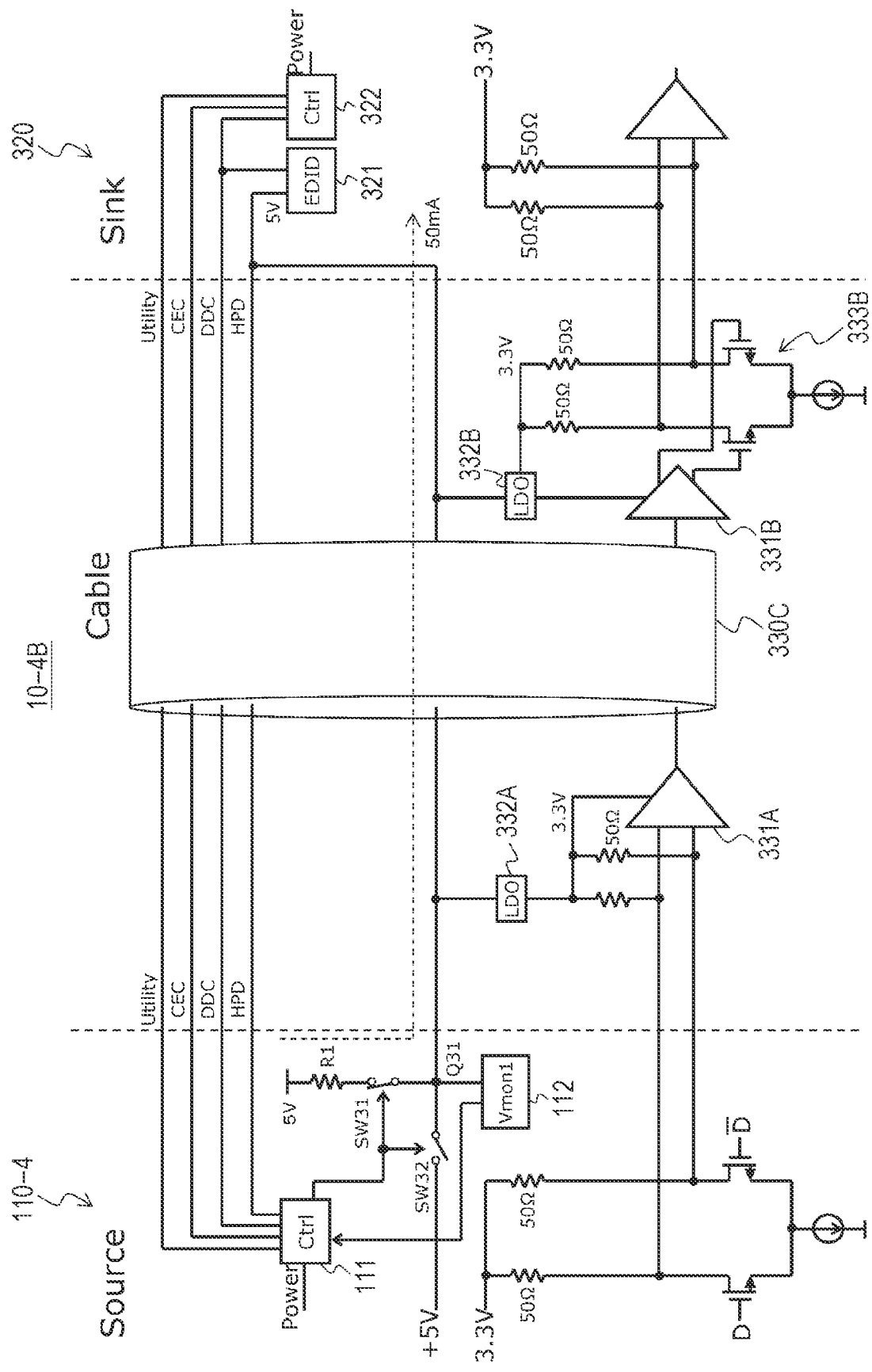
FIG. 35 is a diagram illustrating an exemplary configuration of a transmission system (using +5 V power line) including the compatible source device and the non-compatible HDMI cable.

FIG. 35 illustrates an exemplary configuration of a transmission system 10-3B. The transmission system 10-4B is an HDMI transmission system using an HDMI as a digital interface. The transmission system 10-4B includes the source device 110-4 as a transmission device, the sink device 320 as a reception device, and an HDMI cable 330C that connects these devices. In FIG. 35, a part corresponding to that in FIGS. 4 and 31 is denoted with the same reference numeral, and the detailed description thereof is appropriately omitted.

In the transmission system 10-4B, the source device 110-4 is a compatible source device, and the HDMI cable 330C is a non-compatible cable such as a legacy. In this case, the HDMI cable 330C performs a normal operation (refer to FIGS. 6A and 6B).

The source device 110-4 determines that the HDMI cable is a non-compatible cable and operates in the non-compatible mode. In this case, in the initial state, the voltage at the point Q31 of the +5 V power line is 5 V. The voltage monitoring unit 112 of the source device 110-4 monitors that the voltage at the point Q31 is 5 V and sends the monitoring result to the control unit 111. The control unit 111 determines that the HDMI cable is a non-compatible cable on the basis of the monitoring result and the fact that the HPD line is at a high level (5 V) and performs control to operate in the non-compatible mode. In this case, the control unit 111 short-circuits the switch SW32 and opens the switch SW31 and shifts to a normal operation.

Here, there is a possibility that the sink device 320 starts to draw 50 mA when detecting 5 V. If 50 mA is drawn via a 100 kΩ resistor R1 in an initial state in FIG. 35, it is expected that the voltage of the +5 V power line on the side of the sink device 320 from the switch SW32 is significantly lowered from 5 V and greatly deviates from a specified specification range.

Figure 36:
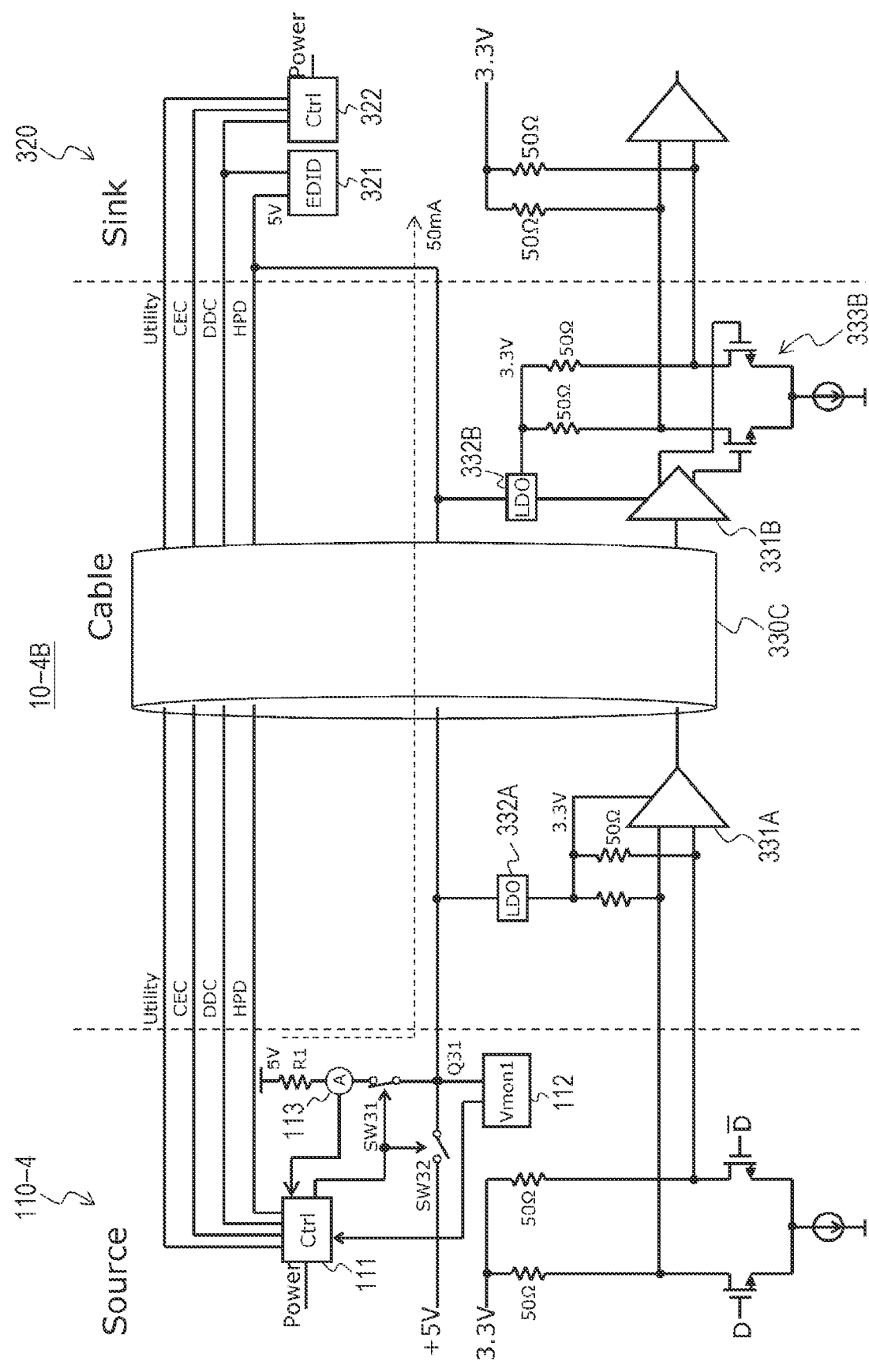
FIG. 36 is a diagram illustrating an exemplary configuration that avoids an inconvenience of the transmission system in FIG. 35.

As a method for avoiding this, as illustrated in FIG. 36, an ammeter 113 is disposed, for example, between the resistor R1 and the switch SW31. Then, when a current in a direction in which an amount of a flowing current I(=5 V/(R1+R2)=5 V/500 KΩ=10 μA) increases in a case where both of the source device and the HDMI cable in FIG. 31 are compatible devices is detected, it is only required that the switches SW31 and SW32 be immediately switched and the current of 50 mA be transmitted from the source of the +5 V power line of the source device 110-4 to the sink device 320.

Figure 37:
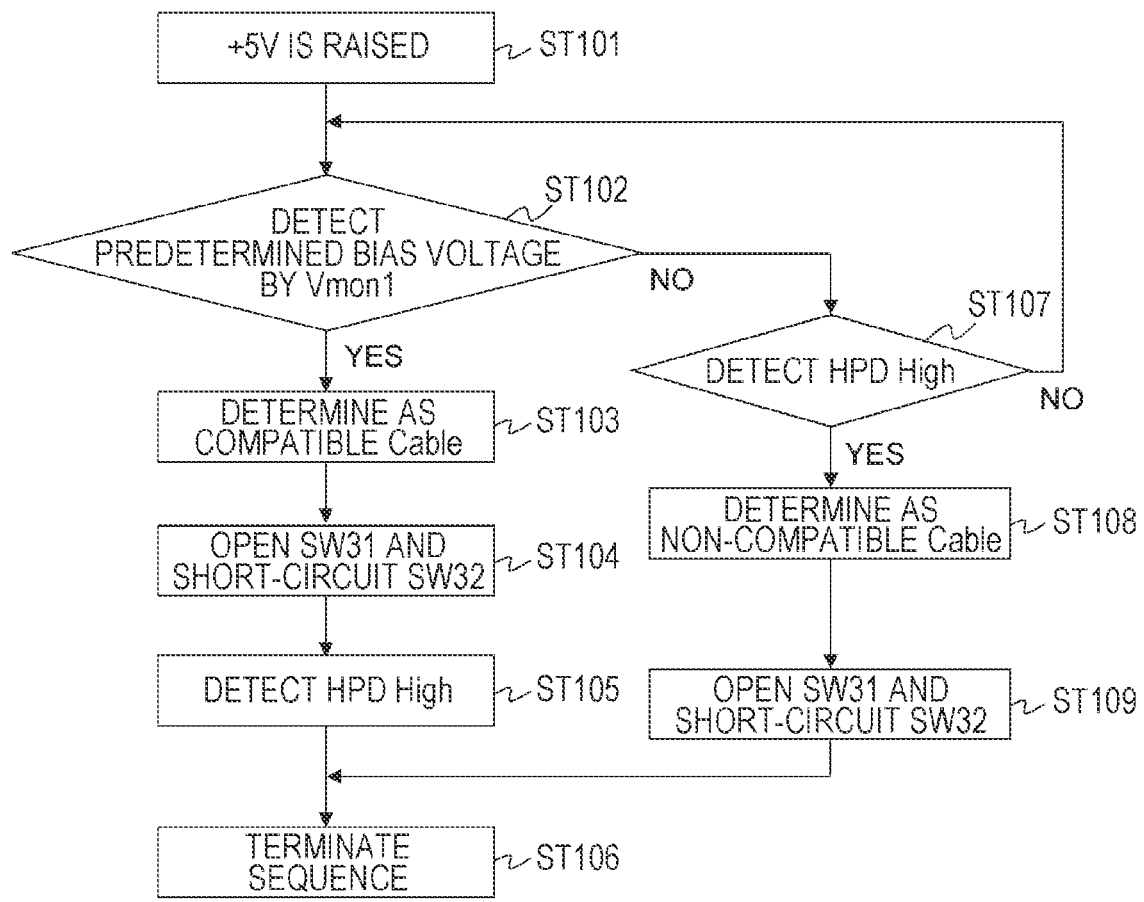
FIG. 37 is a diagram illustrating an example of a sequence of the compatible source device included in the transmission system in FIG. 31.

FIG. 37 illustrates an example of a sequence of the source device 110-4 that is a compatible source device. In step ST101, for example, when a power switch is turned on and +5 V is raised, the sequence is started, and the procedure proceeds to step ST102. In step ST102, the control unit 111 determines whether a predetermined bias voltage (4 V) is detected by the voltage monitoring unit 112.

When the predetermined bias voltage (4 V) is detected, the control unit 111 determines in step ST103 that the HDMI cable is a compatible cable. Then, in step ST104, the control unit 111 changes the state of the switch SW32 from the open state to the short-circuit state and changes the state of the switch SW31 from the short-circuit state to the open state. Then, in step ST105, when the control unit 111 detects that the HPD line becomes a high level (5 V), the sequence is terminated in step ST106.

Furthermore, when the predetermined bias voltage (4 V) is not detected in step ST102, the control unit 111 determines in step ST107 whether or not the high level (5 V) of the HPD line is detected. When the high level (5 V) of the HPD line is not detected, the procedure returns to step ST102. Meanwhile, when the high level (5 V) of the HPD line is detected, the control unit 111 determines in step ST108 that the HDMI cable is a non-compatible cable.

Then, in step ST109, the control unit 111 changes the state of the switch SW32 from the open state to the short-circuit state and changes the state of the switch SW31 from the short-circuit state to the open state. Then, in step ST106, the sequence is terminated.

Figure 38:
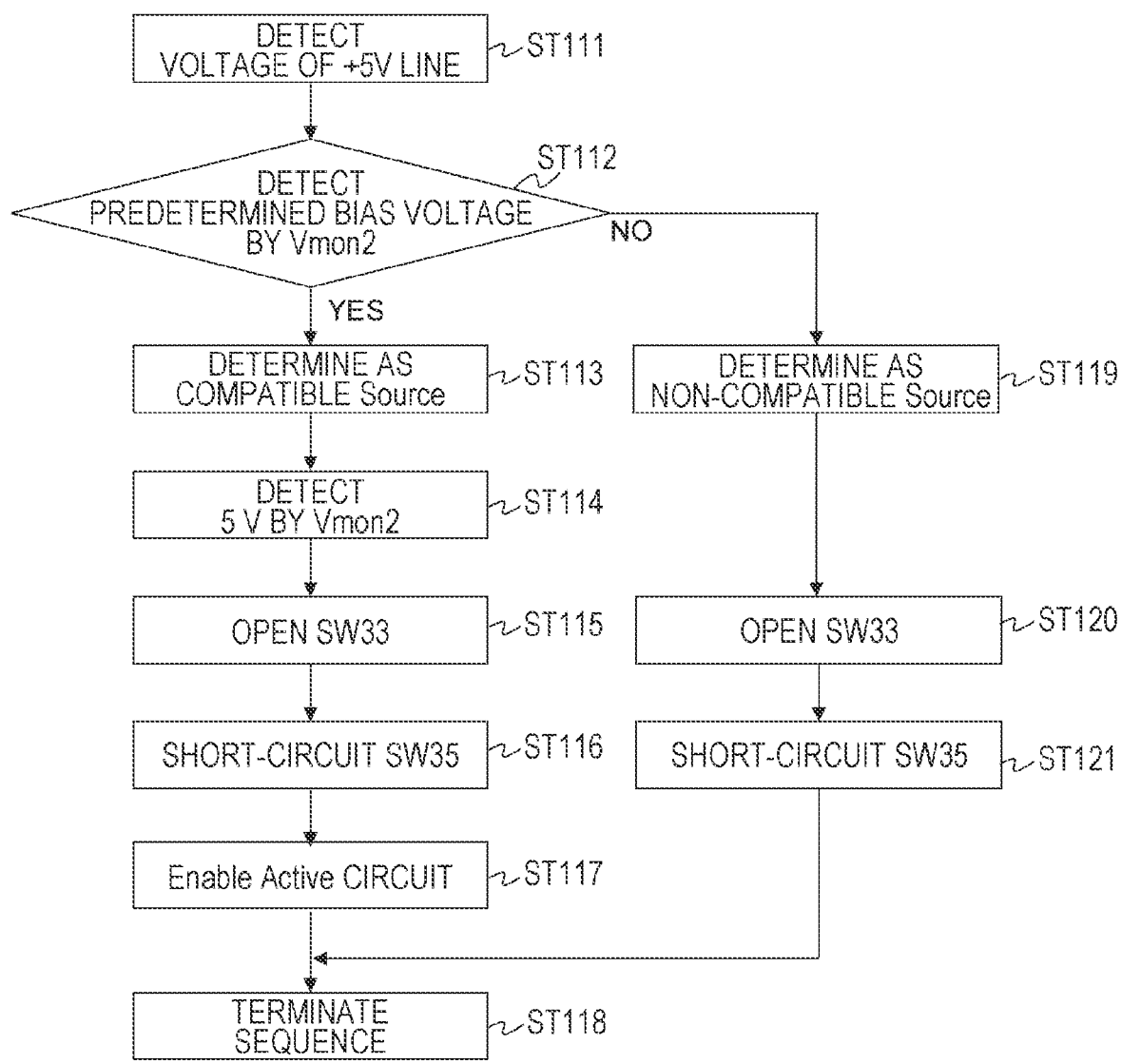
FIG. 38 is a diagram illustrating an example of a sequence of the compatible HDMI cable included in the transmission system in FIG. 15.

FIG. 38 illustrates an example of a sequence of the HDMI cable 130-4 that is a compatible cable. When the voltage monitoring unit 133 detects, in step ST111, a voltage of 5 V or 4 V in the +5 V power line, the sequence is started, and the procedure proceeds to step ST112. In step ST112, the control unit 132 determines whether a predetermined bias voltage (4 V) is detected by the voltage monitoring unit 133.

When the predetermined bias voltage (4 V) is detected, the control unit 132 determines in step ST113 that the source device is a compatible source device. Then, when the voltage monitoring unit 133 detects 5 V in step ST114, the control unit 132 changes the state of the switch SW33 from the short-circuit state to the open state in step ST115. In this case, by detecting 5 V by the voltage monitoring unit 133, it is confirmed that the source device determines that its own cable is a compatible cable.

Next, in step ST116, the control unit 132 changes the state of the switch SW35 from the open state to the short-circuit state. Then, in step ST117, the LDO regulators 332A and 332B are turned on, and the active circuit is set to be in the operation state (Enable). Thereafter, the sequence is terminated in step ST118.

Furthermore, when the predetermined bias voltage (4 V) is not detected in step ST112, the control unit 132 determines in step ST119 that the source device is a non-compatible source device. Next, in step ST120, the control unit 132 changes the state of the switch SW33 from the short-circuit state to the open state. Then, the control unit 132 changes the open state of the switch SW35 to the short-circuit state in step ST121, and the sequence is terminated in step ST118.

Note that the switches SW31 and SW32 of the source device 110-4 and the switches SW33 and SW35 of the HDMI cable 130-4 are reset to the initial states when the voltage of the +5 V power line drops.

Note that, in the above, the HDMI cable 130-4 that is a compatible cable controls on/off the LDO regulators 332A and 332B according to whether the source device is a compatible device or a non-compatible device. However, in this case, in a case where the source device is a non-compatible device, the LDO regulators 332A and 332B are turned off, and the active circuit is in a non-operation state. Therefore, data cannot be transmitted.

Therefore, in a case where the source device is a non-compatible source device, the HDMI cable 130-4 may not turn off the LDO regulators 332A and 332B but guarantee the current drawn from the source device to be equal to or lower than 55 mA by decreasing a data rate. With this operation, even if the source device is a non-compatible source device, data can be transmitted.

Fifth Embodiment

Figure 39:
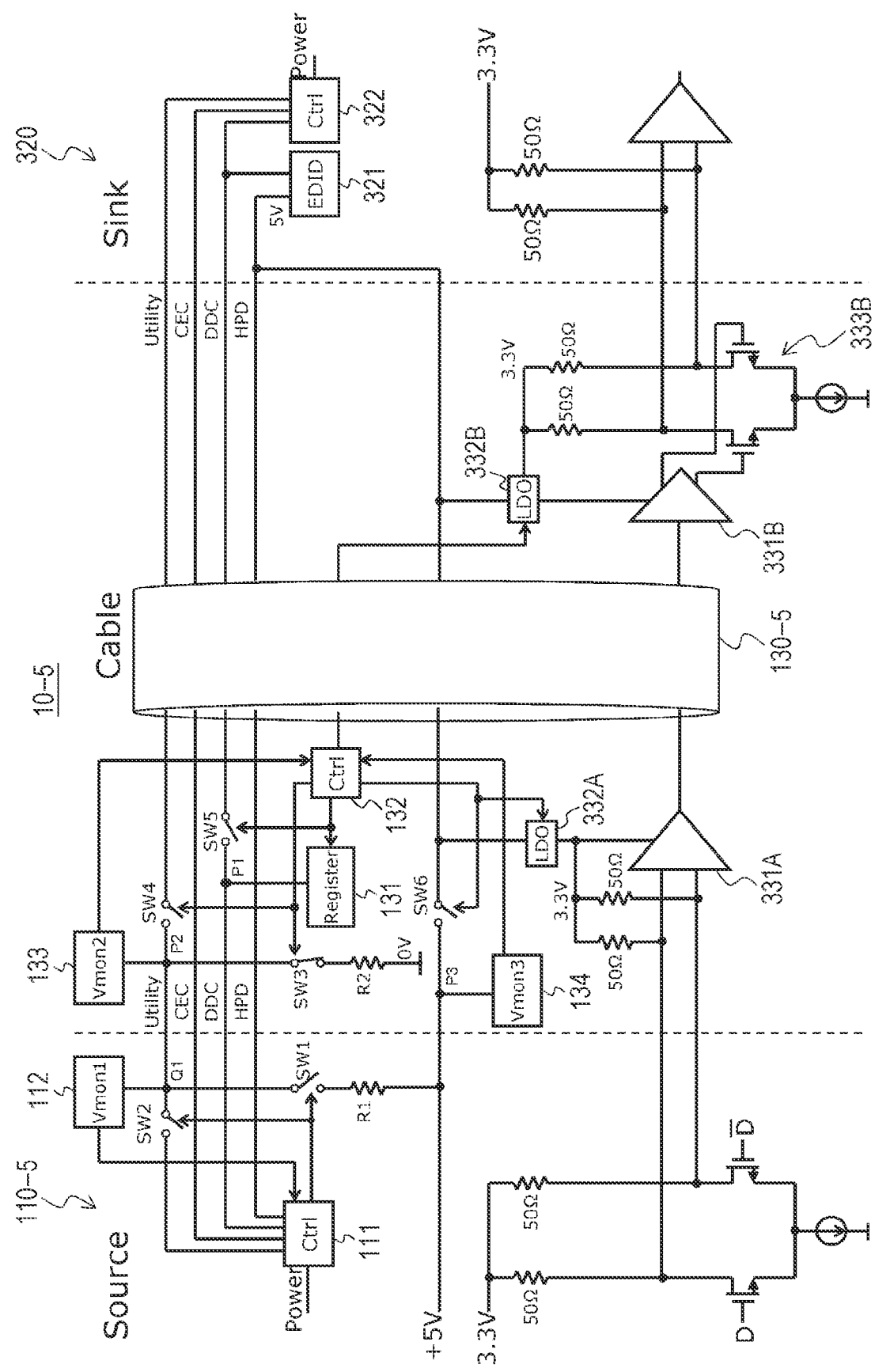
FIG. 39 is a diagram illustrating an exemplary configuration of a transmission system (using Utility line) including the compatible source device and a compatible HDMI cable (including register and current consumption unit).

FIG. 39 illustrates an exemplary configuration of a transmission system 10-5. The transmission system 10-5 is an HDMI transmission system using an HDMI as a digital interface. The transmission system 10-5 includes a source device 110-5 as a transmission device, a sink device 320 as a reception device, and an HDMI cable 130-5 that connects these devices.

The HDMI cable 130-3 in the transmission system 10-3 in FIG. 23 described above does not have a register. However, the HDMI cable 130-5 in the transmission system 10-5 includes a register 131 similar to that of the HDMI cable 130-1 in the transmission system 10-1 in FIG. 7 described above. In FIG. 39, a part corresponding to that in FIGS. 7 and 23 is denoted with the same reference numeral, and the detailed description thereof is appropriately omitted.

The HDMI cable 130-5 is a compatible cable. The HDMI cable 130-5 includes a control unit 132, voltage monitoring units 133 and 134, switches SW3, SW4, and SW5, and a voltage dividing resistor R2 in addition to AOC configuration circuits including conversion circuits 331A and 331B, LDO regulators 332A and 332B, a current driving unit 333B, and the like.

The source device 110-5 is a compatible source device. The source device 110-5 includes a voltage monitoring unit 112, switches SW1 and SW2, and a voltage dividing resistor R1 in addition to a control unit 111 that controls an operation of each unit. It is desirable that the resistor R2 of the HDMI cable 130-5 described above and the resistor R1 of the source device 110-5 be each a large value to some extent so as to reduce current consumption. Hereinafter, the description will be made while assuming R1=100 kΩ and R2=400 kΩ are satisfied.

In the transmission system 10-5 illustrated in FIG. 39, the HDMI cable 130-5 is a compatible cable, and the source device 110-5 is a compatible source device. Therefore, the source device 110-5 determines that the connected HDMI cable is a compatible cable and operates in the compatible mode. Similarly, the HDMI cable 130-5 determines that the connected source device is a compatible source device and operates in the compatible mode.

Operations of the source device 110-5 and the HDMI cable 130-5 will be described. Although detailed description is omitted, the source device 110-5 and the HDMI cable 130-5 operate similarly to the source device 110-1 and the HDMI cable 130-1 in the transmission system 10-1 in FIG. 7 described above. After the control unit 111 of the source device 110-5 accesses (read/write) the register 131 of the HDMI cable 130-5, the source device 110-5 and the HDMI cable 130-5 each shift to a normal operation.

At the time of the access to the register 131, the control unit 111 of the source device 110-5 can write to the register 131 that the control unit 111 can draw a current equal to or higher than 55 mA. After shifting to the normal operation, the control unit 132 of the HDMI cable 130-5 can turn on the LDO regulators 332A and 332B on the basis of information regarding the register 131 and draw the current equal to or higher than 55 mA from a +5 V power line. That is, in a case of the transmission system 10-5 in FIG. 39, the source device 110-5 can notify the HDMI cable 130-5 via the register 131 that the source device 110-5 can draw the current equal to or higher than 55 mA.

Note that, in the transmission system 10-5 illustrated in FIG. 39, it is determined whether or not the source device and the HDMI cable are compatible devices by using the Utility line. However, the transmission system that determines whether or not the source device and the HDMI cable are compatible devices by using the +5 V power line can be similarly configured (refer to FIGS. 15 and 31).

In the transmission system 10-5 illustrated in FIG. 39, the switch SW5 is in the open state until the access from the source device 110-5 to the register 131 of the HDMI cable 130-5 is terminated. Therefore, the access information of the register 131 is not transmitted to the sink device 320 through the DDC line, and it is possible to avoid the malfunction of the sink device 320 of which the address is not defined.

Furthermore, in the transmission system 10-5 illustrated in FIG. 39, the state of the switch SW5 is changed to the short-circuit state after the access from the source device 110-5 to the register 131 of the HDMI cable 130-5 is terminated, and thereafter, the state of the switch SW6 is changed to the short-circuit state. Therefore, it is possible to avoid preventing a communication signal from being transmitted from the source device 110-5 to the sink device 320 through the DDC line after the connection detection signal is transmitted from the sink device 320 to the source device 110-5.

Furthermore, in the transmission system 10-5 illustrated in FIG. 39, the control unit 132 of the HDMI cable 130-5 performs control for turning on the LDO regulators 332A and 332B and drawing the current equal to or higher than 55 mA from the +5 V power line on the basis of information given in notification from the source device 110-5 through the register 131 that the control unit 132 can draw the current equal to or higher than 55 mA. Therefore, the active circuit of the HDMI cable 130-5 can perform an appropriate operation. Furthermore, it is possible to avoid that the source device cannot withstand overcurrent and is broken.

Sixth Embodiment

Figure 40:
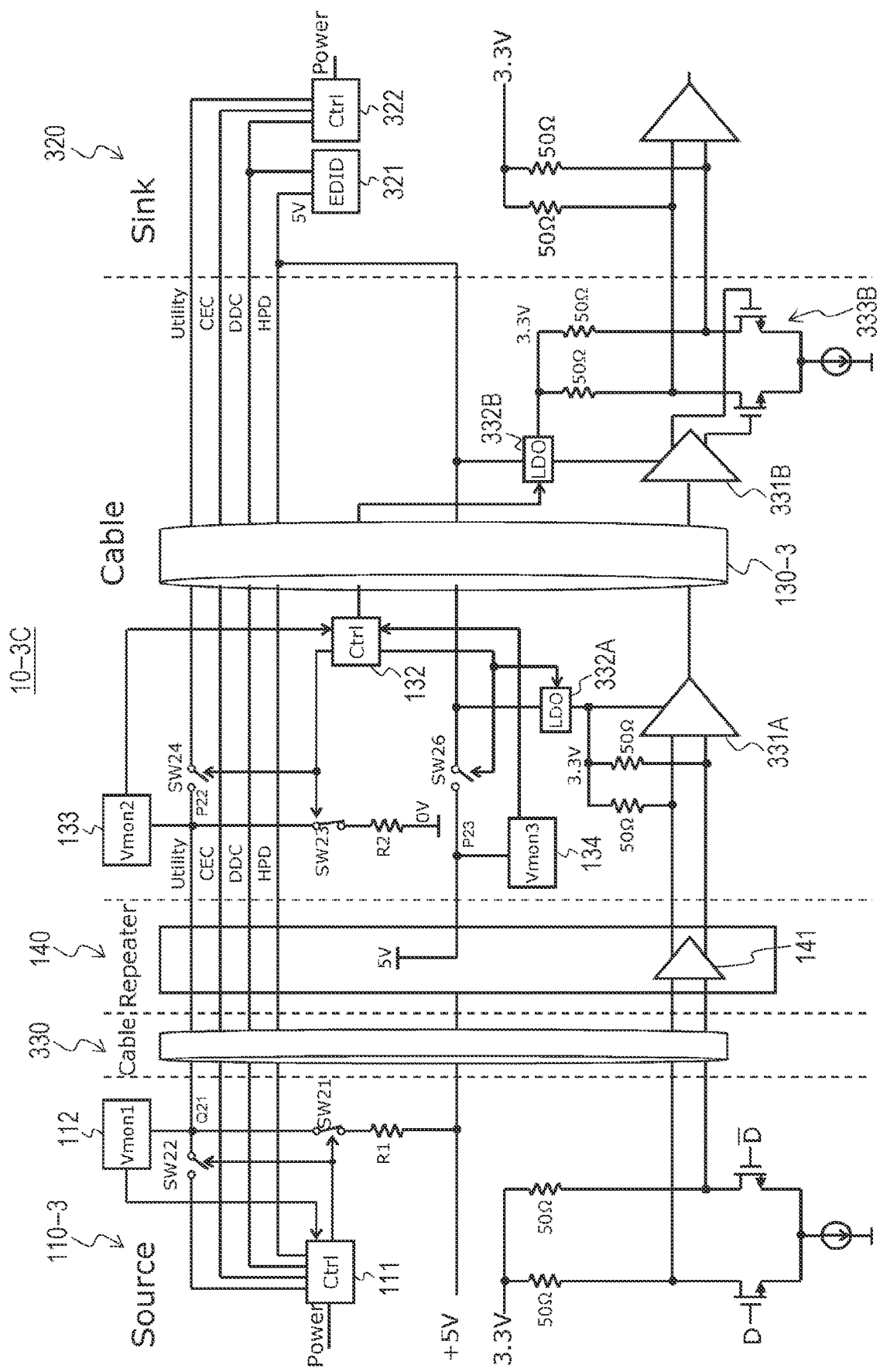
FIG. 40 is a diagram illustrating an exemplary configuration of a transmission system (intervening repeater) including the compatible source device and the compatible HDMI cable (including current consumption unit).

FIG. 40 illustrates an exemplary configuration of a transmission system 10-3C. The transmission system 10-3C is an HDMI transmission system using an HDMI as a digital interface. The transmission system 10-3C includes a source device 110-3 as a transmission device, a repeater 140 as a repeater, a sink device 320 as a reception device, an HDMI cable 330 that connects the source device 110-3 and the repeater 140, and an HDMI cable 130-3 that connects the repeater 140 and the sink device 320.

In the transmission system 10-3 illustrated in FIG. 23 described above, the source device 110-3 that is a compatible source device is directly connected to the sink device 320 via the HDMI cable 130-3 that is a compatible cable. However, in the transmission system 10-3C in FIG. 40, the HDMI cable 330 and the repeater 140 are further inserted between the source device 110-3 and the HDMI cable 130-3 in series. In FIG. 40, a part corresponding to that in FIGS. 1 and 23 is denoted with the same reference numeral.

Here, the repeater 140 includes an amplifier 141 on a data line. Furthermore, the repeater 140 includes a power supply in a separate system from the +5 V power line supplied from the source device 110-3, and 5 V is supplied from the power supply in the separate system to the sink device 320 through the +5 V power line. In this case, the +5 V power line is isolated by the repeater 140 between the source device 110-3 and the HDMI cable 130-3. Furthermore, here, it is assumed that an input and an output of a control line such as a Utility of the repeater 140 be connected with a low impedance.

In a case of the transmission system transmission system 10-3C in FIG. 40, the Utility line is connected to the HDMI cable 330 that is a non-compatible cable via the repeater 140 between the source device 110-3 and the HDMI cable 130-3. The source device 110-3 and the HDMI cable 130-3 perform sequence operations as compatible devices although the repeater 140 exists.

In this case, the voltage monitoring unit 133 of the HDMI cable 130-3 monitors that the voltage at a point P22 is 4 V and sends the monitoring result to the control unit 132. The control unit 132 determines that the source device is a compatible source device on the basis of the monitoring result and controls the source device to operate in a compatible mode. Therefore, the switch SW26 is in a short-circuit state, the LDO regulators 332A and 332B are turned on, the conversion circuits 331A and 331B are in an operation state and start to draw the current from the +5 V line.

In this case, an actual supply source of a current is not compatible to the +5 V power line of the source device 110-3 and is the +5 V power line of the repeater 140. At this time, in a case where the repeater 140 is not compatible to supply of the current equal to or higher than 55 mA, there is a possibility that the repeater 140 is broken.

In the present embodiment, to avoid such a failure of the repeater 140, as illustrated in FIGS. 41A and 41B, the source device and the HDMI cable included in the transmission system each perform different operations according to whether or not the source device and the HDMI cable are compatible devices, and in addition, whether or not the partner is a compatible device, in consideration of whether or not the repeater intervenes.

The compatible source device (source device that is compatible device) and the non-compatible source device operate as illustrated in FIG. 41A. That is, in a case where the compatible source device is connected to the compatible cable (HDMI cable that is compatible device), the compatible source device operates in a non-compatible mode when a non-compatible repeater intervenes and operates in a compatible mode when the repeater does not intervene. Furthermore, in a case of being connected to the non-compatible cable, the compatible source device operates in a non-compatible mode. Furthermore, in a case of being connected to either one of the compatible cable and the non-compatible cable, the non-compatible source device performs a normal operation.

Furthermore, the compatible cable and the non-compatible cable operate as illustrated in FIG. 41B. That is, in a case where the compatible cable is connected to the compatible source device, the compatible cable operates in the non-compatible mode when a non-compatible repeater intervenes and operates in the compatible mode when the repeater does not intervene. Furthermore, in a case of being connected to the non-compatible source device, the compatible cable operates in the non-compatible mode. Furthermore, in a case where either one of the compatible source device and the non-compatible source device is connected, the non-compatible cable performs a normal operation.

Furthermore, FIGS. 41C and 41D illustrate an operation relationship between compatible/non-compatible repeaters and compatible/non-compatible cables 2. In a case of the compatible repeater, the repeater moves similarly to a receiving port of the sink device between the source device and the repeater, and the mode in FIGS. 6A and 6B described above is established. Between the repeater and the sink device, since the repeater moves similarly to an outlet port of the source device, that is, includes a voltage dividing resistor R and a switch SW similarly to the compatible source device, modes in FIGS. 41C and 41D are used. At this time, the compatible cable does not determine the intervention of the repeater and operates as determining as if the cable was connected to the source device. However, since the compatible repeater can flow the current equal to or higher than 55 mA, no problem occurs.

Figure 42:
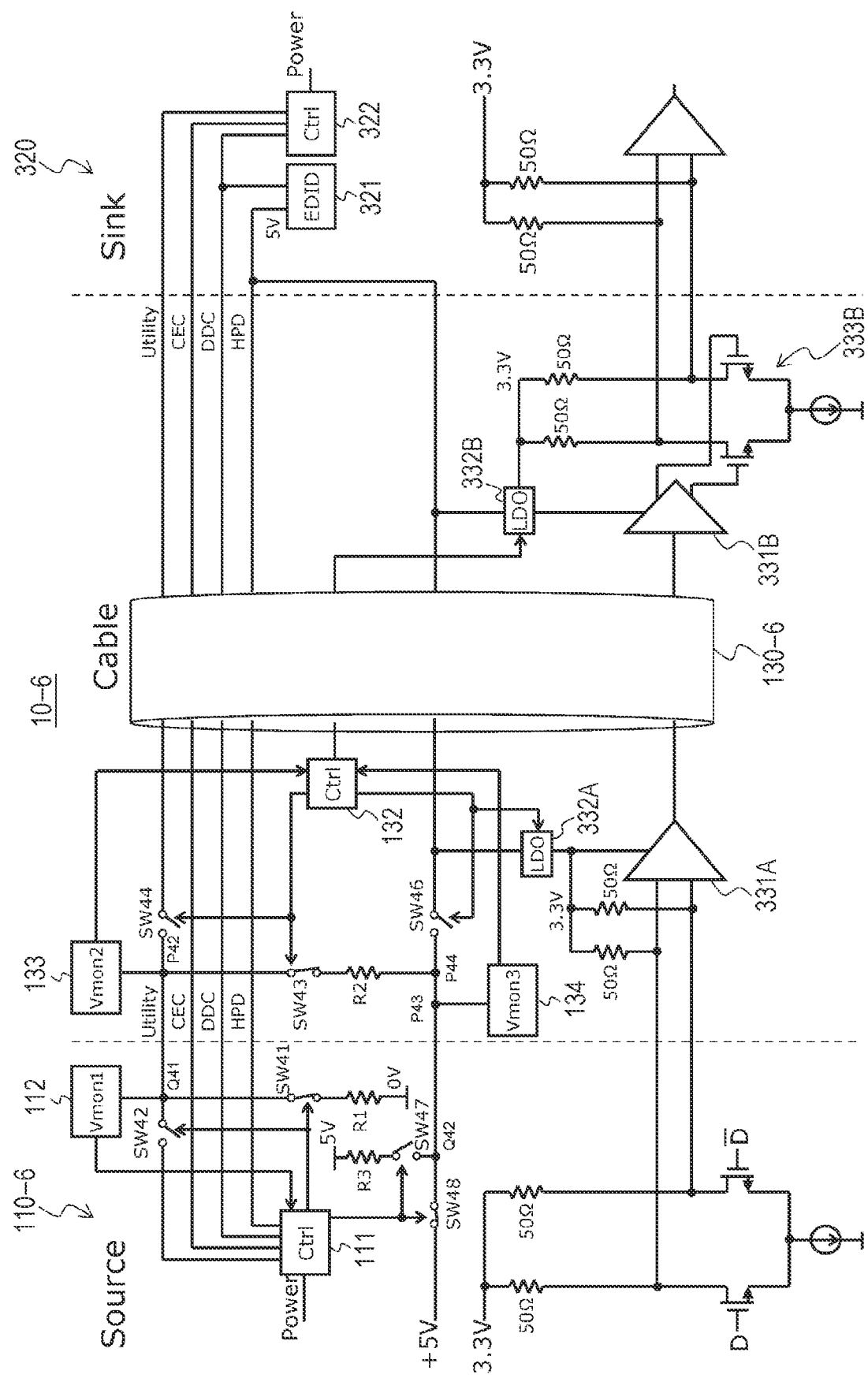
FIG. 42 is a diagram illustrating an exemplary configuration of a transmission system including a compatible source device that is compatible to intervening the repeater and a compatible HDMI cable (including current consumption unit).

FIG. 42 illustrates an exemplary configuration of a transmission system 10-6. The transmission system 10-6 is an HDMI transmission system using an HDMI as a digital interface. The transmission system 10-6 includes a source device 110-6 as a transmission device, a sink device 320 as a reception device, and an HDMI cable 130-6 that is an AOC that connects these devices. In FIG. 42, a part corresponding to that in FIG. 23 is denoted with the same reference numeral, and the detailed description thereof is appropriately omitted.

The HDMI cable 130-6 includes a control unit 132, voltage monitoring units 133 and 134, switches SW43, SW44, and SW46, and a voltage dividing resistor R2 in addition to AOC configuration circuits including conversion circuits 331A and 331B, LDO regulators 332A and 332B, a current driving unit 333B, and the like.

A series circuit including the resistor R2 and the switch SW43 is connected between a point P42 of the Utility line and a point P44 of the +5 V power line. With this structure, a voltage of 5 V is applied to the point P42 of the Utility line via the series circuit including the resistor R2 and the switch SW43. The switch SW44 is inserted at a point closer to the sink device 320 than the point P42 of the Utility line. Furthermore, the switch SW46 is inserted at a point closer to the sink device 320 than the point P44 of the +5 V power line.

The voltage monitoring unit 133 monitors a voltage at the point P42 of the Utility line and sends the monitoring result to the control unit 132. The voltage monitoring unit 134 monitors a voltage at a point P43 closer to a terminal than a position where the switch SW46 is inserted into the +5 V power line and sends the monitoring result to the control unit 132. Electric power is suppled from the point closer to the sink device 320 than a position where the switch SW46 is inserted into the +5 V power line to the LDO regulators 332A and 332B. The control unit 132 controls an operation of each unit of the HDMI cable 130-6.

The source device 110-6 is a compatible source device. The source device 110-6 includes a voltage monitoring unit 112, switches SW41, SW42, SW47, and SW48, and voltage dividing resistors R1 and R3 in addition to a control unit 111 that controls an operation of each unit. It is desirable that the resistor R2 of the HDMI cable 130-6 described above and the resistors R1 and R3 of the source device 110-6 be each a large value to some extent so as to reduce current consumption. Hereinafter, the description will be made while assuming R1=400 kΩ, R2=100 kΩ, and R3=500 kΩ.

A series circuit including the resistor R1 and the switch SW41 is connected between the ground and a point Q41 of the Utility line. With this structure, 0 V that is a ground voltage is applied to the point Q41 of the Utility line via the series circuit including the resistor R1 and the switch SW41. The switch SW42 is inserted on a side opposite to the terminal side of the point Q41 of the Utility line. The voltage monitoring unit 112 monitors a voltage at the point Q41 of the Utility line and sends the monitoring result to the control unit 111. Furthermore, a voltage of 5 V is applied to a point Q42 of the +5 V power line via a series circuit including the resistor R3 and the switch SW47. The switch SW48 is inserted on a side opposite to the terminal side of the point Q42 of the +5 V power line.

In the transmission system 10-6 illustrated in FIG. 42, the HDMI cable 130-6 is a compatible cable, and the source device 110-6 is a compatible source device. Therefore, the source device 110-6 determines that the connected HDMI cable is a compatible cable and operates in the compatible mode. Similarly, the HDMI cable 130-6 determines that the connected source device is a compatible source device and operates in the compatible mode.

Operations of the source device 110-6 and the HDMI cable 130-6 will be described in detail. In FIG. 42, initial states of the source device 110-6 and the HDMI cable 130-6 are illustrated. In the initial state of the source device 110-6, the switches SW41 and SW48 are in a short-circuit state, and the switches SW42 and SW47 are in an open state. Meanwhile, in the initial state of the HDMI cable 130-6, the switch SW43 is in a short-circuit state, and the switches SW44 and SW46 are in an open state.

Since SW41 and SW43 are in the short-circuit state in the initial state, the resistors R1 and R2 are connected in series between the ground of the source device 110-6 (0 V) and the +5 V power line of the HDMI cable 130-6, and a voltage of 4 V is obtained at the points Q41 and P42 of the Utility line by resistance voltage division.

The voltage monitoring unit 112 of the source device 110-6 monitors that the voltage at the point Q41 is 4 V and sends the monitoring result to the control unit 111. The control unit 111 determines that the HDMI cable that is a compatible cable is connected on the basis of the monitoring result.

Similarly, the voltage monitoring unit 133 of the HDMI cable 130-6 monitors that the voltage at the point P42 is 4 V and sends the monitoring result to the control unit 132. The control unit 132 determines that the source device that is a compatible source device is connected on the basis of the monitoring result.

Here, since the switch SW42 is in the open state in the source device 110-6, the voltage of 4 V is not propagated in the source device 110-6 and does not affect the inside of the source device 110-6. Similarly, since the switch SW44 is in the open state in the HDMI cable 130-6, the voltage of 4 V is not propagated to the sink device 320 and does not affect the sink device 320.

Figure 43:
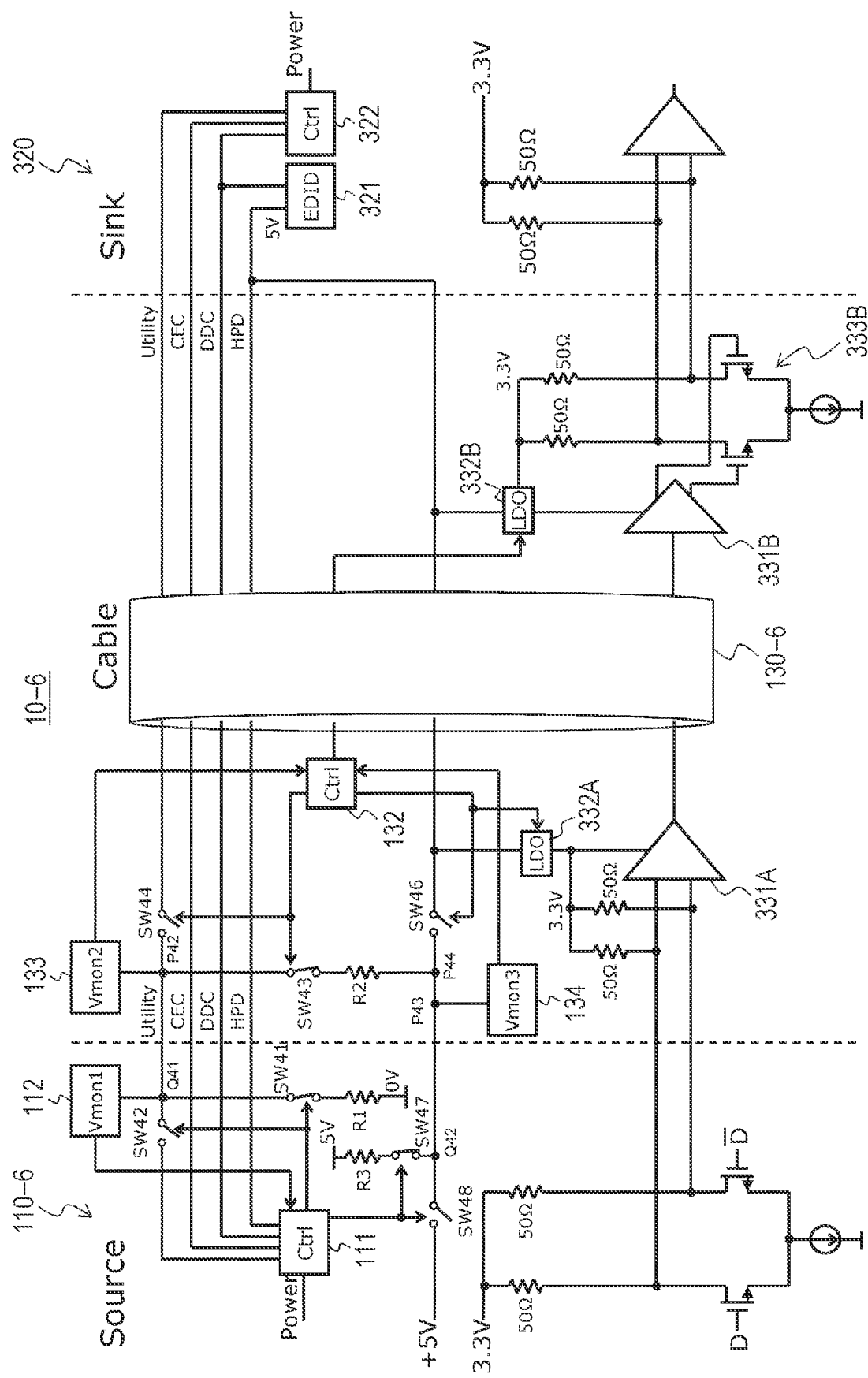
FIG. 43 is a diagram for explaining an operation of the transmission system in FIG. 42.

The control unit 111 of the source device 110-6 short-circuits the switch SW47 as illustrated in FIG. 43, and thereafter, opens the switch SW48 on the basis of the monitoring result indicating 4 V by the voltage monitoring unit 133. Here, the resistor R3 is connected to the resistors R1 and R2 in series, and a voltage of 2 V is obtained at the points Q41 and P42 of the Utility line by resistance voltage division.

At this time, in a case where a relay, such as the repeater 140 (refer to FIG. 40), that isolates the +5 V power line is connected between the source device 110-6 and the HDMI cable 130-6, a change in a generated voltage by the resistor R3 is not made. Therefore, the fact that the voltage of 2 V is obtained at the points Q41 and P42 of the Utility line means that the relay such as the repeater is not connected.

The voltage monitoring unit 112 of the source device 110-6 monitors that the voltage at the point Q41 becomes 2 V and sends the monitoring result to the control unit 111. The control unit 111 determines that the relay such as the repeater that isolates the +5 V power line is not connected between the compatible cable and the control unit 111 on the basis of the monitoring result and performs control to operate in a compatible mode.

Similarly, the voltage monitoring unit 133 of the HDMI cable 130-6 monitors that the voltage at the point P42 becomes 2 V and sends the monitoring result to the control unit 132. The control unit 132 determines that the relay such as the repeater that isolates the +5 V power line is not connected between the compatible source device and the control unit 132 on the basis of the monitoring result and performs control to operate in a compatible mode.

Figure 44:
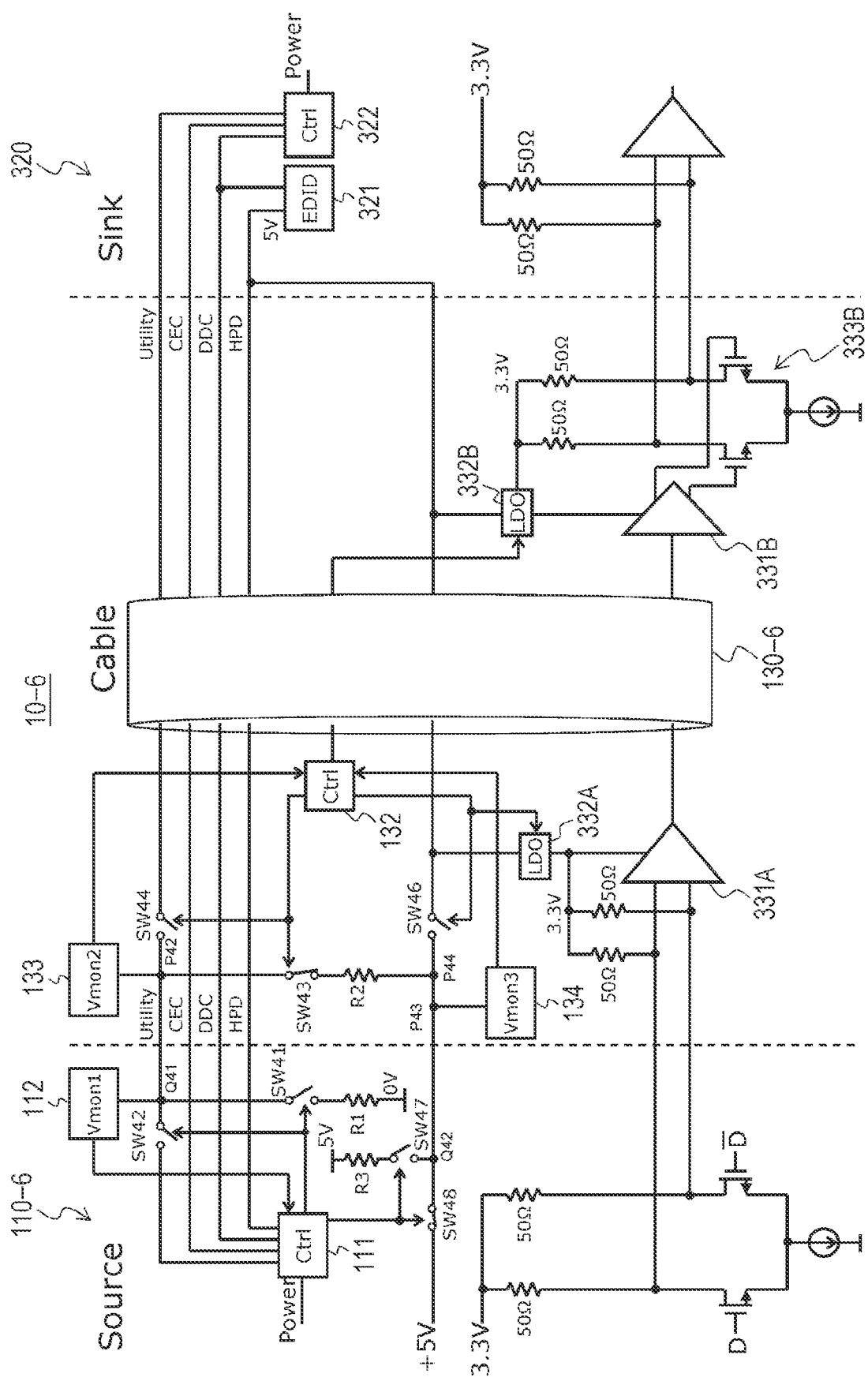
FIG. 44 is a diagram for explaining the operation of the transmission system in FIG. 42.

Since the source device 110-6 is controlled to operate in the compatible mode, the control unit 111 short-circuits the switch SW48, opens the switch SW47, and further opens the switch SW41 as illustrated in FIG. 44. Therefore, the voltage at the point P42 of the Utility line is 5 V. In the HDMI cable 130-6, the voltage monitoring unit 133 monitors that the voltage at the point P42 is 5 V and sends the monitoring result to the control unit 132. By monitoring that the voltage at the point P42 is 5 V in this way, it is confirmed that the source device determines that the cable of the source device is a compatible cable and the relay such as the repeater that isolates the +5 V power line does not intervene.

Figure 45:
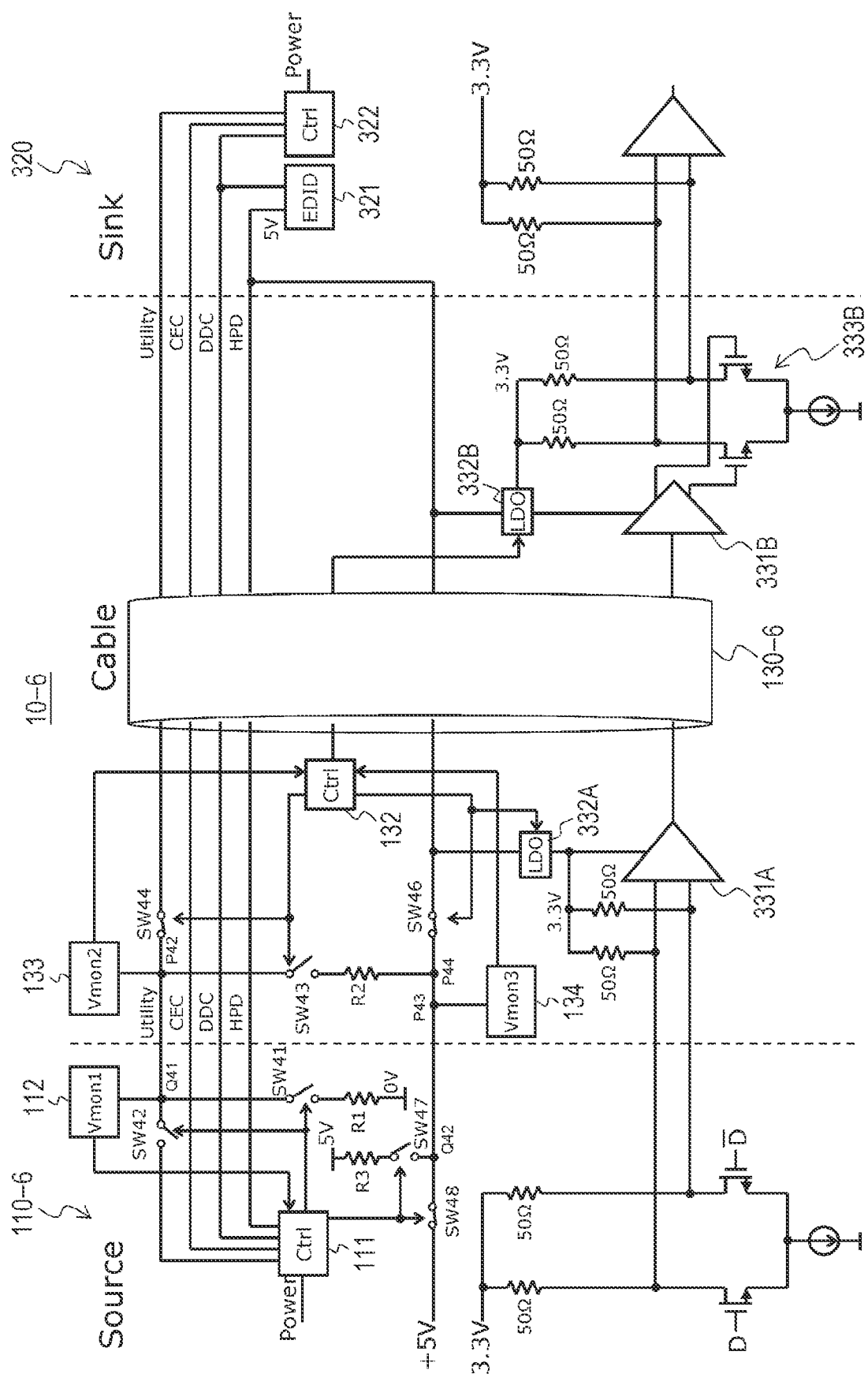
FIG. 45 is a diagram for explaining the operation of the transmission system in FIG. 42.

The control unit 132 changes the state of each switch on the basis of the monitoring result as illustrated in FIG. 45 and shifts to a normal operation. In this case, not to affect the sink device 320, first, the switch SW43 is opened, next, the switch SW44 is short-circuited, and finally, the switch SW46 is short-circuited. Thereafter, the control unit 132 turns on the LDO regulators 332A and 332B and applies 3.3 V of electric power to the conversion circuits 331A and 331B that are active circuits so as to set the conversion circuits 331A and 331B to be in an operation state (Enable).

Figure 46:
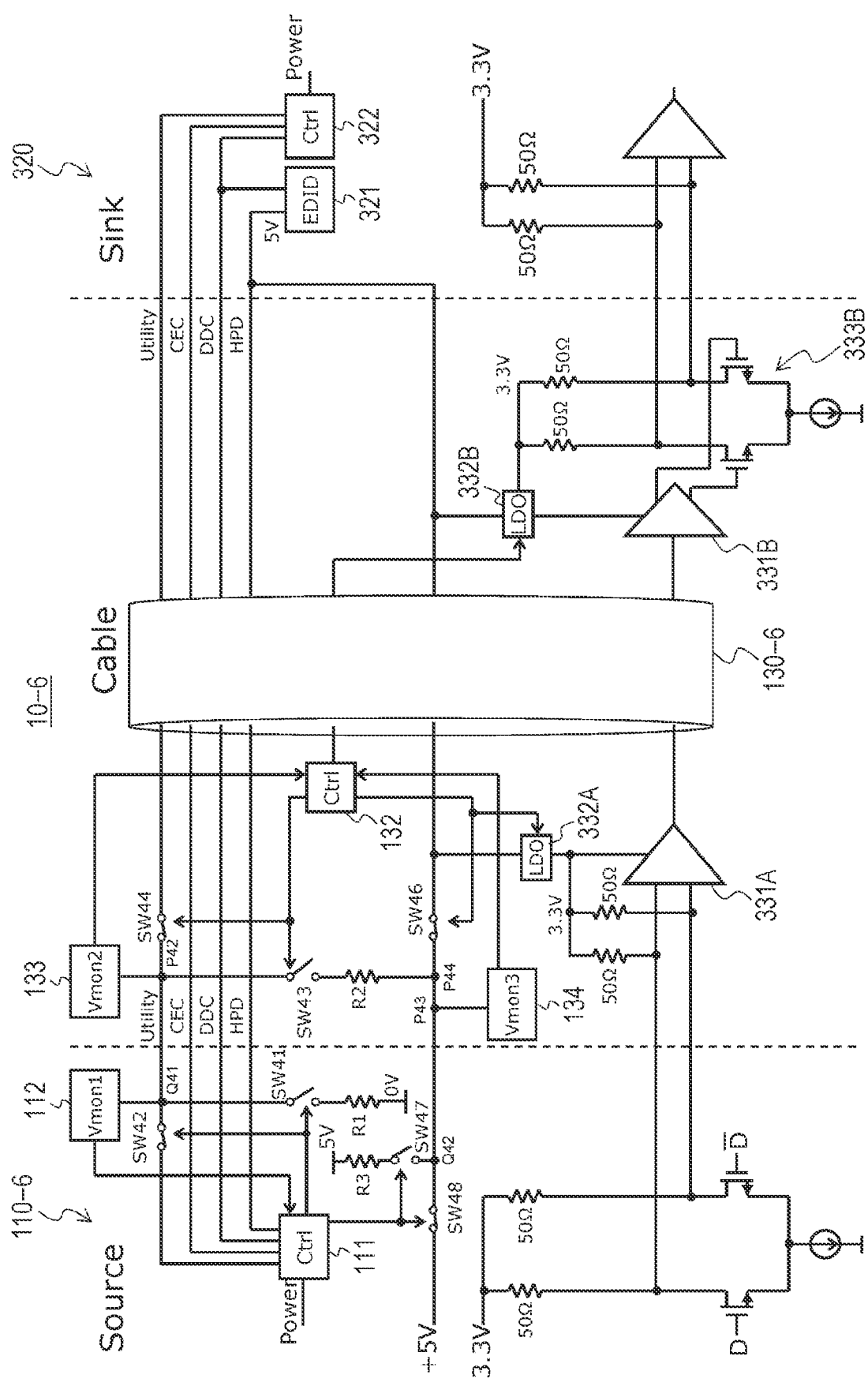
FIG. 46 is a diagram for explaining the operation of the transmission system in FIG. 42.

By short-circuiting the switch SW46, a 5 V voltage is sent from the source device 110-6 to the sink device 320 through the +5 V power line, and accordingly, a 5 V voltage (connection detection signal) is sent from the sink device 320 to the source device 110-6 via the HPD line. With this operation, the control unit 111 of the source device 110-6 recognizes that the preparation of the cable is completed, and short-circuits the switch SW42 and shifts to the normal operation, as illustrated in FIG. 46.

Note that, in a case where the voltage of 4 V is still obtained at the points Q41 and P42 of the Utility line at the time of FIG. 43, the source device 110-6 and the HDMI cable 130-6 each operate as follows. In this case, the control unit 111 of the source device 110-6 determines that the relay such as the repeater that isolates the +5 V power line intervenes and performs control to operate in a non-compatible mode. That is, the control unit 111 short-circuits the switch SW48, opens the switch SW47, opens the switch SW41, and further short-circuits the switch SW42 and shifts to a normal operation.

Furthermore, in this case, the control unit 111 of the HDMI cable 130-6 determines that the relay such as the repeater that isolates the +5 V power line intervenes and performs control to operate in a non-compatible mode. That is, the control unit 132 opens the switch SW43, short-circuits the switch SW44, and further short-circuits the switch SW46 and shifts to a normal operation.

Note that the source device 110-6 may be configured so that a current that can be supplied by the +5 V power line is constantly equal to or higher than 55 mA and the current can be supplied to an active circuit of the HDMI cable 130-6 that is a compatible cable. However, the control unit 111 of the source device 110-6 may change a mode to a mode in which the current that can be supplied by the +5 V power line is set to be equal to or higher than 55 mA when determining that the connected HDMI cable is a compatible cable and the relay such as the repeater that isolates the +5 V power line does not intervene. By switching a current supply amount mode, the source device 110-6 can reduce electric power of a power supply circuit unit. For example, before opening the switch SW41 as described above, the control unit 111 changes the mode to the mode in which a current that can be supplied is equal to or higher than 55 mA.

In this way, in the transmission system 10-6 illustrated in FIG. 42, in a case where the HDMI cable 130-6 that is a compatible cable determines that the connected source device is a compatible source device that may sufficiently supply a current to its own active circuit and the relay such as the repeater that isolates the +5 V power line does not intervene, the HDMI cable 130-6 sets its own active circuit to be in the operation state. Therefore, the active circuit of the HDMI cable 130-6 can perform an appropriate operation. Furthermore, it is possible to avoid that the source device and the relay such as the repeater cannot withstand overcurrent and are broken.

Figure 47:
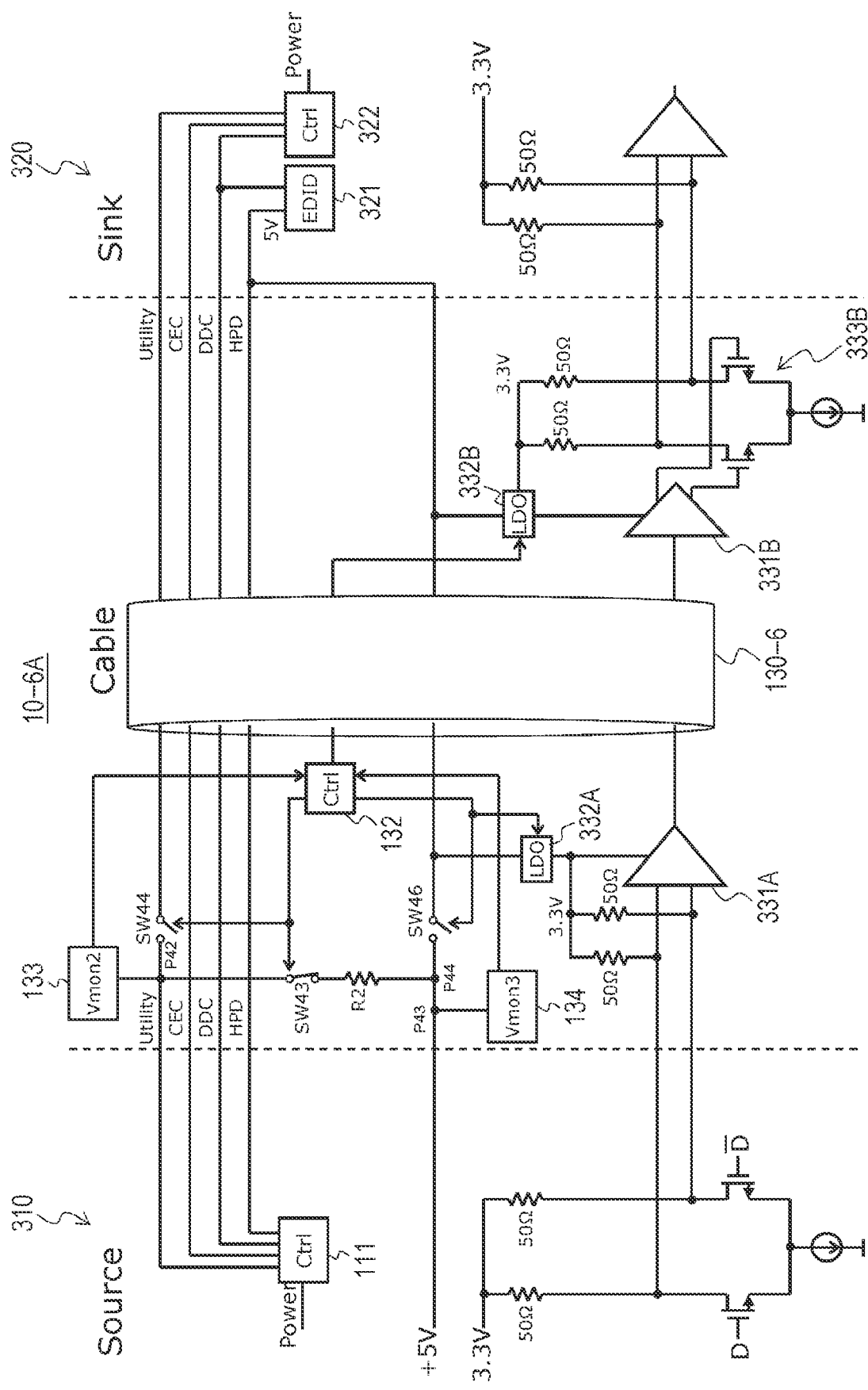
FIG. 47 is a diagram illustrating an exemplary configuration of a transmission system including the non-compatible source device and a compatible HDMI cable (including current consumption unit) that is compatible to intervening the repeater.

FIG. 47 illustrates an exemplary configuration of a transmission system 10-6A. The transmission system 10-6A is an HDMI transmission system using an HDMI as a digital interface. The transmission system 10-6A includes the source device 310 as a transmission device, the sink device 320 as a reception device, and the HDMI cable 130-6 that connects these devices. In FIG. 47, a part corresponding to that in FIGS. 4 and 42 is denoted with the same reference numeral, and the detailed description thereof is appropriately omitted.

In the transmission system 10-6A, the source device 310 is a non-compatible source device such as a legacy, and the HDMI cable 130-6 is a compatible cable. In this case, the source device 310 performs a normal operation (refer to FIGS. 41A, 41B, 41C, and 41D).

Furthermore, the HDMI cable 130-6 determines that the source device is a non-compatible source device and operates in the non-compatible mode. In this case, in the initial state, the voltage at the point P42 of the Utility line is 5 V. The voltage monitoring unit 133 of the HDMI cable 130-6 monitors that the voltage at the point P42 is 5 V and sends the monitoring result to the control unit 132. When the voltage at the point P42 remains to be 5 V although the voltage monitoring unit 134 detects 5 V, the control unit 132 determines that the non-compatible source device is connected and performs control to operate in a non-compatible mode.

In this case, the control unit 132 changes the state of each switch and shifts to the normal operation. In this case, not to affect the sink device 320, first, the switch SW43 is opened, next, the switch SW44 is short-circuited, and finally, the switch SW46 is short-circuited. Furthermore, in this case, the control unit 132 controls an active circuit so as not to draw the current equal to or higher than 55 mA from the +5 V power line. For example, the LDO regulators 332A and 332B are maintained to be turned off, and the conversion circuits 331A and 331B that are active circuits are maintained to be in non-operation states (Disable). With this operation, the HDMI cable 130-6 does not draw the current equal to or higher than 55 mA from the source device 310, and it is possible to avoid that the source device 310 cannot withstand overcurrent and is broken.

Note that, in the above, the HDMI cable 130-6 that is a compatible cable controls on/off the LDO regulators 332A and 332B according to whether the source device is a compatible device or a non-compatible device. However, in this case, in a case where the source device is a non-compatible device, the LDO regulators 332A and 332B are turned off, and the active circuit is in a non-operation state. Therefore, data cannot be transmitted.

Therefore, in a case where the source device is a non-compatible source device, the HDMI cable 130-6 may not turn off the LDO regulators 332A and 332B but guarantee the current drawn from the source device to be equal to or lower than 55 mA by decreasing a data rate. With this operation, even if the source device is a non-compatible source device, data can be transmitted.

Figure 48:
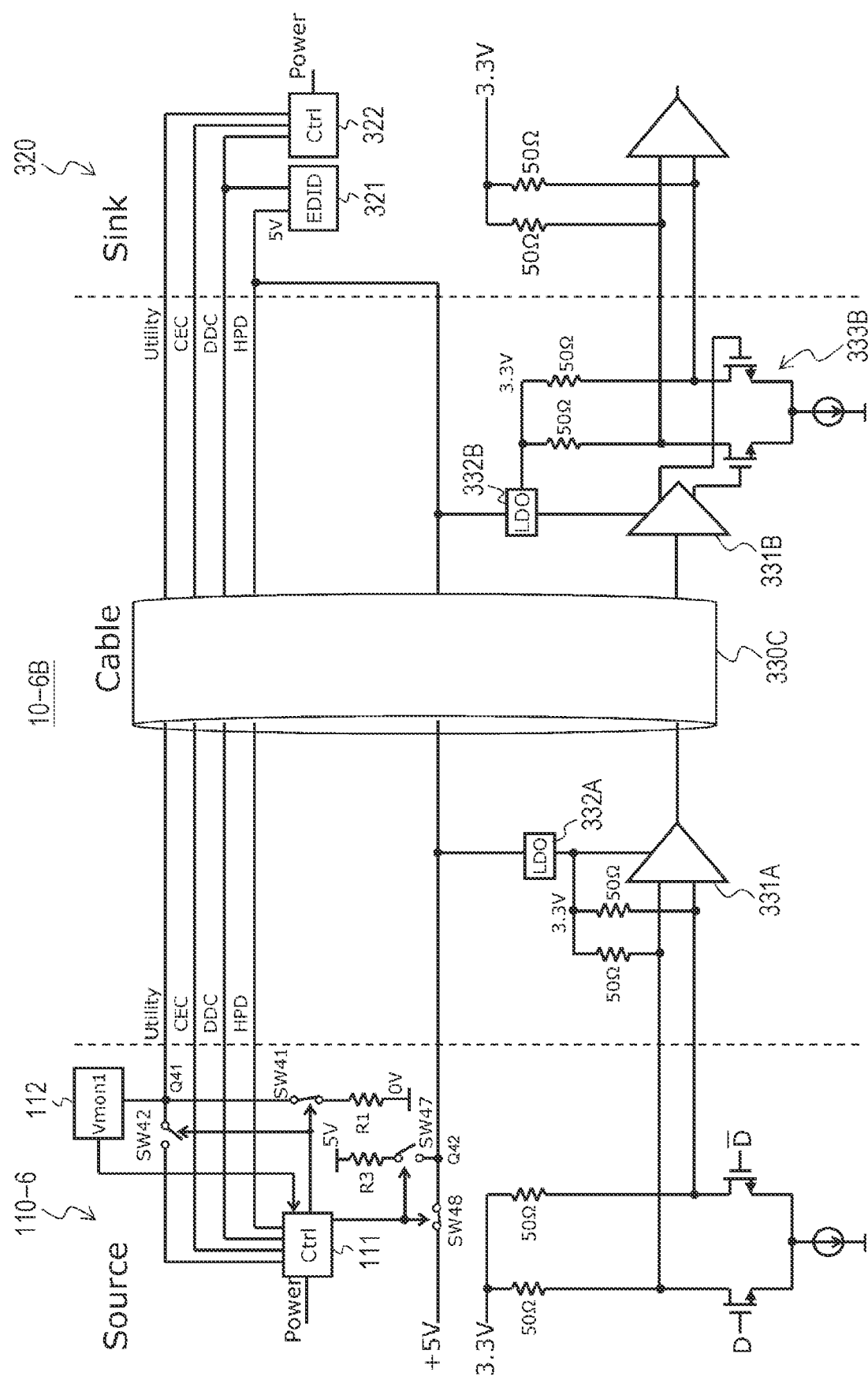
FIG. 48 is a diagram illustrating an exemplary configuration of a transmission system (including current consumption unit) including the compatible source device that is compatible to intervening the repeater and the non-compatible HDMI cable.

FIG. 48 illustrates an exemplary configuration of a transmission system 10-6B. The transmission system 10-6B is an HDMI transmission system using an HDMI as a digital interface. The transmission system 10-6B includes the source device 110-6 as a transmission device, the sink device 320 as a reception device, and an HDMI cable 330C that connects these devices. In FIG. 48, a part corresponding to that in FIGS. 4 and 42 is denoted with the same reference numeral, and the detailed description thereof is appropriately omitted.

In the transmission system 10-6B, the source device 110-6 is a compatible source device, and the HDMI cable 330C is a non-compatible cable such as a legacy. In this case, the HDMI cable 330C performs the normal operation (refer to FIGS. 41A, 41B, 41C, and 41D).

The source device 110-6 determines that the HDMI cable is a non-compatible cable and operates in the non-compatible mode. In this case, in the initial state, the voltage at the point Q41 of the Utility line is 0 V. The voltage monitoring unit 112 of the source device 110-6 monitors that the voltage at the point Q41 is 0 V and sends the monitoring result to the control unit 111. The control unit 111 determines that the HDMI cable is a non-compatible cable on the basis of the monitoring result and the fact that the HPD line is at a high level (5 V) and performs control to operate in the non-compatible mode.

In this case, the control unit 111 changes the state of each switch and shifts to the normal operation. In this case, not to affect the inside of the source device 110-6, first, the switch SW41 is opened, and next, the switch SW42 is short-circuited.

Figure 49:
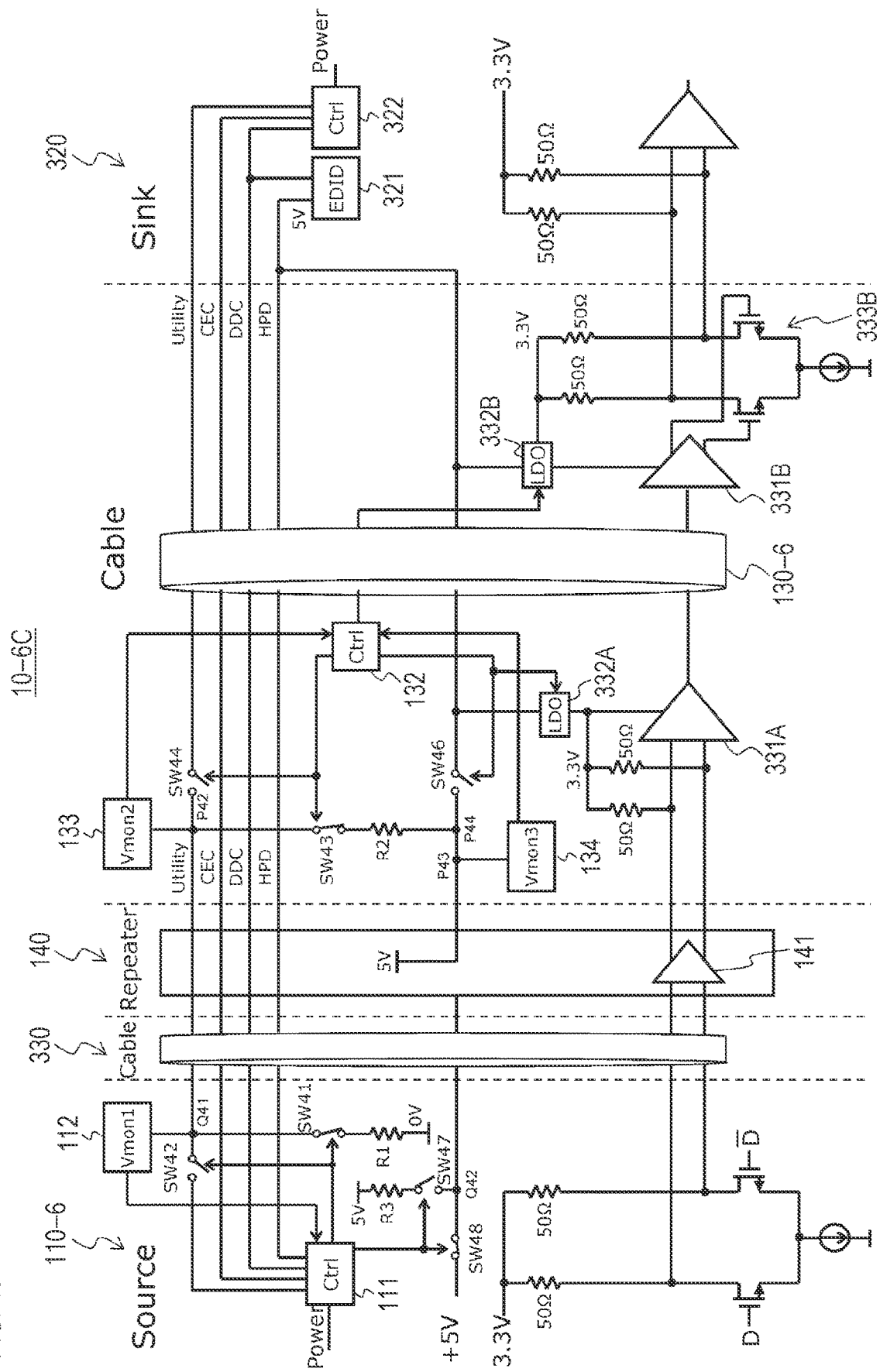
FIG. 49 is a diagram illustrating an exemplary configuration of a transmission system (intervening repeater) including the compatible source device that is compatible to intervening the repeater and the compatible HDMI cable (including current consumption unit).

FIG. 49 illustrates an exemplary configuration of a transmission system 10-6C. The transmission system 10-6C is an HDMI transmission system using an HDMI as a digital interface. The transmission system 10-6C includes the source device 110-6 as a transmission device, a repeater 140 as a repeater, the sink device 320 as a reception device, a cable 330 that connects the source device 110-6 and the repeater 140, and an HDMI cable 130-6 that connects the repeater 140 and the sink device 320.

In the transmission system 10-6 illustrated in FIG. 42 described above, the source device 110-6 that is a compatible source device is directly connected to the sink device 320 via the HDMI cable 130-6 that is a compatible cable. However, in the transmission system 10-6C, the HDMI cable 330 and the repeater 140 are further inserted between the source device 110-6 and the HDMI cable 130-6 in series. In FIG. 49, a part corresponding to that in FIGS. 40 and 42 is denoted with the same reference numeral, and the detailed description thereof is appropriately omitted. Note that it is assumed that in and out of the control line be connected in the repeater 140.

In the transmission system 10-6C illustrated in FIG. 49, the HDMI cable 130-6 is a compatible cable, and the source device 110-6 is a compatible source device. Therefore, although the source device 110-6 determines that the HDMI cable that is a compatible cable is connected, the source device 110-6 recognizes that the repeater 140 that isolates the +5 V power line intervenes and operates in a non-compatible mode. Similarly, although the HDMI cable 130-6 determines that the source device that is a compatible source device is connected, the HDMI cable 130-6 recognizes that the repeater 140 intervenes and operates in a non-compatible mode.

Operations of the source device 110-6 and the HDMI cable 130-6 in the transmission system 10-6C in FIG. 49 will be described in detail. In FIG. 49, initial states of the source device 110-6 and the HDMI cable 130-6 are illustrated. In the initial state of the source device 110-6, the switches SW41 and SW48 are in a short-circuit state, and the switches SW42 and SW47 are in an open state. Meanwhile, in the initial state of the HDMI cable 130-6, the switch SW43 is in a short-circuit state, and the switches SW44 and SW46 are in an open state.

Since SW41 and SW43 are in the short-circuit state in the initial state and the Utility line is connected between the source device 110-6 and the HDMI cable 130-6 via the HDMI cable 330 and the repeater 140, the resistors R1 and R2 are connected in series between the ground of the source device 110-6 (0 V) and the +5 V power line of the HDMI cable 130-6, and a voltage of 4 V is obtained at the points Q41 and P42 of the Utility line by resistance voltage division.

The voltage monitoring unit 112 of the source device 110-6 monitors that the voltage at the point Q41 is 4 V and sends the monitoring result to the control unit 111. The control unit 111 determines that the HDMI cable that is a compatible cable is connected on the basis of the monitoring result.

Similarly, the voltage monitoring unit 133 of the HDMI cable 130-6 monitors that the voltage at the point P42 is 4 V and sends the monitoring result to the control unit 132. The control unit 132 determines that the source device that is a compatible source device is connected on the basis of the monitoring result.

Figure 50:
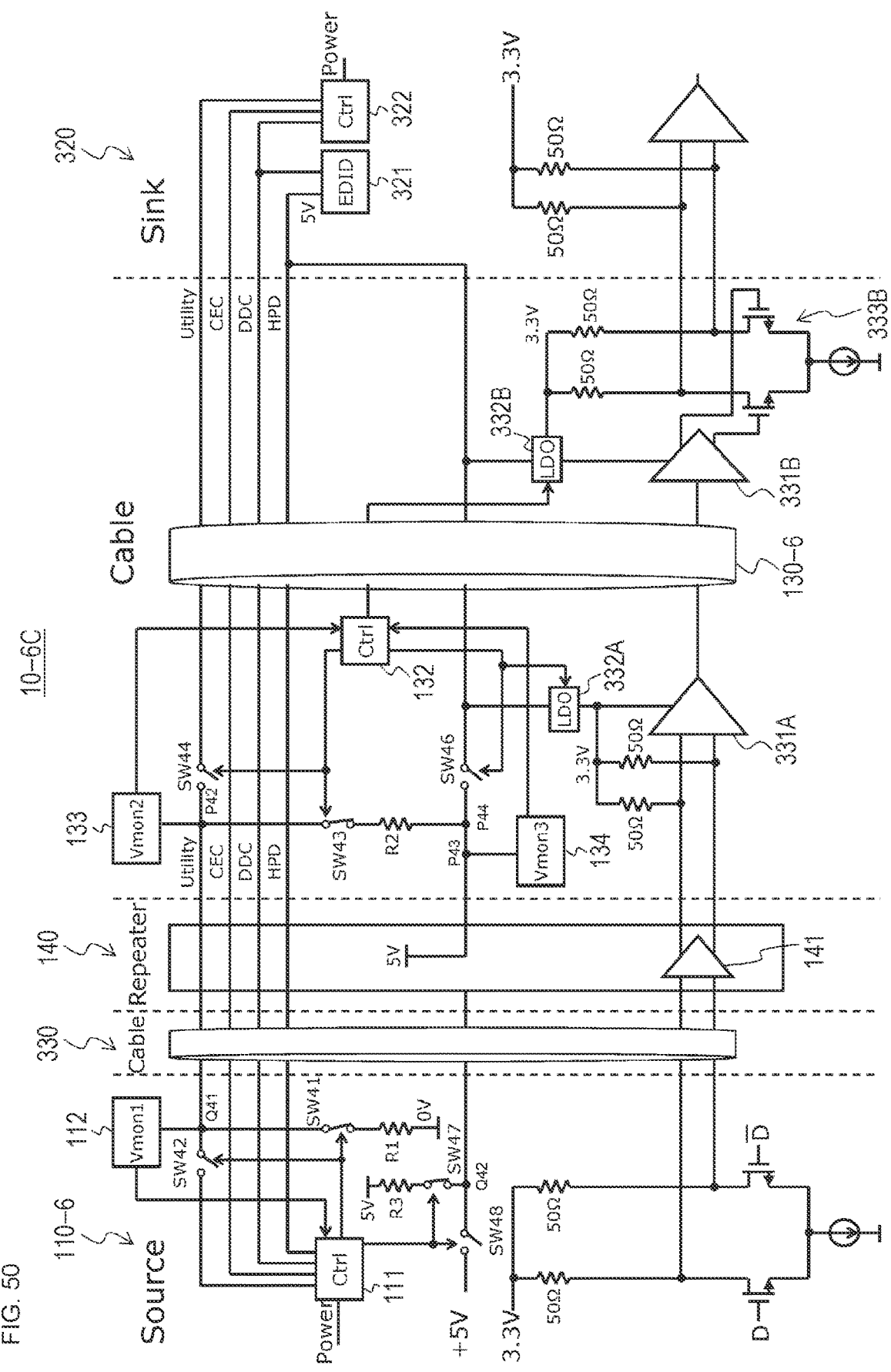
FIG. 50 is a diagram for explaining an operation of the transmission system in FIG. 49.

The control unit 111 of the source device 110-6 short-circuits the switch SW47 as illustrated in FIG. 50 on the basis of the monitoring result indicating 4 V by the voltage monitoring unit 112, and thereafter, opens the switch SW48. At this time, since the +5 V power line of the source device 110-6 and the +5 V power line of the HDMI cable 130-6 are isolated in the repeater 140, the resistor R3 does not connect to the resistors R1 and R2 in series, and therefore, the voltage at the points Q41 and P42 of the Utility line does not change from 4 V.

The control unit 111 of the source device 110-6 determines that the repeater exists between the control unit 111 and the compatible cable on the basis of the monitoring result indicating 4 V by the voltage monitoring unit 112 and performs control to operate in a non-compatible mode. Similarly the control unit 132 of the HDMI cable 130-6 determines that the repeater exists between the control unit 132 and the compatible source device on the basis of the monitoring result indicating 4 V by the voltage monitoring unit 133 and performs control to operate in a non-compatible mode.

Figure 51:
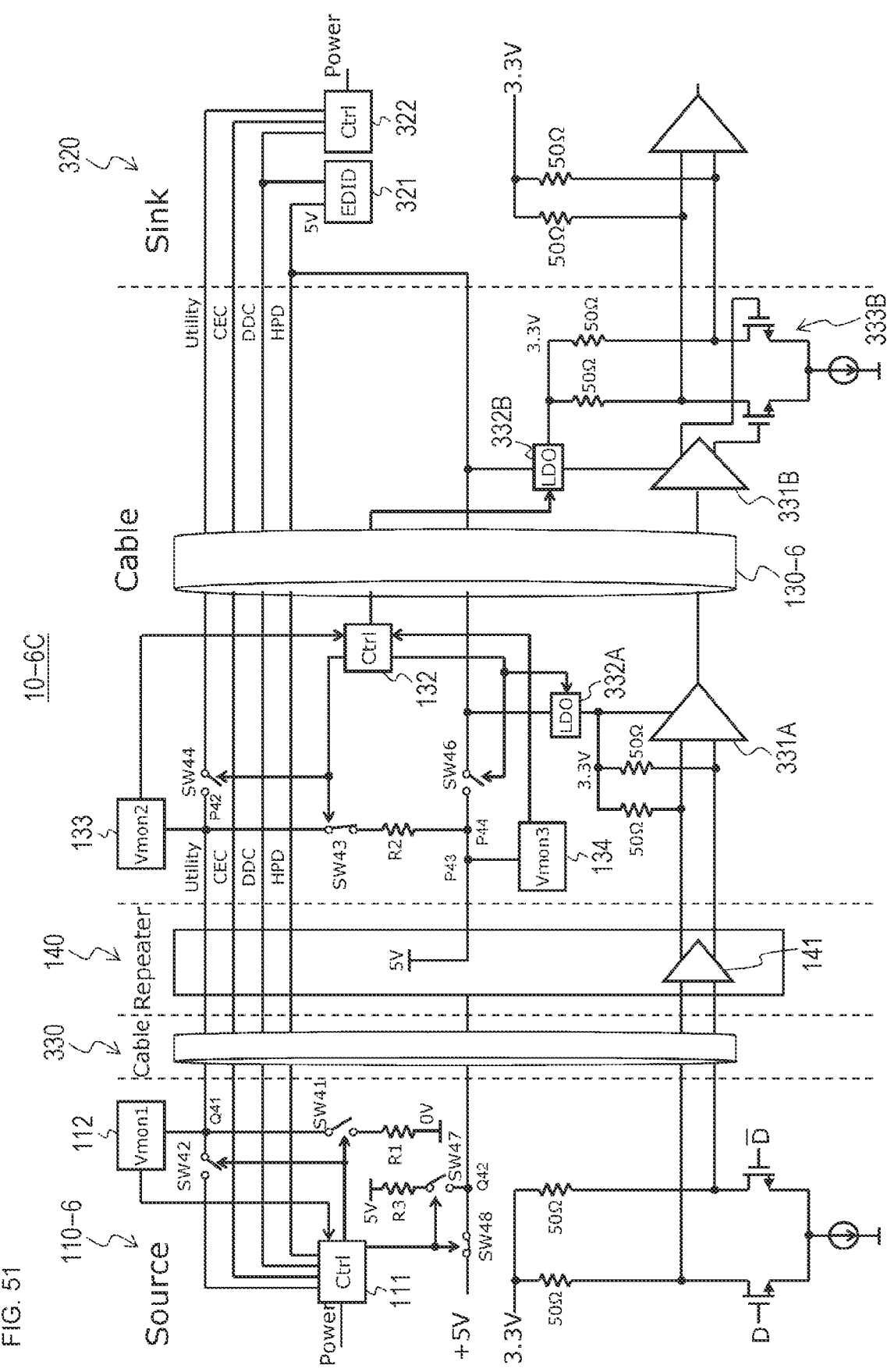
FIG. 51 is a diagram for explaining the operation of the transmission system in FIG. 49.

As illustrated in FIG. 51, the control unit 111 of the source device 110-6 short-circuits the switch SW48, opens the switch SW47, and further opens the switch SW41. Therefore, the voltage at the point P42 of the Utility line is 5 V. In the HDMI cable 130-6, the voltage monitoring unit 133 monitors that the voltage at the point P42 is 5 V and sends the monitoring result to the control unit 132. By monitoring that the voltage at the point P42 is 5 V in this way, it is confirmed that the source device determines that the cable of the source device is a compatible cable and the relay such as the repeater that isolates the +5 V power line intervenes.

Figure 52:
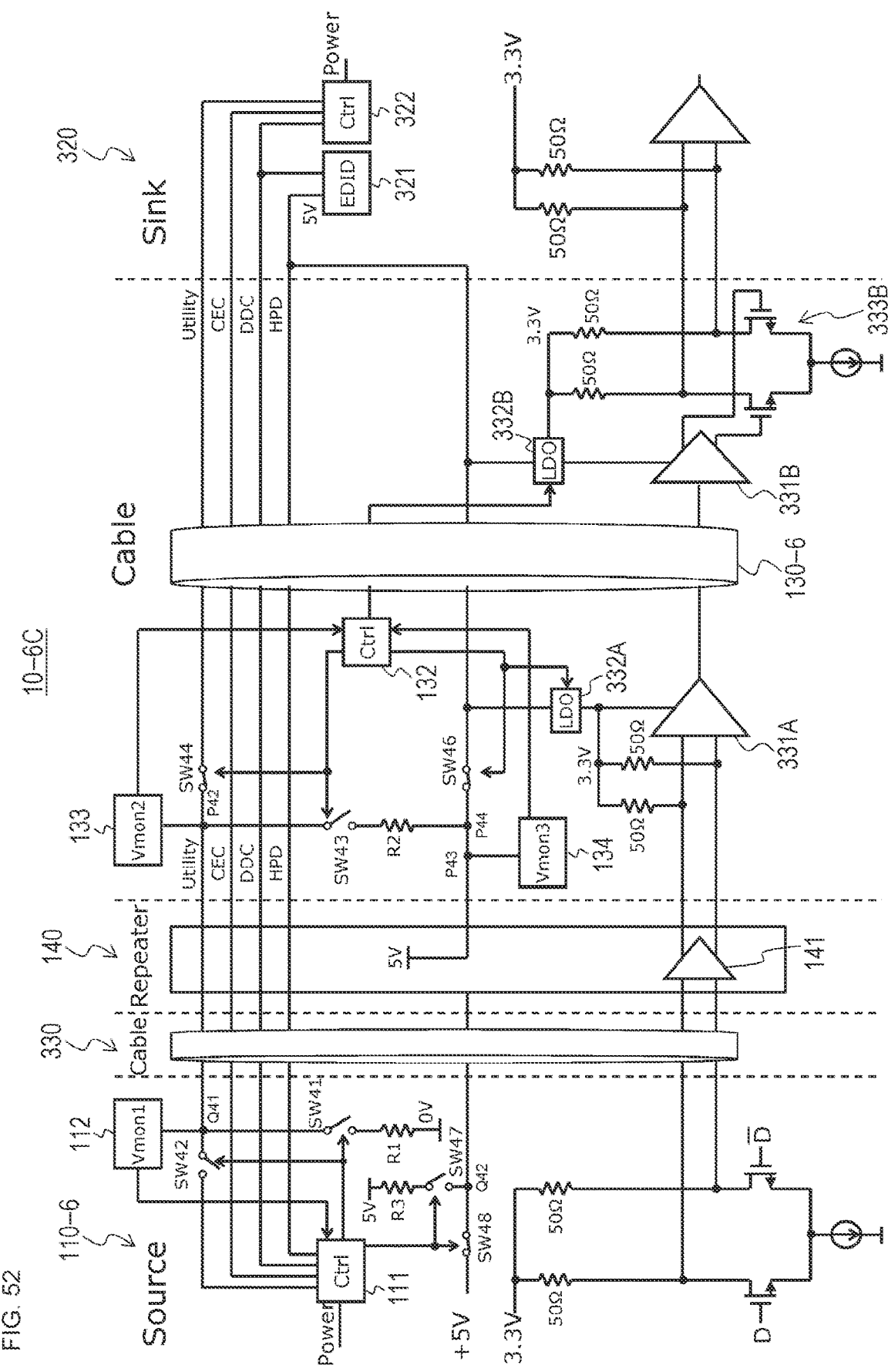
FIG. 52 is a diagram for explaining the operation of the transmission system in FIG. 49.

The control unit 132 changes the state of each switch on the basis of the monitoring result as illustrated in FIG. 52 and shifts to a normal operation. In this case, first, the switch SW43 is opened, and next, the switch SW44 is short-circuited. Finally, the switch SW46 is short-circuited. Furthermore, in this case, the control unit 132 controls an active circuit so as not to draw the current equal to or higher than 55 mA from the +5 V power line. For example, the LDO regulators 332A and 332B are maintained to be turned off, and the conversion circuits 331A and 331B that are active circuits are maintained to be in non-operation states (Disable). With this operation, the HDMI cable 130-6 does not draw the current equal to or higher than 55 mA from the repeater 140, and it is possible to avoid that the repeater 140 cannot withstand overcurrent and is broken.

Figure 53:
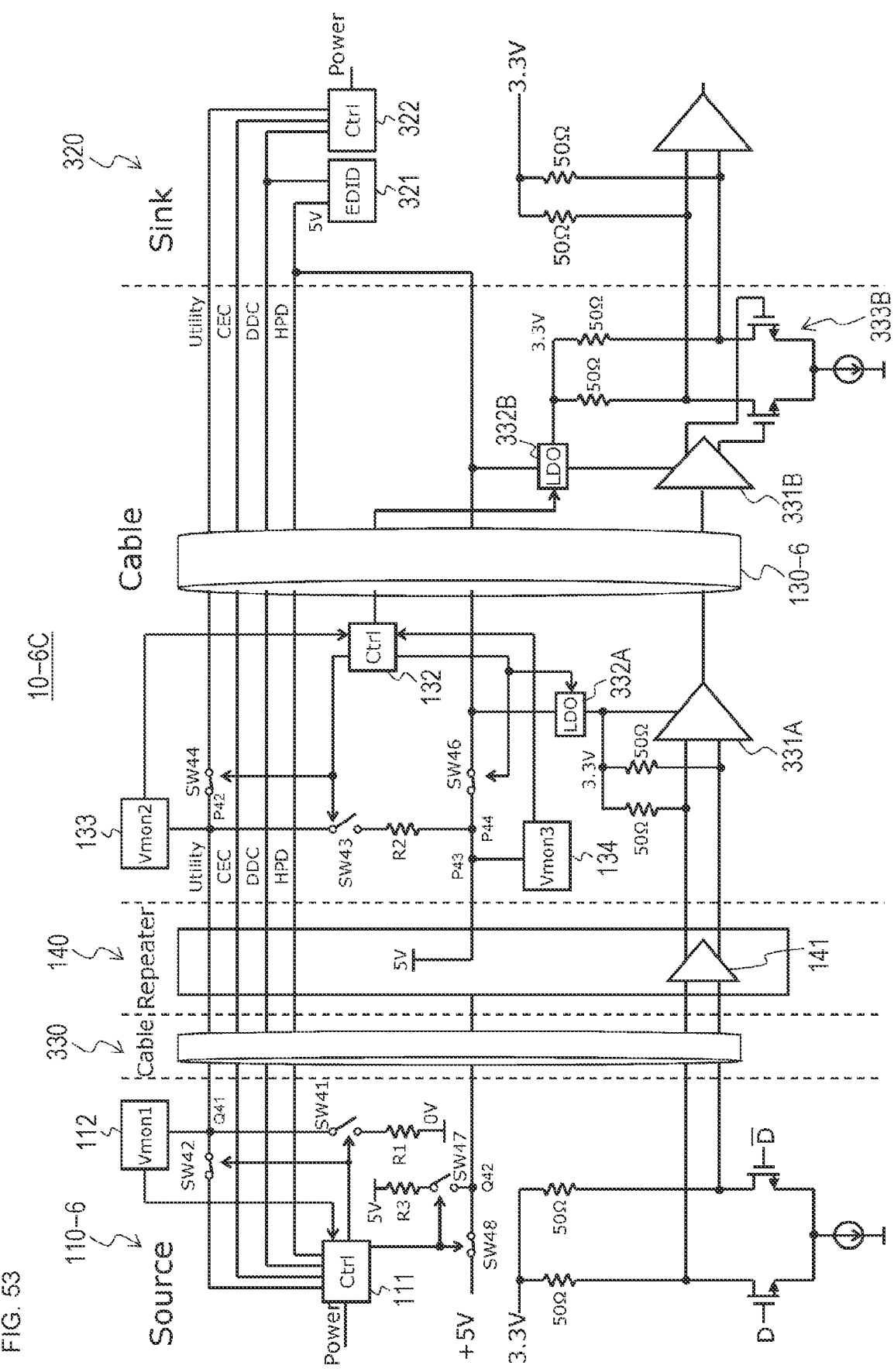
FIG. 53 is a diagram for explaining the operation of the transmission system in FIG. 49.

Furthermore, by short-circuiting the switch SW46, a 5 V voltage is sent from the repeater 140 to the sink device 320 through the +5 V power line, and accordingly, a 5 V voltage (connection detection signal) is sent from the sink device 320 to the source device 110-6 via the HPD line. With this operation, the control unit 111 of the source device 110-6 recognizes that the preparation of the cable is completed, and short-circuits the switch SW42 and shifts to the normal operation, as illustrated in FIG. 53.

Figure 54:
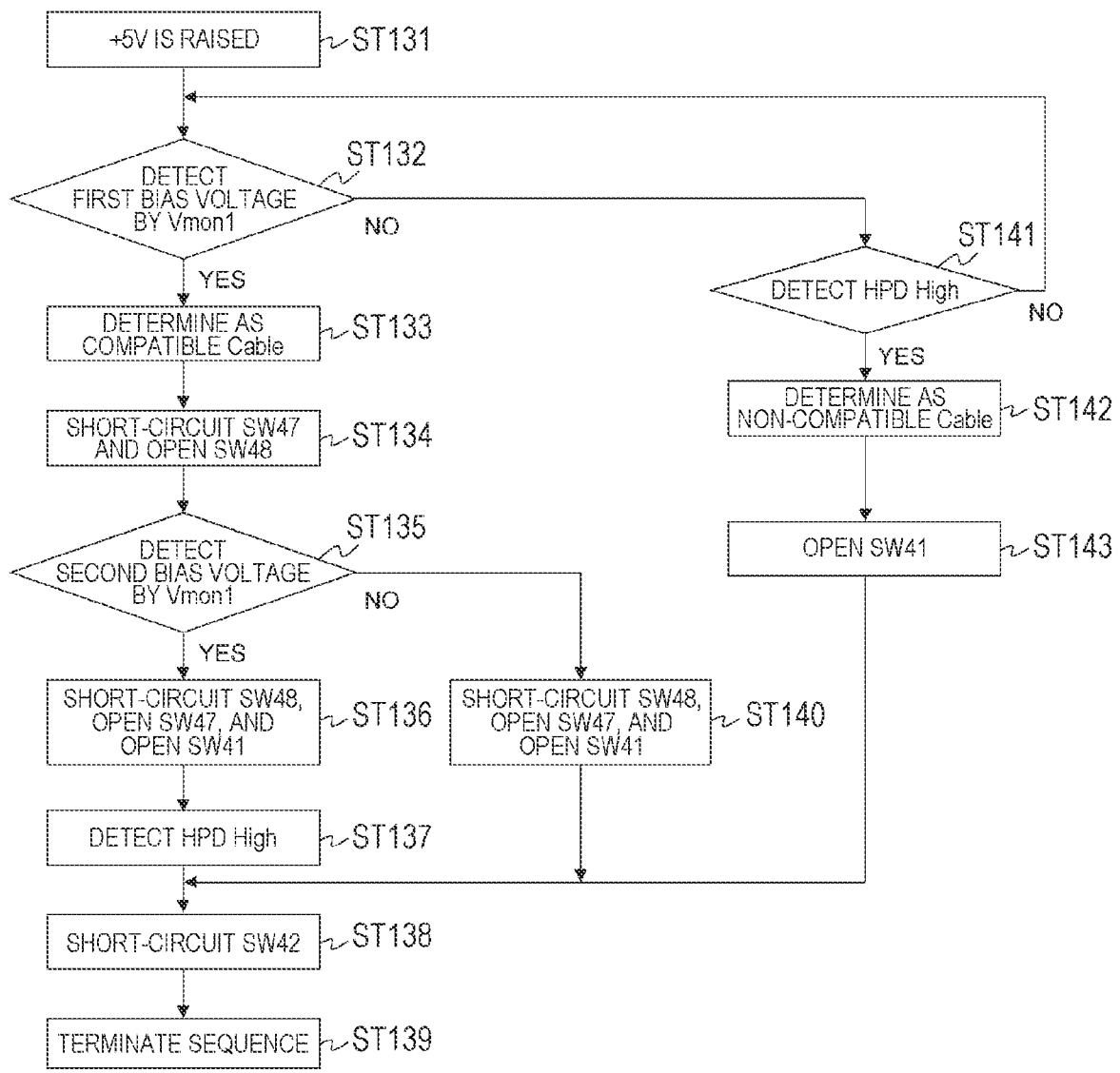
FIG. 54 is a diagram illustrating an example of a sequence of the compatible source device included in the transmission system in FIG. 49.

FIG. 54 illustrates an example of a sequence of the source device 110-6 that is a compatible source device. In step ST131, for example, when a power switch is turned on and +5 V is raised, the sequence is started, and the procedure proceeds to step ST132. In step ST132, the control unit 111 determines whether a first bias voltage (4 V) is detected by the voltage monitoring unit 112.

When the first bias voltage (4 V) is detected, the control unit 111 determines in step ST133 that the HDMI cable that is a compatible cable is connected. Then, in step ST134, the control unit 111 changes the open state of the switch SW47 to the short-circuit state, and thereafter, changes the short-circuit state of the switch SW48 to the open state.

Next, in step ST135, the control unit 111 determines whether a second bias voltage (2 V) is detected by the voltage monitoring unit 112. When the second bias voltage (2 V) is detected, the control unit 111 determines that the relay such as the repeater that isolates the +5 V power line does not intervene between the HDMI cable and the control unit 111, and the procedure proceeds to step ST136. In step ST136, the control unit 111 changes the open state of the switch SW48 to the short-circuit state, changes the short-circuit state of the switch SW47 to the open state, and further changes the short-circuit state of the switch SW41 to the open state.

Next, when the control unit 111 detects in step ST137 that the HPD line becomes a high level (5 V), the control unit 111 changes the state of the switch SW42 from the open state to the short-circuit state in step ST138. Then, in step ST139, the sequence is terminated.

Furthermore, when the second bias voltage (2 V) is not detected in step ST135, the control unit 111 determines that the relay such as the repeater that isolates the +5 V power line intervenes between the HDMI cable and the control unit 111, and the procedure proceeds to step ST140. In step ST140, the control unit 111 changes the open state of the switch SW48 to the short-circuit state, changes the short-circuit state of the switch SW47 to the open state, and further changes the short-circuit state of the switch SW41 to the open state. Then, in step ST138, the control unit 111 changes the open state of the switch SW42 to the short-circuit state. Then, in step ST139, the sequence is terminated.

Furthermore, when the first bias voltage (4 V) is not detected in step ST132, the control unit 111 determines in step ST141 whether or not the high level (5 V) of the HPD line is detected. When the high level (5 V) of the HPD line is not detected, the procedure returns to step ST132. Meanwhile, when the high level (5 V) of the HPD line is detected, the control unit 111 determines in step ST142 that the HDMI cable that is a non-compatible cable is connected.

Then, in step ST143, the state of the switch SW41 is changed from the short-circuit state to the open state. Next, in step ST138, the control unit 111 changes the state of the switch SW42 from the open state to the short-circuit state. Then, in step ST139, the sequence is terminated.

Figure 55:
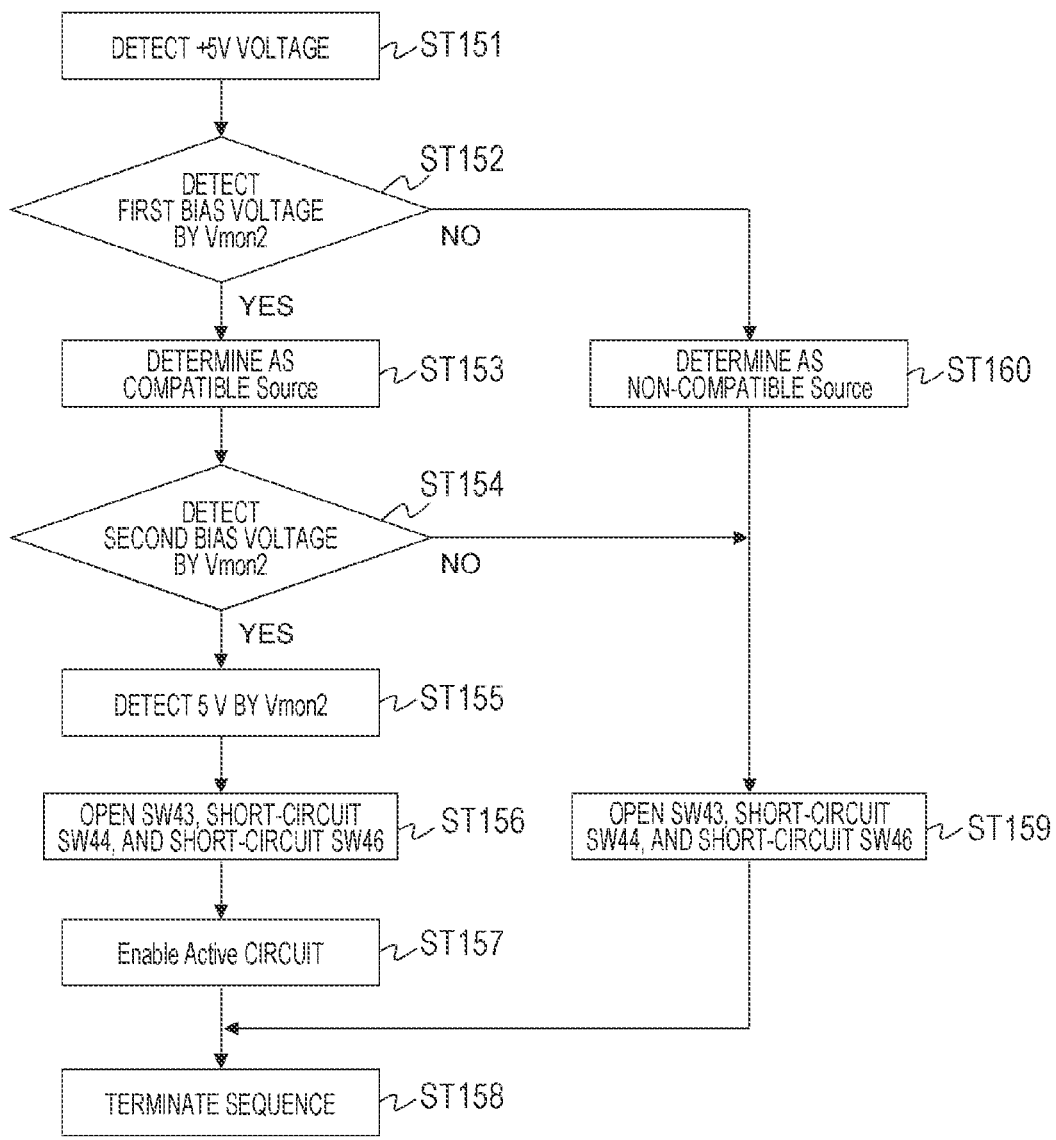
FIG. 55 is a diagram illustrating an example of a sequence of a compatible HDMI cable included in the transmission system in FIG. 49.

FIG. 55 illustrates an example of a sequence of the HDMI cable 130-6 that is a compatible cable. When a voltage of 5 V is detected by the voltage monitoring unit 134 in step ST151, the sequence is started, and the procedure proceeds to step ST152. In step ST152, the control unit 132 determines whether the first bias voltage (4 V) is detected by the voltage monitoring unit 133.

When the first bias voltage (4 V) is detected, the control unit 132 determines in step ST153 that the source device that is a compatible source device is connected. Then, in step ST154, the control unit 132 determines whether the second bias voltage (2 V) is detected by the voltage monitoring unit 133.

When the second bias voltage (2 V) is detected, the control unit 132 determines that the relay such as the repeater that isolates the +5 V power line does not intervene between the source device and the control unit 132, and the procedure proceeds to step ST155. When 5 V is detected by the voltage monitoring unit 133 in step ST155, the control unit 132 changes the short-circuit state of the switch SW43 to the open state, changes the open state of the switch SW44 to the short-circuit state, and further changes the open state of the switch SW46 to the short-circuit state in step ST156.

Next, in step ST157, the LDO regulators 332A and 332B are turned on, and the active circuit is set to be in the operation state (Enable). Thereafter, the sequence is terminated in step ST158.

Furthermore, when the second bias voltage (2 V) is not detected in step ST154, the control unit 132 determines that the relay such as the repeater that isolates the +5 V power line intervenes between the source device and the control unit 132, and the procedure proceeds to step ST159. In step ST159, the control unit 132 changes the short-circuit state of the switch SW43 to the open state, changes the open state of the switch SW44 to the short-circuit state, and further changes the open state of the switch SW46 to the short-circuit state. Then, in step ST158, the sequence is terminated.

Furthermore, when the first bias voltage (4 V) is not detected in step ST152, the control unit 132 determines in step ST160 that the source device that is a non-compatible source device is connected. Then, in step ST159, the control unit 132 changes the short-circuit state of the switch SW43 to the open state, changes the open state of the switch SW44 to the short-circuit state, and further changes the open state of the switch SW46 to the short-circuit state. Then, in step ST158, the sequence is terminated.

Note that the switches SW41, SW42, SW47, and SW48 of the source device 110-6 and the switches SW43, SW44, and SW46 of the HDMI cable 130-6 are reset to the initial states when the voltage of the +5 V power line drops.

Seventh Embodiment

Figure 56:
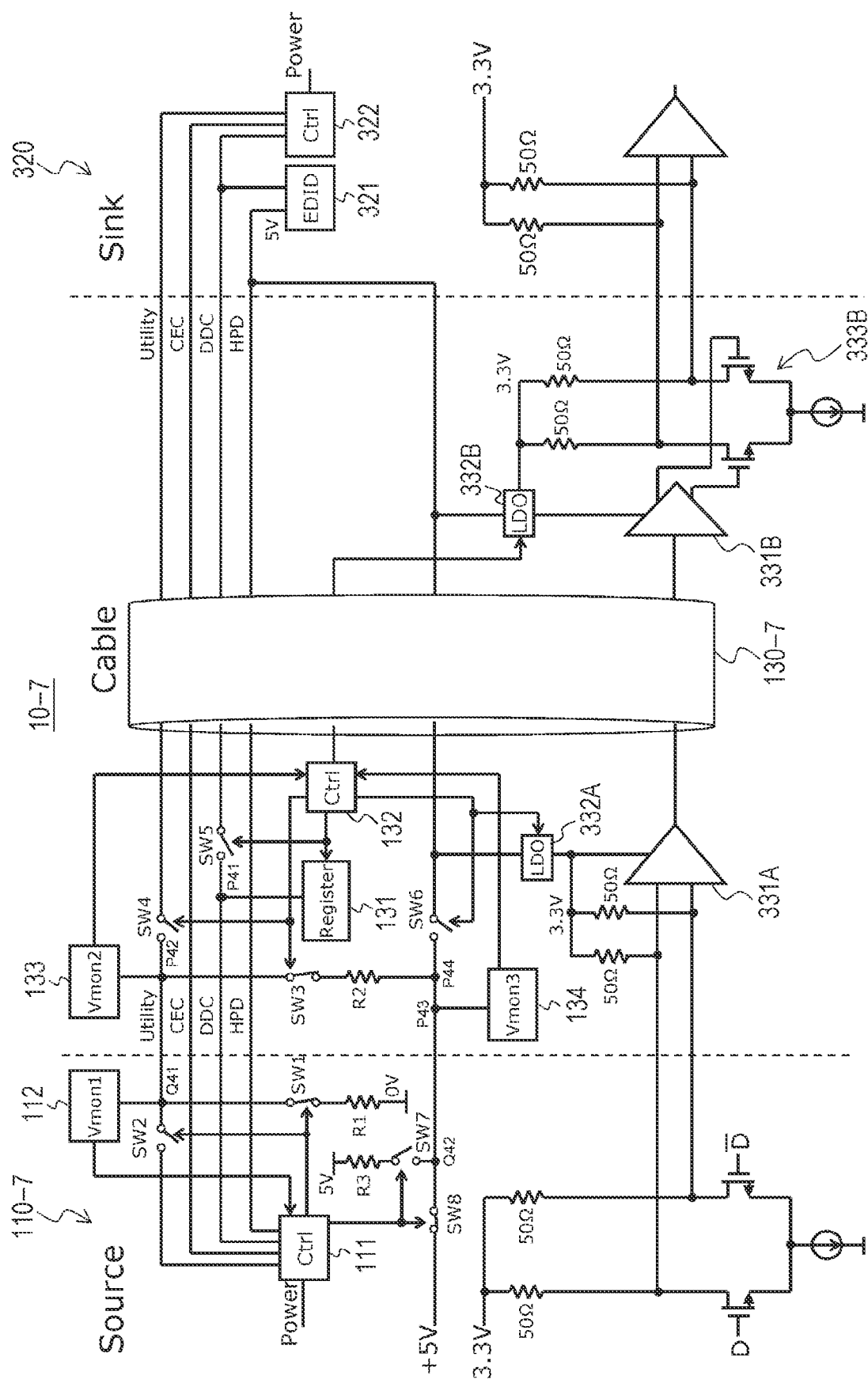
FIG. 56 is a diagram illustrating an exemplary configuration of a transmission system including the compatible source device that is compatible to intervening the repeater and a compatible HDMI cable (including register and current consumption unit).

FIG. 56 illustrates an exemplary configuration of a transmission system 10-7. The transmission system 10-7 is an HDMI transmission system using an HDMI as a digital interface. The transmission system 10-7 includes a source device 110-7 as a transmission device, a sink device 320 as a reception device, and an HDMI cable 130-7 that connects these devices.

The HDMI cable 130-6 in the transmission system 10-6 in FIG. 42 described above does not have a register. However, the HDMI cable 130-7 in the transmission system 10-7 in FIG. 56 includes a register 131 similar to that of the HDMI cable 130-1 in the transmission system 10-1 in FIG. 7 described above. In FIG. 56, a part corresponding to that in FIGS. 7 and 42 is denoted with the same reference numeral, and the detailed description thereof is appropriately omitted.

The HDMI cable 130-7 is a compatible cable. The HDMI cable 130-7 includes a control unit 132, voltage monitoring units 133 and 134, switches SW3, SW4, SW5, and SW6, and a voltage dividing resistor R2 in addition to AOC configuration circuits including conversion circuits 331A and 331B, LDO regulators 332A and 332B, a current driving unit 333B, and the like.

The source device 110-7 is a compatible source device. The source device 110-7 includes a voltage monitoring unit 112, switches SW1, SW2, SW7, and SW8, and voltage dividing resistors R1 and R3 in addition to a control unit 111 that controls an operation of each unit. It is desirable that the resistor R2 of the HDMI cable 130-7 described above and the resistors R1 and R3 of the source device 110-7 be each a large value to some extent so as to reduce current consumption. Hereinafter, the description will be made while assuming R1=400 kΩ, R2=100 kΩ, and R3=500 kΩ.

In the transmission system 10-7 illustrated in FIG. 56, the HDMI cable 130-7 is a compatible cable, and the source device 110-7 is a compatible source device. Therefore, the source device 110-7 determines that the connected HDMI cable is a compatible cable and operates in the compatible mode. Similarly, the HDMI cable 130-7 determines that the connected source device is a compatible source device and operates in the compatible mode.

Operations of the source device 110-7 and the HDMI cable 130-7 will be described. Although detailed description is omitted, the source device 110-7 and the HDMI cable 130-7 operate similarly to the source device 110-1 and the HDMI cable 130-1 in the transmission system 10-1 in FIG. 7 described above. After the control unit 111 of the source device 110-7 accesses (read/write) the register 131 of the HDMI cable 130-7, the source device 110-7 and the HDMI cable 130-7 each shift to a normal operation.

At the time of the access to the register 131, the control unit 111 of the source device 110-7 can write to the register 131 that the control unit 111 can draw a current equal to or higher than 55 mA. After shifting to a normal operation, the control unit 132 of the HDMI cable 130-7 can set an active circuit to be in an operation state (Enable) on the basis of information regarding the register 131 and draw the current equal to or higher than 55 mA from the +5 V power line.

That is, in a case of the transmission system 10-7 in FIG. 56, the source device 110-7 can notify the HDMI cable 130-7 via the register 131 that the source device 110-7 can draw the current equal to or higher than 55 mA.

Furthermore, although detailed description is omitted, the source device 110-7 and the HDMI cable 130-7 operate similarly to the source device 110-6 and the HDMI cable 130-6 in the transmission system 10-6 in FIG. 42, respectively. With this operation, the control unit 111 of the source device 110-7 recognizes whether or not a relay such as a repeater that isolates the +5 V power line intervenes between the compatible cable and the control unit 111. Similarly, the control unit 132 of the HDMI cable 130-7 recognizes whether or not the relay such as the repeater that isolates the +5 V power line intervenes between the compatible source device and the control unit 132.

As described above, after shifting to a normal operation, the control unit 132 of the HDMI cable 130-7 can set an active circuit to be in an operation state (Enable) on the basis of information regarding the register 131 and draw the current equal to or higher than 55 mA from the +5 V power line. However, in a case where it is recognized that the relay such as the repeater that isolates the +5 V power line intervenes between the control unit 132 and the compatible source device, by controlling the active circuit so as not to draw the current equal to or higher than 55 mA from the +5 V power line, it is possible to avoid that the intervened relay such as the repeater cannot withstand overcurrent and is broken.

In the transmission system 10-7 illustrated in FIG. 56, the switch SW5 is maintained to be in the open state until the access from the source device 110-7 to the register 131 of the HDMI cable 130-7 is terminated. Therefore, the access information of the register 131 is not transmitted to the sink device 320 through the DDC line, and it is possible to avoid the malfunction of the sink device 320 of which the address is not defined.

Furthermore, in the transmission system 10-7 illustrated in FIG. 56, the state of the switch SW5 is changed to the short-circuit state after the access from the source device 110-7 to the register 131 of the HDMI cable 130-7 is terminated, and thereafter, the state of the switch SW6 is changed to the short-circuit state. Therefore, since a communication signal is transmitted from the source device 110-7 to the sink device 320 through the DDC line after the connection detection signal is transmitted from the sink device 320 to the source device 110-7, it is possible to avoid preventing the communication signal.

Furthermore, in the transmission system 10-7 illustrated in FIG. 56, the control unit 132 of the HDMI cable 130-7 performs control for turning on the LDO regulators 332A and 332B and drawing the current equal to or higher than 55 mA from the +5 V power line on the basis of information given in notification from the source device 110-7 through the register 131 that the control unit 132 can draw the current equal to or higher than 55 mA. Therefore, the active circuit of the HDMI cable 130-7 can perform an appropriate operation. Furthermore, it is possible to avoid that the source device cannot withstand overcurrent and is broken.

Furthermore, in the transmission system 10-7 illustrated in FIG. 56, in a case where the relay such as the repeater that isolates the +5 V power line intervenes between the source device 110-7 and the HDMI cable 130-7, it is possible to recognize the relay and control the active circuit of the HDMI cable 130-7 so as not to draw the current equal to or higher than 55 mA from the +5 V power line, and it is possible to avoid that the relay cannot withstand overcurrent and is broken.

Note that, in the transmission system 10-6 in FIG. 42 and the like, by providing a configuration for applying a voltage of 5 V to the point Q42 of the +5 V power line via the series circuit including the resistor R3 and the switch SW47, a second voltage (2 V) is generated. However, a configuration can be considered in which a 5 V potential is directly changed to generate the second voltage (2 V) without providing the resistor R3.

Eighth Embodiment

Figure 57:
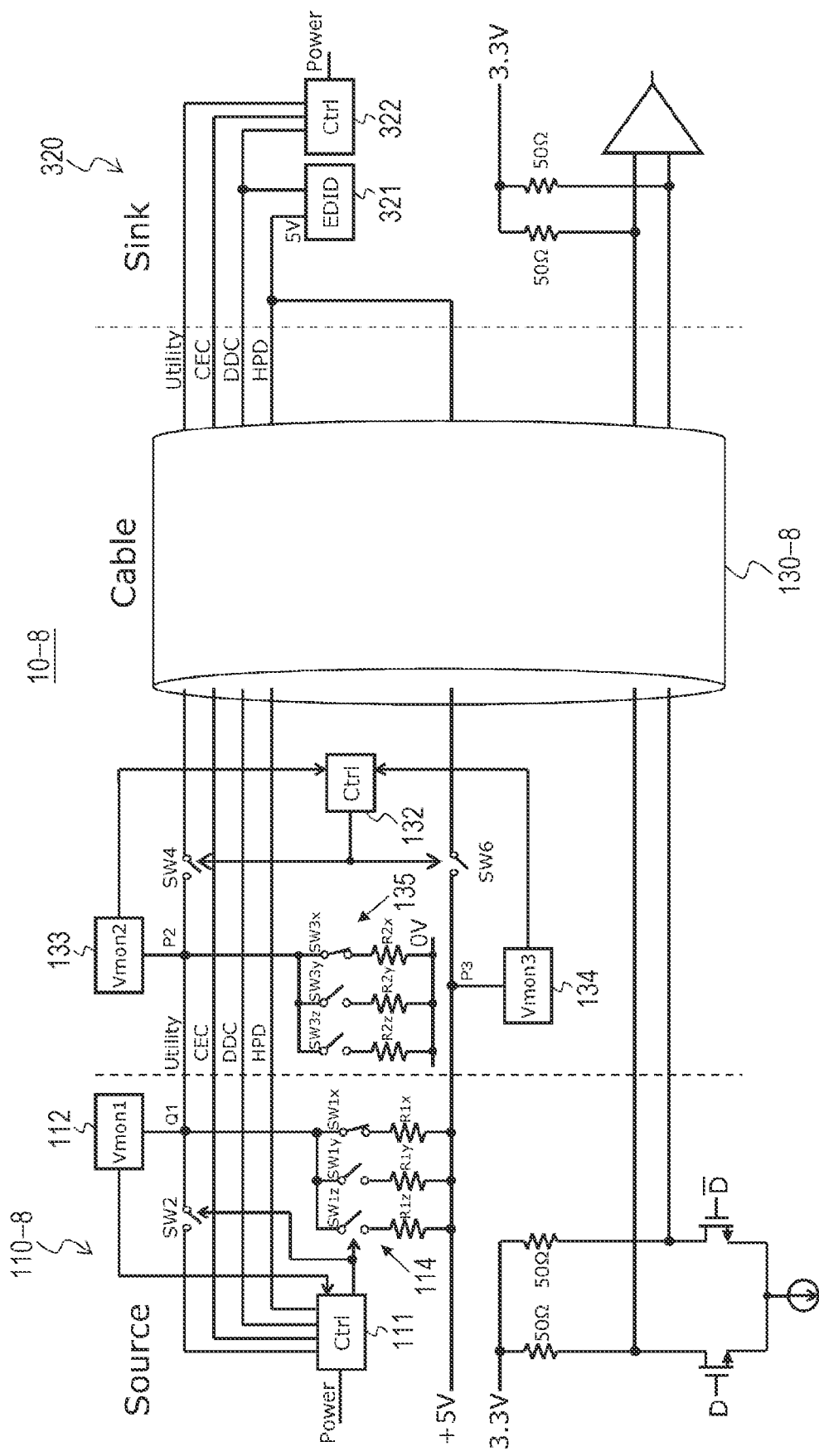
FIG. 57 is a diagram illustrating an exemplary configuration of a transmission system including a compatible source device that includes a variable resistance circuit and the compatible HDMI cable.

FIG. 57 illustrates an exemplary configuration of a transmission system 10-8. The transmission system 10-8 is an HDMI transmission system using an HDMI as a digital interface. The transmission system 10-8 includes a source device 110-8 as a transmission device, a sink device 320 as a reception device, and an HDMI cable 130-8 that connects these devices. In FIG. 57, a part corresponding to that in FIG. 7 is denoted with the same reference numeral, and the detailed description thereof is appropriately omitted.

The transmission system 10-1 in FIG. 7 can exchange information such as a cable ID, a circuit characteristic adjustment parameter, an amount of current consumed by a cable, a transmittable data rate, and the like between the source device 110-1 and the cable 130-1 by reading and writing the register 131 prepared in the cable 130-1 by the source device 110-1 by using an inter-integrated circuit (I2C) of the DDC line.

In contrast, the transmission system 10-8 changes a bias voltage of the Utility line by changing a resistance value of a variable resistance circuit so to as exchange various information between the source device 110-8 and the HDMI cable 130-8, and it is not necessary to provide a register on the DDC line. Therefore, the access information of the register is not transmitted to the sink device 320 through the DDC line, and the sink device 320 of which an address is not defined does not cause a malfunction.

The HDMI cable 130-8 is a compatible cable. The HDMI cable 130-8 includes a control unit 132, voltage monitoring units 133 and 134, switches SW4 and SW6, and a variable resistance circuit 135. The switch SW4 is inserted at a point closer to the sink device 320 than a point P2 of the Utility line. Furthermore, the switch SW6 is inserted at a point closer to the sink device 320 than a point P3 of the +5 V power line.

The voltage monitoring unit 133 monitors a voltage at the point P2 of the Utility line and sends the monitoring result to the control unit 132. The voltage monitoring unit 134 monitors a voltage at the point P3 of the +5 V power line and sends the monitoring result to the control unit 132. The control unit 132 controls an operation of each unit of the HDMI cable 130-8.

The variable resistance circuit 135 is connected between the point P2 of the Utility line and the ground (0 V). The variable resistance circuit 135 has a configuration in which a predetermined number of series circuits including a resistor and a switch are connected in parallel. In the illustrated example, a series circuit including a resistor R2$x$ and a switch SW3$x$, a series circuit including a resistor R2$y$ and a switch SW3$y$, and a series circuit including a resistor R2$z$ and a switch SW3$z$ are connected in parallel.

The source device 110-8 is a compatible source device. The source device 110-8 includes a voltage monitoring unit 112, a switch SW2, a variable resistance circuit 114 in addition to a control unit 111 that controls an operation of each unit. The switch SW2 is inserted on the inner side of a point Q1 of the Utility line. The voltage monitoring unit 112 monitors a voltage at a point Q2 of the Utility line and sends the monitoring result to the control unit 111.

The variable resistance circuit 114 is connected between the +5 V power line and the point Q1 of the Utility line. The variable resistance circuit 114 has a configuration in which a predetermined number of series circuits including a resistor and a switch are connected in parallel. In the illustrated example, a series circuit including a resistor R1$x$ and a switch SW1$x$, a series circuit including a resistor R1$y$ and a switch SW1$y$, and a series circuit including a resistor R1$z$ and a switch SW1$z$ are connected in parallel.

It is desirable that the resistors R2$x$ R2$y$, and R2$z$ of the HDMI cable 130-8 and the resistors R1$x$, R1$y$, and R1$z$ of the source device 110-8 be each a large value to some extent so as to reduce current consumption. Although not limited to the values indicated below, the following description will be made as assuming that R1$x$=100 kΩ, R1$y$=200 kΩ, R1$z$=300 kΩ, R2$x$=400 kΩ, R2$y$=500 kΩ, and R2$z$=600 kΩ.

In the transmission system 10-8 illustrated in FIG. 57, the HDMI cable 130-8 is a compatible cable, and the source device 110-8 is a compatible source device. Therefore, the source device 110-8 determines that the connected HDMI cable is a compatible cable and operates in the compatible mode. Similarly, the HDMI cable 130-8 determines that the connected source device is a compatible source device and operates in the compatible mode.

Operations of the source device 110-8 and the HDMI cable 130-8 will be described in detail. In FIG. 57, initial states of the source device 110-8 and the HDMI cable 130-8 are illustrated. In the initial state of the source device 110-8, the switch SW1$x$ is in a short-circuit state, and the switches SW1$y$, SW1$z$, and SW2 are in an open state. Meanwhile, in the initial state of the HDMI cable 130-8, the switch SW3$x$ is in a short-circuit state, and the switches SW3$y$, SW3$z$, SW4, and SW6 are in an open state.

Since the switches SW1$x$ and SW3$x$ are in the short-circuit state in the initial state, the resistors R1$x$ and R2$x$ are connected in series between the +5 V power line of the source device 110-8 and the ground (0 V) of the HDMI cable 130-8, and a voltage of 4 V (bias voltage) is obtained at the points Q1 and P2 of the Utility line by resistance voltage division.

The voltage monitoring unit 112 of the source device 110-8 monitors that the voltage at the point Q1 is 4 V and sends the monitoring result to the control unit 111. The control unit 111 determines that the connected HDMI cable is the compatible cable on the basis of the monitoring result and controls the HDMI cable to operate in the compatible mode.

Similarly, the voltage monitoring unit 133 of the HDMI cable 130-8 monitors that the voltage at the point P2 is 4 V and sends the monitoring result to the control unit 132. The control unit 132 determines that the connected source device is the compatible source device on the basis of the monitoring result and controls the source device to operate in the compatible mode.

Here, since the switch SW2 is in the open state in the source device 110-8, the voltage of 4 V is not propagated in the source device 110-8 and does not affect the inside of the source device 110-8. Similarly, since the switch SW4 is in the open state in the HDMI cable 130-8, the voltage of 4 V is not propagated to the sink device 320 and does not affect the sink device 320.

The source device 110-8 and the HDMI cable 130-8 each start to operate in the compatible modes, and information is exchanged between the source device 110-8 and the HDMI cable 130-8 first. In this case, the source device 110-8 can transmit various information to the HDMI cable 130-8 by changing the resistance value of the variable resistance circuit 114 and changing the bias voltage of the Utility line. On the side of the HDMI cable 130-8, the monitoring result of the bias voltage at the point P2 of the Utility line is supplied from the voltage monitoring unit 133 to the control unit 132. The control unit 132 refers to a table indicating a correspondence relationship between a bias voltage value and the information and understands and acquires transmission information from the source device 110-8.

Furthermore, in this case, the HDMI cable 130-8 can transmit various information to the source device 110-8 by changing the resistance value of the variable resistance circuit 135 and changing the bias voltage of the Utility line. On the side of the source device 110-8, the monitoring result of the bias voltage at the point Q1 of the Utility line is supplied from the voltage monitoring unit 112 to the control unit 111. The control unit 111 refers to the table indicating a correspondence relationship between a bias voltage value and the information and understands and acquires transmission information from the HDMI cable 130-8.

Figure 58:
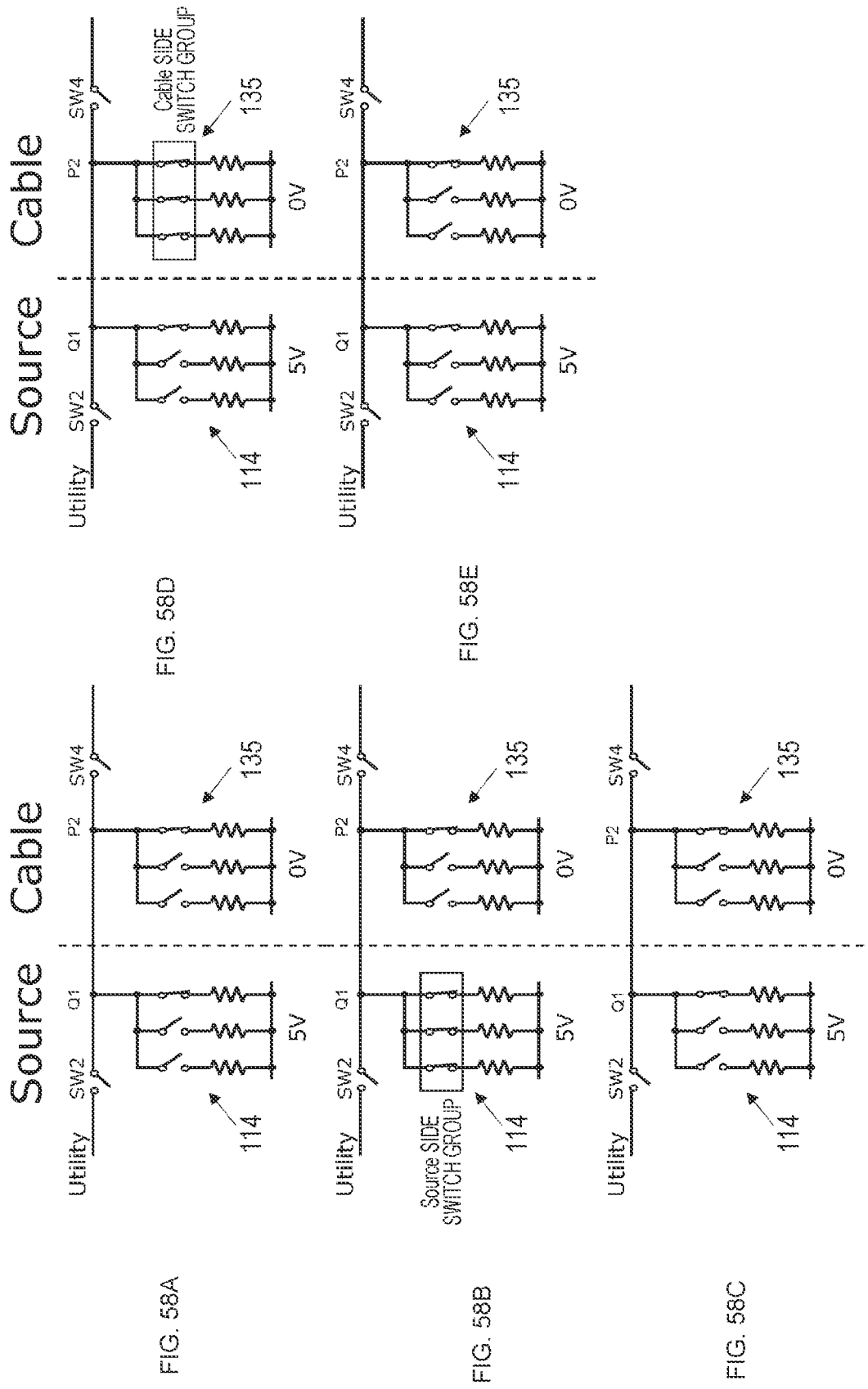
FIGS. 58A, 58B, 58C, 58D, and 58E are diagrams for explaining an example of an operation of the variable resistance circuit at the time of information transmission and reception between the source device and the HDMI cable.

FIGS. 58A, 58B, 58C, 58D, and 58E illustrate an example of operations of the variable resistance circuits 114 and 135 at the time when information is exchanged between the source device 110-8 and the HDMI cable 130-8. FIG. 58A illustrates the same initial state as in FIG. 57. When it is determined that both of the source device 110-8 and the HDMI cable 130-8 are compatible devices, first, the source device 110-8 switches a switch group of the variable resistance circuit 114 as illustrated in FIG. 58B, and changes the bias voltage generated by resistance voltage division so as to transmit information to the HDMI cable 130-8. When the transmission of information to the HDMI cable 130-8 is terminated, the source device 110-8 shifts the switch group of the variable resistance circuit 114 to an initial switch state (refer to FIG. 58A) as illustrated in FIG. 58C and notifies the HDMI cable 130-8 that the transmission of the information is terminated.

Thereafter, as illustrated in FIG. 58D, by switching the switch group of the variable resistance circuit 135 and changing the bias voltage generated by resistance voltage division, the HDMI cable 130-8 transmits information to the source device 110-8. When the transmission of information to the source device 110-8 is terminated, the HDMI cable 130-8 shifts the switch group of the variable resistance circuit 135 to an initial switch state (refer to FIG. 58A) as illustrated in FIG. 58E and notifies the source device 110-8 that the transmission of the information is terminated.

Note that, in the transmission system 10-8 in FIG. 57, an example is illustrated in in which three resistors are arranged in parallel in each of the variable resistance circuit 114 of the source device 110-8 and the variable resistance circuit 135 of the HDMI cable 130-8. However, the number of resistors arranged in parallel is not limited to three.

Figures 59, 60:
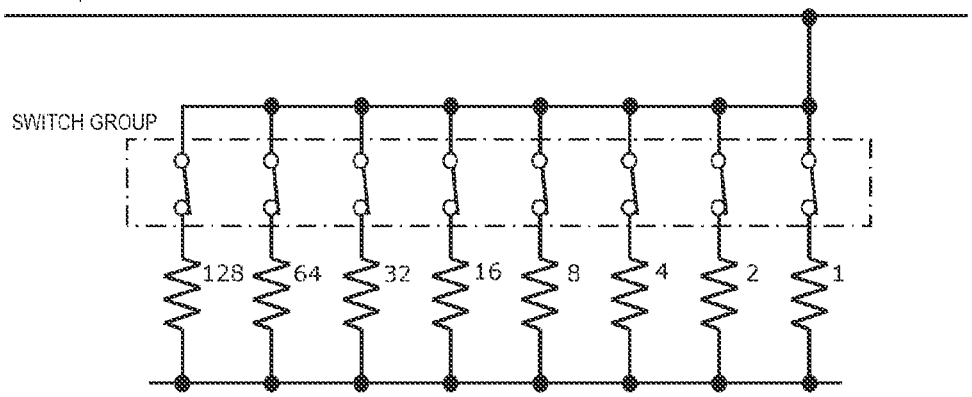
FIG. 59 is a diagram illustrating another exemplary configuration of the variable resistance circuit.
FIG. 60 is a diagram illustrating an example of an information table shared by the source device and the HDMI cable.

For example, as illustrated in FIG. 59, by arranging eight weighted resistors in parallel, 256 gradations can be expressed. In this case, it is assumed that the source device 110-8 and the HDMI cable 130-8 have, for example, a table illustrated in FIG. 60 in common. Then, in this case, for example, when the source device 110-8 transmits information to the HDMI cable 130-8, by generating a voltage of a determined code in the table, the HDMI cable 130-8 can detect that the source device 110-8 supports the information with the code. However, in a case of the above implementation example, two gradations are already used.

A gradation 0 in which all the switches are opened is a condition for shifting to the next sequence. Furthermore, a certain gradation is used in an initial state of a negotiation. Since these two gradations cannot be used for information transmission, in a case where 256 gradations are prepared, 254 gradations can be freely used. In a case of an example in FIG. 60, in a case where it is desired to transmit a source version from the source device 110-8 to the HDMI cable 130-8, the source version can be transmitted by expressing any voltage of gradations 2 and 3. As a method for switching the gradation, the gradation may be continuously switched to a target gradation, and the source device 110-8 and the HDMI cable 130-8 may recognize that the gradation is shifted to a next gradation by certainly returning to a predetermined gradation once.

Furthermore, in the transmission system 10-8 in FIG. 57, an example is illustrated in which three resistors are arranged in parallel in each of the variable resistance circuit 114 of the source device 110-8 and the variable resistance circuit 135 of the HDMI cable 130-8, and the resistance value is changed by switching the short-circuit state and the open state of each switch in the switch group. However, it is considered to configure each of the variable resistance circuits 114 and 135 by using a single resistor element (variable resistance element) that may change the resistance value.

Figure 61:
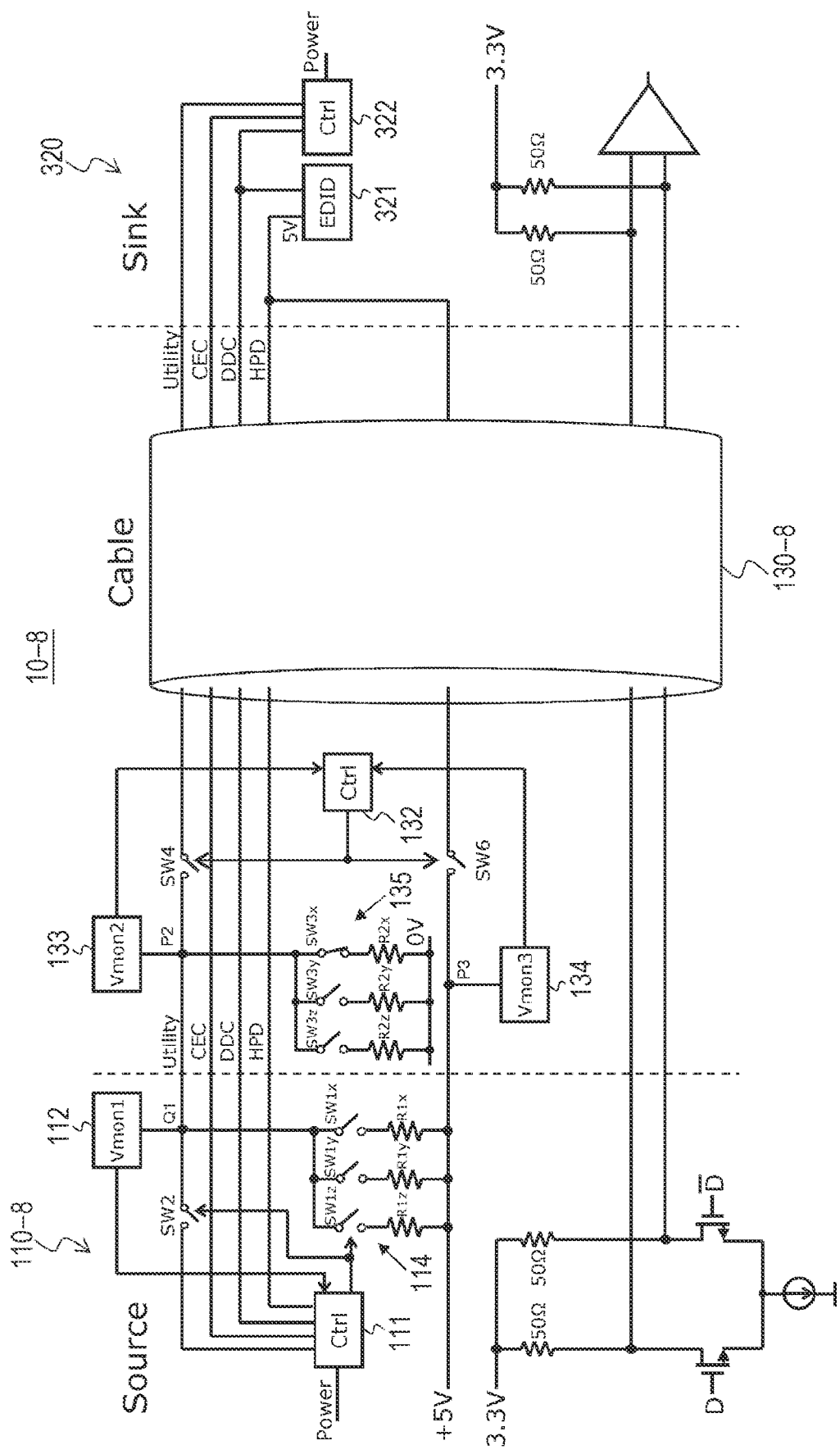
FIG. 61 is a diagram for explaining an operation of the transmission system in FIG. 57.

When the exchange of the information between the source device 110-8 and the HDMI cable 130-8 is terminated, as illustrated in FIG. 61, the control unit 111 of the source device 110-8 opens all switches in a switch SW1 group. Therefore, the voltage at the point P2 of the Utility line is 0 V. In the HDMI cable 130-8, the voltage monitoring unit 133 monitors that the voltage at the point P2 is 0 V and sends the monitoring result to the control unit 132.

Figure 62:
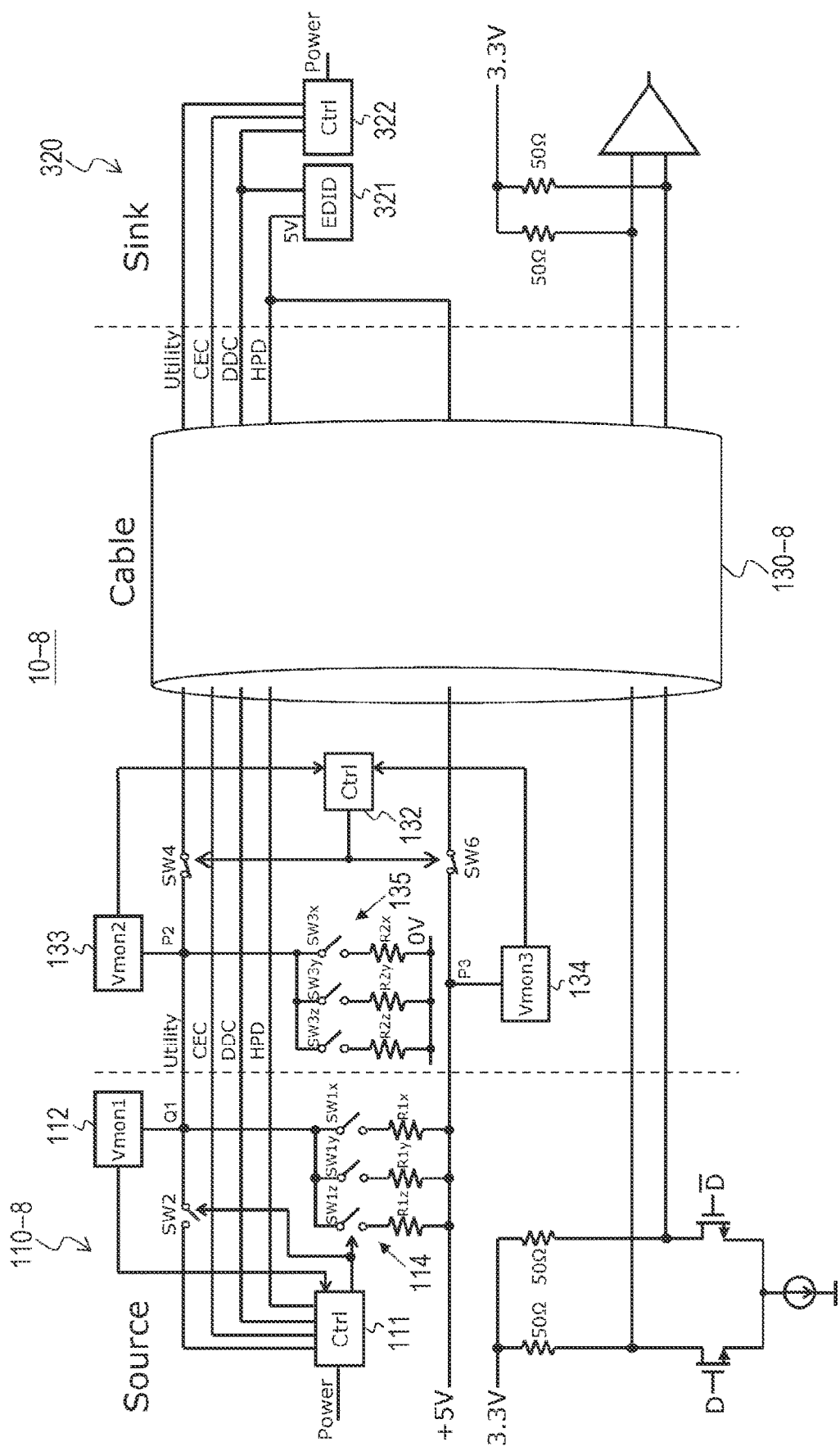
FIG. 62 is a diagram for explaining the operation of the transmission system in FIG. 57.

The control unit 132 determines that the exchange of the information is terminated on the basis of the monitoring result and changes the states of the switch SW3 group and the switches SW4 and SW6 as illustrated in FIG. 62 and shifts to a normal operation. In this case, not to affect the sink device 320, first, all the switches in the switch SW3 group are opened, next, the switch SW4 is short-circuited, and finally, the switch SW6 is short-circuited.

Figure 63:
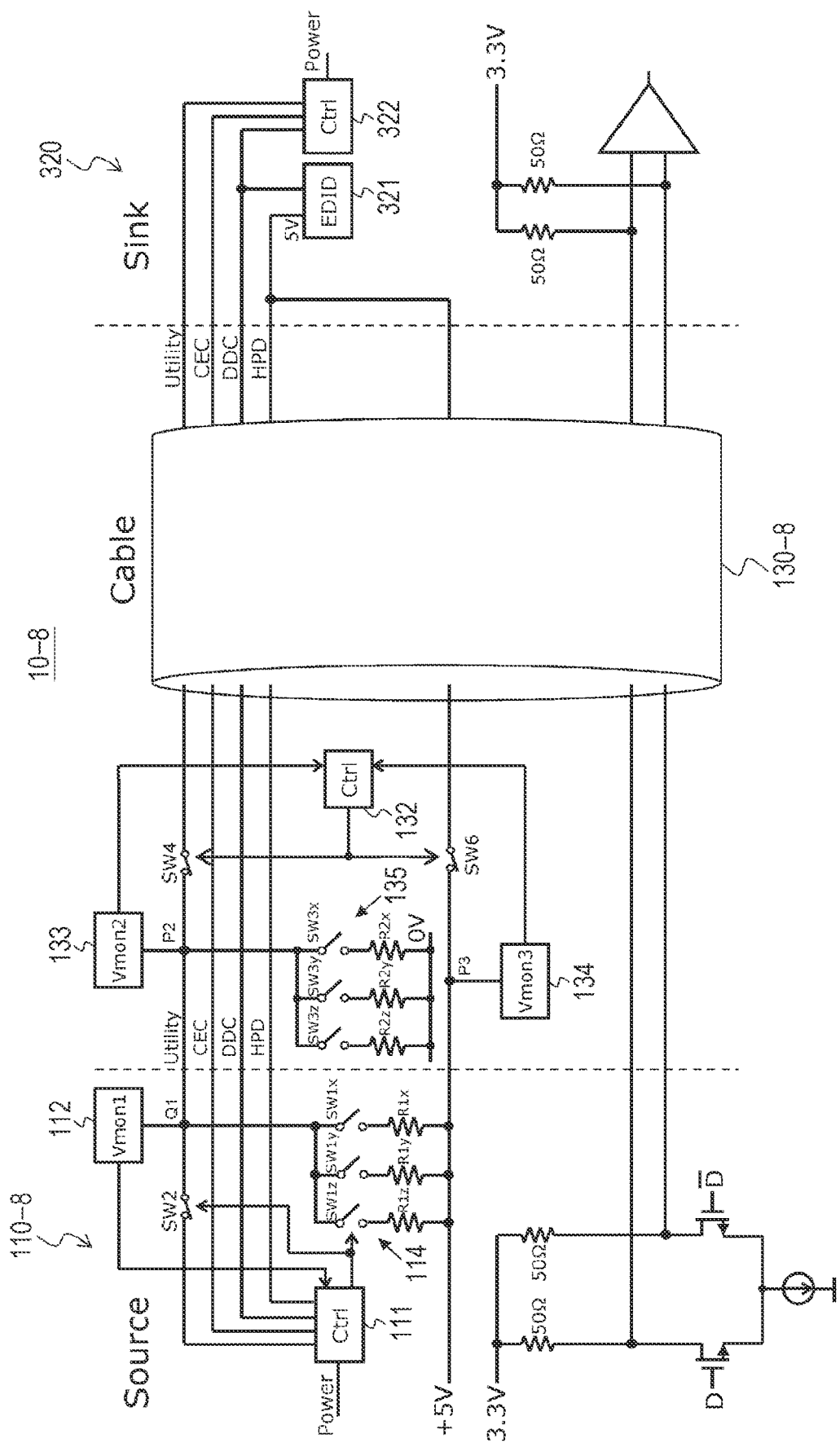
FIG. 63 is a diagram for explaining the operation of the transmission system in FIG. 57.

By short-circuiting the switch SW6, a 5 V voltage is sent from the source device 110-8 to the sink device 320 through the +5 V power line, and accordingly, a 5 V voltage (connection detection signal) is sent from the sink device 320 to the source device 110-8 via the HPD line. With this operation, the control unit 111 of the source device 110-8 recognizes that the preparation of the cable is completed, and short-circuits the switch SW2 and shifts to the normal operation, as illustrated in FIG. 63.

In this way, the transmission system 10-8 illustrated in FIG. 57 exchanges various information between the source device 110-8 and the HDMI cable 130-8 by changing the resistance values of the variable resistance circuits 114 and 135 and changing the bias voltage of the Utility line. It is not necessary to provide the register on the DDC line. Therefore, the access information of the register is not transmitted to the sink device 320 through the DDC line, and the sink device 320 of which the address is not defined does not cause a malfunction.

Figure 64:
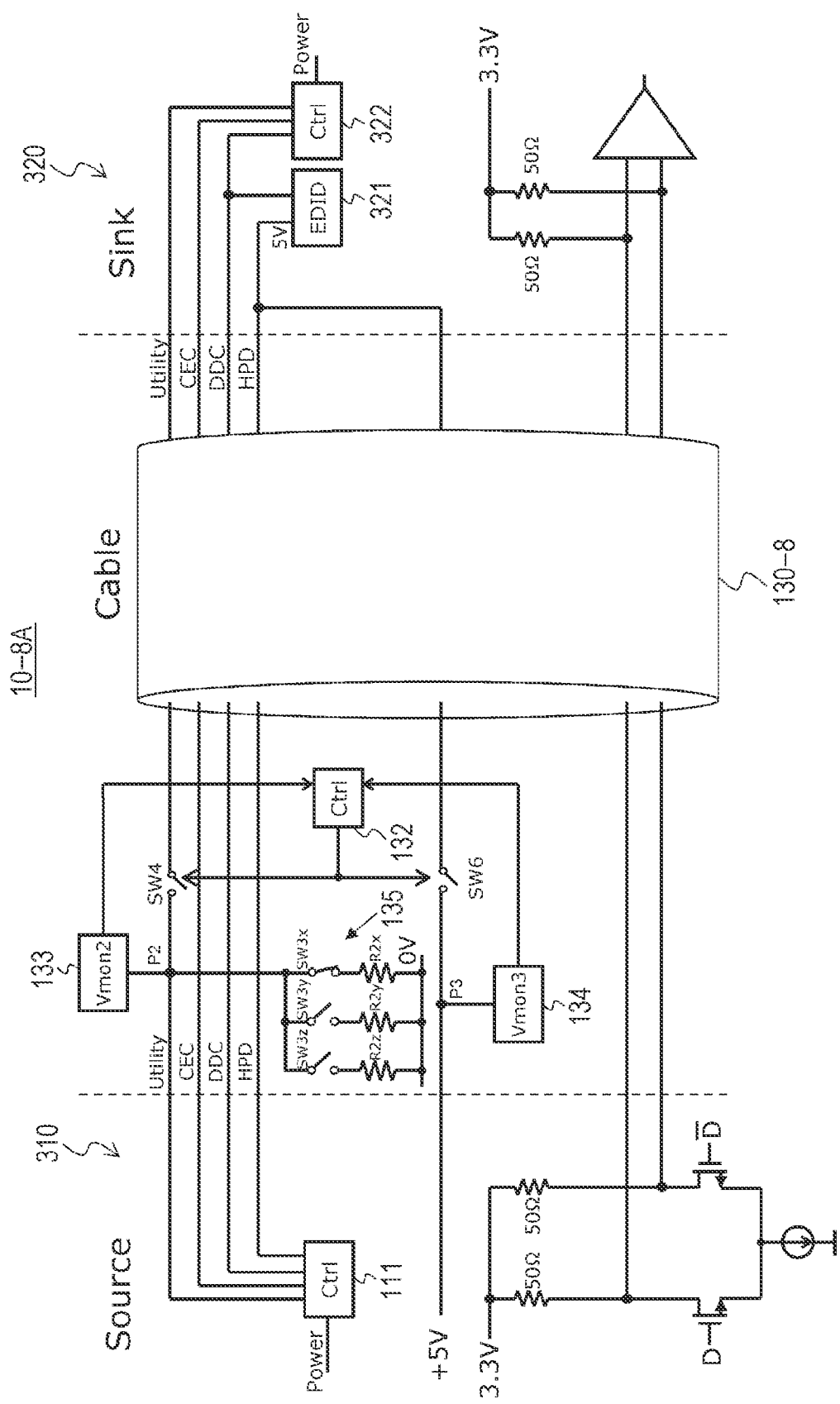
FIG. 64 is a diagram illustrating an exemplary configuration of a transmission system including the non-compatible source device and a compatible HDMI cable that includes the variable resistance circuit.

FIG. 64 illustrates an exemplary configuration of a transmission system 10-8A. The transmission system 10-8A is an HDMI transmission system using an HDMI as a digital interface. The transmission system 10-8A includes the source device 310 as a transmission device, the sink device 320 as a reception device, and the HDMI cable 130-8 that connects these devices. In FIG. 64, a part corresponding to that in FIGS. 1 and 57 is denoted with the same reference numeral, and the detailed description thereof is appropriately omitted.

In the transmission system 10-8A, the source device 310 is a non-compatible source device such as a legacy, and the HDMI cable 130-8 is a compatible cable. In this case, the source device 310 performs a normal operation (refer to FIGS. 6A and 6B).

Furthermore, the HDMI cable 130-8 determines that the source device is a non-compatible source device and operates in the non-compatible mode. In this case, in the initial state, the voltage at the point P2 of the Utility line is 0 V. The voltage monitoring unit 133 of the HDMI cable 130-8 monitors that the voltage at the point P2 is 0 V and sends the monitoring result to the control unit 132. The control unit 132 determines that the source device is a non-compatible source device on the basis of the monitoring result and the fact that the +5 V power line is at a high level (5 V) and performs control to operate in the non-compatible mode.

In this case, the control unit 132 changes the state of each switch and shifts to the normal operation. In this case, not to affect the sink device 320, first, all the switches in the switch SW3 group are opened, next, the switch SW4 is short-circuited, and finally, the switch SW6 is short-circuited (refer to FIG. 63).

Figure 65:
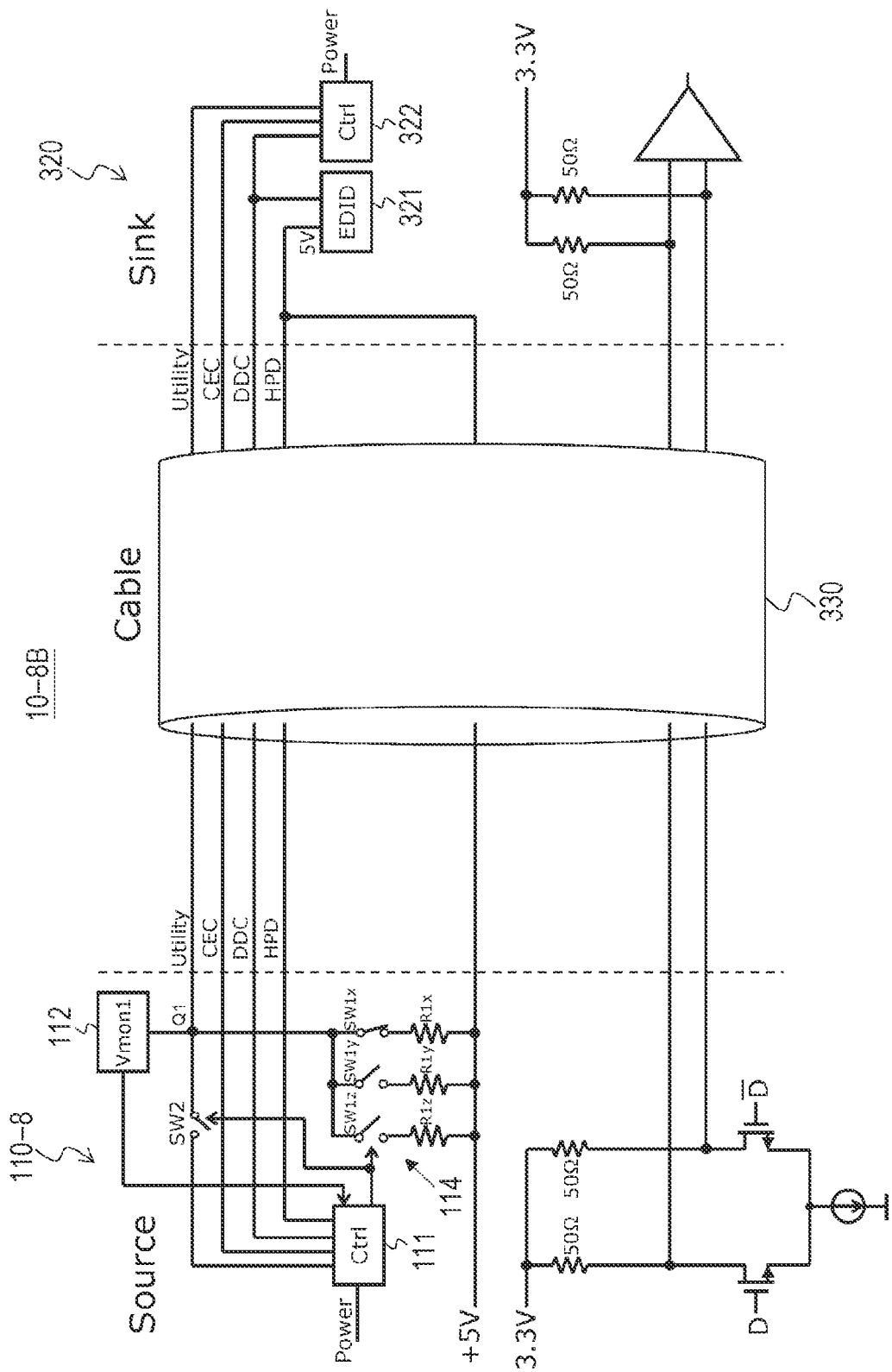
FIG. 65 is a diagram illustrating an exemplary configuration of a transmission system including a compatible source device that includes a variable resistance circuit and the non-compatible HDMI cable.

FIG. 65 illustrates an exemplary configuration of a transmission system 10-8B. The transmission system 10-8B is an HDMI transmission system using an HDMI as a digital interface. The transmission system 10-8B includes the source device 110-8 as a transmission device, the sink device 320 as a reception device, and the HDMI cable 330 that connects these devices. In FIG. 65, a part corresponding to that in FIGS. 1 and 57 is denoted with the same reference numeral, and the detailed description thereof is appropriately omitted.

In the transmission system 10-8B, the source device 110-8 is a compatible source device, and the HDMI cable 330 is a non-compatible cable such as a legacy. In this case, the HDMI cable 330 performs the normal operation (refer to FIGS. 6A and 6B).

The source device 110-8 determines that the HDMI cable is a non-compatible cable and operates in the non-compatible mode. In this case, in the initial state, the voltage at the point Q1 of the Utility line is 5 V. The voltage monitoring unit 112 of the source device 110-8 monitors that the voltage at the point Q1 is 5 V and sends the monitoring result to the control unit 111. The control unit 111 determines that the HDMI cable is a non-compatible cable on the basis of the monitoring result and the fact that the HPD line is at a high level (5 V) and performs control to operate in the non-compatible mode.

In this case, the control unit 111 changes the state of each switch and shifts to the normal operation. In this case, not to affect the inside of the source device 110-8, first, all switches in the switch SW1 group are opened, and next, the switch SW2 is short-circuited (refer to FIG. 63).

Figure 66:
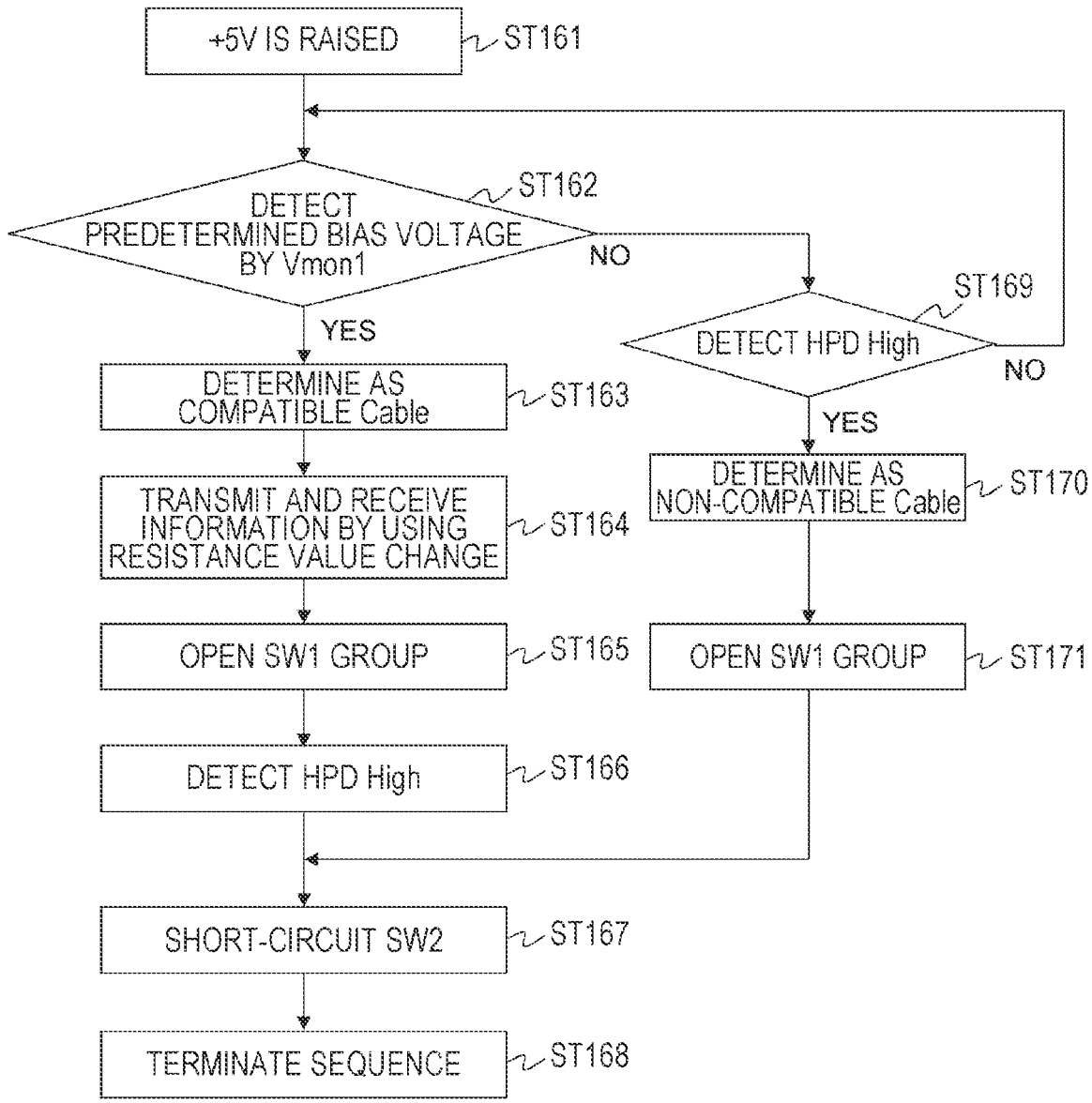
FIG. 66 is a diagram illustrating an example of a sequence of the compatible source device included in the transmission system in FIG. 57.

FIG. 66 illustrates an example of a sequence of the source device 110-8 that is a compatible source device. In step ST161, for example, when a power switch is turned on and +5 V is raised, the sequence is started, and the procedure proceeds to step ST162. In step ST162, the control unit 111 determines whether a predetermined bias voltage (4 V) is detected by the voltage monitoring unit 112.

When the predetermined bias voltage (4 V) is detected, the control unit 111 determines in step ST163 that the HDMI cable is a compatible cable. Then, in step ST164, the information is exchanged with the HDMI cable using a change in the resistance value.

Next, in step ST165, after the exchange of the information is terminated, the control unit 111 opens all the switches in the switch SW1 group. Thereafter, when the control unit 111 detects in step ST166 that the HPD line becomes a high level (5 V), the control unit 111 changes the state of the switch SW2 from the open state to the short-circuit state in step ST167. Then, in step ST168, the sequence is terminated.

Furthermore, when the predetermined bias voltage (4 V) is not detected in step ST162, the control unit 111 determines in step ST169 whether or not the high level (5 V) of the HPD line is detected. When the high level (5 V) of the HPD line is not detected, the procedure returns to step ST162. Meanwhile, when the high level (5 V) of the HPD line is detected, the control unit 111 determines in step ST170 that the HDMI cable is a non-compatible cable.

Then, in step ST171, all the switches in the switch SW1 group are opened. Next, in step ST167, the control unit 111 changes the state of the switch SW2 from the open state to the short-circuit state. Then, in step ST168, the sequence is terminated.

Figure 67:
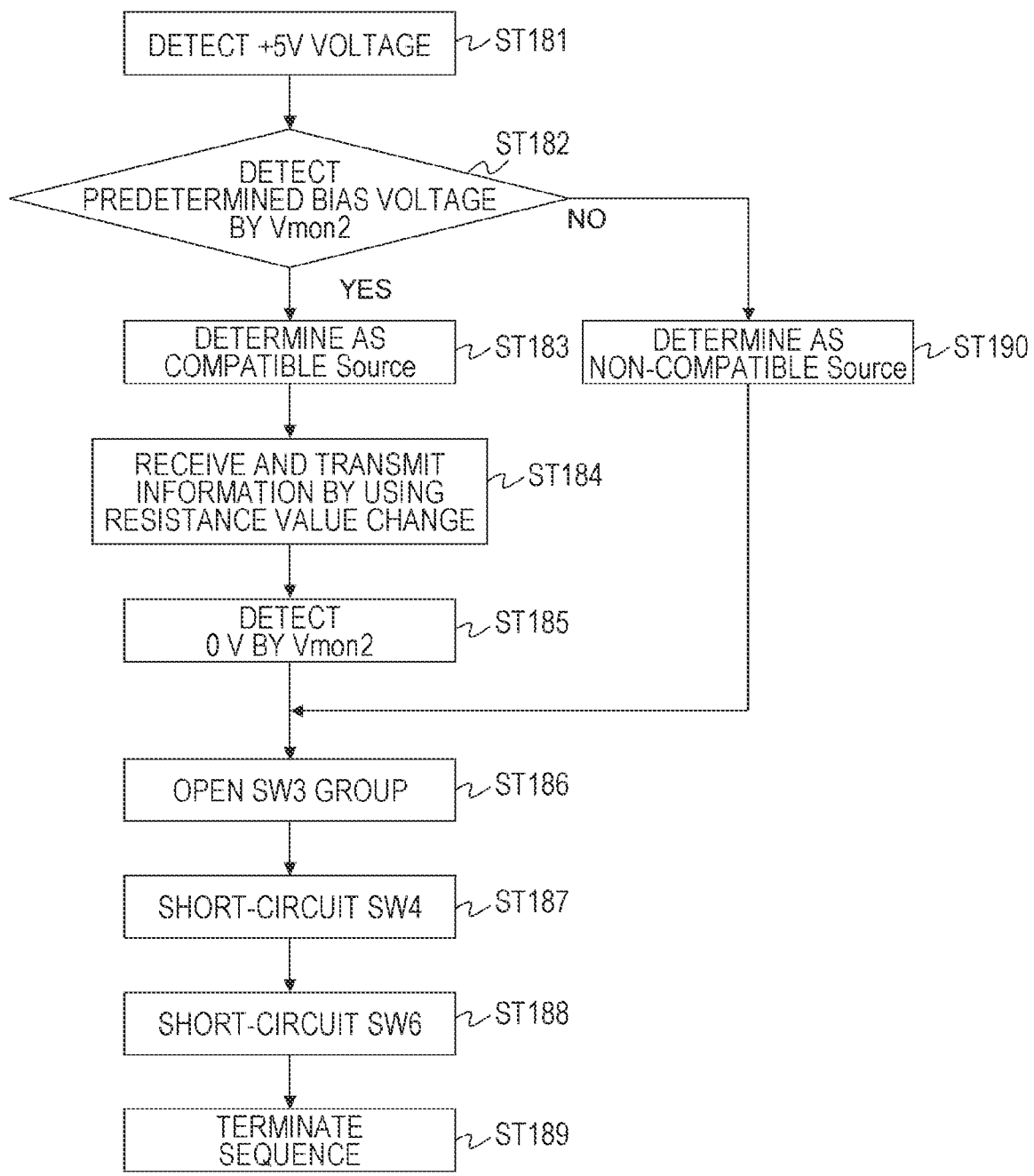
FIG. 67 is a diagram illustrating an example of a sequence of the compatible HDMI cable included in the transmission system in FIG. 57.

FIG. 67 illustrates an example of a sequence of the HDMI cable 130-8 that is a compatible cable. When a voltage of 5 V is detected by the voltage monitoring unit 134 in step ST181, the sequence is started, and the procedure proceeds to step ST182. In step ST182, the control unit 132 determines whether a predetermined bias voltage (4 V) is detected by the voltage monitoring unit 133.

When the predetermined bias voltage (4 V) is detected, the control unit 132 determines in step ST183 that the source device is a compatible source device. Then, in step ST184, the information is exchanged with the source device using a change in the resistance value. Next, when the voltage monitoring unit 133 detects 0 V in step ST185, the control unit 132 opens all the switches in the switch SW3 group in step ST186.

Next, in step ST187, the control unit 132 changes the state of the switch SW4 from the open state to the short-circuit state. Next, in step ST188, the control unit 132 changes the state of the switch SW6 from the open state to the short-circuit state. Then, in step ST189, the sequence is terminated.

Furthermore, when the predetermined bias voltage (4 V) is not detected in step ST182, the control unit 132 determines in step ST190 that the source device is a non-compatible source device. Then, in step ST186, the control unit 132 opens all the switches in the switch SW3 group.

Next, in step ST187, the control unit 132 changes the state of the switch SW4 from the open state to the short-circuit state. Next, in step ST188, the control unit 132 changes the state of the switch SW6 from the open state to the short-circuit state. Then, in step ST189, the sequence is terminated.

Note that each switch of the source device 110-8 and each switch of the HDMI cable 130-8 are reset to the initial states when the voltage of the +5 V power line drops.

Ninth Embodiment

Figure 68:
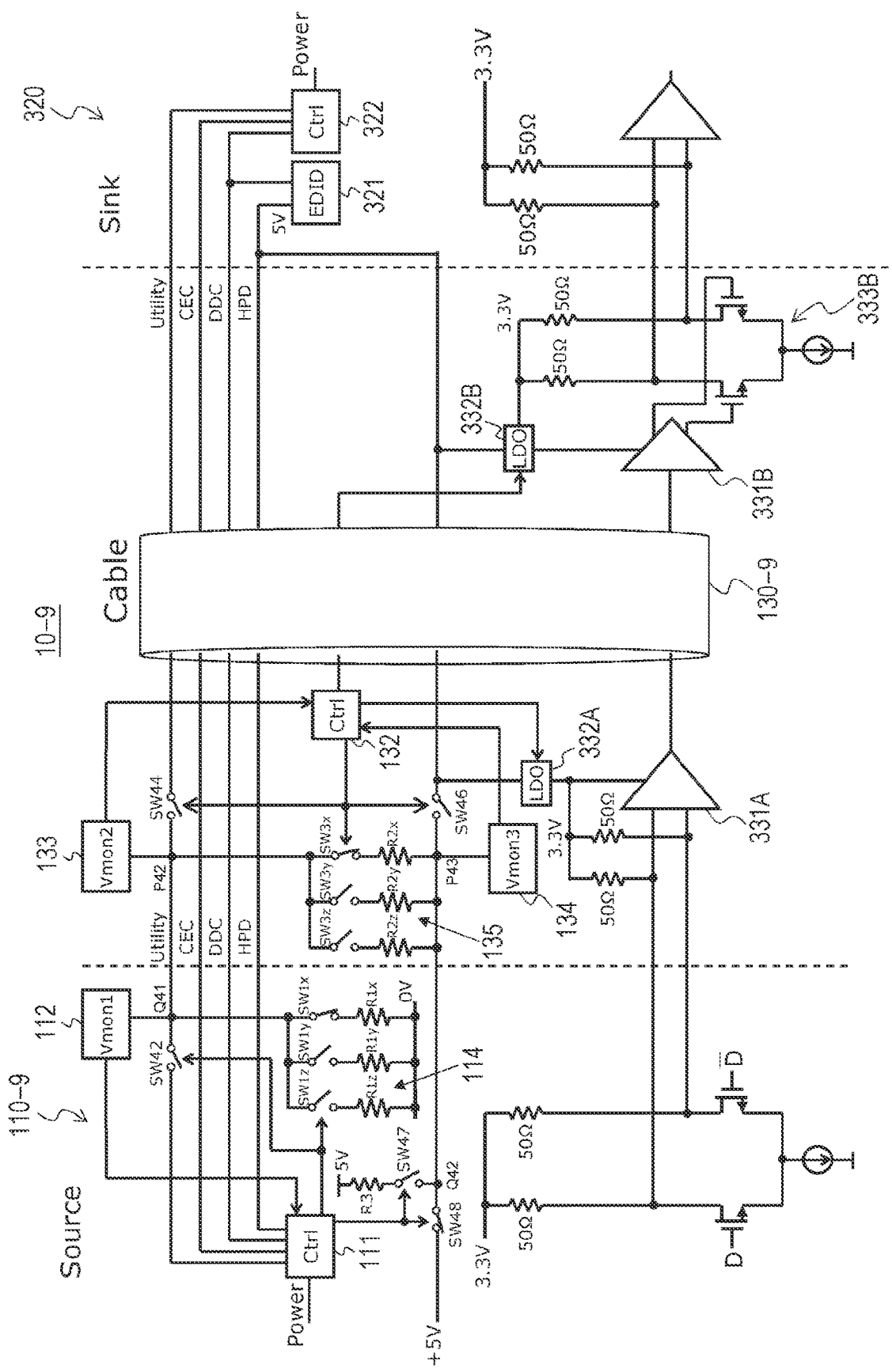
FIG. 68 is a diagram illustrating an exemplary configuration of a transmission system including the compatible source device, which is compatible to intervening the repeater, including the variable resistance circuit and the compatible HDMI cable (including current consumption unit).

FIG. 68 illustrates an exemplary configuration of a transmission system 10-9. The transmission system 10-9 is an HDMI transmission system using an HDMI as a digital interface. The transmission system 10-9 includes a source device 110-9 as a transmission device, a sink device 320 as a reception device, and an HDMI cable 130-9 that is an AOC for connecting these devices. In FIG. 68, a part corresponding to that in FIGS. 42 and 57 is denoted with the same reference numeral, and the detailed description thereof is appropriately omitted.

The HDMI cable 130-9 includes a control unit 132, voltage monitoring units 133 and 134, switches SW44 and SW46, and a variable resistance circuit 135 in addition to AOC configuration circuits including conversion circuits 331A and 331B, LDO regulators 332A and 332B, a current driving unit 333B, and the like.

The switch SW44 is inserted at a point closer to the sink device 320 than a point P42 of a Utility line. The variable resistance circuit 135 is connected between the point P42 of the Utility line and a +5 V power line. With this structure, 5 V is applied to the point P42 of the Utility line via the variable resistance circuit 135. The variable resistance circuit 135 includes a series circuit including a resistor R2$x$ and a switch SW3$x$, a series circuit including a resistor R2$y$ and a switch SW3$y$, and a series circuit including a resistor R2$z$ and a switch SW3$z$ connected in parallel.

The voltage monitoring unit 133 monitors a voltage at the point P42 of the Utility line and sends the monitoring result to the control unit 132. The voltage monitoring unit 134 monitors a voltage at a point P43 closer to a terminal than a position where the switch SW46 is inserted into the +5 V power line and sends the monitoring result to the control unit 132. Electric power is supplied from the point closer to the sink device 320 than a position where the switch SW46 is inserted into the +5 V power line to the LDO regulators 332A and 332B. The control unit 132 controls an operation of each unit of the HDMI cable 130-9.

The source device 110-9 is a compatible source device. The source device 110-9 includes a voltage monitoring unit 112, SW42, SW47, and SW48, a voltage dividing resistor R3, and a variable resistance circuit 114 in addition to a control unit 111 that controls an operation of each unit.

The variable resistance circuit 114 is connected between the ground and a point Q41 of the Utility line. With this structure, 0 V is applied to the point Q41 of the Utility line via the variable resistance circuit 114. The variable resistance circuit 114 includes a series circuit including a resistor R1$x$ and a switch SW1$x$, a series circuit including a resistor R1$y$ and a switch SW1$y$, and a series circuit including a resistor R1$z$ and a switch SW1$z$ connected in parallel.

It is desirable that the resistors R2$x$, R2$y$, and R2$z$ of the HDMI cable 130-9 and the resistors R1$x$, R1$y$, R1$z$, and R3 of the source device 110-9 be each a large value to some extent so as to reduce current consumption. Although not limited to the values indicated below, the following description will be made as assuming that R1$x$=400 kΩ, R1$y$=500 kΩ, R1$z$=600 kΩ, R2$x$=100 kΩ, R2$y$=200 kΩ, R2$z$=300 kΩ, and R3=500 kΩ.

The switch SW42 is inserted on a side opposite to the terminal side of the point Q41 of the Utility line. The voltage monitoring unit 112 monitors a voltage at the point Q41 of the Utility line and sends the monitoring result to the control unit 111. Furthermore, a voltage of 5 V is applied to a point Q42 of the +5 V power line via a series circuit including the resistor R3 and the switch SW47. The switch SW48 is inserted on a side opposite to the terminal side of the point Q42 of the +5 V power line.

In the transmission system 10-9 illustrated in FIG. 68, the HDMI cable 130-9 is a compatible cable, and the source device 110-9 is a compatible source device. Therefore, the source device 110-9 determines that the connected HDMI cable is a compatible cable and operates in the compatible mode. Similarly, the HDMI cable 130-9 determines that the connected source device is a compatible source device and operates in the compatible mode.

Operations of the source device 110-9 and the HDMI cable 130-9 will be described in detail. In FIG. 68, initial states of the source device 110-9 and the HDMI cable 130-9 are illustrated. In the source device 110-9, the switches SW1$x$ and SW48 are in a short-circuit state, and the switches SW1$y$, SW1$z$, SW42, and SW47 are in an open state. Meanwhile, in the initial state of the HDMI cable 130-9, the switch SW3$x$ is in a short-circuit state, and the switches SW3$y$, SW3$z$, SW44, and SW46 are in an open state.

Since SW1$x$ and SW3$x$ are in the short-circuit state in the initial state, the resistors R1$x$ and R2$x$ are connected in series between the ground of the source device 110-9 (0 V) and the +5 V power line of the HDMI cable 130-9, and a voltage of 4 V is obtained at the points Q41 and P42 of the Utility line by resistance voltage division.

The voltage monitoring unit 112 of the source device 110-9 monitors that the voltage at the point Q41 is 4 V and sends the monitoring result to the control unit 111. The control unit 111 determines that the HDMI cable that is a compatible cable is connected on the basis of the monitoring result.

Similarly, the voltage monitoring unit 133 of the HDMI cable 130-9 monitors that the voltage at the point P42 is 4 V and sends the monitoring result to the control unit 132. The control unit 132 determines that the source device that is a compatible source device is connected on the basis of the monitoring result.

Here, since the switch SW42 is in the open state in the source device 110-9, the voltage of 4 V is not propagated in the source device 110-9 and does not affect the inside of the source device 110-9. Similarly, since the switch SW44 is in the open state in the HDMI cable 130-9, the voltage of 4 V is not propagated to the sink device 320 and does not affect the sink device 320.

Figure 69:
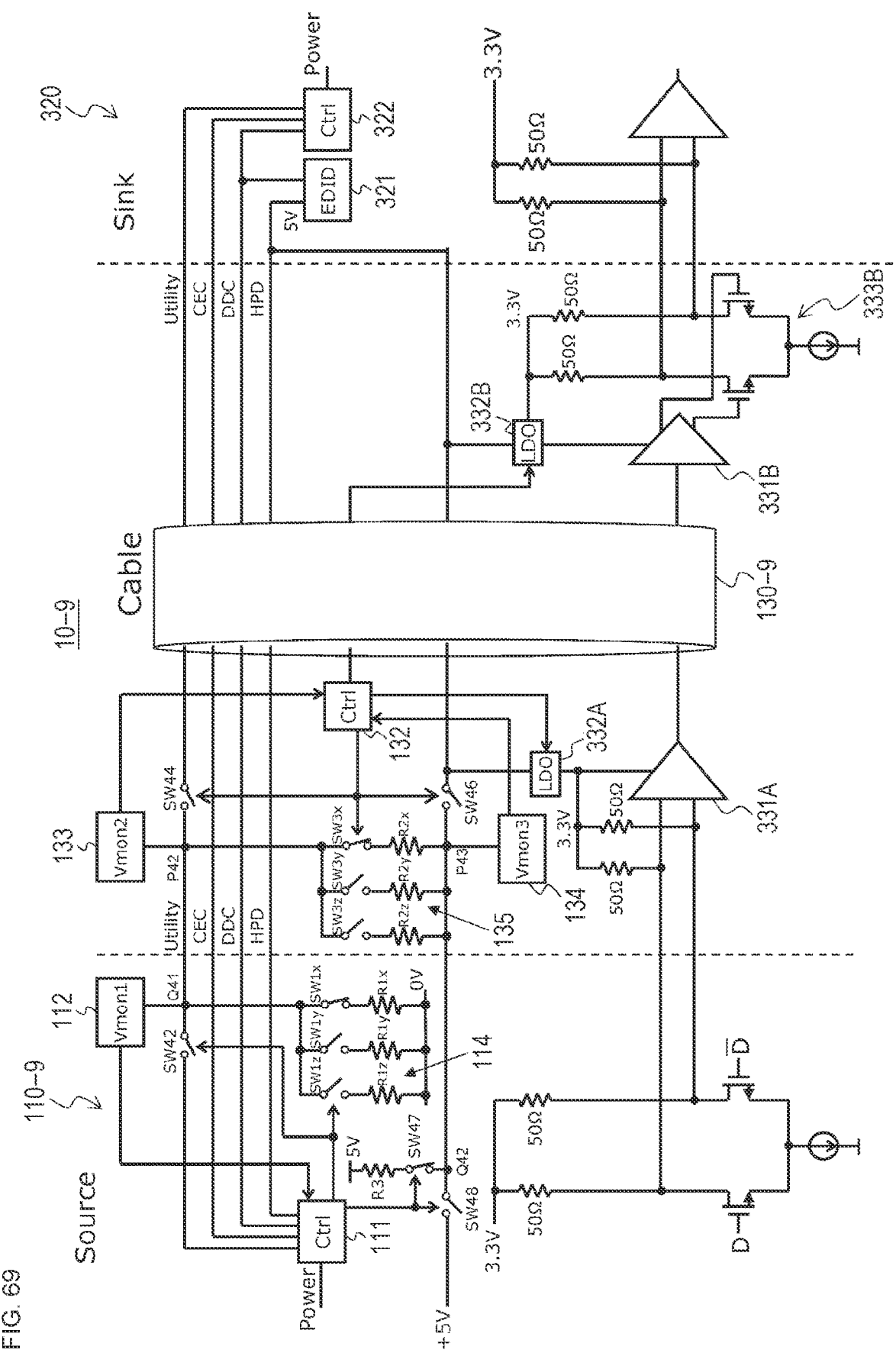
FIG. 69 is a diagram for explaining an operation of the transmission system in FIG. 68.

The control unit 111 of the source device 110-9 short-circuits the switch SW47 as illustrated in FIG. 69 on the basis of the monitoring result indicating 4 V by the voltage monitoring unit 112, and thereafter, opens the switch SW48. Here, the resistor R3 is connected to the resistors R1$x$ and R2$x$ in series, and a voltage of 2 V is obtained at the points Q41 and P42 of the Utility line by resistance voltage division.

At this time, in a case where a relay that isolates the +5 V power line as the repeater 140 is connected between the source device 110-9 and the HDMI cable 130-9 (refer to a case where switch SW47 is in short-circuit state and switch SW48 is in open state in FIG. 75 to be described later), the power line is isolated by the repeater 140 between the source device 110-9 and the HDMI cable 130-9. Therefore, a change in a generated voltage by the resistor R3 does not occur. Therefore, the fact that the voltage of 2 V is obtained at the points Q41 and P42 of the Utility line means that the relay such as the repeater is not connected.

The voltage monitoring unit 112 of the source device 110-9 monitors that the voltage at the point Q41 becomes 2 V and sends the monitoring result to the control unit 111. The control unit 111 determines that the relay such as the repeater that isolates the +5 V power line is not connected between the compatible cable and the control unit 111 on the basis of the monitoring result and performs control to operate in a compatible mode.

Similarly, the voltage monitoring unit 133 of the HDMI cable 130-9 monitors that the voltage at the point P42 becomes 2 V and sends the monitoring result to the control unit 132. The control unit 132 determines that the relay such as the repeater that isolates the +5 V power line is not connected between the compatible source device and the control unit 132 on the basis of the monitoring result and performs control to operate in a compatible mode.

The source device 110-9 and the HDMI cable 130-9 each start to operate in the compatible modes, and information is exchanged between the source device 110-9 and the HDMI cable 130-9 first. In this case, the source device 110-9 can transmit various information to the HDMI cable 130-9 by changing the resistance value of the variable resistance circuit 114 and changing the bias voltage of the Utility line. On the side of the HDMI cable 130-9, the monitoring result of the bias voltage at the point P42 of the Utility line is supplied from the voltage monitoring unit 133 to the control unit 132. The control unit 132 refers to a table indicating a correspondence relationship between a bias voltage value and the information and understands and acquires transmission information from the source device 110-9.

Furthermore, in this case, the HDMI cable 130-9 can transmit various information to the source device 110-9 by changing the resistance value of the variable resistance circuit 135 and changing the bias voltage of the Utility line. On the side of the source device 110-9, the monitoring result of the bias voltage at the point Q41 of the Utility line is supplied from the voltage monitoring unit 112 to the control unit 111. The control unit 111 refers to the table indicating a correspondence relationship between a bias voltage value and the information and understands and acquires transmission information from the HDMI cable 130-9.

Figure 70:
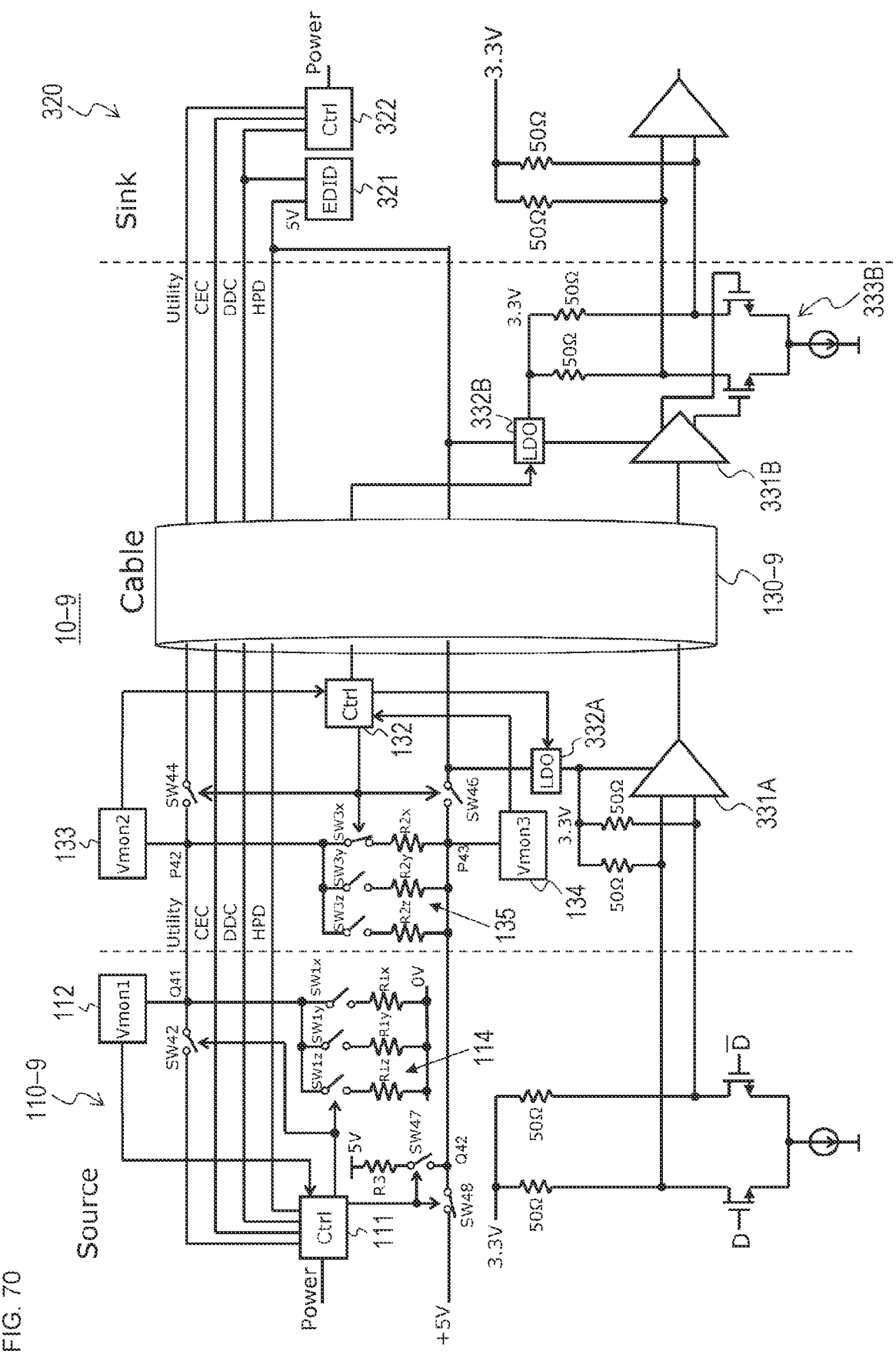
FIG. 70 is a diagram for explaining the operation of the transmission system in FIG. 68.

When the exchange of the information between the source device 110-9 and the HDMI cable 130-9 is terminated, as illustrated in FIG. 70, the control unit 111 of the source device 110-9 short-circuits the switch SW48, opens the switch SW47, and further opens all the switches in the switch SW1 group. Therefore, the voltage at the point P42 of the Utility line is 5 V. In the HDMI cable 130-9, the voltage monitoring unit 133 monitors that the voltage at the point P42 is 5 V and sends the monitoring result to the control unit 132.

Figure 71:
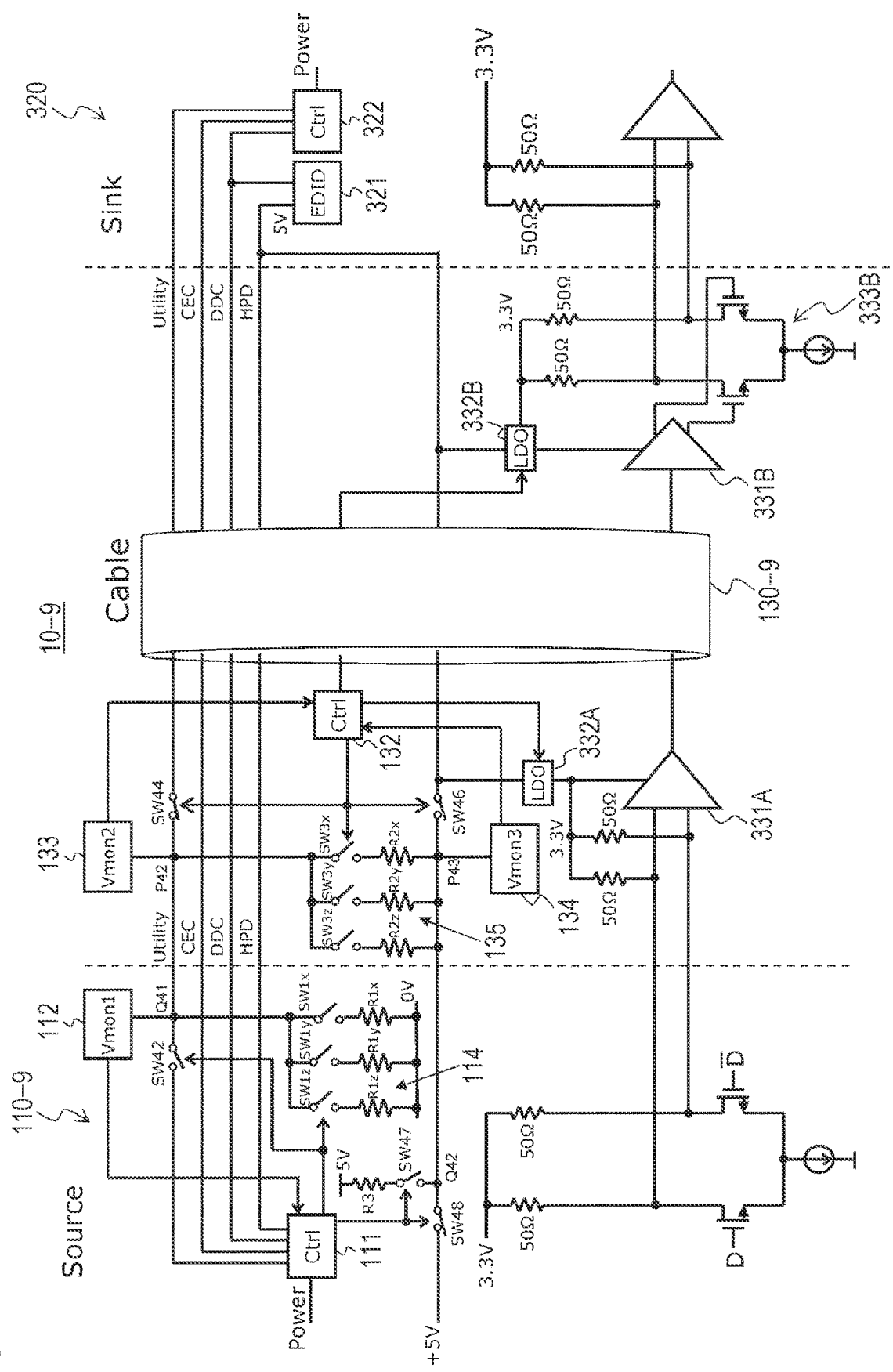
FIG. 71 is a diagram for explaining the operation of the transmission system in FIG. 68.

The control unit 132 determines that the exchange of the information is terminated on the basis of the monitoring result and changes the states of the switch SW3 group and the switches SW44 and SW46 as illustrated in FIG. 71 and shifts to a normal operation. In this case, not to affect the sink device 320, first, all the switches in the switch SW3 group are opened, next, the switch SW44 is short-circuited, and finally, the switch SW46 is short-circuited.

Figure 72:
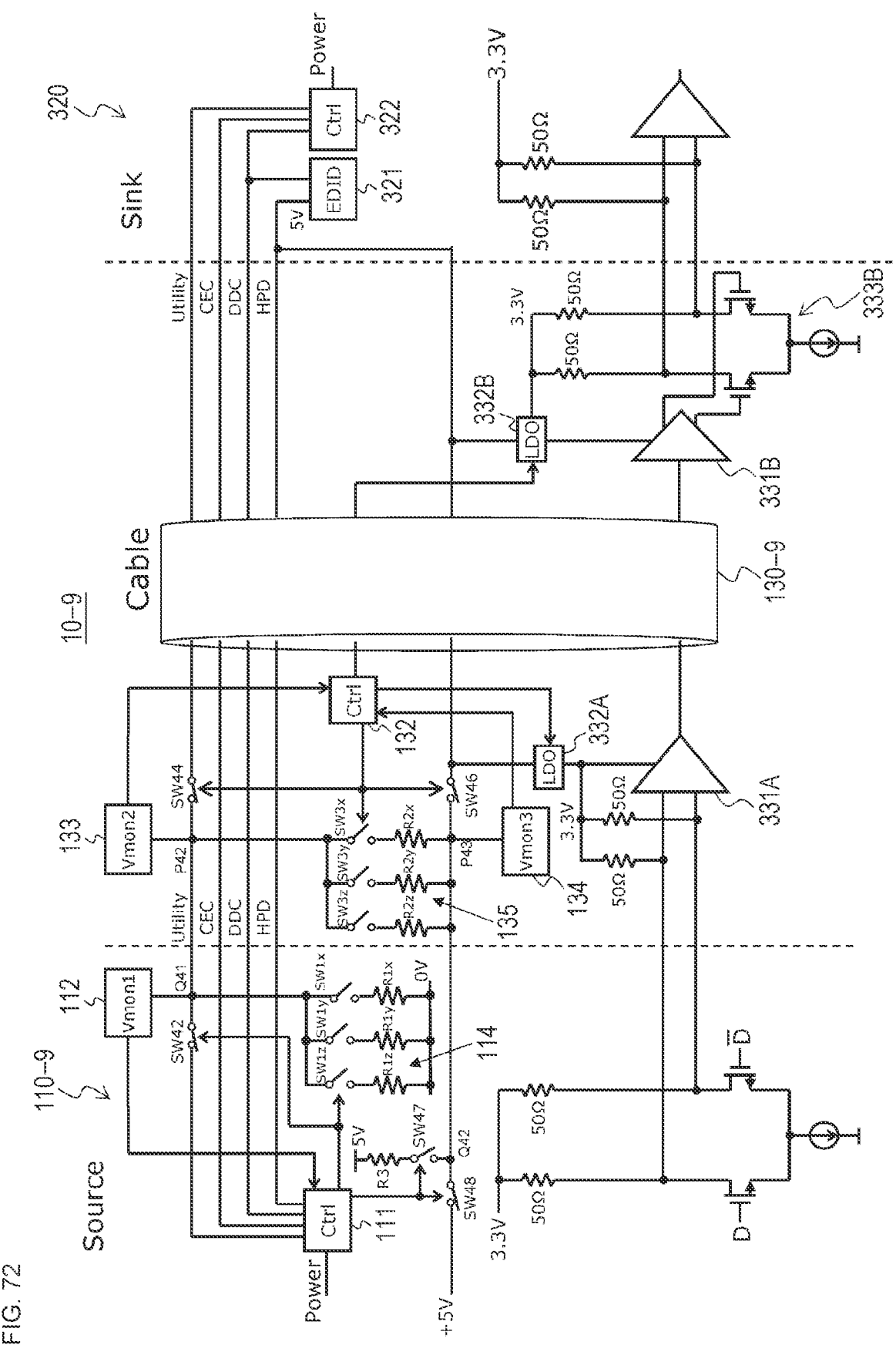
FIG. 72 is a diagram for explaining the operation of the transmission system in FIG. 68.

By short-circuiting the switch SW46, a 5 V voltage is sent from the source device 110-9 to the sink device 320 through the +5 V power line, and accordingly, a 5 V voltage (connection detection signal) is sent from the sink device 320 to the source device 110-9 via the HPD line. With this operation, the control unit 111 of the source device 110-9 recognizes that the preparation of the cable is completed, and short-circuits the switch SW42 and shifts to the normal operation, as illustrated in FIG. 72.

Note that, in a case where the voltage of 4 V is still obtained at the points Q41 and P42 of the Utility line at the time of FIG. 69, the source device 110-9 and the HDMI cable 130-9 each operate as follows. In this case, the control unit 111 of the source device 110-9 determines that the relay such as the repeater that isolates the +5 V power line intervenes and performs control to operate in a non-compatible mode. That is, the control unit 111 short-circuits the switch SW48, opens the switch SW47, opens all switches in the switch SW1 group, and further short-circuits the switch SW42 and shifts to a normal operation.

Furthermore, in this case, the control unit 111 of the HDMI cable 130-9 determines that the relay such as the repeater that isolates the +5 V power line intervenes and performs control to operate in a non-compatible mode. That is, the control unit 132 opens all the switches in the switch SW3 group, short-circuits the switch SW44, and further short-circuits the switch SW46 and shifts to a normal operation.

Note that the source device 110-9 may be configured so that a current that can be supplied by the +5 V power line is constantly equal to or higher than 55 mA and the current can be supplied to the active circuit of the HDMI cable 130-9 that is a compatible cable. However, the control unit 111 of the source device 110-9 may change a mode to a mode in which the current that can be supplied by the +5 V power line is set to be equal to or higher than 55 mA when determining that the connected HDMI cable is a compatible cable and the relay such as the repeater that isolates the +5 V power line does not intervene. By switching the current supply amount mode, the source device 110-9 can reduce electric power of a power supply circuit unit. For example, before opening all the switches in the switch SW1 group as described above, the control unit 111 changes the mode to the mode in which a current that can be supplied is equal to or higher than 55 mA.

In this way, similarly to the transmission system 10-8 illustrated in FIG. 57 described above, the transmission system 10-9 illustrated in FIG. 68 exchanges various information between the source device 110-9 and the HDMI cable 130-9 by changing the resistance values of the variable resistance circuits 114 and 135 and changing the bias voltage of the Utility line. It is not necessary to provide the register on the DDC line. Therefore, the access information of the register is not transmitted to the sink device 320 through the DDC line, and the sink device 320 of which the address is not defined does not cause a malfunction.

Furthermore, similarly to the transmission system 10-6 illustrated in FIG. 42, in the transmission system 10-9 illustrated in FIG. 68, in a case where the HDMI cable 130-9 that is a compatible cable determines that the connected source device is a compatible source device that may sufficiently supply a current to its own active circuit and the relay such as the repeater that isolates the +5 V power line does not intervene, the HDMI cable 130-9 sets its own active circuit to be in the operation state. Therefore, the active circuit of the HDMI cable 130-9 can perform an appropriate operation. Furthermore, it is possible to avoid that the source device and the relay such as the repeater cannot withstand overcurrent and are broken.

Figure 73:
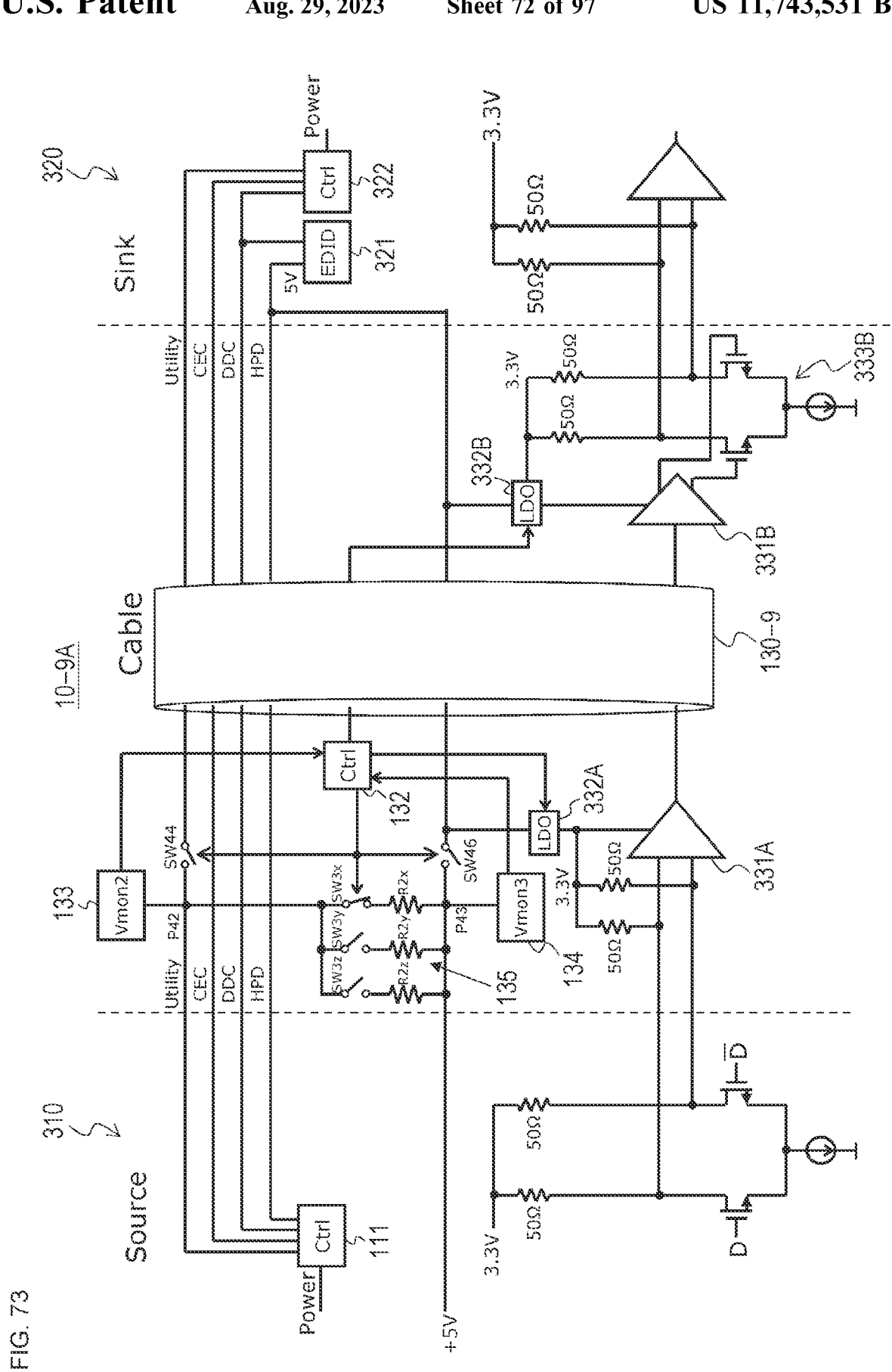
FIG. 73 is a diagram illustrating an exemplary configuration of a transmission system including the non-compatible source device and a compatible HDMI cable (including current consumption unit) that includes the variable resistance circuit.

FIG. 73 illustrates an exemplary configuration of a transmission system 10-9A. The transmission system 10-9A is an HDMI transmission system using an HDMI as a digital interface. The transmission system 10-9A includes the source device 310 as a transmission device, the sink device 320 as a reception device, and the HDMI cable 130-9 that connects these devices. In FIG. 73, a part corresponding to that in FIGS. 4 and 68 is denoted with the same reference numeral, and the detailed description thereof is appropriately omitted.

In the transmission system 10-9A, the source device 310 is a non-compatible source device such as a legacy, and the HDMI cable 130-9 is a compatible cable. In this case, the source device 310 performs a normal operation (refer to FIGS. 41A, 41B, 41C, and 41D).

Furthermore, the HDMI cable 130-9 determines that the source device is a non-compatible source device and operates in the non-compatible mode. In this case, in the initial state, the voltage at the point P42 of the Utility line is 5 V. The voltage monitoring unit 133 of the HDMI cable 130-6 monitors that the voltage at the point P42 is 5 V and sends the monitoring result to the control unit 132. When the voltage at the point P42 remains to be 5 V although the voltage monitoring unit 134 detects 5 V, the control unit 132 determines that the non-compatible source device is connected and performs control to operate in a non-compatible mode.

In this case, the control unit 132 changes the state of each switch and shifts to the normal operation. In this case, not to affect the sink device 320, first, all the switches in the switch SW3 group are opened, next, the switch SW44 is short-circuited, and finally, the switch SW46 is short-circuited. Furthermore, in this case, the control unit 132 controls an active circuit so as not to draw the current equal to or higher than 55 mA from the +5 V power line. For example, the LDO regulators 332A and 332B are maintained to be turned off, and the conversion circuits 331A and 331B that are active circuits are maintained to be in non-operation states (Disable). With this operation, the HDMI cable 130-9 does not draw the current equal to or higher than 55 mA from the source device 310, and it is possible to avoid that the source device 310 cannot withstand overcurrent and is broken.

Note that, in the above, the HDMI cable 130-9 that is a compatible cable controls on/off the LDO regulators 332A and 332B according to whether the source device is a compatible device or a non-compatible device. However, in this case, in a case where the source device is a non-compatible device, the LDO regulators 332A and 332B are turned off, and the active circuit is in a non-operation state. Therefore, data cannot be transmitted.

Therefore, in a case where the source device is a non-compatible source device, the HDMI cable 130-9 may not turn off the LDO regulators 332A and 332B but guarantee the current drawn from the source device to be equal to or lower than 55 mA by decreasing a data rate. With this operation, even if the source device is a non-compatible source device, data can be transmitted.

Figure 74:
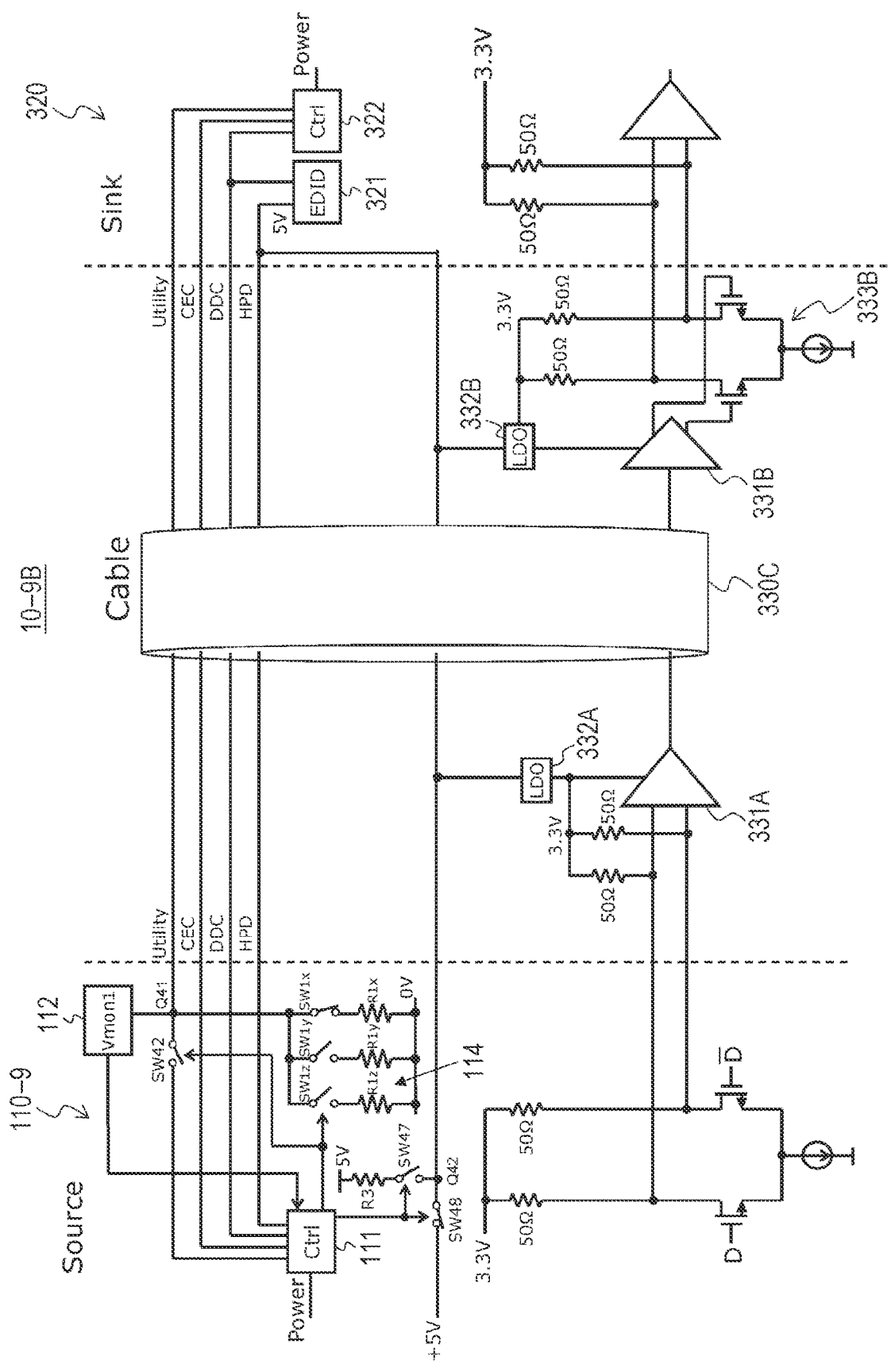
FIG. 74 is a diagram illustrating an exemplary configuration of a transmission system including the compatible source device that includes the variable resistance circuit and the non-compatible HDMI cable (including current consumption unit).

FIG. 74 illustrates an exemplary configuration of a transmission system 10-9B. The transmission system 10-9B is an HDMI transmission system using an HDMI as a digital interface. The transmission system 10-9B includes the source device 110-9 as a transmission device, the sink device 320 as a reception device, and an HDMI cable 330C that connects these devices. In FIG. 74, a part corresponding to that in FIGS. 4 and 68 is denoted with the same reference numeral, and the detailed description thereof is appropriately omitted.

In the transmission system 10-9B, the source device 110-9 is a compatible source device, and the HDMI cable 330C is a non-compatible cable such as a legacy. In this case, the HDMI cable 330C performs the normal operation (refer to FIGS. 41A, 41B, 41C, and 41D).

The source device 110-9 determines that the HDMI cable is a non-compatible cable and operates in the non-compatible mode. In this case, in the initial state, the voltage at the point Q41 of the Utility line is 0 V. The voltage monitoring unit 112 of the source device 110-9 monitors that the voltage at the point Q41 is 0 V and sends the monitoring result to the control unit 111. The control unit 111 determines that the HDMI cable is a non-compatible cable on the basis of the monitoring result and the fact that the HPD line is at a high level (5 V) and performs control to operate in the non-compatible mode.

In this case, the control unit 111 changes the state of each switch and shifts to the normal operation. In this case, not to affect the inside of the source device 110-9, first, all switches in a switch SW1 group are opened, and next, the switch SW42 is short-circuited.

Figure 75:
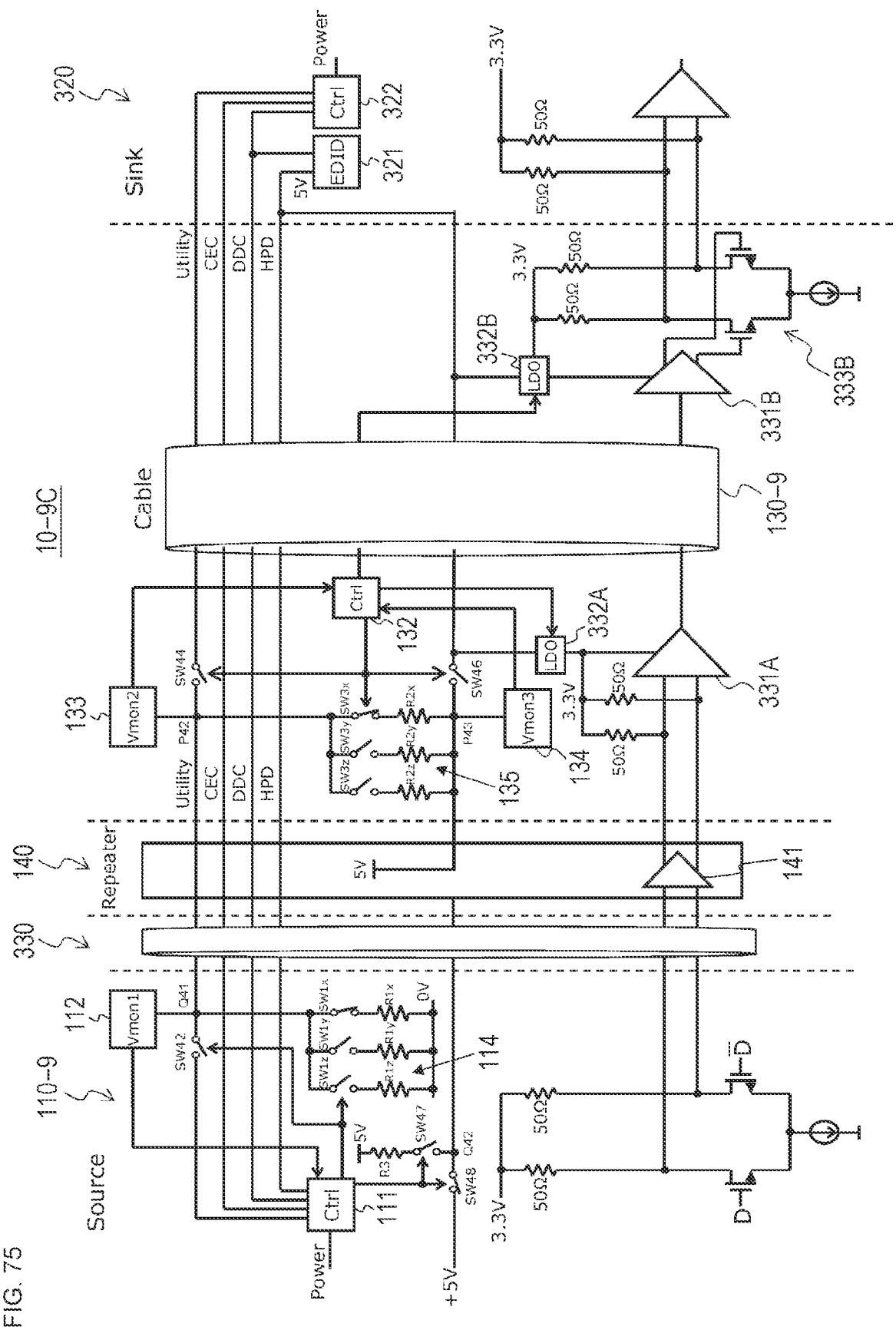
FIG. 75 is a diagram illustrating an exemplary configuration of a transmission system (intervening repeater) including the compatible source device that is compatible to intervening the repeater and the compatible HDMI cable (including current consumption unit).

Although detailed description is omitted, FIG. 75 illustrates an exemplary configuration of a transmission system 10-9C in which the repeater 140 that isolates the +5 V power line is connected between the source device 110-9 and the HDMI cable 130-9. In the transmission system 10-9C, the HDMI cable 330 and the repeater 140 are inserted between the source device 110-9 and the HDMI cable 130-9 in series. Note that in and out of the control line are connected in the repeater 140.

In such a transmission system 10-9C, as described above, the source device 110-9 and the HDMI cable 130-9 can detect that the repeater 140 is intervened, and for example, the HDMI cable 130-9 can avoid to wrongly draw a current equal to or higher than 55 mA from the repeater 140, and it is possible to prevent a failure of the repeater 140 in advance.

Figure 76:
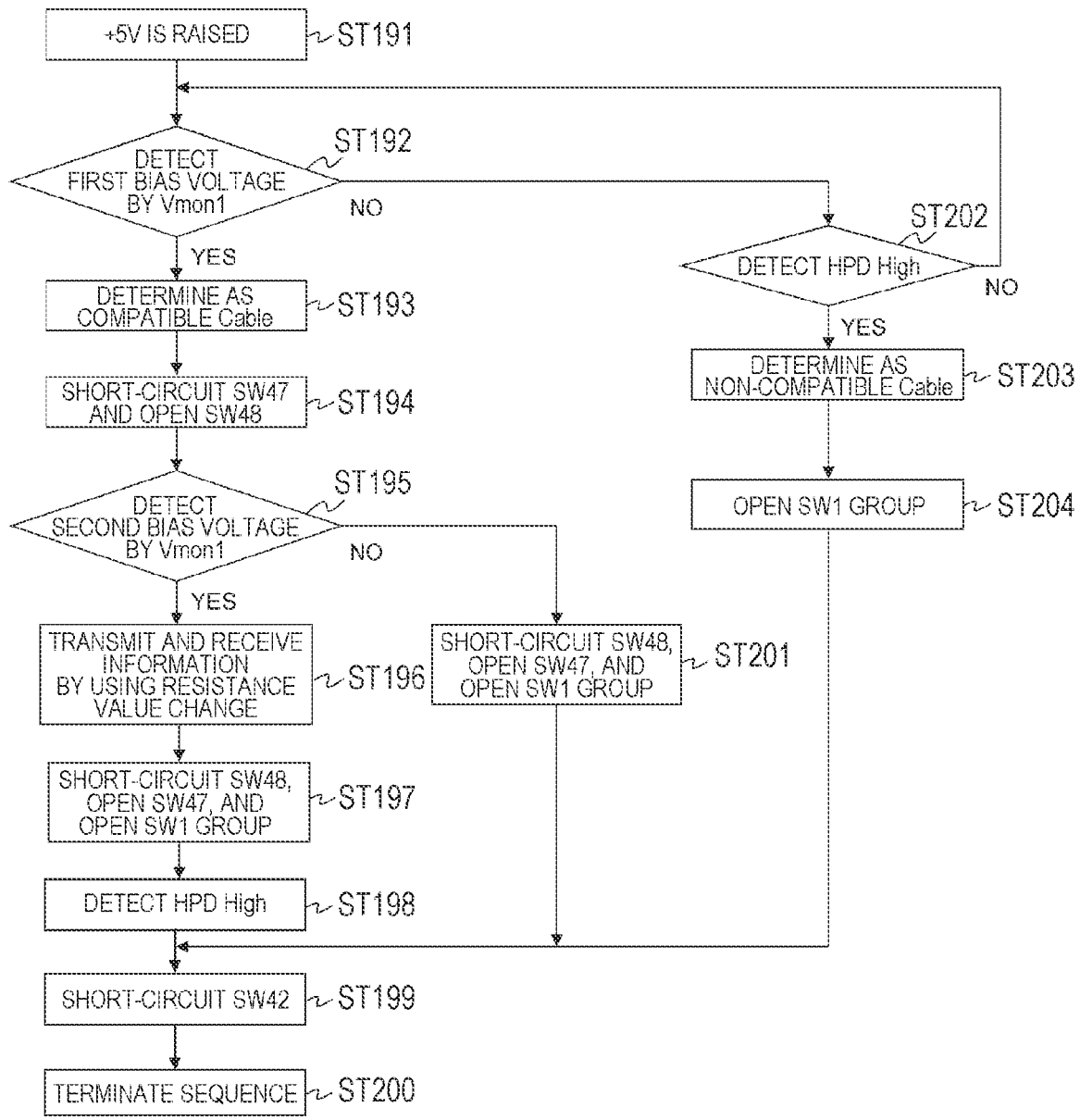
FIG. 76 is a diagram illustrating an example of a sequence of the compatible source device included in the transmission system in FIG. 68.

FIG. 76 illustrates an example of a sequence of the source device 110-9 that is a compatible source device. In step ST191, for example, when a power switch is turned on and +5 V is raised, the sequence is started, and the procedure proceeds to step ST192. In step ST192, the control unit 111 determines whether the first bias voltage (4 V) is detected by the voltage monitoring unit 112.

When the first bias voltage (4 V) is detected, the control unit 111 determines in step ST193 that the HDMI cable that is a compatible cable is connected. Then, in step ST194, the control unit 111 changes the open state of the switch SW47 to the short-circuit state, and thereafter, changes the short-circuit state of the switch SW48 to the open state.

Next, in step ST195, the control unit 111 determines whether a second bias voltage (2 V) is detected by the voltage monitoring unit 112. When the second bias voltage (2 V) is detected, the control unit 111 determines that the relay such as the repeater that isolates the +5 V power line does not intervene between the HDMI cable and the control unit 111, and the procedure proceeds to step ST196. In step ST196, the information is exchanged with the HDMI cable using a change in the resistance value.

Next, in step ST197, the control unit 111 changes the open state of the switch SW48 to the short-circuit state, changes the short-circuit state of the switch SW47 to the open state, and further changes states of all the switches in the switch SW1 group to the open state.

Next, when the control unit 111 detects in step ST198 that the HPD line becomes a high level (5 V), the control unit 111 changes the state of the switch SW42 from the open state to the short-circuit state in step ST199. Then, in step ST200, the sequence is terminated.

Furthermore, when the second bias voltage (2 V) is not detected in step ST195, the control unit 111 determines that the relay such as the repeater that isolates the +5 V power line intervenes between the HDMI cable and the control unit 111, and the procedure proceeds to step ST201. In step ST201, the control unit 111 changes the open state of the switch SW48 to the short-circuit state, changes the short-circuit state of the switch SW47 to the open state, and further changes states of all the switches in the switch SW1 group to the open state. Then, in step ST199, the control unit 111 changes the open state of the switch SW42 to the short-circuit state. Then, in step ST200, the sequence is terminated.

Furthermore, when the first bias voltage (4 V) is not detected in step ST192, the control unit 111 determines in step ST202 whether or not the high level (5 V) of the HPD line is detected. When the high level (5 V) of the HPD line is not detected, the procedure returns to step ST192. Meanwhile, when the high level (5 V) of the HPD line is detected, the control unit 111 determines in step ST203 that the HDMI cable that is a non-compatible cable is connected.

Then, in step ST204, states of all the switches in the switch SW1 group are changed to the open state. Next, in step ST199, the control unit 111 changes the state of the switch SW42 from the open state to the short-circuit state. Then, in step ST200, the sequence is terminated.

Figure 77:
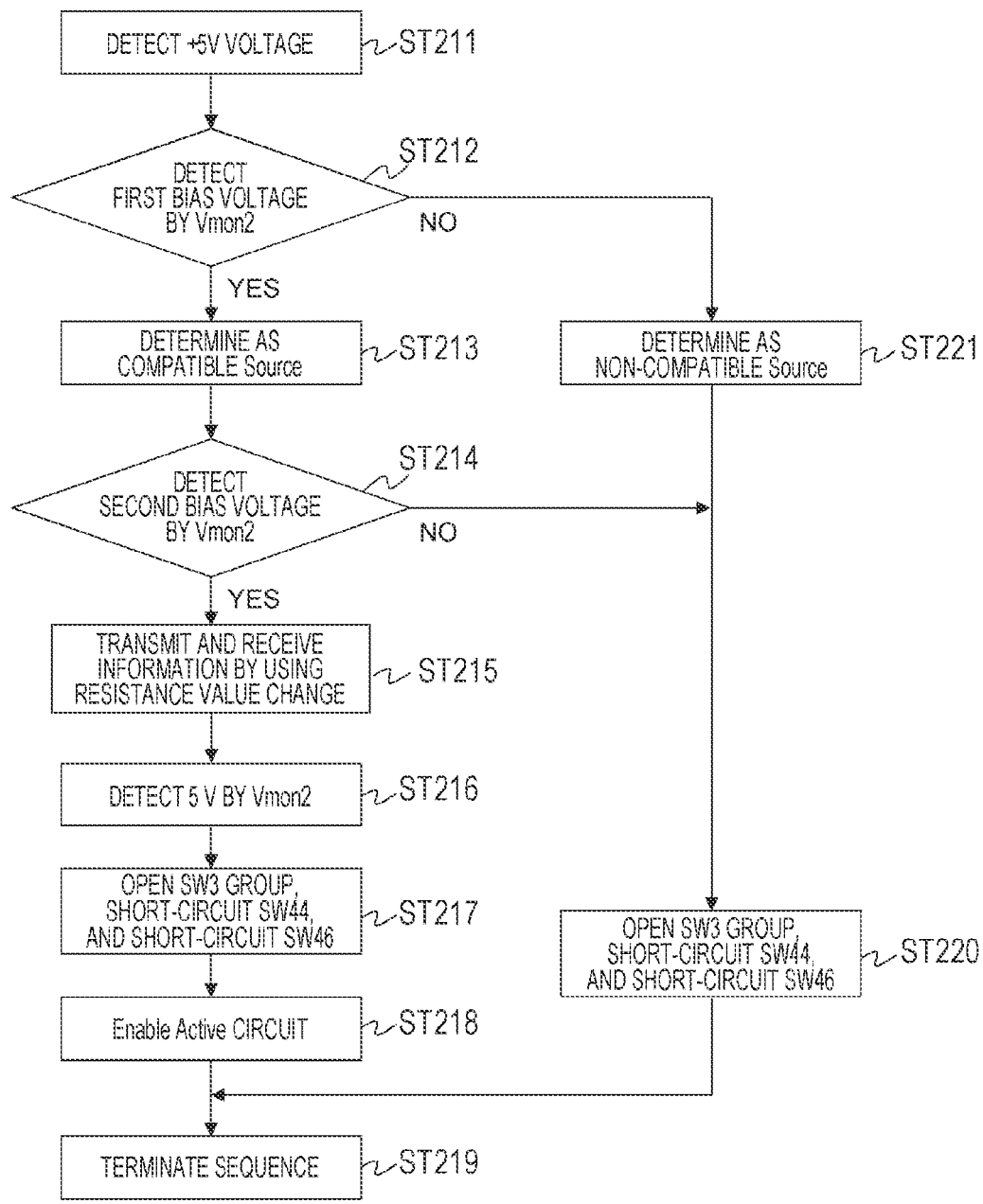
FIG. 77 is a diagram illustrating an example of a sequence of the compatible HDMI cable included in the transmission system in FIG. 68.

FIG. 77 illustrates an example of a sequence of the HDMI cable 130-9 that is a compatible cable. When a voltage of 5 V is detected by the voltage monitoring unit 134 in step ST211, the sequence is started, and the procedure proceeds to step ST212. In step ST212, the control unit 132 determines whether the first bias voltage (4 V) is detected by the voltage monitoring unit 133.

When the first bias voltage (4 V) is detected, the control unit 132 determines in step ST213 that the source device that is a compatible source device is connected. Then, in step ST214, the control unit 132 determines whether the second bias voltage (2 V) is detected by the voltage monitoring unit 133.

When the second bias voltage (2 V) is detected, the control unit 132 determines that the relay such as the repeater that isolates the +5 V power line does not intervene between the source device and the control unit 132, and the procedure proceeds to step ST215. In step ST215, the information is exchanged with the source device using a change in the resistance value.

Next, when 5 V is detected by the voltage monitoring unit 133 in step ST216, the control unit 132 changes the states of all the switches in the switch SW3 group to the open state, changes the open state of the switch SW44 to the short-circuit state, and further changes the open state of the switch SW46 to the short-circuit state in step ST217.

Next, in step ST218, the LDO regulators 332A and 332B are turned on, and the active circuit is set to be in the operation state (Enable). Thereafter, the sequence is terminated in step ST219.

Furthermore, when the second bias voltage (2 V) is not detected in step ST214, the control unit 132 determines that the relay such as the repeater that isolates the +5 V power line intervenes between the source device and the control unit 132, and the procedure proceeds to step ST220. In step ST220, the control unit 132 opens all the switches in the switch SW3 group, changes the open state of the switch SW44 to the short-circuit state, and further changes the open state of the switch SW46 to the short-circuit state. Then, in step ST219, the sequence is terminated.

Furthermore, when the first bias voltage (4 V) is not detected in step ST212, the control unit 132 determines in step ST221 that the source device that is a non-compatible source device is connected. Then, in step ST220, the control unit 132 opens all the switches in the switch SW3 group, changes the open state of the switch SW44 to the short-circuit state, and further changes the open state of the switch SW46 to the short-circuit state. Then, in step ST219, the sequence is terminated.

Note that each switch of the source device 110-9 and each switch of the HDMI cable 130-9 are reset to the initial states when the voltage of the +5 V power line drops.

Tenth Embodiment

For example, in the transmission system 10-9 illustrated in FIG. 68 described above, a case is considered in which, for example, a power feeding terminal other than a pin specified by the HDMI is prepared and power is fed to an active circuit from outside instead of feeding power from the source device 110-9 via the +5 V power line. There is no problem in a case where the external power feeding is connected to only the active circuit and used only to feed a current to the active circuit.

Figure 78:
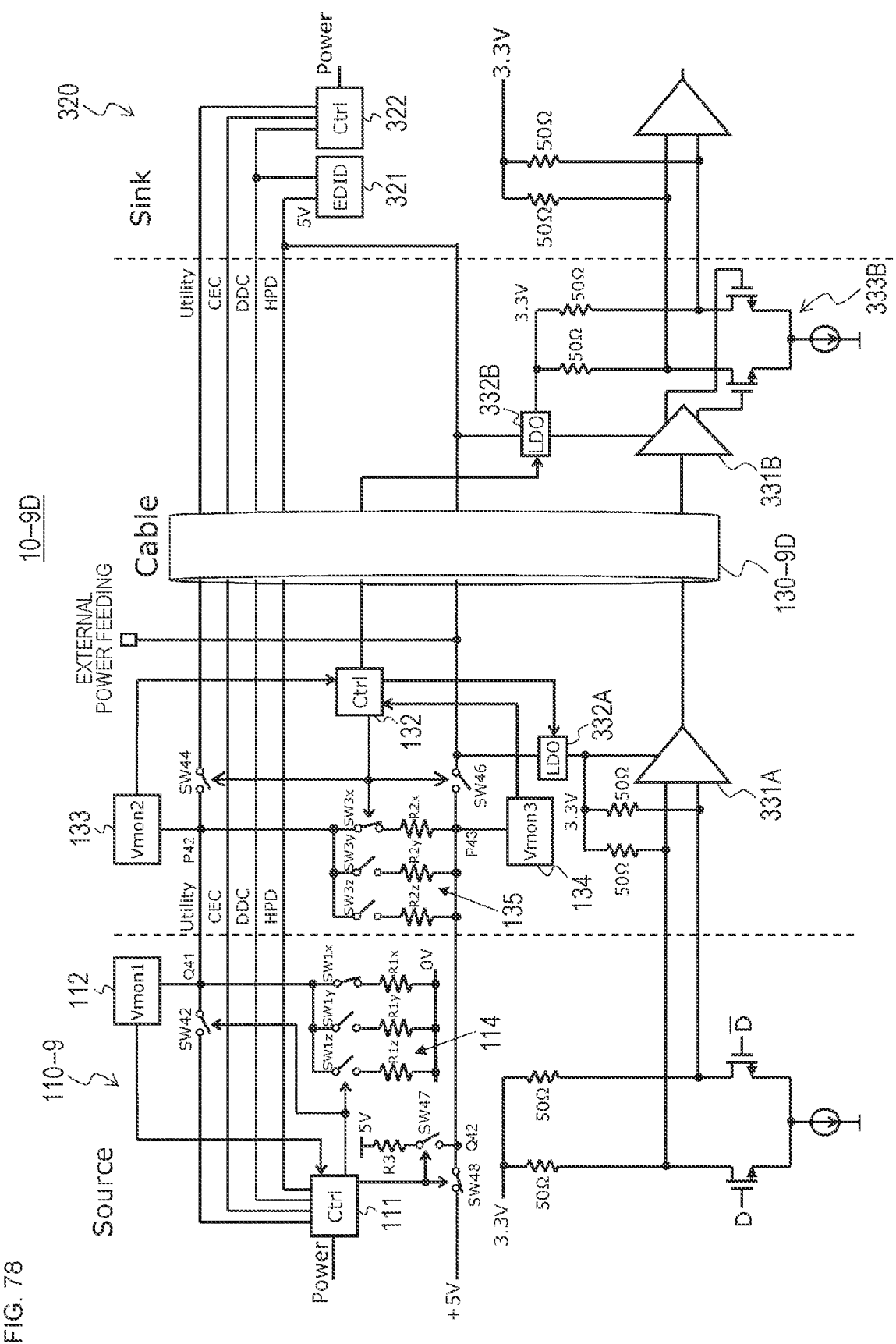
FIG. 78 is a diagram illustrating an exemplary configuration of a transmission system of which a cable includes an external power feeding terminal.

However, for example, as illustrated in a transmission system 10-9D illustrated in FIG. 78, in a case where the external power feeding is directly connected to the +5 V power line, a timing when the HPD returns to the source device 110-9 cannot be controlled, and the sequence described above is not satisfied. Note that, although detailed description is omitted, the transmission system 10-9D includes a source device 110-9 as a transmission device, a sink device 320 as a reception device, and an HDMI cable 130-9D that connects these devices and includes the external power feeding terminal.

Figure 79:
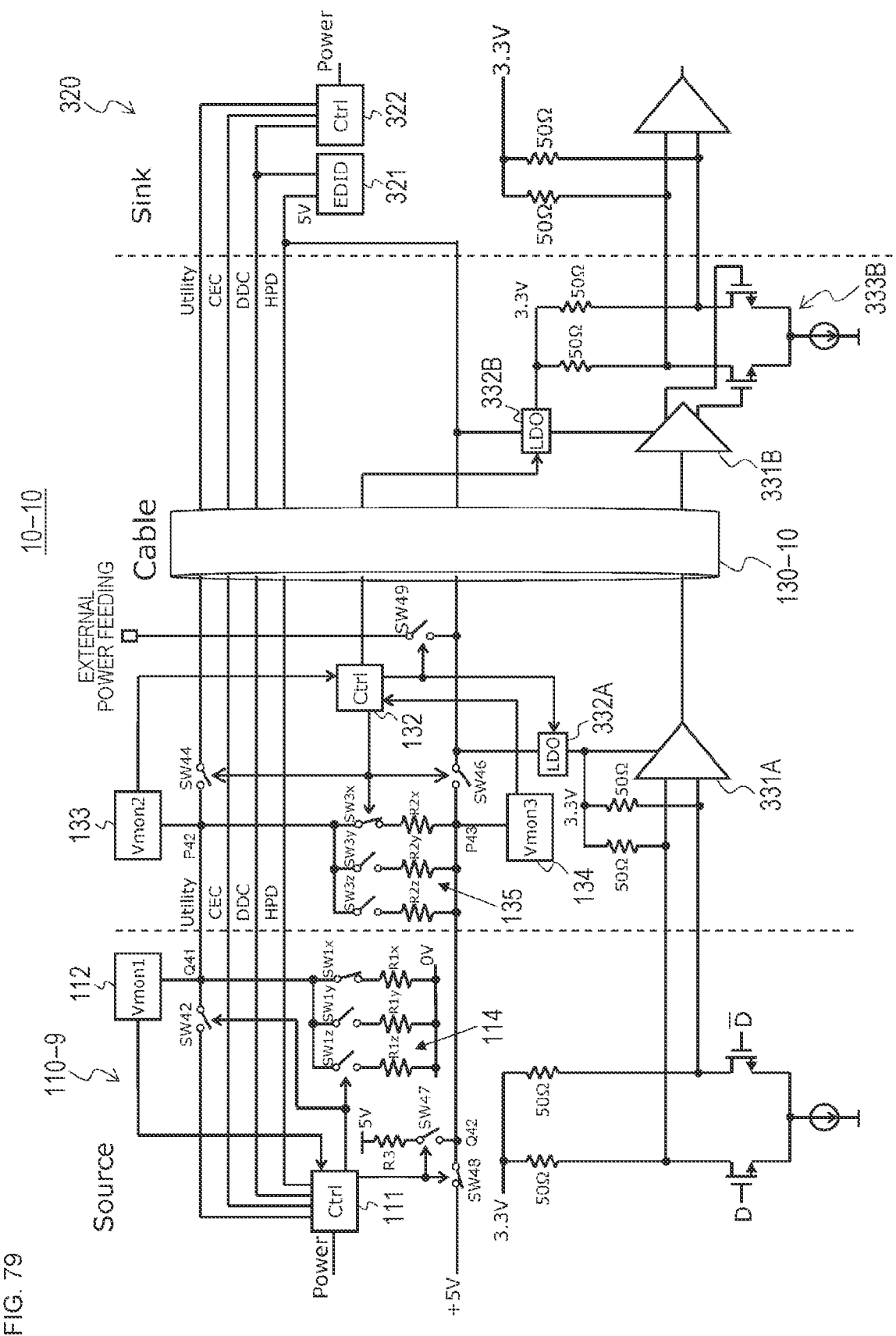
FIG. 79 is a diagram illustrating an improved exemplary configuration of the transmission system of which the cable includes the external power feeding terminal.

To avoid the above inconvenience, as illustrated in a transmission system 10-10 in FIG. 79, it is possible to cope with the inconvenience by providing a switch SW49 between the external power feeding terminal and the +5 V power line and closing the switch SW49 after terminating the entire sequence. Alternatively, not providing the switch between the external power feeding terminal and the +5 V power line, the switch may be provided on the side of the sink device 320 from a connection point between the external power feeding terminal and the +5 V. Note that, although detailed description is omitted, the transmission system 10-10 includes a source device 110-9 as a transmission device, a sink device 320 as a reception device, and an HDMI cable 130-10 that connects these devices, includes the external power feeding terminal, and has a switch SW49 provided thereon.

Tenth Embodiment

Figure 80:
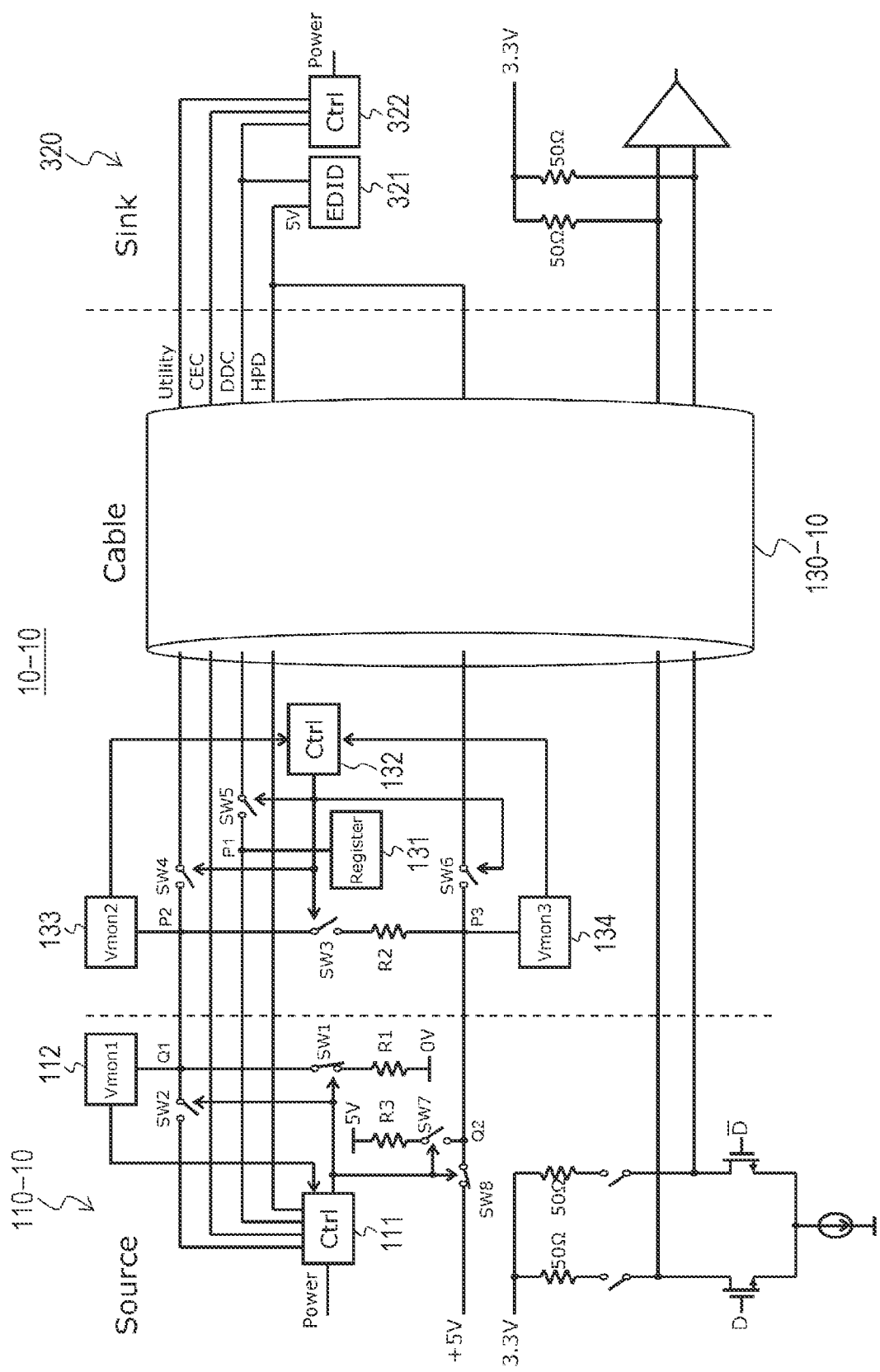
FIG. 80 is a diagram illustrating an exemplary configuration of a transmission system including the compatible source device that is compatible to intervening the repeater and the compatible HDMI cable (including register).

FIG. 80 illustrates an exemplary configuration of a transmission system 10-10. The transmission system 10-10 is an HDMI transmission system using an HDMI as a digital interface. The transmission system 10-10 includes a source device 110-10 as a transmission device, a sink device 320 as a reception device, and an HDMI cable 130-10 that connects these devices. In FIG. 80, a part corresponding to that in FIGS. 42 and 7 is denoted with the same reference numeral, and the detailed description thereof is appropriately omitted.

The HDMI cable 130-10 is a compatible cable including a register 131. The HDMI cable 130-10 includes a control unit 132, voltage monitoring units 133 and 134, switches SW3, SW4, SW5, and SW6, and a voltage dividing resistor R2, in addition to the register 131.

The register 131 is connected to a point P1 of the DDC line. The switch SW5 is inserted at a point closer to the sink device 320 than the point P1 of the DDC line. A series circuit including the resistor R2 and the switch SW3 is connected between a point P2 of the Utility line and a point P3 of the +5 V power line. With this structure, the voltage of 5 V is applied to the point P2 of the Utility line via the series circuit including the resistor R2 and the switch SW3. The switch SW4 is inserted at a point closer to the sink device 320 than the point P2 of the Utility line. Furthermore, the switch SW6 is inserted at a point closer to the sink device 320 than the point P3 of the +5 V power line.

The voltage monitoring unit 133 monitors a voltage at the point P2 of the Utility line and sends the monitoring result to the control unit 132. The voltage monitoring unit 134 monitors a voltage at the point P3 of the +5 V power line and sends the monitoring result to the control unit 132. The control unit 132 controls an operation of each unit of the HDMI cable 130-10.

The source device 110-10 is a compatible source device. The source device 110-10 includes a voltage monitoring unit 112, switches SW1, SW2, SW7, and SW8, and voltage dividing resistors R1 and R3 in addition to a control unit 111 that controls an operation of each unit. It is desirable that the resistor R2 of the HDMI cable 130-10 described above and the resistors R1 and R3 of the source device 110-10 be each a large value to some extent so as to reduce current consumption. Hereinafter, the description will be made while assuming R1=400 kΩ, R2=100 kΩ, and R3=500 kΩ.

A series circuit including the resistor R1 and the switch SW1 is connected between the ground and a point Q1 of the Utility line. With this structure, 0 V that is a ground voltage is applied to the point Q1 of the Utility line via the series circuit including the resistor R1 and the switch SW1. The switch SW2 is inserted on a side opposite to the terminal side of the point Q1 of the Utility line. The voltage monitoring unit 112 monitors a voltage at the point Q1 of the Utility line and sends the monitoring result to the control unit 111. Furthermore, a power of 5 V is applied to a point Q2 of the +5 V power line via a series circuit including the resistor R3 and the switch SW7. The switch SW8 is inserted on a side opposite to the terminal side of the point Q2 of the +5 V power line.

In the transmission system 10-10 illustrated in FIG. 80, the HDMI cable 130-10 is a compatible cable, and the source device 110-10 is a compatible source device. Therefore, the source device 110-10 determines that the connected HDMI cable is a compatible cable and operates in the compatible mode. Similarly, the HDMI cable 130-10 determines that the connected source device is a compatible source device and operates in the compatible mode.

Operations of the source device 110-10 and the HDMI cable 130-10 will be described in detail. In FIG. 80, initial states of the source device 110-10 and the HDMI cable 130-10 are illustrated. In the initial state of the source device 110-10, the switches SW1 and SW8 are in a short-circuit state, and the switches SW2 and SW7 are in an open state. Meanwhile, in the initial state of the HDMI cable 130-10, the switches SW3, SW4, SW5, and SW6 are in an open state.

Figure 81:
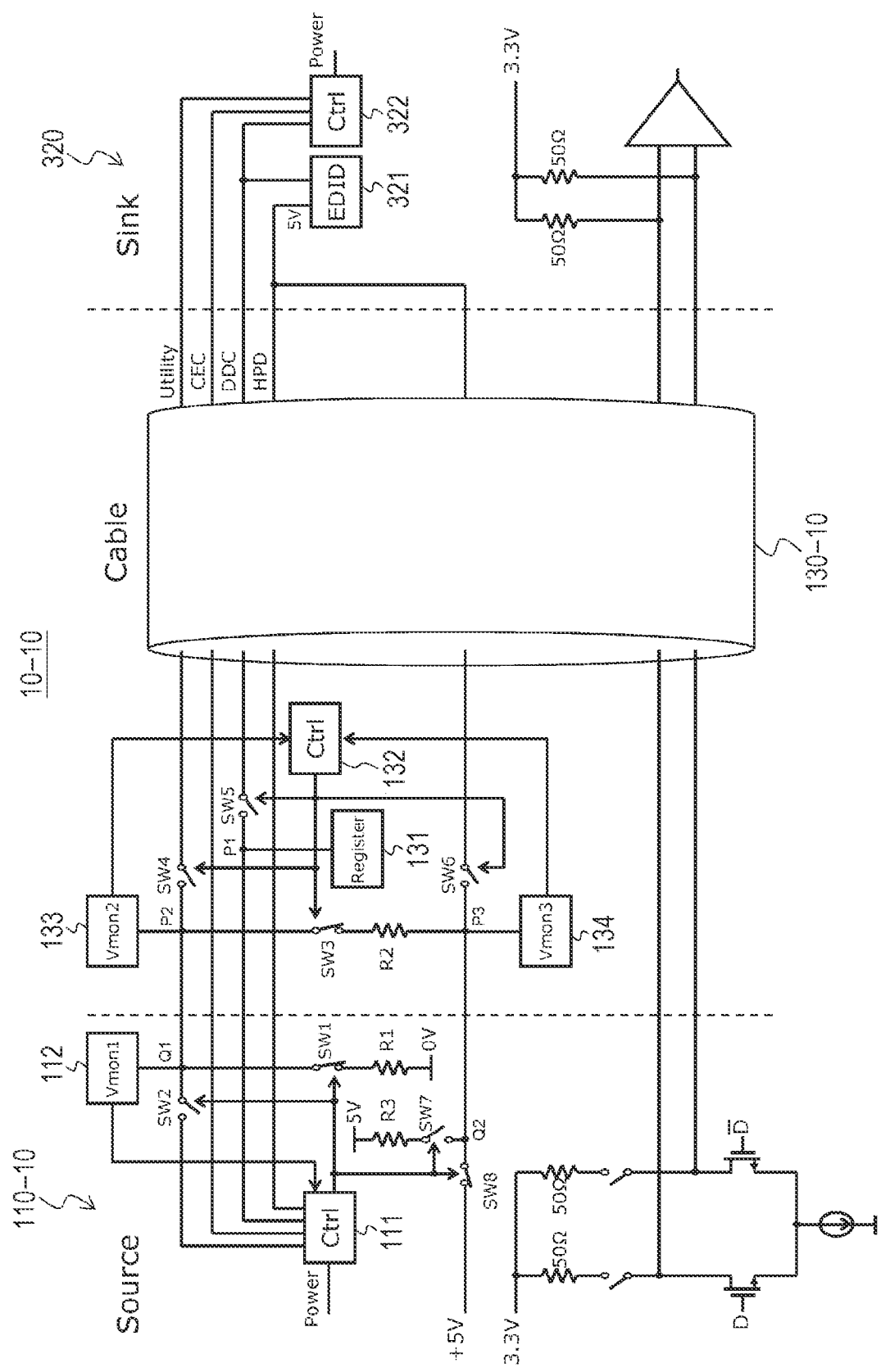
FIG. 81 is a diagram for explaining an operation of the transmission system in FIG. 80.

When the control unit 132 of the HDMI cable 130-10 detects that the voltage at the point P3 of the +5 V power line, that is, the voltage of the +5 V power line is stabilized at 5 V as receiving the monitoring result of the voltage monitoring unit 134, the control unit 132 short-circuits the switch SW3 as illustrated in FIG. 81. By short-circuiting the switch SW3 after the voltage of the power line is stabilized at 5 V in this way, it is possible to avoid that start timings of negotiations of the source device 110-10 and the HDMI cable 130-10 become different from each other due to an unstable state of the voltage of the power line at the time when a cable is inserted.

When the switch SW3 is in the short-circuit state, the resistors R1 and R2 are connected in series between the ground (0 V) of the source device 110-10 and the +5 V power line of the HDMI cable 130-10, and a voltage of 4 V is obtained at the points Q1 and P2 of the Utility line by resistance voltage division.

The voltage monitoring unit 112 of the source device 110-10 monitors that the voltage at the point Q1 is 4 V and sends the monitoring result to the control unit 111. The control unit 111 determines that the HDMI cable that is a compatible cable is connected on the basis of the monitoring result. Similarly, the voltage monitoring unit 133 of the HDMI cable 130-10 monitors that the voltage at the point P2 is 4 V and sends the monitoring result to the control unit 132. The control unit 132 determines that the source device that is a compatible source device is connected on the basis of the monitoring result.

Here, since the switch SW2 is in the open state in the source device 110-10, the voltage of 4 V is not propagated in the source device 110-10 and does not affect the inside of the source device 110-10. Similarly, since the switch SW4 is in the open state in the HDMI cable 130-10, the voltage of 4 V is not propagated to the sink device 320 and does not affect the sink device 320.

Figure 82:
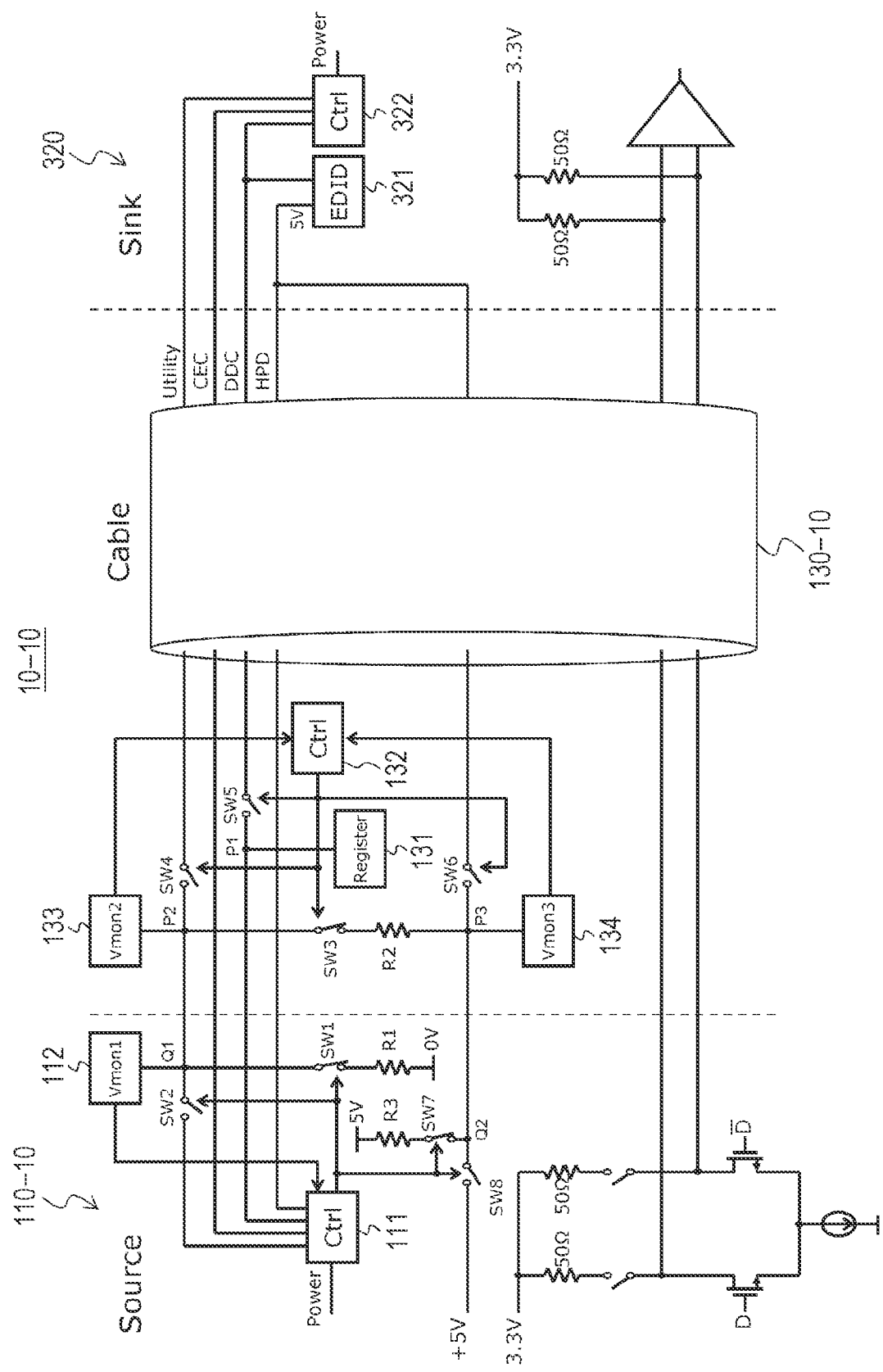
FIG. 82 is a diagram for explaining the operation of the transmission system in FIG. 80.

The control unit 111 of the source device 110-10 short-circuits the switch SW7 as illustrated in FIG. 82 on the basis of the monitoring result indicating 4 V by the voltage monitoring unit 112, and thereafter, opens the switch SW8. Here, the resistor R3 is connected to the resistors R1 and R2 in series, and a voltage of 2 V is obtained at the points Q1 and P2 of the Utility line by resistance voltage division.

Here, in a case where a relay, such as the repeater 140 (refer to FIG. 50), that isolates the +5 V power line is connected between the source device 110-10 and the HDMI cable 130-10, a change in a generated voltage by the resistor R3 is not made. Therefore, the fact that the voltage of 2 V is obtained at the points Q1 and P2 of the Utility line means that the relay such as the repeater is not connected.

The voltage monitoring unit 112 of the source device 110-10 monitors that the voltage at the point Q1 becomes 2 V and sends the monitoring result to the control unit 111. The control unit 111 determines that the relay such as the repeater that isolates the +5 V power line is not connected between the compatible cable and the control unit 111 on the basis of the monitoring result and performs control to operate in a compatible mode.

Similarly, the voltage monitoring unit 133 of the HDMI cable 130-10 monitors that the voltage at the point P2 becomes 2 V and sends the monitoring result to the control unit 132. The control unit 132 determines that the relay such as the repeater that isolates the +5 V power line is not connected between the compatible source device and the control unit 132 on the basis of the monitoring result and performs control to operate in a compatible mode.

Note that, in a case where the relay such as the repeater is connected between the source device 110-10 and the HDMI cable 130-10, if the switch SW7 is in the short-circuit state and the switch SW8 is in the open state, the voltage at the points Q1 and P2 of the Utility line is maintained to be 4 V. In this case, since the control unit 111 of the source device 110-10 controls switching of the states of the switches SW7 and SW8, the voltage at the point Q1 is maintained to be 4 V even if the states of the switches SW7 and SW8 are switched. Therefore, it can be determined that the relay such as the repeater is connected between the source device 110-10 and the HDMI cable 130-10.

However, the control unit 132 of the HDMI cable 130-10 does not know a switching timing of the states of the switches SW7 and SW8 of the source device 110-10. Therefore, it cannot be determined that the relay such as the repeater is connected between the source device 110-10 and the HDMI cable 130-10 on the basis of the monitoring result of the voltage at the point P2. Therefore, in this case, the control unit 111 of the source device 110-10 opens the switch SW1, sets the voltage at the point P2 of the Utility line to 5 V, and notifies the control unit 132 of the HDMI cable 130-10 that the relay such as the repeater is connected between the source device 110-10 and the HDMI cable 130-10.

In this way, in a case where the relay such as the repeater is connected between the source device 110-10 and the HDMI cable 130-10, the source device 110-10 and the HDMI cable 130-10 perform a predetermined procedure and shift to normal operations.

In a case where the relay such as the repeater is not connected between the source device 110-10 and the HDMI cable 130-10, the source device 110-10 is controlled to operate in a compatible mode. Therefore, the control unit 111 accesses (read/write) the register 131 of the HDMI cable 130-10 via the DDC line. In this case, the control unit 111 can read and use specification information and the like of the HDMI cable 130-10 existing in the register 131 and can write information regarding a current supply capability of the source device 110-10. After shifting to the normal operation, the control unit 132 of the HDMI cable 130-10 can read and use the information regarding the current supply capability of the source device 110-10 written in the register 131.

Note that, in a case where the control unit 111 accesses (read/write) the register 131 via the DDC line, since the switch SW5 is in the open state, it is possible to prevent access information of the register 131 from being transmitted to the sink device 320, and occurrence of a malfunction of the sink device 320 of which the address is not defined is avoided.

Figure 83:
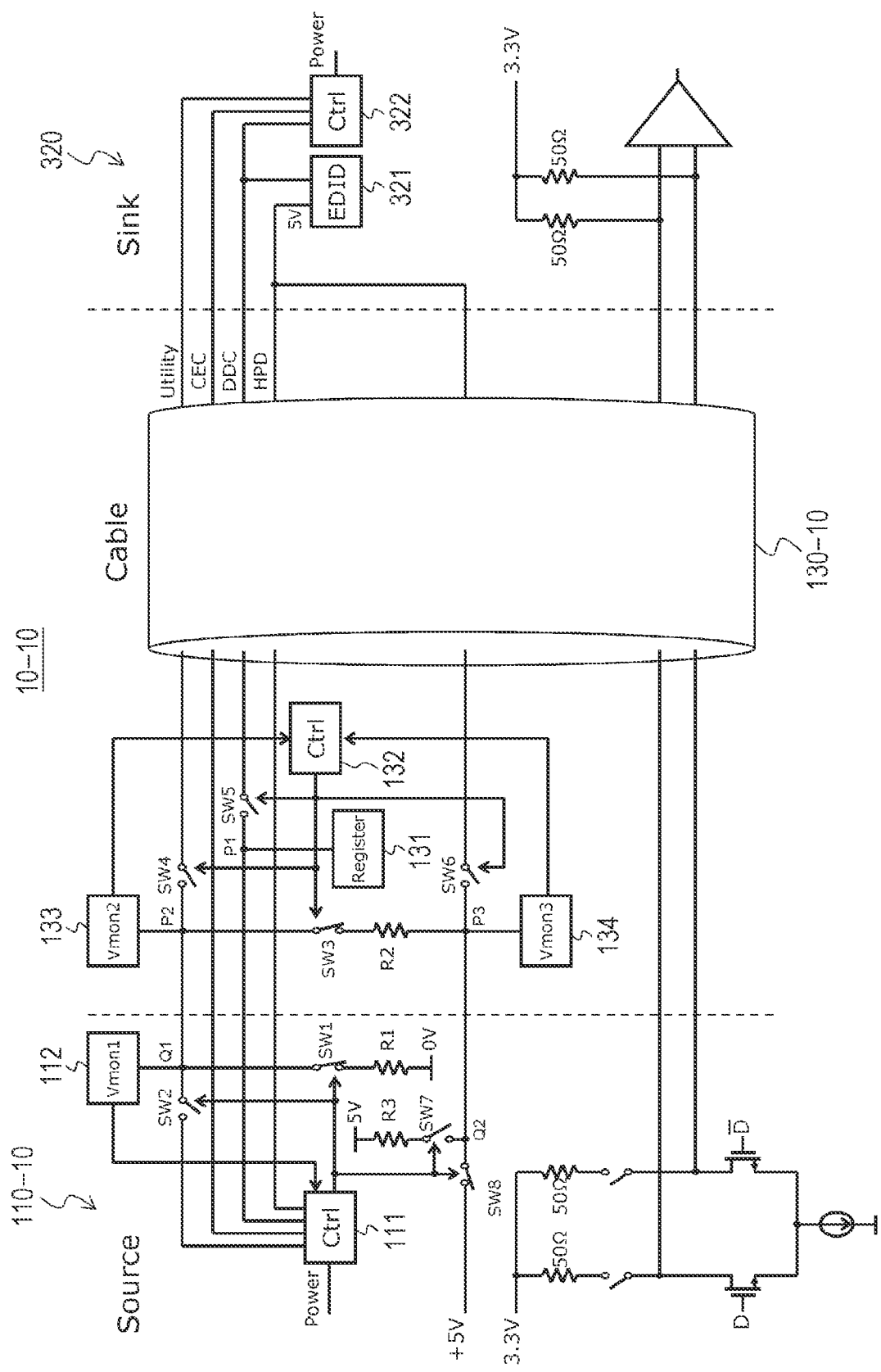
FIG. 83 is a diagram for explaining the operation of the transmission system in FIG. 80.

After the access (read/write) to the register 131 described above is terminated, the control unit 111 of the source device 110-10 short-circuits the switch SW8 and opens the switch SW7 as illustrated in FIG. 83. Therefore, the voltage at the point P2 of the Utility line becomes 4 V again. In the HDMI cable 130-10, the voltage monitoring unit 133 monitors that the voltage at the point P2 is 4 V and sends the monitoring result to the control unit 132.

Figure 84:
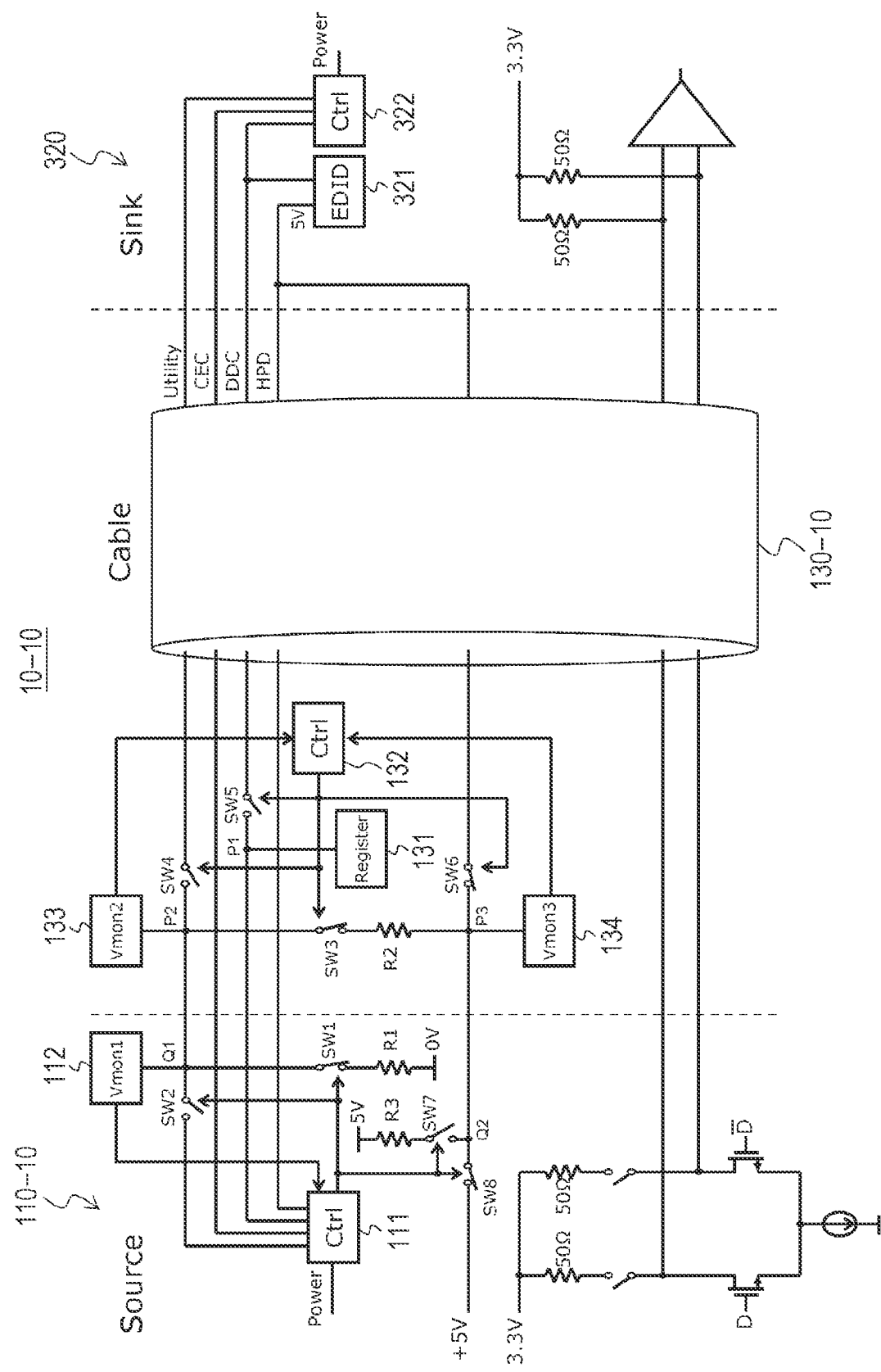
FIG. 84 is a diagram for explaining the operation of the transmission system in FIG. 80.

The control unit 132 short-circuits the switch SW6 on the basis of the monitoring result as illustrated in FIG. 84. In this way, in a case where the source device 110-10 sends a 5 V voltage to the sink device 320 through the +5 V power line by short-circuiting the switch SW6, accordingly, a 5 V voltage (connection detection signal) can be sent from the sink device 320 to the source device 110-10 via the HPD line.

In this case, since the switch SW1 of the source device 110-10 is in the short-circuit state and the switch SW3 of the HDMI cable 130-10 is in the short-circuit state, the voltage at the point Q1 of the Utility line is 4 V. Therefore, in a case where the HDMI cable 130-10 is removed from the source device 110-10, the control unit 111 of the source device 110-10 can detect that from the monitoring result of the voltage monitoring unit 112, and it is possible to take measures such as recovering the switch to the initial state so as to not to cause a malfunction.

Figure 85:
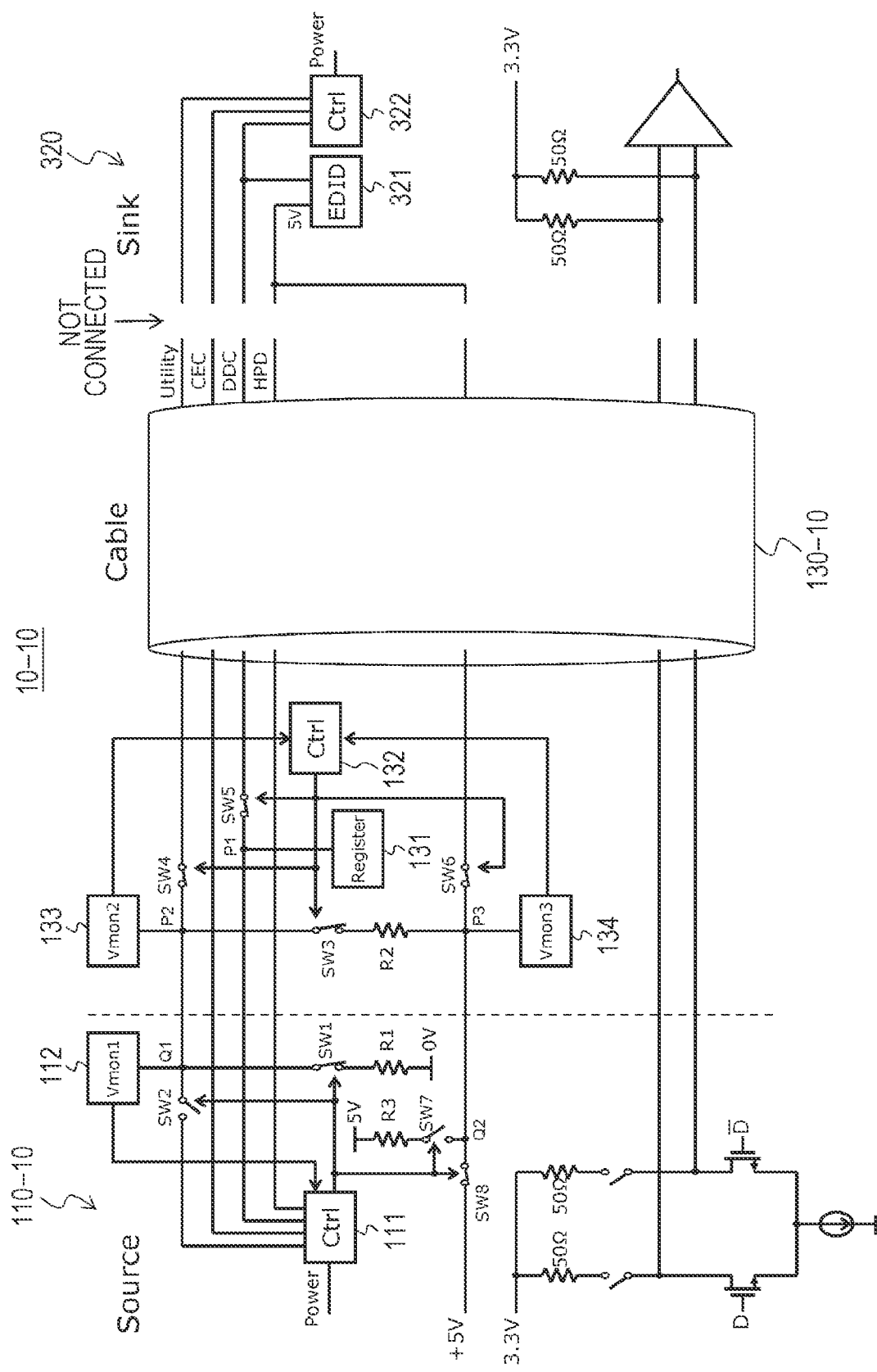
FIG. 85 is a diagram for explaining the operation of the transmission system in FIG. 80.

For example, as illustrated in FIG. 85, in a case where the HDMI cable 130-10 is not connected to the sink device 320, a state is continued in which the sink device 320 cannot send the 5 V voltage (connection detection signal) to the source device 110-10 via the HPD line. In a case where the HDMI cable 130-10 is removed from the source device 110-10 in this state, the voltage at the point Q1 of the Utility line changes from 4 V to 0 V. With this change, the control unit 111 of the source device 110-10 can detect that the HDMI cable 130-10 is removed from the source device 110-10.

Figure 86:
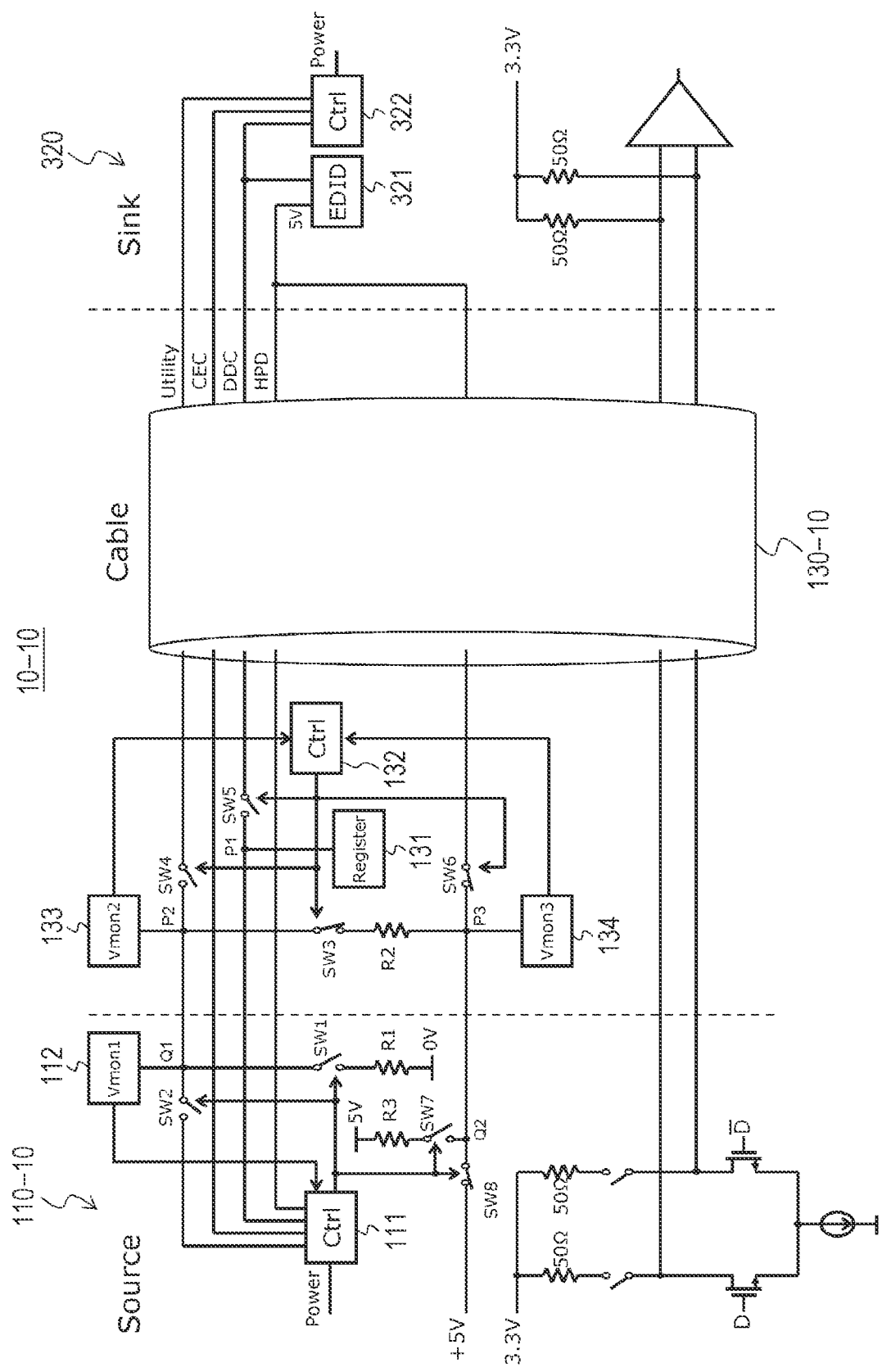
FIG. 86 is a diagram for explaining the operation of the transmission system in FIG. 80.

When the 5 V voltage (connection detection signal) is sent from the sink device 320 to the source device 110-6 via the HPD line, the control unit 111 of the source device 110-10 recognizes that the preparation of the cable is completed and opens the switch SW1 as illustrated in FIG. 86. Therefore, the voltage at the point P2 of the Utility line is 5 V.

In the HDMI cable 130-10, the voltage monitoring unit 133 monitors that the voltage at the point P2 is 5 V and sends the monitoring result to the control unit 132.

Figure 87:
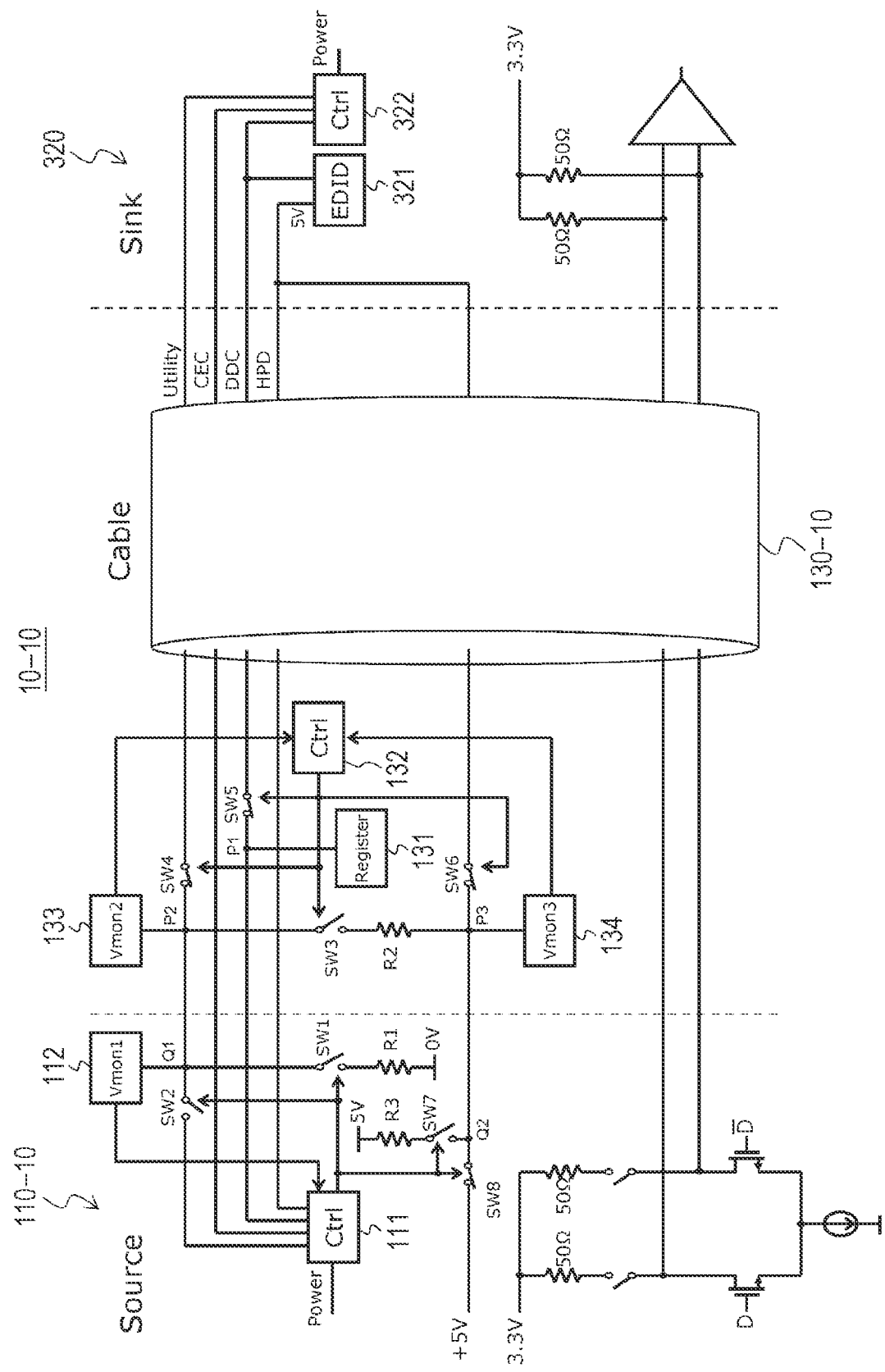
FIG. 87 is a diagram for explaining the operation of the transmission system in FIG. 80.
Figure 88:
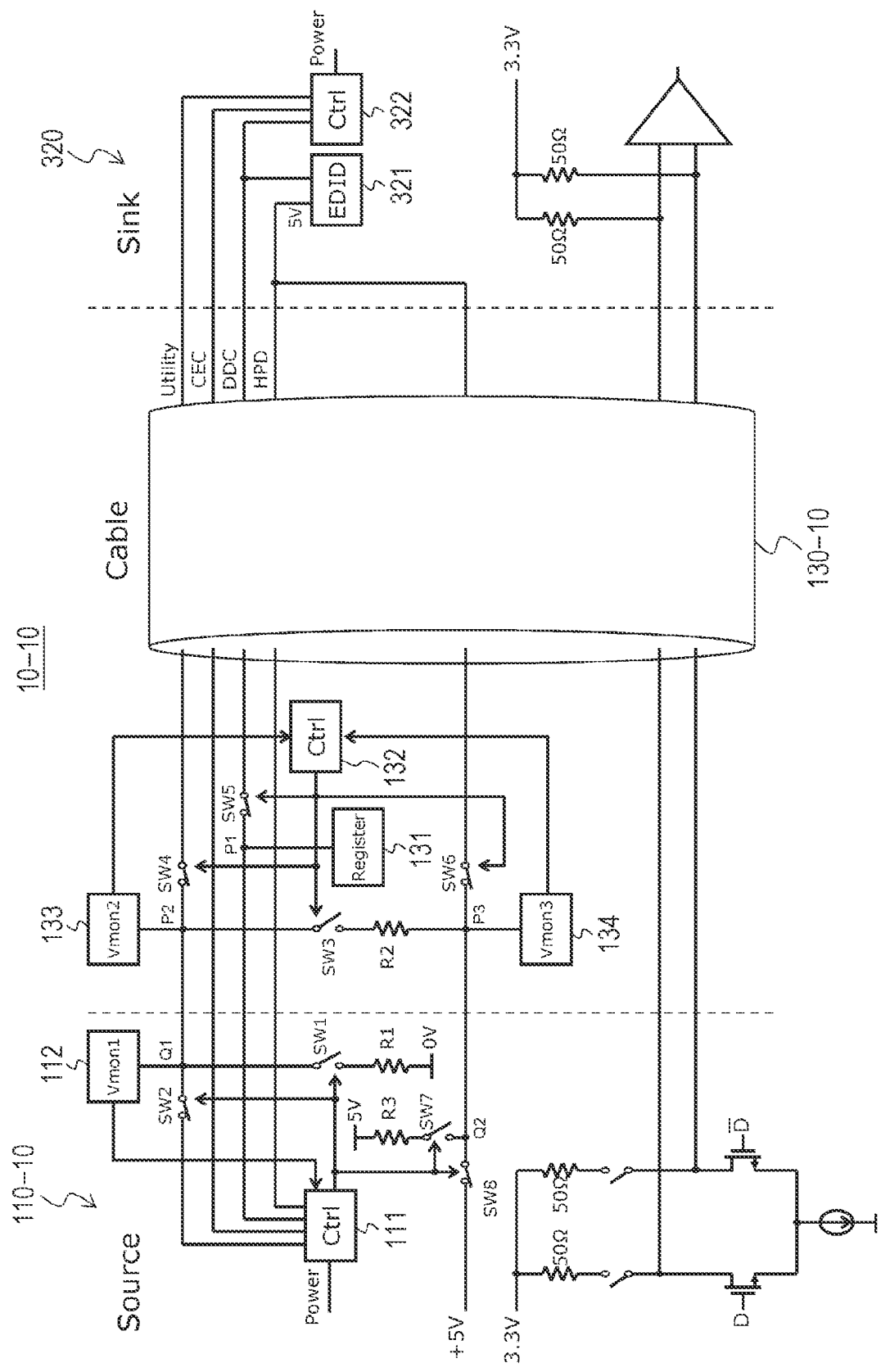
FIG. 88 is a diagram for explaining the operation of the transmission system in FIG. 80.

The control unit 132 changes the state of each switch on the basis of the monitoring result as illustrated in FIG. 87 and shifts to a normal operation. In this case, not to affect the sink device 320, first, the switch SW3 is opened, and next, the switch SW4 is short-circuited and the switch SW5 is short-circuited. Furthermore, after waiting for a certain period of time after opening the switch SW1, the control unit 111 of the source device 110-10 short-circuits the switch SW2 as illustrated in FIG. 88 and shifts to a normal operation.

In the above, a case where the register 131 exists in the HDMI cable 130-10 has been described. However, in a case where it is understood that there is no register access from the source device 110-10, it is not necessary for the HDMI cable 130-10 to include the register 131 and the switch SW5. Note that, in a case where whether or not the register access from the source device 110-10 is made is unknown, by providing the switch SW5, even if the HDMI cable 130-10 does not include the register 131, transmission of an undefined address to the sink device 320 can be prevented in advance, and occurrence of a malfunction of the sink device 320 can be avoided in advance.

In this way, in the transmission system 10-10 illustrated in FIG. 80, after the voltage of the +5 V power line is stabilized to 5 V, the switch SW3 of the HDMI cable 130-10 is short-circuited, the resistors R1 and R2 are connected in series between the ground (0 V) of the source device 110-10 and the +5 V power line of the HDMI cable 130-10, and a voltage of 4 V is obtained at the points Q1 and P2 of the Utility line. Therefore, the source device 110-10 can determine that the compatible HDMI cable is connected, and the HDMI cable 130-10 can determine that the compatible source device is connected.

Furthermore, in the transmission system 10-10 illustrated in FIG. 80, the switch SW7 is in the short-circuit state, the switch SW8 is in the open state, the resistors R1, R2, and R3 are connected in series between the ground (0 V) of the source device 110-10 and the 5 V power supply, and the voltage of 2 V is obtained at the points Q1 and P2 of the Utility line. Therefore, the source device 110-10 and the HDMI cable 130-10 can determine that the relay such as the repeater that isolates the +5 V power line does not intervene between the source device 110-10 and the HDMI cable 130-10.

Furthermore, in the transmission system 10-10 illustrated in FIG. 80, until the source device 110-10 receives the connection detection signal from the sink device 320 via the HPD line, the switch SW1 is in the short-circuit state, and the voltage of 4 V is obtained at the point Q1 of the Utility line. Therefore, in a case where the HDMI cable 130-10 is removed from the source device 110-10, the voltage at the point Q1 of the Utility line changes from 4 V to 0 V. Therefore, the source device 110-10 can detect the removal and can take measures such as recovering the switch to the initial state so as not to cause a malfunction.

Figure 89:
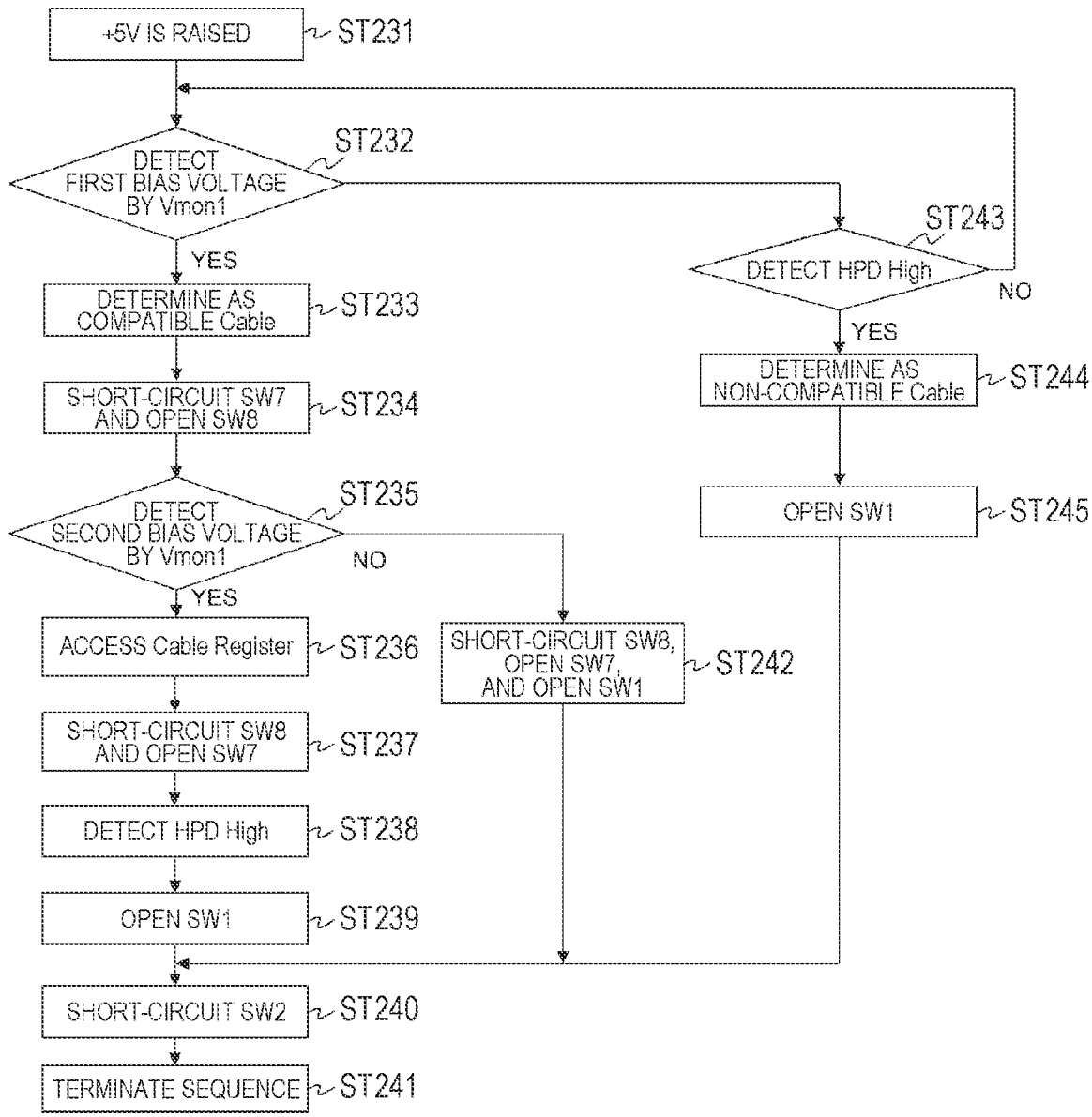
FIG. 89 is a diagram illustrating an example of a sequence of the compatible source device included in the transmission system in FIG. 80.

FIG. 89 illustrates an example of a sequence of the source device 110-10 that is a compatible source device. In step ST231, for example, when a power switch is turned on and +5 V is raised, the sequence is started, and the procedure proceeds to step ST232. In step ST232, the control unit 111 determines whether a first bias voltage (4 V) is detected by the voltage monitoring unit 112.

When the first bias voltage (4 V) is detected, the control unit 111 determines in step ST233 that the HDMI cable that is a compatible cable is connected. Then, in step ST234, the control unit 111 changes the open state of the switch SW7 to the short-circuit state, and thereafter, changes the short-circuit state of the switch SW8 to the open state.

Next, in step ST235, the control unit 111 determines whether a second bias voltage (2 V) is detected by the voltage monitoring unit 112. When the second bias voltage (2 V) is detected, the control unit 111 determines that the relay such as the repeater that isolates the +5 V power line does not intervene between the HDMI cable and the control unit 111, and the procedure proceeds to step ST236. In step 236, the control unit 111 accesses (read/write) the register of the HDMI cable.

Then, after the access to the register of the HDMI cable is terminated, the control unit 111 changes the open state of the switch SW8 to the short-circuit state and changes the open state of the switch SW7 to the short-circuit state in step ST237.

Next, when the control unit 111 detects in step ST238 that the HPD line becomes a high level (5 V), the control unit 111 changes the state of the switch SW1 from the open state to the short-circuit state in step ST239. Then, after waiting for a certain period of time, the control unit 111 changes the open state of the switch SW2 to the short-circuit state in step ST240, and thereafter, the sequence is terminated in step ST241.

Furthermore, when the second bias voltage (2 V) is not detected in step S235, the control unit 111 determines that the relay such as the repeater that isolates the +5 V power line intervenes between the HDMI cable and the control unit 111, and the procedure proceeds to step ST242. In step ST242, the control unit 111 changes the open state of the switch SW8 to the short-circuit state, changes the short-circuit state of the switch SW7 to the open state, and further changes the short-circuit state of the switch SW1 to the open state. Then, in step ST240, the control unit 111 changes the open state of the switch SW2 to the short-circuit state. Then, in step ST241, the sequence is terminated.

Furthermore, when the first bias voltage (4 V) is not detected in step ST232, the control unit 111 determines in step ST243 whether or not the high level (5 V) of the HPD line is detected. When the high level (5 V) of the HPD line is not detected, the procedure returns to step ST232. Meanwhile, when the high level (5 V) of the HPD line is detected, the control unit 111 determines in step ST244 that the HDMI cable that is a non-compatible cable is connected.

Then, in step ST245, the state of the switch SW1 is changed from the short-circuit state to the open state. Next, in step ST240, the control unit 111 changes the state of the switch SW2 from the open state to the short-circuit state. Then, in step ST241, the sequence is terminated.

Figure 90:
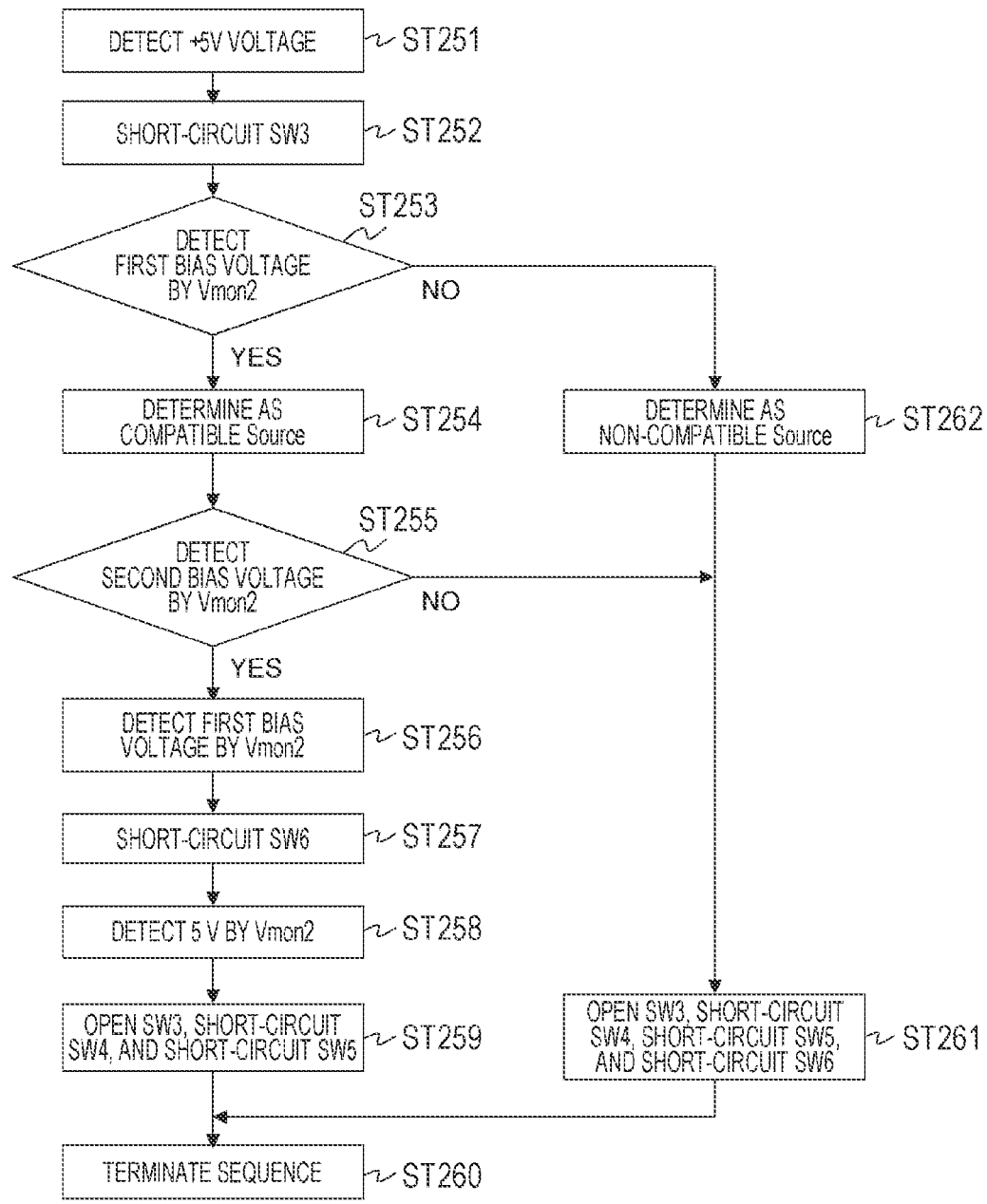
FIG. 90 is a diagram illustrating an example of a sequence of the compatible HDMI cable included in the transmission system in FIG. 80.

FIG. 90 illustrates an example of a sequence of the HDMI cable 130-10 that is a compatible cable. When a voltage of 5 V is detected by the voltage monitoring unit 134 in step ST251, the sequence is started, and the procedure proceeds to step ST252. Then, in step ST252, after the voltage of 5 V of the +5 V power line is stabilized, the control unit 132 changes the open state of the switch SW3 to the short-circuit state.

Next, in step ST253, the control unit 132 determines whether the first bias voltage (4 V) is detected by the voltage monitoring unit 133. When the first bias voltage (4 V) is detected, the control unit 132 determines in step ST254 that the source device that is a compatible source device is connected.

Next, in step ST255, the control unit 132 determines whether the second bias voltage (2 V) is detected by the voltage monitoring unit 133. When the second bias voltage (2 V) is detected, the control unit 132 determines that the relay such as the repeater that isolates the +5 V power line does not intervene between the source device and the control unit 132, and the procedure proceeds to step ST256. When the voltage monitoring unit 133 detects the first bias voltage (4 V) in step ST256, the procedure proceeds to step ST257.

In step ST257, the control unit 132 changes the open state of the switch SW6 to the short-circuit state. Next, when 5 V is detected by the voltage monitoring unit 133 in step ST258, the control unit 132 changes the short-circuit state of the switch SW3 to the open state, changes the open state of the switch SW4 to the short-circuit state, and further changes the open state of the switch SW5 to the short-circuit state in step ST259. Then, in step ST260, the sequence is terminated.

Furthermore, when the second bias voltage (2 V) is not detected in step ST255, after 5 V is detected by the voltage monitoring unit 133, the control unit 132 determines that the relay such as the repeater that isolates the +5 V power line intervenes between the source device and the control unit 132, and the procedure proceeds to step ST261. In step ST261, the control unit 132 changes the short-circuit state of the switch SW3 to the open state, changes the open state of the switch SW4 to the short-circuit state, changes the open state of the switch SW5 to the short-circuit state, and further changes the open state of the switch SW6 to the short-circuit state. Then, in step ST260, the sequence is terminated.

Furthermore, when the first bias voltage (4 V) is not detected in step ST253, the control unit 132 determines in step ST262 that the source device that is a non-compatible source device is connected. Then, in step ST261, the control unit 132 changes the short-circuit state of the switch SW3 to the open state, changes the open state of the switch SW4 to the short-circuit state, changes the open state of the switch SW5 to the short-circuit state, and further changes the open state of the switch SW6 to the short-circuit state. Then, in step ST260, the sequence is terminated.

Note that the switches SW1, SW2, SW7, and SW8 of the source device 110-10 and the switches SW3, SW4, SW5, and SW6 of the HDMI cable 130-10 are reset to the initial states when the voltage of the +5 V power line drops.

Eleventh Embodiment

Figure 91:
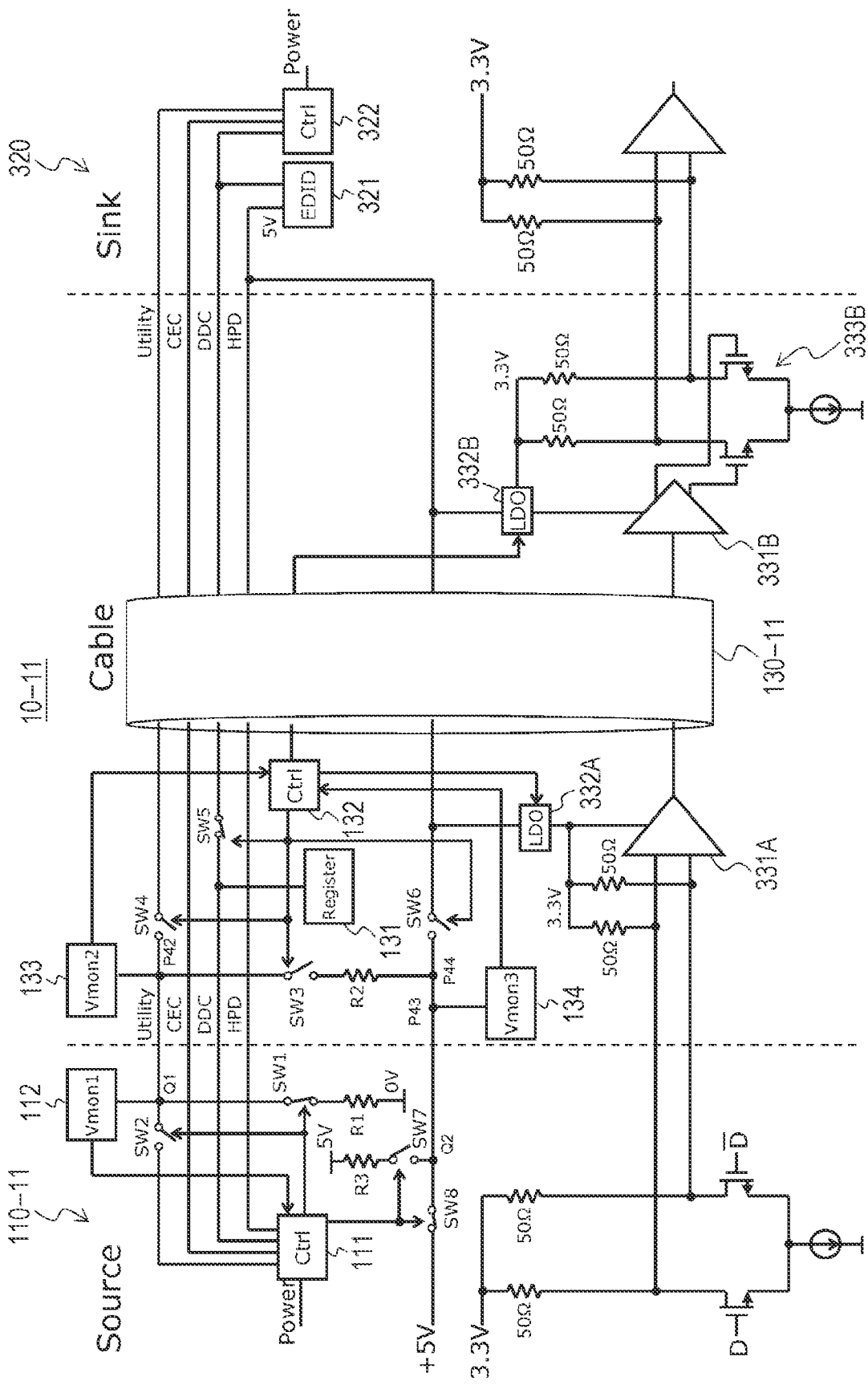
FIG. 91 is a diagram illustrating an exemplary configuration of the transmission system including the compatible source device that is compatible to intervening the repeater and the compatible HDMI cable (including register and current consumption unit).

FIG. 91 illustrates an exemplary configuration of a transmission system 10-11. The transmission system 10-11 is an HDMI transmission system using an HDMI as a digital interface. The transmission system 10-11 includes a source device 110-11 as a transmission device, a sink device 320 as a reception device, and an HDMI cable 130-11 that connects these devices. In FIG. 91, a part corresponding to that in FIGS. 80 and 39 is denoted with the same reference numeral, and the detailed description thereof is appropriately omitted.

The source device 110-11 has a configuration similar to that of the source device 110-10 in the transmission system 10-10 in FIG. 80. The HDMI cable 130-11 is an Active Optical Cable (AOC), whereas the HDMI cable 130-10 in the transmission system 10-10 in FIG. 80 is a normal HDMI cable.

Therefore, the HDMI cable 130-11 includes AOC configuration circuits including conversion circuits 331A and 331B, LDO regulators 332A and 332B, a current driving unit 333B, and the like in addition to a register 131, a control unit 132, voltage monitoring units 133 and 134, and switches SW3, SW4, SW5, and SW6.

Although detailed description is omitted, the transmission system 10-11 operates similarly to the transmission system 10-10 in FIG. 80 and can obtain a similar effect.

Note that, in the transmission system 10-11, the control unit 132 of the HDMI cable 130-11 can perform control for turning on the LDO regulators 332A and 332B and drawing a current equal to or higher than 55 mA from a +5 V power line on the basis of current supply capability information given in notification from the source device 110-11 through the register 131, that is, information indicating that the control unit 132 can draw the current equal to or higher than 55 mA. In this case, for example, in the sequence of the HDMI cable in FIG. 90, after the processing in step ST259, the LDO regulators 332A and 332B are turned on, and an active circuit is set to be in an operation state (Enable). With this operation, the active circuit of the HDMI cable 130-11 can perform an appropriate operation. Furthermore, it is possible to avoid that the source device cannot withstand overcurrent and is broken.

Furthermore, in a case where the HDMI cable 130-11 does not include the register 131, it is considered that the control unit 132 of the HDMI cable 130-11 assumes that the source device 110-11 has sufficient current supply capability information on the basis of the determination that the source device 110-11 is a compatible cable and performs control for turning on the LDO regulators 332A and 332B and drawing the current equal to or higher than 55 mA from the +5 V power line.

Twelfth Embodiment

Figure 92:
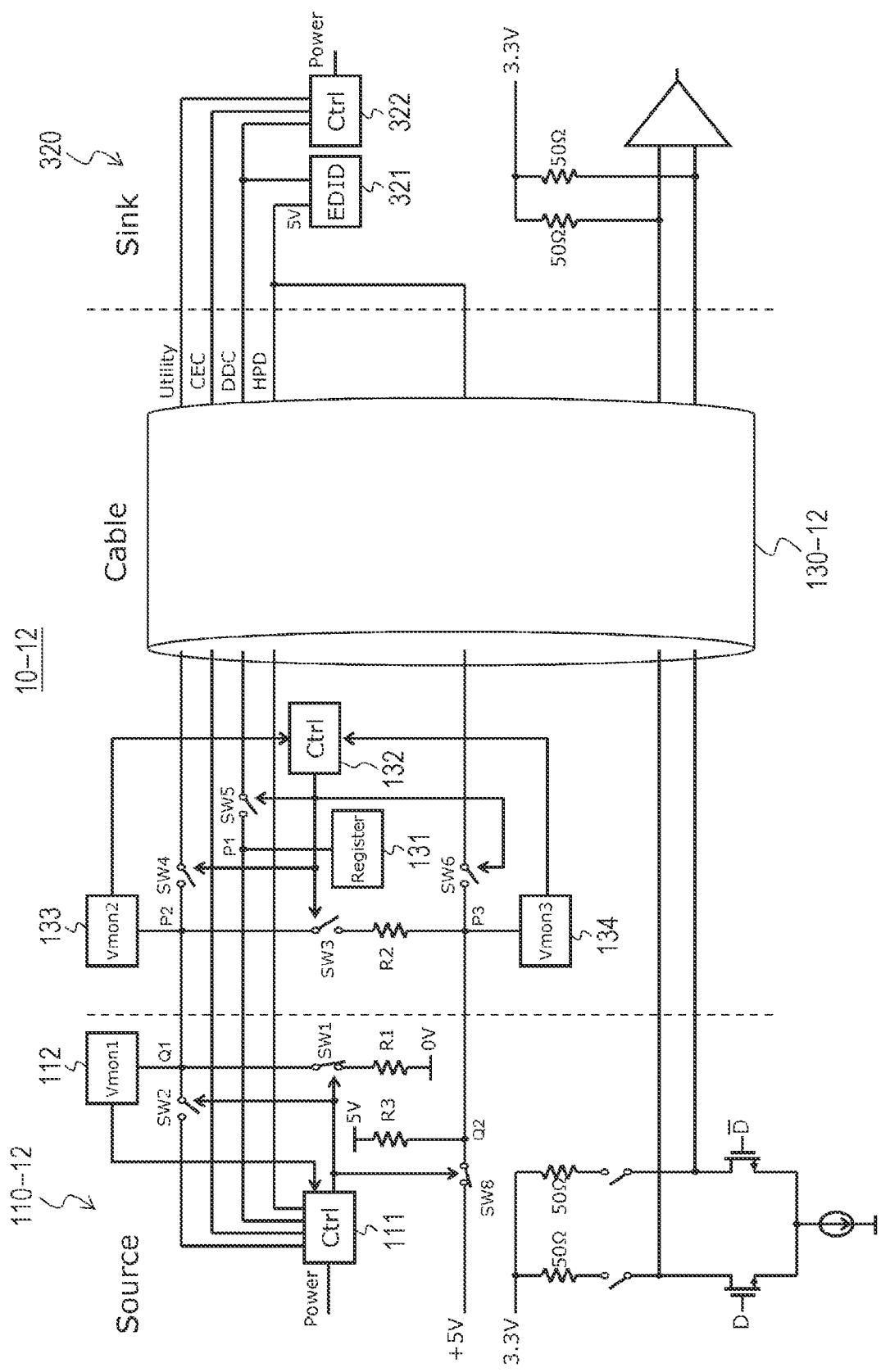
FIG. 92 is a diagram illustrating an exemplary configuration of the transmission system including the compatible source device that is compatible to intervening the repeater and the compatible HDMI cable (including register).

FIG. 92 illustrates an exemplary configuration of a transmission system 10-12. The transmission system 10-12 is an HDMI transmission system using an HDMI as a digital interface. The transmission system 10-12 includes a source device 110-12 as a transmission device, a sink device 320 as a reception device, and an HDMI cable 130-12 that connects these devices. In FIG. 92, a part corresponding to that in FIG. 80 is denoted with the same reference numeral, and the detailed description thereof is appropriately omitted.

The HDMI cable 130-12 has a configuration similar to that of the HDMI cable 130-10 in the transmission system 10-10 in FIG. 80. Whereas the source device 110-10 of the transmission system 10-10 in FIG. 80 includes the switch SW7, the switch SW7 is excluded in the source device 110-12. Other configuration of the source device 110-12 is similar to that of the source device 110-10, and the source device 110-12 operates similarly to the source device 110-10.

Although detailed description is omitted, the transmission system 10-12 operates similarly to the transmission system 10-10 in FIG. 80 and can obtain a similar effect.

Thirteenth Embodiment

Figure 93:
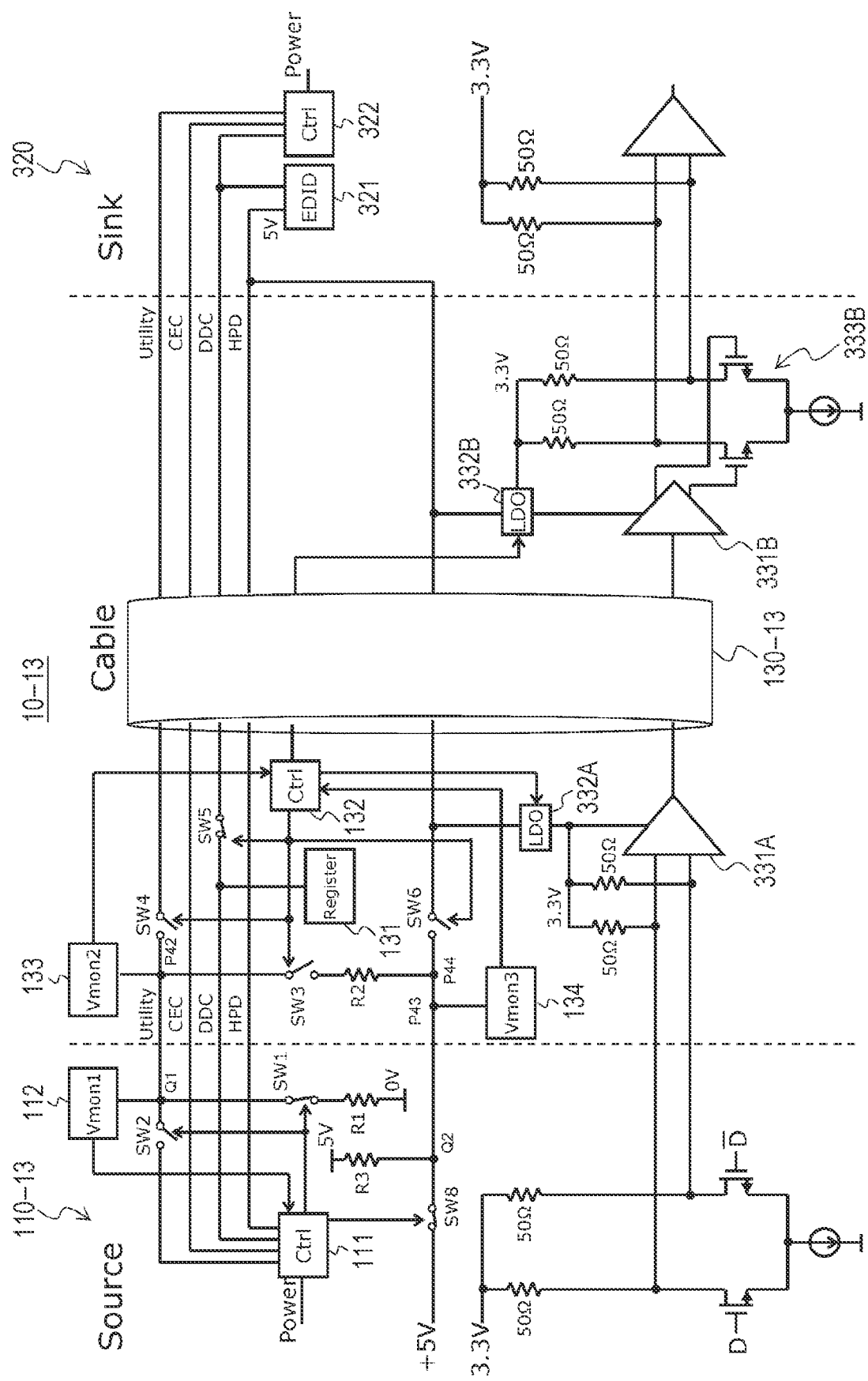
FIG. 93 is a diagram illustrating an exemplary configuration of the transmission system including the compatible source device that is compatible to intervening the repeater and the compatible HDMI cable (including register and current consumption unit).

FIG. 93 illustrates an exemplary configuration of a transmission system 10-13. The transmission system 10-13 is an HDMI transmission system using an HDMI as a digital interface. The transmission system 10-13 includes a source device 110-13 as a transmission device, a sink device 320 as a reception device, and an HDMI cable 130-13 that connects these devices. In FIG. 93, a part corresponding to that in FIG. 91 is denoted with the same reference numeral, and the detailed description thereof is appropriately omitted.

The HDMI cable 130-13 has a configuration similar to that of the HDMI cable 130-11 in the transmission system 10-11 in FIG. 91. Whereas the source device 110-11 of the transmission system 10-11 in FIG. 91 includes the switch SW7, the switch SW7 is excluded in the source device 110-13. Other configuration of the source device 110-13 is similar to that of the source device 110-11, and the source device 110-13 operates similarly to the source device 110-11.

Although detailed description is omitted, the transmission system 10-13 operates similarly to the transmission system 10-11 in FIG. 91 and can obtain a similar effect.

Fourteenth Embodiment

Figure 94:
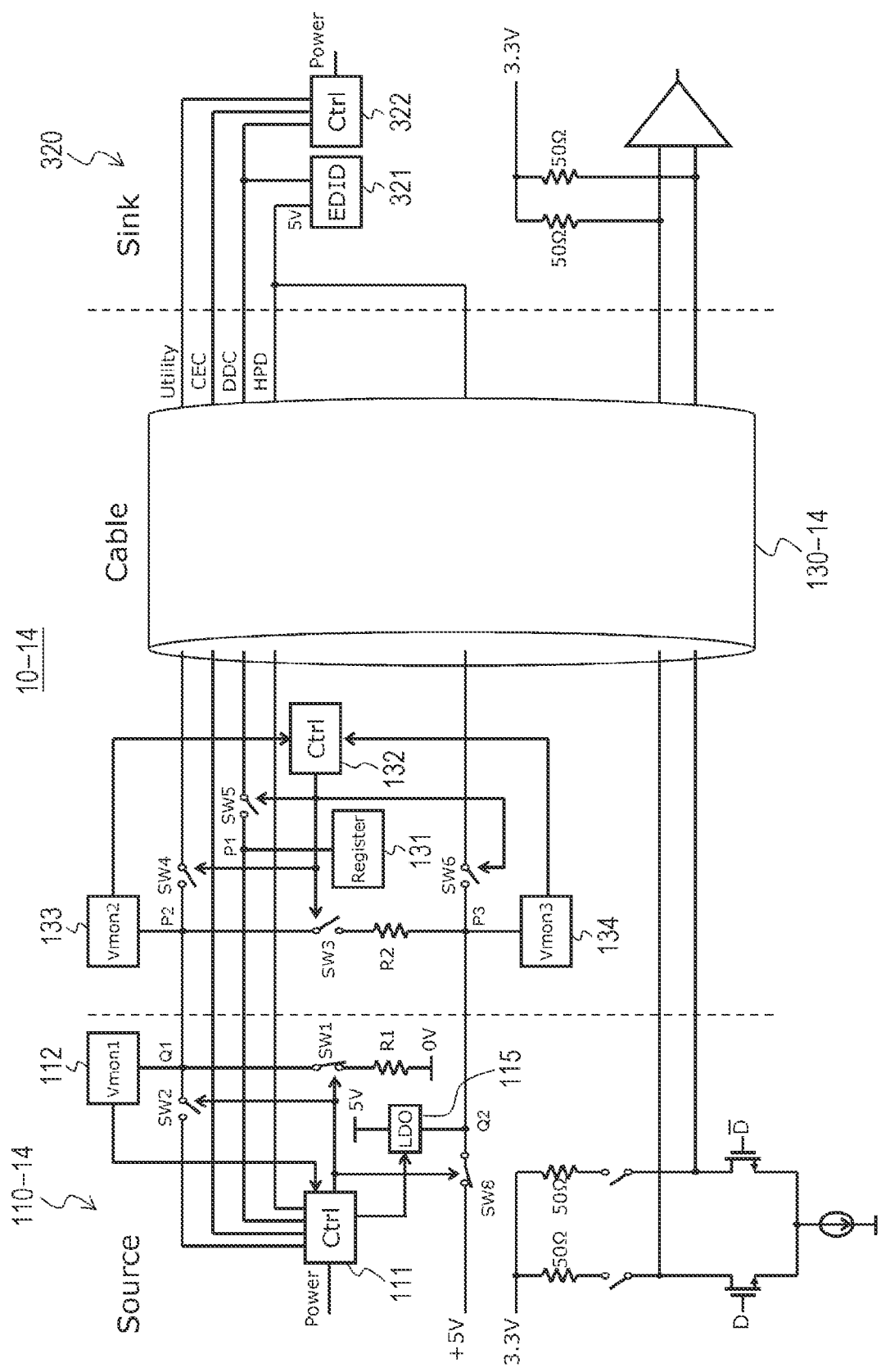
FIG. 94 is a diagram illustrating an exemplary configuration of the transmission system including the compatible source device that is compatible to intervening the repeater and the compatible HDMI cable (including register).

FIG. 94 illustrates an exemplary configuration of a transmission system 10-14. The transmission system 10-14 is an HDMI transmission system using an HDMI as a digital interface. The transmission system 10-14 includes a source device 110-14 as a transmission device, a sink device 320 as a reception device, and an HDMI cable 130-14 that connects these devices. In FIG. 94, a part corresponding to that in FIGS. 80 and 92 is denoted with the same reference numeral, and the detailed description thereof is appropriately omitted.

The HDMI cable 130-14 has a configuration similar to that of the HDMI cable 130-12 in the transmission system 10-12 in FIG. 92. The source device 110-12 of the transmission system 10-12 in FIG. 92 includes the resistor R3. However, in the source device 110-14, a Low Drop Out (LDO) regulator 115 is disposed instead of the resistor R3. The LDO regulator 115 is controlled by a control unit 111 and generates a voltage of 3 V at a timing when a switch SW8 is opened. In a case where the switch SW8 is in a short-circuit state, the LDO regulator 115 is controlled to generate a voltage of 5 V.

Since the LDO regulator 115 generates the voltage of 3 V at the timing when the switch SW8 is opened, resistors R1 and R2 are connected in series between the ground (0 V) of the source device 110-14 and a 3 V power supply, and a voltage of 2 V is obtained at points Q1 and P2 of a Utility line. With this operation, similarly to the transmission systems 10-10 and 10-12 respectively in FIGS. 80 and 92, the source device 110-14 and the HDMI cable 130-14 can determine that a relay such as a repeater that isolates the +5 V power line does not intervene between the source device 110-14 and the HDMI cable 130-14.

Although detailed description is omitted, the transmission system 10-14 operates similarly to the transmission systems 10-10 and 10-12 respectively in FIGS. 80 and 92 and can obtain a similar effect. Furthermore, in the transmission system 10-14, by using the LDO regulator 115 instead of the resistor R3, when the switch SW8 is opened, it is possible to apply the stable voltage of 3 V to the +5 V power line and accurately generate the voltage of 2 V at the points Q1 and P2 of the Utility line. Furthermore, it is possible to accurately determine that the relay such as the repeater does not intervene. By the way, in a case where a voltage drop caused by the resistor R3 is used, in a case where a large current is drawn other than a current flowing in a series resistor including the resistors R1 and R2 via the resistor R3, the voltage drop caused by the resistor R3 increases, and there is a possibility that a voltage less than 3 V is applied to the +5 V power line.

Fifteenth Embodiment

Figure 95:
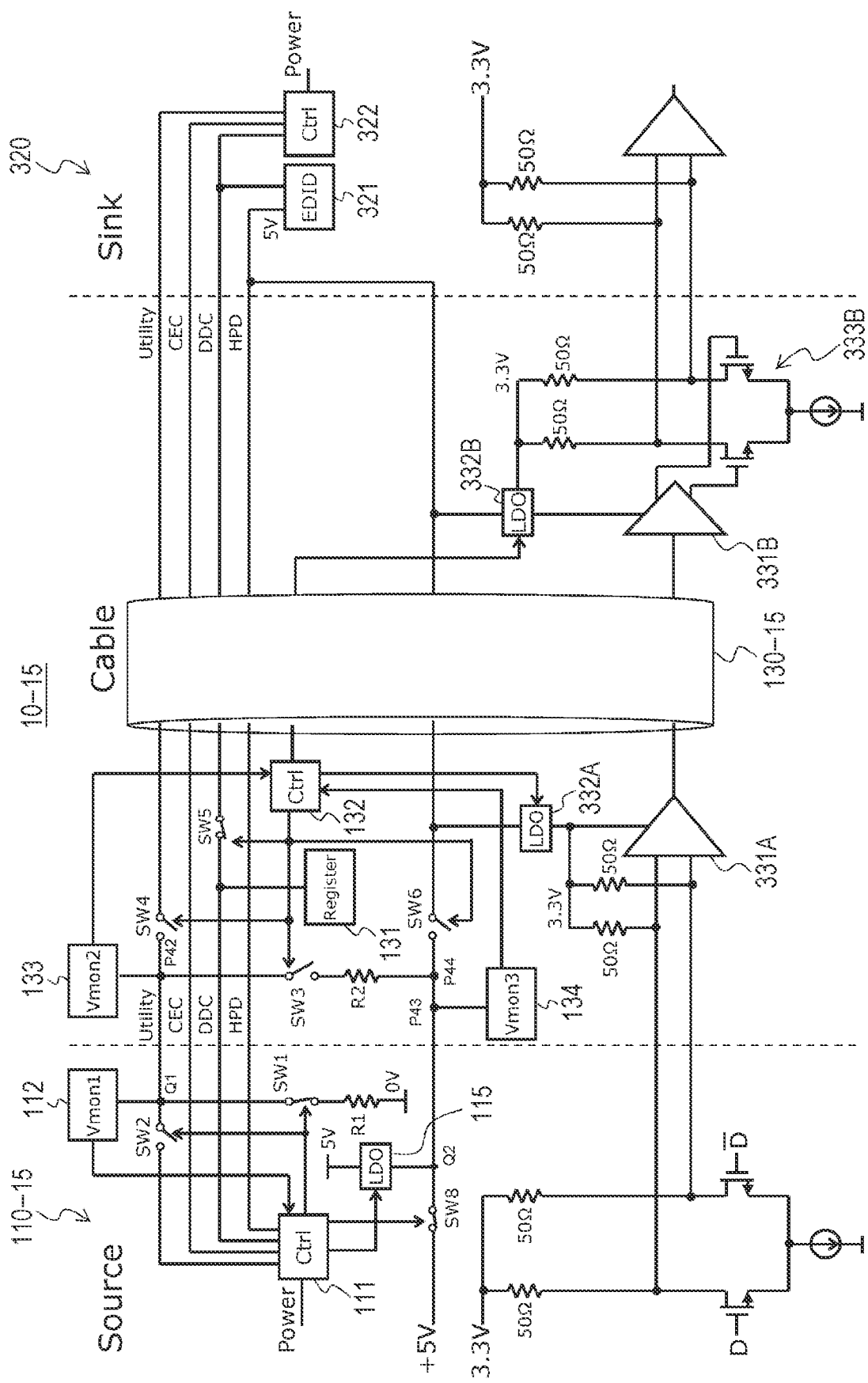
FIG. 95 is a diagram illustrating an exemplary configuration of the transmission system including the compatible source device that is compatible to intervening the repeater and the compatible HDMI cable (including register and current consumption unit).

FIG. 95 illustrates an exemplary configuration of a transmission system 10-15. The transmission system 10-15 is an HDMI transmission system using an HDMI as a digital interface. The transmission system 10-15 includes a source device 110-15 as a transmission device, a sink device 320 as a reception device, and an HDMI cable 130-15 that connects these devices. In FIG. 95, a part corresponding to that in FIGS. 93 and 94 is denoted with the same reference numeral, and the detailed description thereof is appropriately omitted.

The HDMI cable 130-15 has a configuration similar to that of the HDMI cable 130-13 in the transmission system 10-13 in FIG. 93. The source device 110-13 of the transmission system 10-13 in FIG. 93 includes the resistor R3. However, in the source device 110-15, a low drop out (LDO) regulator 115 is disposed instead of the resistor R3. The LDO regulator 115 is controlled by a control unit 111 and generates a voltage of 3 V at a timing when a switch SW8 is opened. In a case where the switch SW8 is in a short-circuit state, the LDO regulator 115 is controlled to generate a voltage of 5 V.

Although detailed description is omitted, the transmission system 10-15 operates similarly to the transmission systems 10-13 and 10-14 respectively in FIGS. 93 and 94 and can obtain a similar effect.

Sixteenth Embodiment

Figure 96:
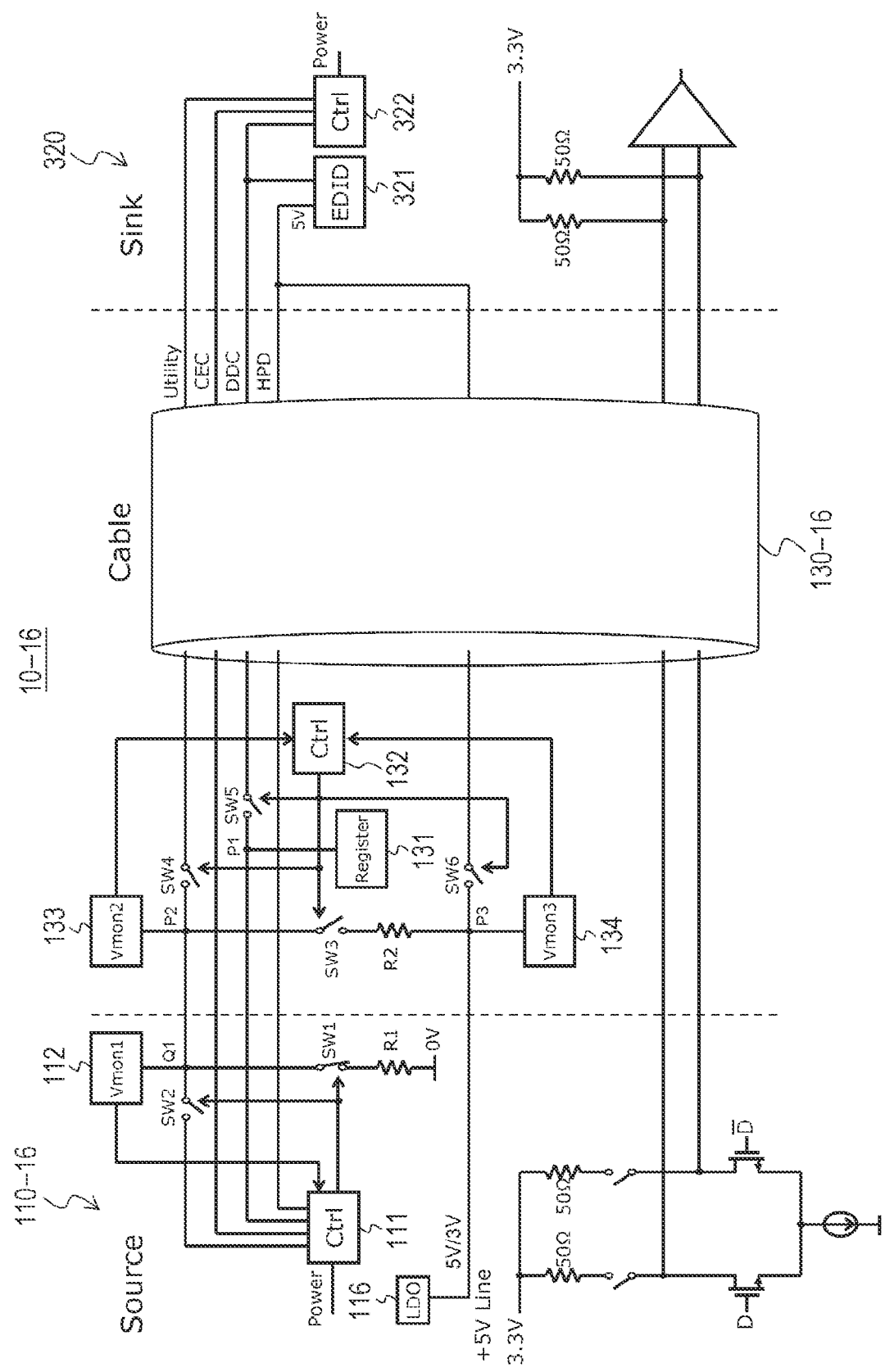
FIG. 96 is a diagram illustrating an exemplary configuration of the transmission system including the compatible source device that is compatible to intervening the repeater and the compatible HDMI cable (including register).

FIG. 96 illustrates an exemplary configuration of a transmission system 10-16. The transmission system 10-16 is an HDMI transmission system using an HDMI as a digital interface. The transmission system 10-16 includes a source device 110-16 as a transmission device, a sink device 320 as a reception device, and an HDMI cable 130-16 that connects these devices. In FIG. 96, a part corresponding to that in FIGS. 80, 92, and 94 is denoted with the same reference numeral, and the detailed description thereof is appropriately omitted.

The HDMI cable 130-14 has a configuration similar to that of the HDMI cable 130-14 in the transmission system 10-14 in FIG. 94. The source device 110-14 of the transmission system 10-14 in FIG. 94 includes the LDO regulator 115 and the switch SW8. Whereas, in the source device 110-16, an LDO regulator 116 that sets a voltage of a +5 V power line is disposed instead of the LDO regulator 115 and the switch SW8. The LDO regulator 116 is controlled by a control unit 111 and is controlled to generate a voltage of 3 V at a timing similar to the timing when the switch SW8 is opened by the transmission system 10-14 in FIG. 94 and to generate a voltage of 5 V at other timings.

Since the LDO regulator 116 generates the voltage of 3 V at the timing similar to the timing when the switch SW8 is opened by the transmission system 10-14 in FIG. 94, resistors R1 and R2 are connected in series between the ground (0 V) of the source device 110-16 and a 3 V power supply, and a voltage of 2 V is obtained at points Q1 and P2 of a Utility line. With this operation, similarly to the transmission systems 10-10, 10-12, and 10-14 respectively in FIGS. 80, 92, and 94, and the source device 110-16 and the HDMI cable 130-16 can determine that a relay such as a repeater that isolates the +5 V power line does not intervene between the source device 110-16 and the HDMI cable 130-16.

Although detailed description is omitted, the transmission system 10-16 operates similarly to the transmission systems 10-10, 10-12, and 10-14 respectively in FIGS. 80, 92, and 94 and can obtain a similar effect. Furthermore, since the transmission system 10-16 does not use the switch SW8, it is possible to avoid an unstable operation caused by a ripple generated when the open state and the short-circuit state of the switch SW8 are switched.

Seventeenth Embodiment

Figure 97:
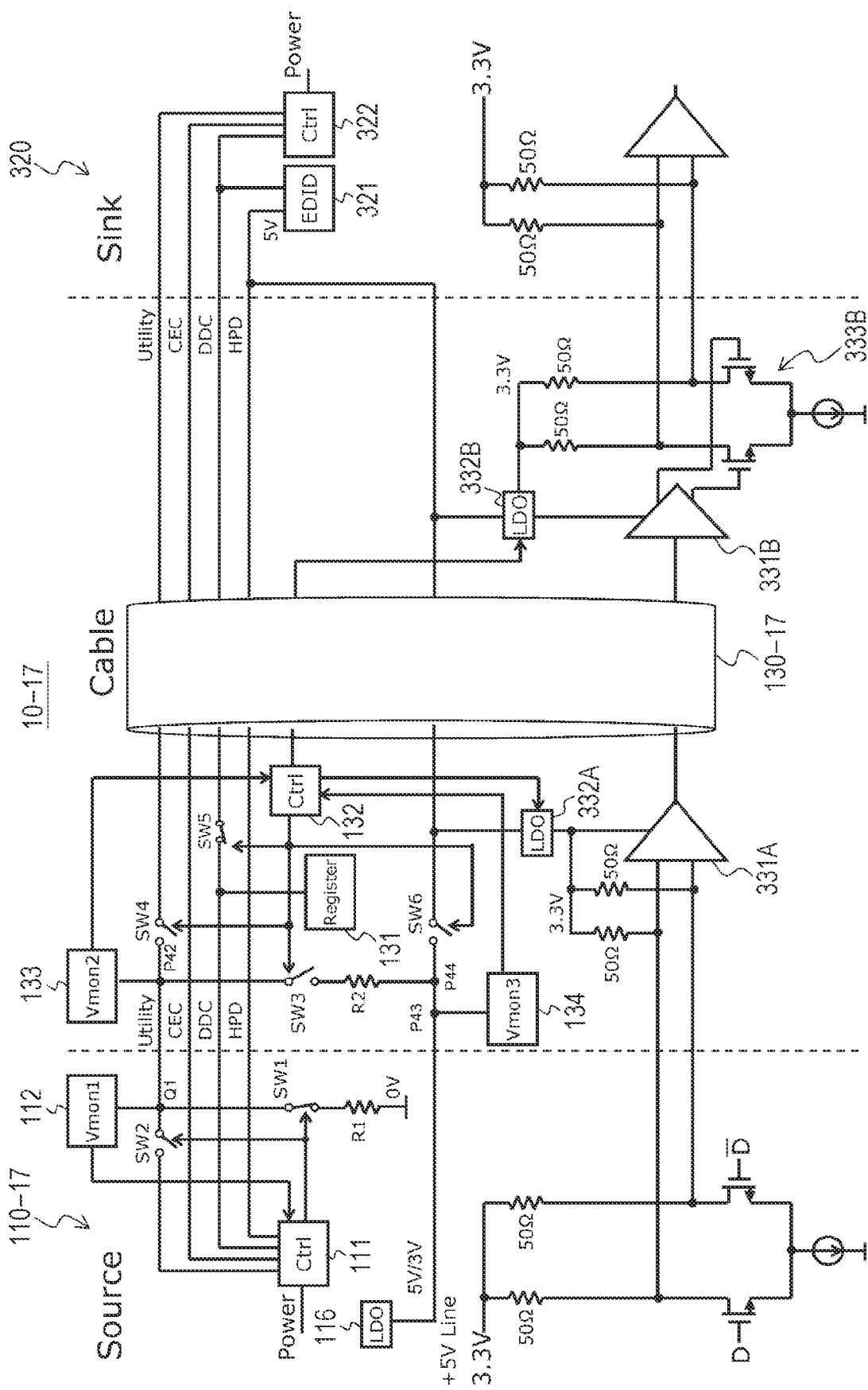
FIG. 97 is a diagram illustrating an exemplary configuration of the transmission system including the compatible source device that is compatible to intervening the repeater and the compatible HDMI cable (including register and current consumption unit).

FIG. 97 illustrates an exemplary configuration of a transmission system 10-17. The transmission system 10-17 is an HDMI transmission system using an HDMI as a digital interface. The transmission system 10-17 includes a source device 110-17 as a transmission device, a sink device 320 as a reception device, and an HDMI cable 130-17 that connects these devices. In FIG. 97, a part corresponding to that in FIGS. 95 and 96 is denoted with the same reference numeral, and the detailed description thereof is appropriately omitted.

The HDMI cable 130-17 has a configuration similar to that of the HDMI cable 130-15 in the transmission system 10-15 in FIG. 95. The source device 110-15 of the transmission system 10-15 in FIG. 95 includes the LDO regulator 115 and the switch SW8. Whereas, in the source device 110-17, an LDO regulator 116 that sets a voltage of a +5 V power line is disposed instead of the LDO regulator 115 and the switch SW8. The LDO regulator 116 is controlled by a control unit 111 and is controlled to generate a voltage of 3 V at a timing similar to the timing when the switch SW8 is opened by the transmission system 10-15 in FIG. 95 and to generate a voltage of 5 V at other timings.

Although detailed description is omitted, the transmission system 10-17 operates similarly to the transmission systems 10-15 and 10-16 respectively in FIGS. 95 and 96 and can obtain a similar effect.

<2. Modification>

Note that in the tenth to seventeenth embodiments, until receiving the connection detection signal from the sink device via the HPD line, the source device short-circuits the switch SW1 and causes a state where the voltage of 4 V is obtained at the point Q1 of the Utility line. Then, in a case where the HDMI cable is removed from the source device, the source device can detect the removal. Although detailed description is omitted, it is considered that the other embodiment has a similar configuration and obtain a similar effect.

Furthermore, in the above embodiments, an example has been described in which it is determined whether or not the source device and the HDMI cable are compatible devices by using the Utility line and the power line. However, the line to be used is not limited to these, and it is considered to use other lines.

Furthermore, in the above embodiments, the transmission system in which the source device and the sink device are connected with the HDMI cable has been described as an example. However, since the present technology can be similarly applied to a cable that uses a mechanism defined by VESA plug and display (P&D) Specification and connects a transmission device and a reception device, the present technology can be applied to a DVI, a MHL, a Display Port, and the like. Furthermore, the present technology can be applied to wireless communication and the like without limiting to the AOC and the ACC. Moreover, the present technology may be naturally and similarly applied to a USB cable and the like.

For example, a configuration in a case where "Display Port" is used will be briefly described. FIG. 98A illustrates pin arrangement of "Display Port". AuX+/− corresponds to a DDC of the HDMI, and 3.3 V corresponds to +5 V of the HDMI. Hot plug detection corresponds to the HPD of the HDMI.

The configuration illustrated in FIG. 15 can be obtained by using a 3.3 V power line instead of the +5 V power line. In a case of the configuration in FIG. 7, a 14-pin GND may be used instead of the Utility line. In a case where one of the source device and the cable is a non-compatible device such as a legacy, since the switch SW2 or the switch SW4 illustrated in FIG. 7 does not exist, short-circuit with the GND occurs. However, in a case where the source device is a non-compatible device as illustrated in FIG. 11, the voltage on the cable side is 0 V. Therefore, no problem occurs. Even in a case where the cable is a non-compatible device as illustrated in FIG. 12, since 3.3 V is connected to the GND via 100 kΩ, a leakage current is 33 ρA and is extremely small. Therefore, no problem occurs.

Furthermore, the present technology can be applied to "Thunderbolt". FIG. 98B illustrates pin arrangement of "Thunderbolt". In a case of "Thunderbolt", "DPPWR" corresponds to the +5 V line. The HPD is prepared in advance. Regarding the HDMI, an example has been described in which resistance voltage division is performed between the source and the cable by using the Utility line. However, in a case of "Thunderbolt", reserve No. 10 or No. 12 may be used.

Furthermore, the present technology can have a configuration below.

(1) A cable connected between a first electronic device and a second electronic device, the cable including:
a determination unit configured to determine whether or not the first electronic device is a compatible electronic device; and
a control unit configured to perform control to operate in a compatible mode when the first electronic device is a compatible electronic device and operate in a non-compatible mode when the first electronic device is not a compatible electronic device on the basis of the determination result by the determination unit.

(2) The cable according to (1), in which
the determination unit determines whether or not the first electronic device is a compatible electronic device on the basis of a voltage monitoring result of a predetermined line to which a predetermined voltage is applied via a voltage dividing resistor.

(3) The cable according to (2), in which
a first switch is connected to the voltage dividing resistor in series, and
the first switch is in a short-circuit state when the determination is made.

(4) The cable according to (3), in which
a second switch is inserted at a point closer to the second electronic device than a point where the voltage of the predetermined line is monitored, and
the second switch is in an open state when the determination is made.

(5) The cable according to (4), in which
when the voltage of the predetermined line measured by the voltage monitoring becomes the predetermined voltage, the control unit, in the compatible mode, changes a short-circuit state of the first switch to an open state, and thereafter, changes an open state of the second switch to a short-circuit state.

(6) The cable according to any one of (1) to (5), further including:
a register connected to a communication line, in which a third switch is connected at a point closer to the second electronic device than a point of the communication line where the register is connected, and after confirming that the first electronic device accesses the register, the control unit, in the compatible mode, changes an open state of the third switch to a short-circuit state.

(7) The cable according to (6), in which
the control unit confirms that the first electronic device accesses the register on the basis of the voltage monitoring result of the predetermined line to which the predetermined voltage is applied via the voltage dividing resistor.

(8) The cable according to (6) or (7), in which
a fourth switch is inserted into a power line, and
after changing the open state of the third switch to the short-circuit state, the control unit, in the compatible mode, changes an open state of the fourth switch to a short-circuit state.

(9) The cable according to any one of (6) to (8), in which in the non-compatible mode, the control unit changes the open state of the third switch to the short-circuit state without confirming that the first electronic device accesses the register.

(10) The cable according to (9), in which
a fourth switch is inserted into a power line, and
after changing the open state of the third switch to the short-circuit state, the control unit, in the non-compatible mode, changes an open state of the fourth switch to a short-circuit state.

(11) The cable according to any one of (1) to (5), further including:
a current consumption unit connected to a power line, in which
after confirming that the first electronic device determines that the cable of the first electronic device is a compatible cable, the control unit, in the compatible mode, changes a no-current consumption state of the current consumption unit to a current consumption state.

(12) The cable according to (11), in which
a fifth switch is inserted into the power line, and
after confirming that the first electronic device determines that the cable of the first electronic device is a compatible cable, the control unit, in the compatible mode, changes an open state of the fifth switch to a short-circuit state.

(13) The cable according to (11), in which
the control unit confirms that the first electronic device determines that the cable of the first electronic device is a compatible cable on the basis of the voltage monitoring result of a predetermined line to which a predetermined voltage is applied via a voltage dividing resistor.

(14) The cable according to (12), in which
the control unit, in the non-compatible mode, changes the open state of the fifth switch to the short-circuit state without confirming that the first electronic device determines that the cable of the first electronic device is a compatible cable.

(15) The cable according to (1) or (2), in which
the control unit performs control to operate in the compatible mode when the first electronic device is a compatible electronic device and a relay that isolates a power line does not intervene between the first electronic device and the control unit.

(16) The cable according to (15), in which
the control unit determines that the first electronic device is a compatible electronic device as a voltage of a predetermined line to which a predetermined voltage is applied via a voltage dividing resistor becomes a first voltage, and thereafter, determines that the relay does not intervene between the first electronic device and the control unit as the voltage of the predetermined line changes to a second voltage.

(17) The cable according to (1) or (2), further including:
an information transmission unit configured to exchange information with the first electronic device and function at the time of an operation in the compatible mode.

(18) The cable according to (17), in which
the information transmission unit includes
a variable resistance circuit connected to a predetermined line, and
transmits arbitrary information to the first electronic device by changing a resistance value of the variable resistance circuit.

(19) The cable according to (18), in which
the information transmission unit
monitors a voltage of the predetermined line in a state where the resistance value of the variable resistance circuit is fixed to a predetermined value so as to receive predetermined information from the first electronic device.

(20) A method of controlling a cable connected between a first electronic device and a second electronic device, the method including:
a determining step of determining whether or not the first electronic device is a compatible electronic device by a determination unit; and
a controlling step of performing control, by a control unit, to operate in a compatible mode when the first electronic device is a compatible electronic device and operate in a non-compatible mode when the first electronic device is not a compatible electronic device on the basis of the determination result by the determination unit.

(21) A connection device connected between a first electronic device and a second electronic device, the connection device including:
a determination unit configured to determine whether or not the first electronic device is a compatible electronic device; and
a control unit configured to perform control to operate in a compatible mode when the first electronic device is a compatible electronic device and operate in a non-compatible mode when the first electronic device is not a compatible electronic device on the basis of the determination result by the determination unit.

(22) An electronic device connected to an external device via a cable, the electronic device including:
a determination unit configured to determine whether or not the cable is a compatible cable; and
a control unit configured to perform control to operate in a compatible mode when the cable is a compatible cable and operate in a non-compatible mode when the cable is not a compatible cable on the basis of the determination result by the determination unit.

(23) The electronic device according to (22), in which
the determination unit determines whether or not the cable is a compatible cable on the basis of a voltage monitoring result of a predetermined line to which a predetermined voltage is applied via a voltage dividing resistor.

(24) The electronic device according to (23), in which
a first switch is connected to the voltage dividing resistor in series, and
the first switch is in a short-circuit state when the determination is made.

(25) The electronic device according to (24), in which
a second switch is inserted on a side opposite to a terminal side of a point where the voltage of the predetermined line is monitored, and the second switch is in an open state when the determination is made.

(26) The electronic device according to (24) or (25), in which
after detecting that a connection detection line becomes a high level, the control unit changes a short-circuit state of the first switch to an open state in the compatible mode.

(27) The electronic device according to (24), in which
the control unit changes a short-circuit state of the first switch to an open state in the non-compatible mode.

(28) The electronic device according to any one of (24) to (26), in which
before changing the short-circuit state of the first switch to the open state, the control unit accesses a register of the cable through a communication line in the compatible mode.

(29) The electronic device according to any one of (24) to (26), in which
before changing the short-circuit state of the first switch to the open state, the control unit changes a current that can be supplied by a power line from a first current to a second current higher than the first current in the compatible mode.

(30) The electronic device according to (22) or (23), in which
when the cable is a compatible cable and a relay that isolates a power line does not intervene between the cable and the control unit, the control unit performs control to operate in the compatible mode.

(31) The electronic device according to (30), in which
the control unit determines that the cable is a compatible cable as a voltage of a predetermined line to which a predetermined voltage is applied via a voltage dividing resistor becomes a first voltage, and thereafter, determines that the relay does not intervene between the cable and the control unit as the voltage of the predetermined line changes to a second voltage.

(32) The electronic device according to (22) or (23), further including:
an information transmission unit configured to exchange information with the cable and function at the time of an operation in the compatible mode.

(33) The electronic device according to (32), in which
the information transmission unit includes
a variable resistance circuit connected to a predetermined line, and
transmits arbitrary information to the cable by changing a resistance value of the variable resistance circuit.

(34) The electronic device according to (33), in which
the information transmission unit
monitors a voltage of the predetermined line in a state where the resistance value of the variable resistance circuit is fixed to a predetermined value so as to receive predetermined information from the cable.

(35) A method of controlling an electronic device connected to an external device via a cable, the method including:
a determining step of determining whether or not the cable is a compatible cable by a determination unit; and
a controlling step of performing control, by a control unit, to operate in a compatible mode when the cable is a compatible cable and operate in a non-compatible mode when the cable is not a compatible cable on the basis of the determination result by the determination unit.

(36) An electronic device connected to an external device via a connection device, the electronic device including:
a determination unit configured to determine whether or not the connection device is a compatible connection device; and
a control unit configured to perform control to operate in a compatible mode when the connection device is a compatible connection device and operate in a non-compatible mode when the connection device is not a compatible connection device on the basis of the determination result by the determination unit.

REFERENCE SIGNS LIST

10-1 to 10-17, 10-1A to 10-4A, 10-1B to 10-4B, 10-6B to 10-6C, 10-8A to 10-8B, 10-9A to 10-9D Transmission system
110-1 to 110-17 Source device
111 Control unit
112 Voltage monitoring unit
113 Ammeter
114, 135 Variable resistance circuit
115, 116 LDO regulator
130-1 to 130-17, 130-9D, 330, 330 CHDMI cable
131 Register
132 Control unit
133, 134 Voltage monitoring unit
140 Repeater
141 Amplifier
310 Source device
311 Control unit
320 Sink device
321 EDID ROM
322 Control unit
331A, 331B Conversion circuit
332A, 332B LDO regulator
333B Current driving unit
SW1 to SW8, SW11 to SW15, SW21 to SW24, SW26, SW31 to SW33, SW35, SW41 to SW44, SW46 to SW49 Switch
R1, R2, R3 Voltage dividing resistor

The invention claimed is:

1. A device for connection to a first electronic device and a second electronic device, the device comprising:
circuitry configured to:
determine the first electronic device is one of a compatible electronic device or a non-compatible electronic device;
control the device to:
operate in a compatible mode based on the determination that the first electronic device is the compatible electronic device; and
operate in a non-compatible mode based on the determination that the first electronic device is the non-compatible electronic device; and
connect to the first electronic device via a plurality of lines.

2. The device according to claim 1, wherein the plurality of lines are lines of a High-Definition Multimedia Interface (HDMI) cable.

3. The device according to claim 2, wherein the circuitry is further configured to control a communication between the device and the first electronic device at least through a utility line of the HDMI cable based on the determination that the first electronic device is one of the compatible electronic device or the non-compatible electronic device.

4. The device according to claim 3, wherein a communication between the first electronic device and the second electronic device includes high-bandwidth digital content protection (HDCP) communication based on a display data channel (DDC) line of the HDMI cable.

5. The device according to claim 3, further comprising a register configured for access from the first electronic device through a display data channel (DDC) line of the HDMI cable.

6. The device according to claim 5, wherein the circuitry is further configured to control the first electronic device to access the register in the compatible mode.

7. The device according to claim 3, wherein the circuitry is further configured to:
monitor a voltage of a +5 V power line; and
determine disconnection of the device from the first electronic device based on decrease in the voltage of the +5 V power line.

8. The device according to claim 3, wherein
the first electronic device is a data transmission device for transmission of content data, and
the second electronic device is a data reproduction device for reproduction of the content data.

9. The device according to claim 1, wherein
the circuitry is further configured to determine that the first electronic device is the compatible electronic device based on a voltage monitoring result of at least one line, and
the at least one line corresponds to a line at which a voltage is applied via a voltage dividing resistor.

10. The device according to claim 1, wherein
the device is on a cable, and
the cable is for connection between the first electronic device and the second electronic device.

11. An electronic device for connection to an external device via a connection device, the electronic device comprising:
circuitry configured to:
determine the connection device is one of a compatible connection device or a non-compatible connection device;
control the electronic device to:
operate in a compatible mode based on the determination that the connection device is the compatible connection device; and
operate in a non-compatible mode based on the determination that the connection device is the non-compatible connection device; and
connect to the connection device via a plurality of lines.

12. The electronic device according to claim 11, wherein the plurality of lines are lines of a High-Definition Multimedia Interface (HDMI) cable.

13. The electronic device according to claim 12, wherein the circuitry is further configured to control a communication between the electronic device and the connection device at least through a utility line of the HDMI cable based on the determination that the connection device is one of the compatible connection device or the non-compatible connection device.

14. The electronic device according to claim 13, wherein the circuitry is further configured to perform high-bandwidth Digital Content Protection (HDCP) communication with the external device through a Display Data Channel (DDC) line of the HDMI cable.

15. The electronic device according to claim 13, wherein the circuitry is further configured to access a register of the connection device through a Display Data Channel (DDC) line of the HDMI cable.

16. The electronic device according to claim 15, wherein the circuitry is further configured to access the register in the compatible mode.

17. The electronic device according to claim 13, wherein the circuitry is further configured to:
detect a voltage level of a Hot Plug Detect (HPD) line of the HDMI cable; and
determine the connection device is one of the compatible connection device or the non-compatible connection device based on the voltage level of the HPD line.

18. The electronic device according to claim 13, wherein the electronic device is for connection to the connection device through a cable having a Lane 0, a Lane 1, a Lane 2, and a Lane 3.

19. The electronic device according to claim 13, wherein
the connection device is a repeater device, and
the repeater device is for connection between the electronic device and the external device.

20. The electronic device according to claim 11, wherein
the connection device is on a cable, and
the cable is for connection between the electronic device and the external device.

* * * * *